US012028474B2

(12) United States Patent
O'Leary et al.

(10) Patent No.: US 12,028,474 B2
(45) Date of Patent: Jul. 2, 2024

(54) USER INTERFACES ASSOCIATED WITH REMOTE INPUT DEVICES

(71) Applicant: Apple Inc., Cupertino, CA (US)

(72) Inventors: Fiona P. O'Leary, Palo Alto, CA (US); Jonathan A. Topf, San Francisco, CA (US); Mylène E. Dreyer, San Francisco, CA (US); Julian Missig, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 304 days.

(21) Appl. No.: 17/448,877

(22) Filed: Sep. 25, 2021

(65) Prior Publication Data
US 2022/0124191 A1  Apr. 21, 2022

Related U.S. Application Data

(60) Provisional application No. 63/261,653, filed on Sep. 24, 2021, provisional application No. 63/083,831, filed on Sep. 25, 2020.

(51) Int. Cl.
*H04M 1/72427* (2021.01)
*G06F 3/0481* (2022.01)
(Continued)

(52) U.S. Cl.
CPC ...... *H04M 1/72412* (2021.01); *G06F 3/0481* (2013.01); *G06F 3/04817* (2013.01); *G06F 3/0482* (2013.01); *H04M 1/72427* (2021.01)

(58) Field of Classification Search
CPC .......... H04M 1/72412; H04M 1/72427; G06F 3/0481; G06F 3/04817; G06F 3/0482
See application file for complete search history.

(56) References Cited

U.S. PATENT DOCUMENTS 6,323,846 B1  11/2001  Westerman et al.
6,570,557 B1  5/2003  Westerman et al.
(Continued)

FOREIGN PATENT DOCUMENTS

EP  3318310 A1  5/2018
TW  201039101 A  11/2010
(Continued)

OTHER PUBLICATIONS

Yannick Francillette et al., A Players clustering Method to Enhance the Players' Experience in Multi-Player Games, Jul. 1, 2013, International Conference on Computer Games, pp. 1-6 (Year: 2013).*

(Continued)

*Primary Examiner* — Tam T Tran
(74) *Attorney, Agent, or Firm* — Kubota & Basol LLP

(57) ABSTRACT

In some embodiments, an electronic device displays user interfaces associated with games in response to detecting input devices having been connected to the electronic device. In some embodiments, an electronic device displays a reduced user interface in response to detecting that a cover has covered a portion of the display of the electronic device. In some embodiments, an electronic device displays a user interface via a display generation component of an input device. In some embodiments, an electronic device projects a user interface via a projection device of an input device. In some embodiments, an electronic device directs inputs from an input device to different user interfaces depending on the mode in which the input device is operating.

27 Claims, 54 Drawing Sheets

(51) Int. Cl.
*G06F 3/04817* (2022.01)
*G06F 3/0482* (2013.01)
*H04M 1/72412* (2021.01)

(56) References Cited

U.S. PATENT DOCUMENTS

| | | | |
|---|---|---|---|
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 9,348,458 | B2 | 5/2016 | Hotelling et al. |
| 9,933,937 | B2 | 4/2018 | Lemay et al. |
| 2002/0015024 | A1 | 2/2002 | Westerman et al. |
| 2003/0224779 | A1 | 12/2003 | Sims |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0066740 | A1 | 3/2006 | Cheng et al. |
| 2006/0197753 | A1 | 9/2006 | Hotelling |
| 2011/0096513 | A1 | 4/2011 | Kim |
| 2011/0280403 | A1* | 11/2011 | DeLuca ............... H04L 67/303 380/278 |
| 2014/0221098 | A1* | 8/2014 | Boulanger ............ G06F 1/1632 361/679.3 |
| 2015/0084900 | A1* | 3/2015 | Hodges ................ G06F 3/0227 345/173 |
| 2017/0072304 | A1* | 3/2017 | Koizumi ................ G06F 3/011 |

FOREIGN PATENT DOCUMENTS

| | | |
|---|---|---|
| WO | 2013/169849 A2 | 11/2013 |
| WO | 2014/105276 A1 | 7/2014 |
| WO | 2014/123828 A1 | 8/2014 |

OTHER PUBLICATIONS

Emanuel Mineda Carneiro et al., Adaptive GAme AI Architecture with Player Modeling, Apr. 1, 2014, International Conference on Information Technology, pp. 40-45 (Year: 2014).*
International Search Report received for PCT Patent Application No. PCT/US2021/071597, dated Feb. 28, 2022, 10 pages.

* cited by examiner

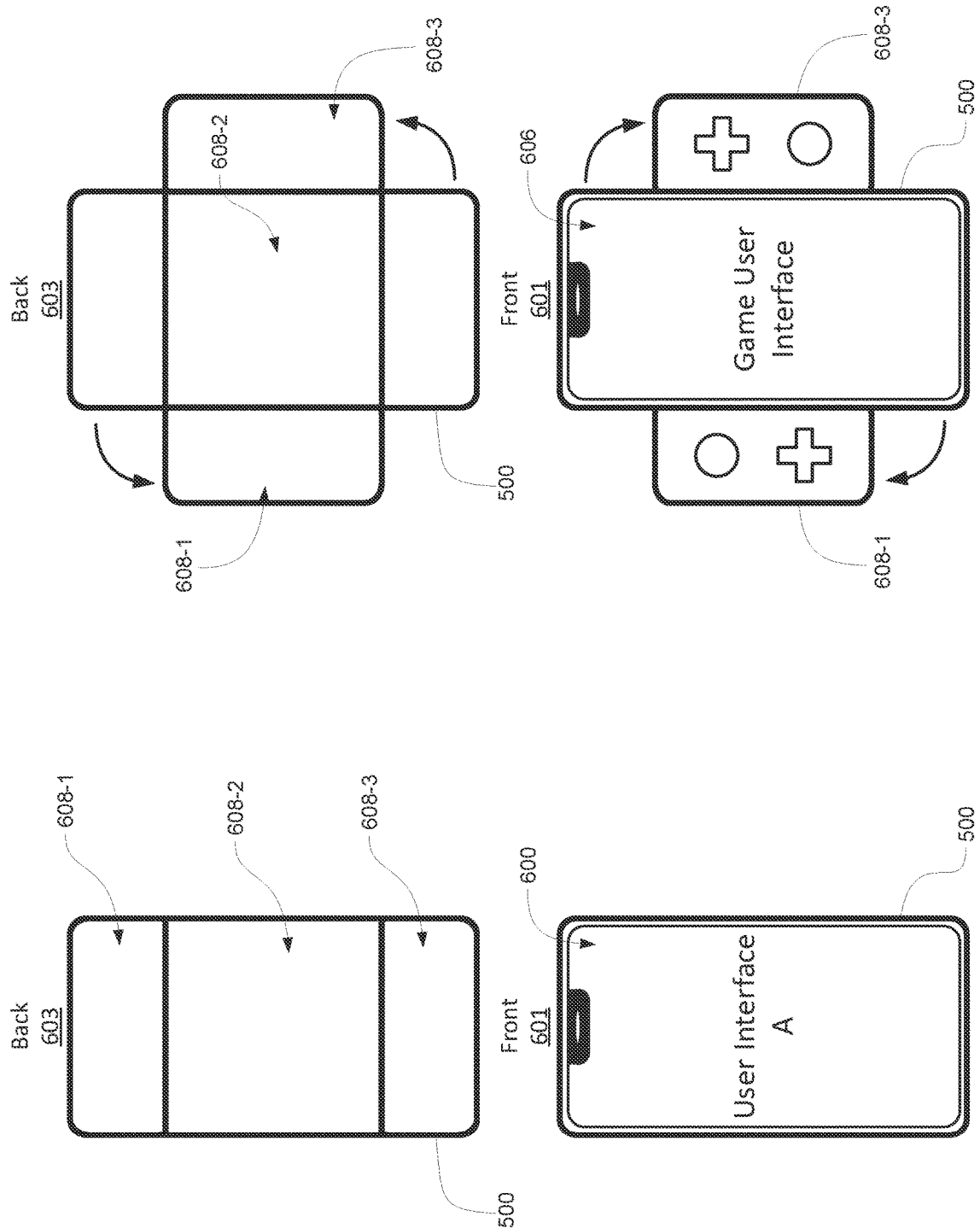

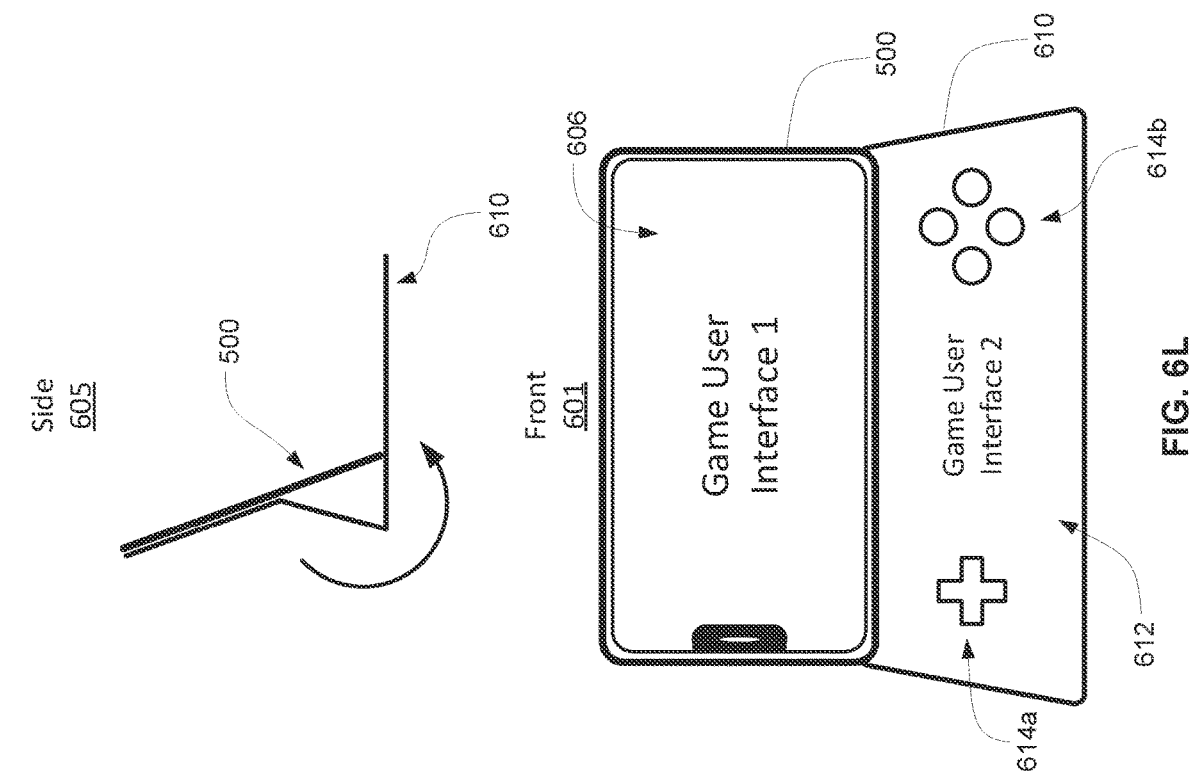

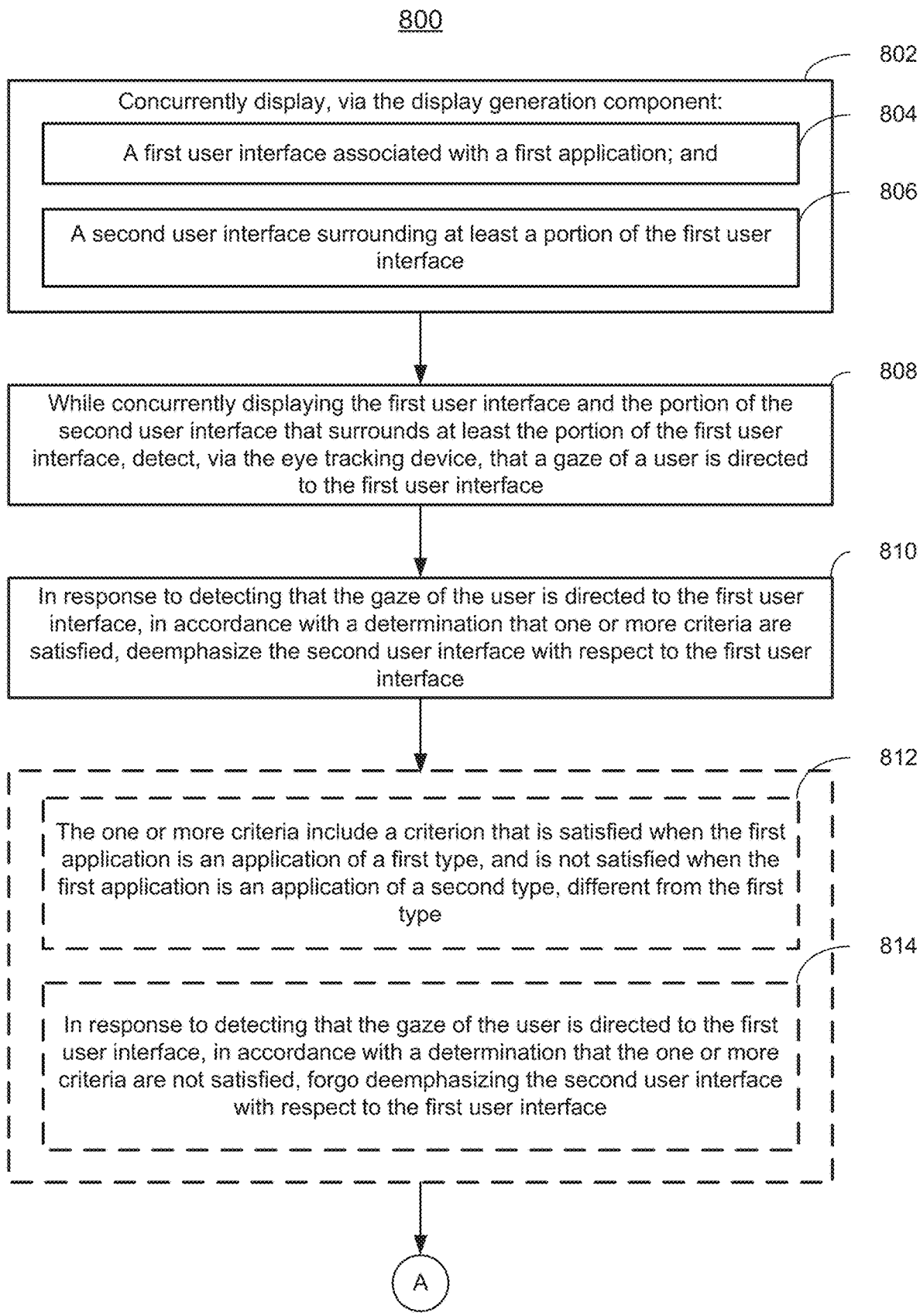

USER INTERFACES ASSOCIATED WITH REMOTE INPUT DEVICES

CROSS-REFERENCE TO RELATED APPLICATIONS

This application claims the benefit of U.S. Provisional Application No. 63/083,831, filed Sep. 25, 2020, and U.S. Provisional Application No. 63/261,653, filed Sep. 24, 2021, the content of which are incorporated herein by reference in their entirety for all purposes.

FIELD OF THE DISCLOSURE

This relates generally to electronic devices that receive user inputs via remote input devices, and user interactions with such devices.

BACKGROUND

User interaction with electronic devices has increased significantly in recent years. These devices can be devices such as computers, tablet computers, televisions, multimedia devices, mobile devices, and the like. In some circumstances, electronic devices receive user inputs via remote input devices.

SUMMARY

Some embodiments described in this disclosure are directed to displaying user interfaces associated with games in response to detecting input devices having been connected to an electronic device. Some embodiments described in this disclosure are directed to displaying a reduced user interface in response to detecting that a cover has covered a portion of the display of an electronic device. Some embodiments described in this disclosure are directed to displaying a user interface via a display generation component of an input device. Some embodiments described in this disclosure are directed to projecting a user interface via a projection device of an input device. Some embodiments described in this disclosure are directed to directing inputs from an input device to different user interfaces depending on the mode in which the input device is operating.

The embodiments described in this disclosure provide the user with the ability to provide inputs to electronic devices via various input devices. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 6A-6M illustrate exemplary ways in which an electronic device displays a game user interface in response to detecting that an input device has been connected to the electronic device in accordance with some embodiments.

FIGS. 8A-8F illustrate exemplary ways in which an electronic device displays a reduced user interface in response to detecting that a cover has covered a portion of the display of the electronic device in accordance with some embodiments.

FIGS. 12A-12K illustrate exemplary ways in which an input device projects a user interface in accordance with some embodiments.

DETAILED DESCRIPTION

Figure 1:
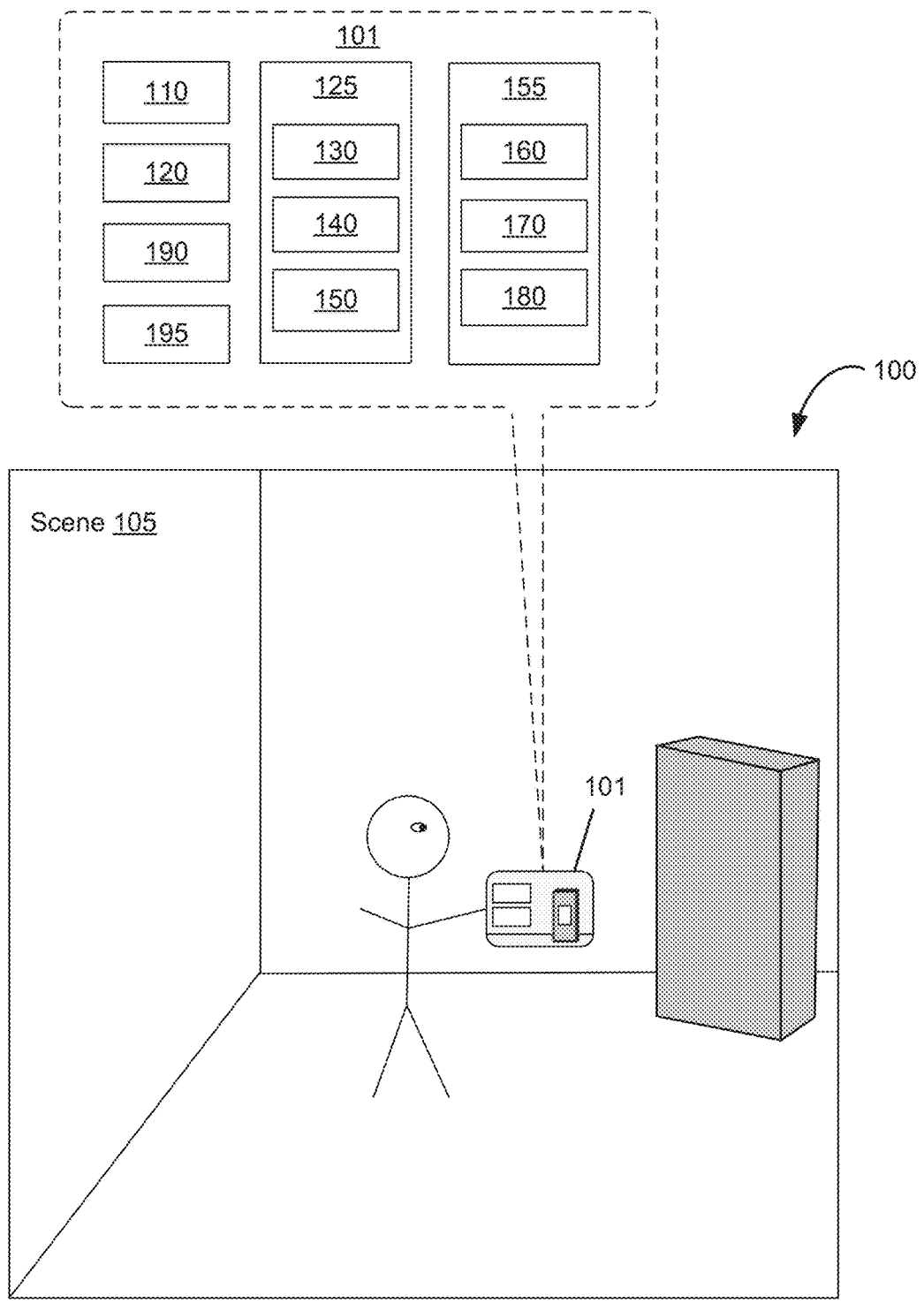
FIG. 1A is a block diagram illustrating a portable multifunction device with a touch-sensitive display in accordance with some embodiments.
FIG. 1B is a block diagram illustrating exemplary components for event handling in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for efficient interfaces for electronic devices that receive user inputs from remote input devices. In some implementations, an electronic device displays respective user interfaces associated with games in response to detecting that a remote input device has been connected to the electronic device. In some implementations, an electronic device displays a reduced user interface in response to detecting that a cover has covered a portion of the display of the electronic device. In some implementations, an electronic device displays a user interface via a display generation component of a remote input device. In some embodiments, an electronic device projects a user interface via a projection device of a remote input device. In some embodiments, an electronic device directs inputs to different user interfaces depending on the mode of operation of a remote input device. Such techniques can increase the efficiency of providing inputs to the electronic device, especially while playing a game, and reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
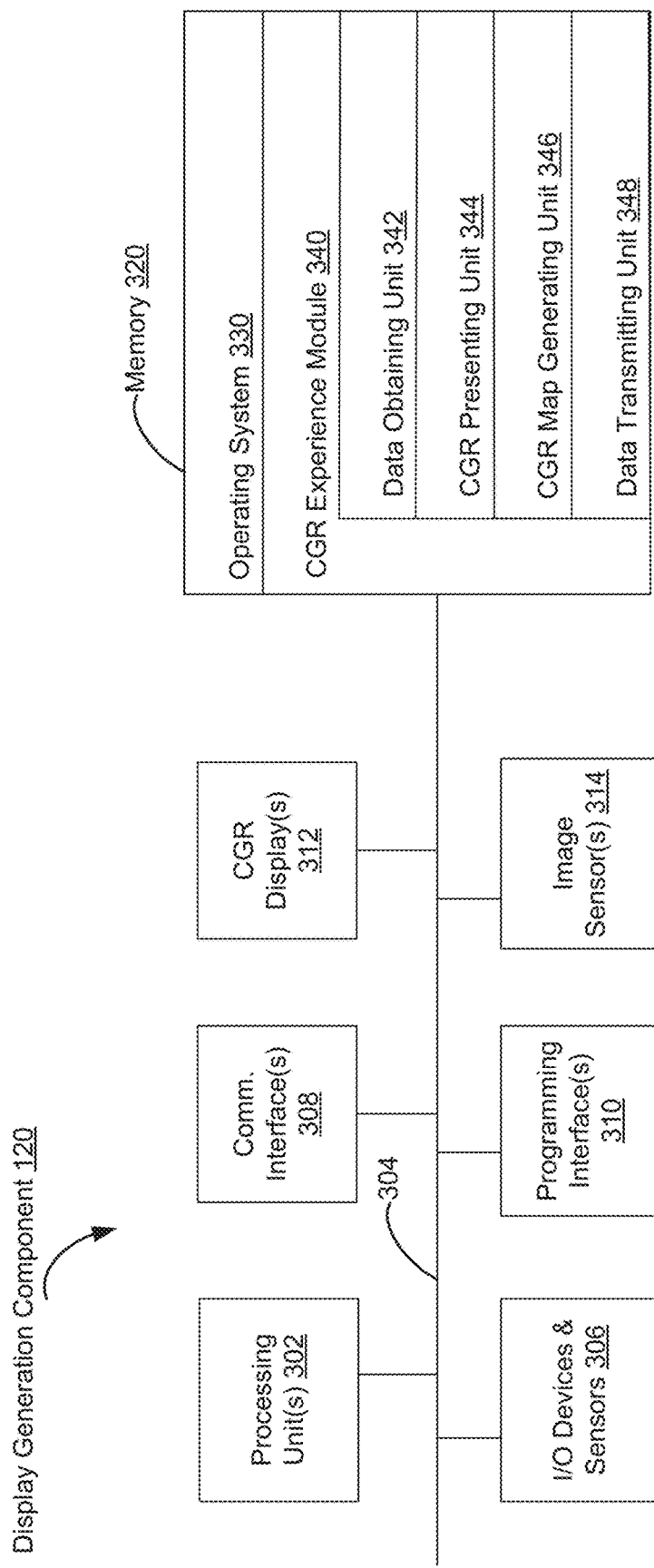
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;

Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
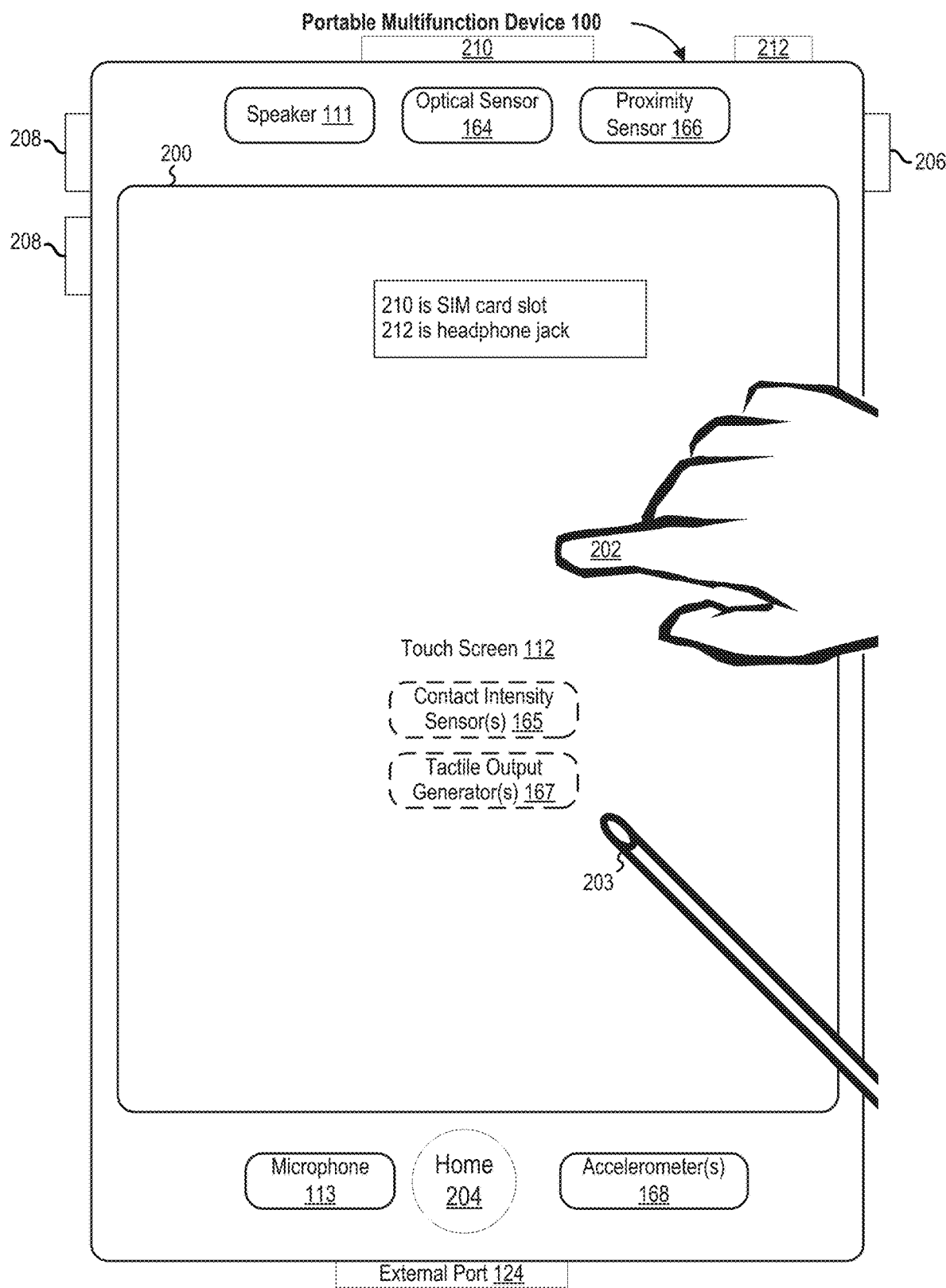
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
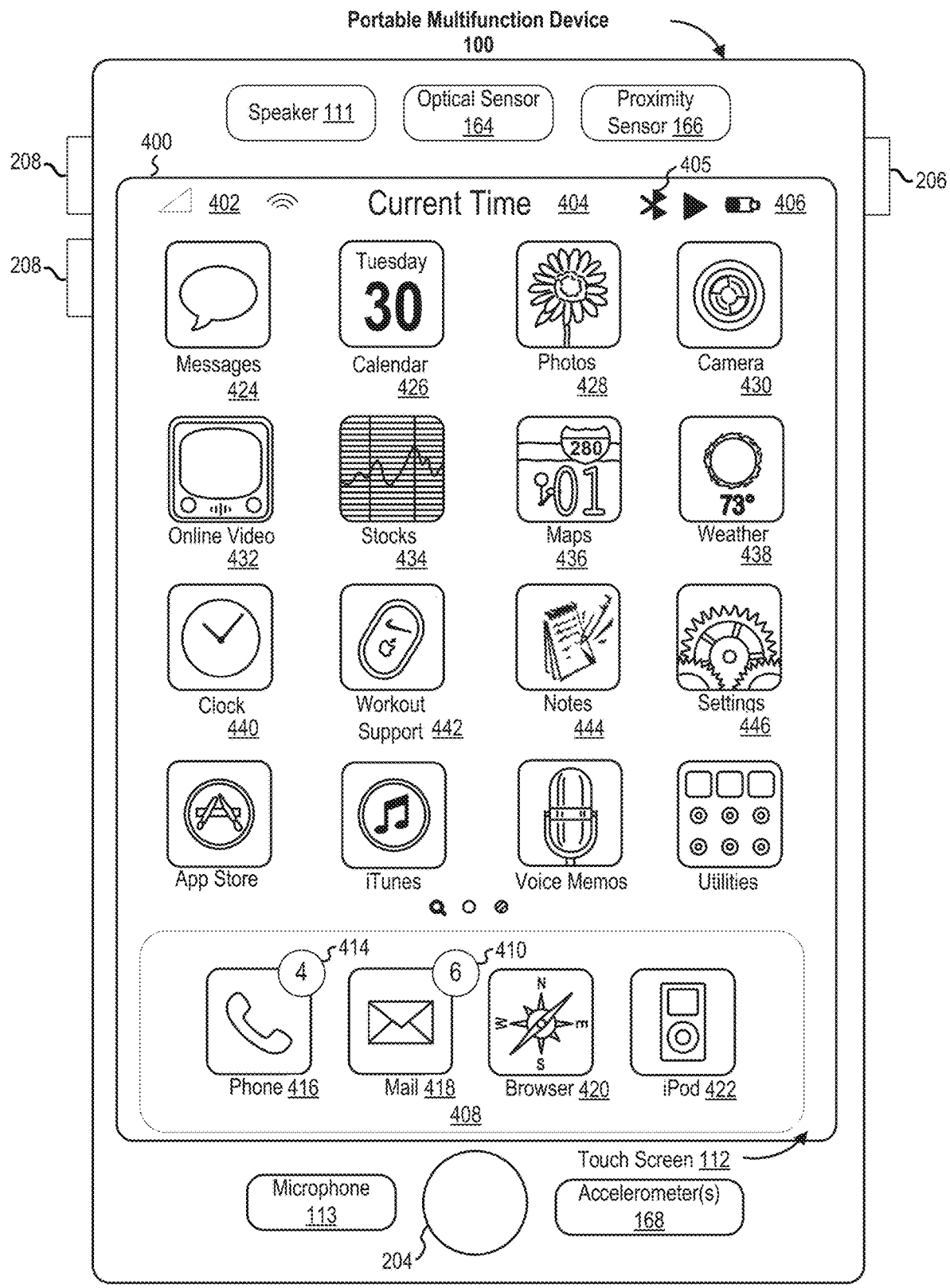
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
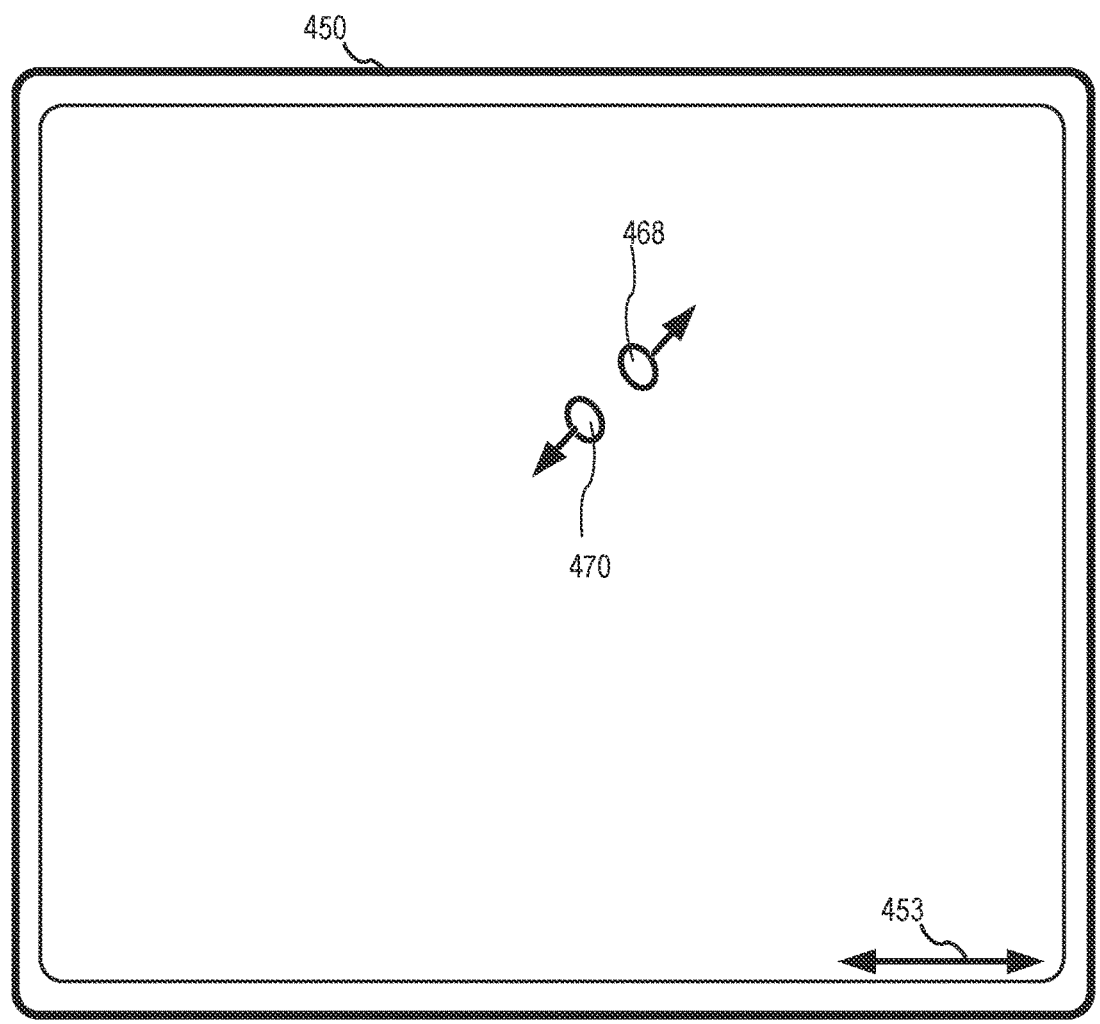
FIG. 4B illustrates an exemplary user interface for a multifunction device with a touch-sensitive surface that is separate from the display in accordance with some embodiments.
Figure 4B:
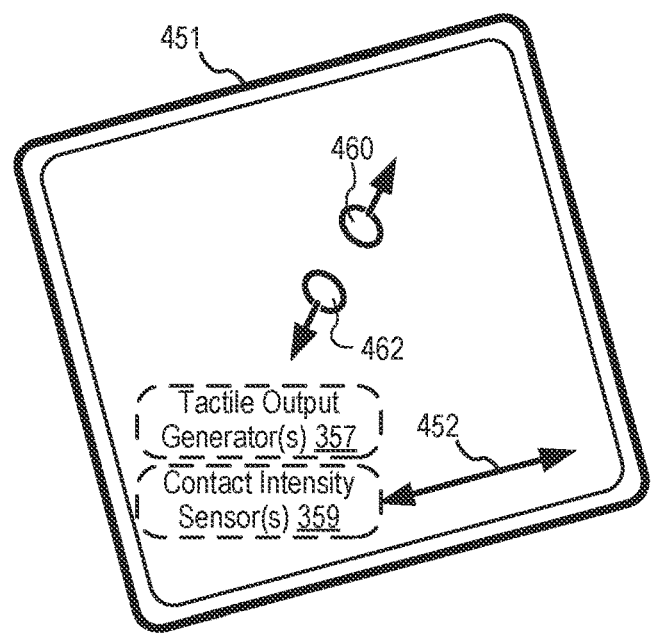

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

FIG. 5B depicts exemplary personal electronic device 500. In some embodiments, device 500 can include some or all of the components described with respect to FIGS. 1A, 1, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-18. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

FIG. 5I illustrates a block diagram of an exemplary architecture for the device 580 according to some embodiments of the disclosure. In the embodiment of FIG. 5I, media or other content is optionally received by device 580 via network interface 582, which is optionally a wireless or wired connection. The one or more processors 584 optionally execute any number of programs stored in memory 586 or storage, which optionally includes instructions to perform one or more of the methods and/or processes described herein (e.g., methods 700, 900, 1100, 1300 and 1500).

In some embodiments, display controller 588 causes the various user interfaces of the disclosure to be displayed on display 594. Further, input to device 580 is optionally provided by remote 590 via remote interface 592, which is optionally a wireless or a wired connection. In some embodiments, input to device 580 is provided by a multifunction device 591 (e.g., a smartphone) on which a remote control application is running that configures the multifunction device to simulate remote control functionality, as will be described in more detail below. In some embodiments, multifunction device 591 corresponds to one or more of device 100 in FIGS. 1A and 2, device 300 in FIG. 3, and device 500 in FIG. 5A. It is understood that the embodiment of FIG. 5I is not meant to limit the features of the device of the disclosure, and that other components to facilitate other features described in the disclosure are optionally included in the architecture of FIG. 5I as well. In some embodiments, device 580 optionally corresponds to one or more of multifunction device 100 in FIGS. 1A and 2, device 300 in FIG. 3, and device 500 in FIG. 5A; network interface 582 optionally corresponds to one or more of RF circuitry 108, external port 124, and peripherals interface 118 in FIGS. 1A and 2, and network communications interface 360 in FIG. 3; processor 584 optionally corresponds to one or more of processor(s) 120 in FIG. 1A and CPU(s) 310 in FIG. 3; display controller 588 optionally corresponds to one or more of display controller 156 in FIG. 1A and I/O interface 330 in FIG. 3; memory 586 optionally corresponds to one or more of memory 102 in FIG. 1A and memory 370 in FIG. 3; remote interface 592 optionally corresponds to one or more of peripherals interface 118, and I/O subsystem 106 (and/or its components) in FIG. 1A, and I/O interface 330 in FIG. 3; remote 590 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 594 optionally corresponds to one or more of touch-sensitive display system 112 in FIGS. 1A and 2, and display 340 in FIG. 3.

FIG. 5J illustrates an exemplary structure for remote 590 according to some embodiments of the disclosure. In some embodiments, remote 590 optionally corresponds to one or more of multifunction device 100 in FIGS. 1A and 2, device 300 in FIG. 3, and device 500 in FIG. 5A. Remote 590 optionally includes touch-sensitive surface 593, similar to touch-sensitive surface 451 in FIG. 4. In some embodiments, touch-sensitive surface 593 is edge-to-edge (e.g., it extends to the edges of remote 590, such that little or no surface of remote 590 exists between the touch-sensitive surface 593 and one or more edges of remote 590, as illustrated in FIG. 5J). Touch-sensitive surface 593 is optionally able to sense contacts as well as contact intensities (e.g., clicks of touch-sensitive surface 593), as previously described in this disclosure. Further, touch-sensitive surface 593 optionally includes a mechanical actuator for providing physical button click functionality (e.g., touch-sensitive surface 593 is "clickable" to provide corresponding input to device 580). Remote 590 also optionally includes buttons 596-1, 596-2, 596-3, 596-4, 596-5, and 596-6. Buttons 596-1, 596-2, 596-3, 596-4, 596-5, and 596-6 are optionally mechanical buttons or mechanical button alternatives that are able to sense contact with, or depression of, such buttons to initiate corresponding action(s) on, for example, device 580. In some embodiments, selection of "menu" button 596-1 by a user navigates device 580 backwards in a currently-executing application or currently-displayed user interface (e.g., back to a user interface that was displayed previous to the currently-displayed user interface), or navigates device 580 to a one-higher-level user interface than the currently-displayed user interface. In some embodiments, selection of "home" button 596-2 by a user navigates device 580 to a main, home, or root user interface from any user interface that is displayed on device 580 (e.g., to a home screen of device 580 that optionally includes one or more applications accessible on device 580). In some embodiments, selection of the "home" button 596-2 causes the electronic device to navigate to a unified media browsing application. In some embodiments, selection of "play/pause" button 596-3 by a user toggles between playing and pausing a currently-playing content item on device 580 (e.g., if a content item is playing on device 580 when "play/pause" button 596-3 is selected, the content item is optionally paused, and if a content item is paused on device 580 when "play/pause" button 596-3 is selected, the content item is optionally played). In some embodiments, selection of "+" 596-4 or "−" 596-5 buttons by a user increases or decreases, respectively, the volume of audio reproduced by device 580 (e.g., the volume of a content item currently-playing on device 580). In some embodiments, selection of "audio input" button 596-6 by a user allows the user to provide audio input (e.g., voice input) to device 580, optionally, to a voice assistant on the device. In some embodiments, remote 590 includes a microphone via which the user provides audio input to device 580 upon selection of "audio input" button 596-6. In some embodiments, remote 590 includes one or more accelerometers for detecting information about the motion of the remote.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

FIG. 5K illustrates an exemplary structure for game controller 480 according to some embodiments of the disclosure. In some embodiments, game controller 480 optionally corresponds to one or more of multifunction device 100 in FIGS. 1A and 2, device 300 in FIG. 3, and device 500 in FIG. 5A. In some embodiments, game controller 480 includes "menu" button 481 that performs the same or similar functions to "menu" button 596-1 of remote 590. In some embodiments, game controller 480 includes analog sticks 483 and 484. In some embodiments, analog sticks 483 and 484 provide an analog navigational command to the electronic device to which game controller 480 is providing inputs. In some embodiments, an analog command refers to a command that is not discrete (e.g., not either "0" or "1" or not either "on" or "off"), but rather encompasses a range of values. For example, analog sticks 483 and 484 can transmit a vector including a direction and intensity. In some embodiments, game controller 480 includes one or more function buttons 485. In some embodiments, the function buttons can be mapped to particular functions within an application or game. In some embodiments, game controller 480 includes a touch-sensitive surface (not shown). In some embodiments, the touch-sensitive surface can be the same or share similar features as touch sensitive surface 593 of remote 590. In some embodiments, game controller 480 includes more or fewer input mechanisms or the input mechanisms described herein can be located at different positions than those illustrated in FIG. 5K. For example, in some embodiments, game controller 480 includes one or more trigger buttons and/or a directional pad (e.g., "d-pad"), which provides directional and/or navigational commands (e.g., up/down/left/right inputs). For example, when the directional pad is pressed down on the left side of the directional pad, a left command is transmitted (e.g., and similarly for up, down, and right). Thus, as described above, game controller 480 is an input device that is capable of communicating (e.g., wirelessly or wired) with an electronic device (e.g., such as device 500) and provide user inputs to the electronic device. In some embodiments, game controller 480 includes one or more display generation components such as an LCD or LED display, a touch screen display, and/or a projection device capable of projecting content onto a surface. In some embodiments, game controller 480 optionally receives display information from an electronic device with which game controller 480 is connected and displays content (e.g., media content, a user interface, etc.) via the display generation component of game controller 480. For example, game controller 480 optionally communicates with remote interface 592 of a device (e.g., device 580).

FIG. 5L illustrates an exemplary structure for game controller 490 according to some embodiments of the disclosure. In some embodiments, game controller 490 includes two physically separate parts, left controller 490a and right controller 490b (e.g., collectively referred to as game controller 490), which are uniquely paired with each other and together act as a single input device. In some embodiments, game controller 490 is capable of being physically attached to or physically detached from an electronic device (e.g., such as electronic device 500) and provide user inputs received via the input mechanisms of game controller 490 to the attached electronic device (e.g., wirelessly or wired). In some embodiments, left controller 490a is configured to be attached to the left side of a device while right controller 490b is configured to be attached to the right side of a device, although left controller 490a and right controller 490b can also be swapped and operate properly.

In some embodiments, left controller 490a includes an analog stick 492a (e.g., similar to analog sticks 483 and 484 described above with respect to game controller 480) and directional pad 494a. In some embodiments, right controller 490b includes an analog stick 492b (e.g., similar to analog sticks 483 and 484 described above with respect to game controller 480) and directional pad 494b. In some embodiments, the input mechanisms (e.g., analog sticks and direction pads) are positioned on the left and right controllers in a similar manner and/or in the same relative position such that the left controller and right controller can be interchangeably used (e.g., flipping the right controller allows the right controller to be used as a left controller and flipping the left controller allows the left controller to be used as a right controller). In some embodiments, more or fewer input mechanisms are possible, such as trigger buttons, menu buttons, and/or function buttons (e.g., such as function buttons 485 described above with respect to game controller 480).

Thus, as described above, game controller 490 is an input device that is capable of communicating (e.g., wirelessly or wired) with an electronic device (e.g., such as device 500) and provide user inputs to the electronic device. In some embodiments, game controller 490 (e.g., one or both of left controller 490a and right controller 490b) includes one or more display generation components such as an LCD or LED display, a touch screen display, and/or a projection device capable of projecting content onto a surface. In some embodiments, game controller 490 optionally receives display information from an electronic device with which game controller 490 is connected and displays content (e.g., media content, a user interface, etc.) via the display generation component of game controller 490.

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Attaching an Input Device to an Electronic Device

Users interact with electronic devices in many different manners, including using remote input devices to provide inputs to electronic devices. In some embodiments, a user can physically attach an input device to an electronic device. The embodiments described below provide ways in which an electronic device automatically changes modes and/or displays a respective user interface in response to detecting that an input device has been physical attached to the electronic device. Automatically changing devices modes and/or displaying a respective user interface enhances the user's interactions with the electronic device and reduces the amount of time the user needs to perform operations. Reducing operational time decreases the power usage of the device and increases battery life for battery-powered devices.

FIGS. 6A-6M illustrate exemplary ways in which electronic device 500 displays a game user interface in response to detecting that an input device has been connected to electronic device 500 in accordance with some embodiments of the disclosure. The embodiments in these figures are used to illustrate the processes described below, including the processes described with reference to FIG. 7. Although FIGS. 6A-6M illustrate various examples of ways an electronic device is able to perform the processes described below with respect to FIG. 7, it should be understood that these examples are not meant to be limiting, and the electronic device is able to perform one or more processes described below with reference to FIG. 7 in ways not expressly described with reference to FIGS. 6A-6M.

Figure 6B:
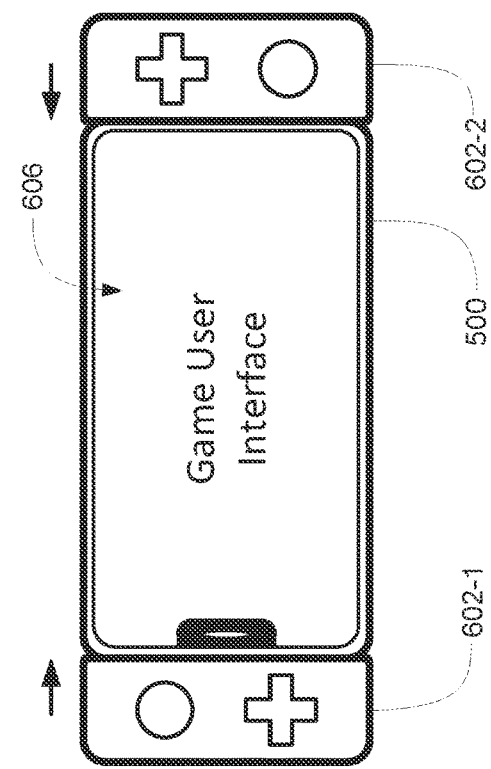
Figure 6A:
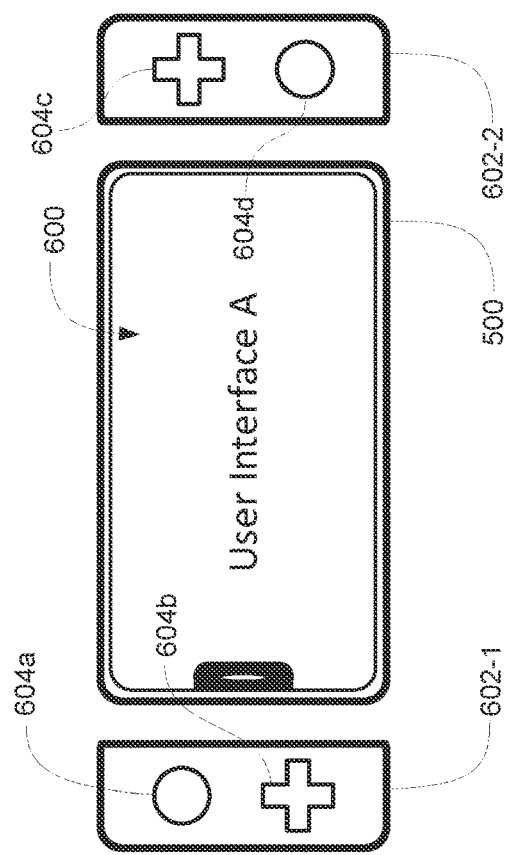

FIG. 6A illustrates electronic device 500 displaying user interface 600 (e.g., via a display device, via a display generation component, etc.). In some embodiments, user interface 600 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

FIG. 6A further illustrates input devices 602-1 and 602-2. In some embodiments, input devices 602-1 and 602-2 are two physically separate parts of a single input device (e.g., optionally treated as a single input device, collectively referred to herein as input device 602, similar to game controller 490 described above with respect to FIG. 5L) capable of providing user inputs to an electronic device, such as electronic device 500. In some embodiments, input device 602 is a game controller configured to provide user inputs for game applications, although input device 602 is not limited to only providing inputs for game applications. As shown in FIG. 6A, input device 602-1 includes one or more input mechanisms, such as analog stick 604a and directional pad 604b, and input device 602-2 includes one or more input mechanisms, such as analog stick 604d and direction pad 604c. In some embodiments, input devices 602-1 and 602-2 include more or fewer input mechanisms, such as function buttons, start/stop buttons, control buttons, trigger buttons, sliders, etc. In some embodiments, input devices 602-1 and 602-2 are interchangeable such that input device 602-2 can perform the functions of input device 602-1 and vice versa. As shown, in some embodiments, input devices 602-1 and 602-2 have similar layouts and/or are mirror images of each other. In other embodiments, input devices 602-1 and 602-2 may have different layouts, buttons, or controls (e.g., more or less buttons and/or controls, touch sensitive surfaces, etc.), optionally including one or more indicators and/or display generation components, such as LEDs, LCDs, etc.

In some embodiments, input devices 602-1 and 602-2 are configured to receive one or more user inputs (e.g., via the input mechanisms) and transmit the user inputs to a paired electronic device. In some embodiments, input devices 602-1 and 602-2 are capable of wireless and/or wired communication with a paired electronic device. Input devices 602-1 and 602-2 are optionally wirelessly paired with an electronic device via a wireless communication protocol, such as Bluetooth, NFC, WiFi, WiFi Direct, an ad hoc wireless network, etc. In some embodiments, input devices 602-1 and 602-2 are automatically paired with an electronic device when input devices 602-1 and 602-2 are physically attached to the respective electronic device (optionally establishing a wired communication session with the electronic device).

Returning to FIG. 6A, electronic device 500 is displaying user interface 600 when input devices 602-1 and 602-2 are not physically attached to electronic device 500. In some embodiments, user interface 600 is any type of user interface, such as a user interface of an application, a user interface of a system application, a home screen user interface (e.g., user interface 400 described above with respect to FIG. 4A), a user interface of a game application, a lock screen user interface, etc. In some embodiments, electronic device 500 is in a low-power mode, such that the display generation component is powered off and/or not displaying a user interface.

As discussed above, input devices 602-1 and 602-2 are capable of being physically attached to an electronic device and provide user inputs to the attached electronic device. For example, in FIG. 6B, input devices 602-1 and 602-2 have been attached to the left and right sides of device 500 (e.g., when device 500 is in a landscape orientation). In some embodiments, input devices 602-1 and 602-2 can be attached to any side of device 500, whether in the landscape or portrait orientations, and not necessarily on opposite sides. For example, input device 602-1 can be attached on the top of the device while input device 602-2 is attached to the right side of the device.

In some embodiments, device 500 detects that input devices 602-1 and/or 602-2 have been attached to device 500. In some embodiments, detecting that input devices 602-1 and/or 602-2 have been attached to device 500 includes receiving a signal and/or command (e.g., wirelessly or wired) from input device 602 indicating that input devices 602-1 and/or 602-2 have been attached to device 500. For example, device 500 optionally includes one or more electrical ports on the sides of device 500 that become coupled to corresponding electrical ports on the sides of input devices 602-1 and 602-2, via which signals are transmitted. In some embodiments, input device 602 wirelessly pairs with device 500 (or vice versa) in response to detecting that input devices 602-1 and 602-2 have been attached to device 500.

In some embodiments, in response to detecting that input devices 602-1 and 602-2 have been attached to device 500, device 500 replaces display of user interface 600 with display of game user interface 606, as shown in FIG. 6B. In some embodiments, game user interface 606 is a user interface of a game application. For example, device 500 launches and/or displays a user interface of the most recent game application, the most frequently used game application, etc.

In some embodiments, game user interface 606 is a user interface of an application for managing a plurality of game applications accessible on device 500. In some embodiments, the application for managing a plurality of game applications aggregates and presents information associated with the status, gameplay progress, and/or the user's interactions with a plurality of game applications. In some embodiments, the application for managing a plurality of game applications provides a portal in which a user is able to find other players and create a multiplayer session with other players. In some embodiments, the application for managing a plurality of game applications includes a user interface for viewing the status of the contacts of the user and for launching a game application from a list of a plurality of game applications.

Thus, as described above, because input device 602 is an input device that is designed as an input device for playing games on device 500, in response to detecting that input device 602 has been attached to device 500, device 500 automatically launches and/or displays a user interface associated with games.

Figure 6D:
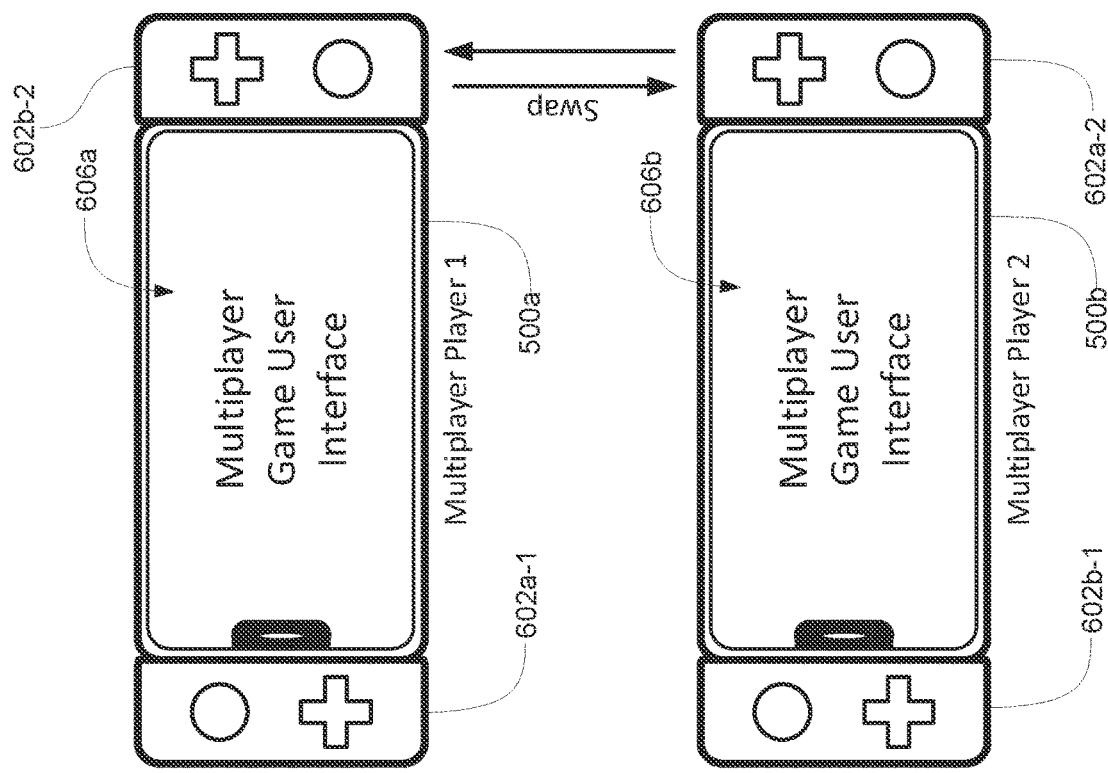
Figure 6C:
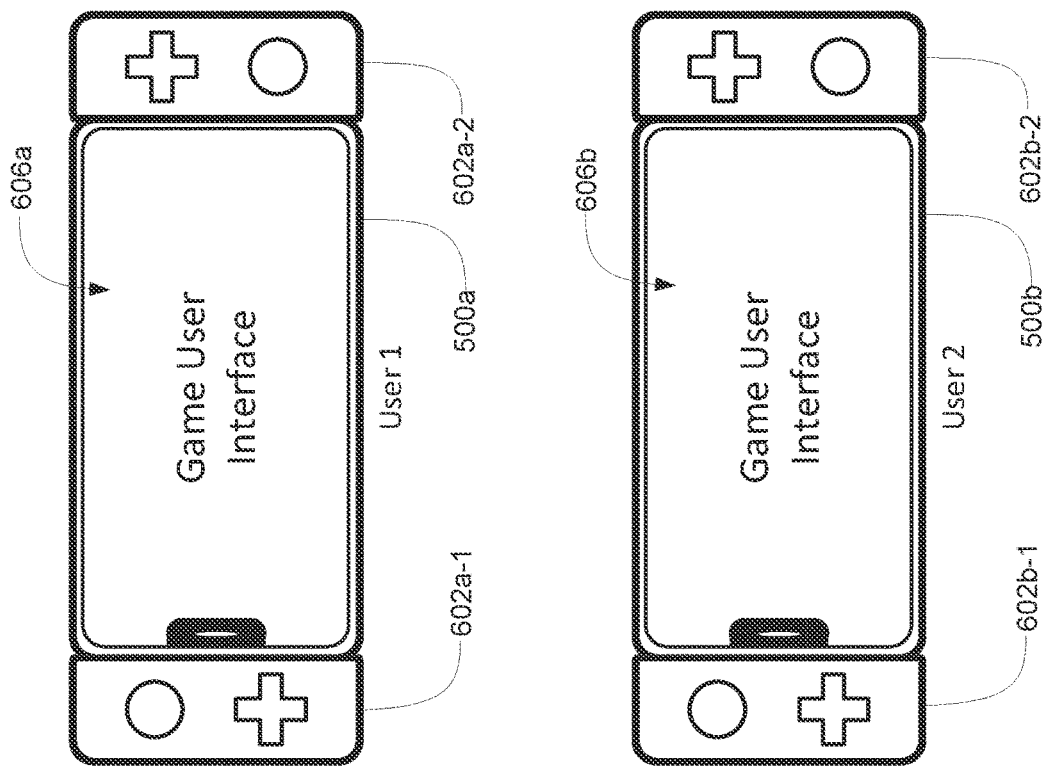

FIGS. 6C-6D illustrate an embodiment in which a part of input device 602 is able to be attached and/or swapped with another electronic device to automatically initiate a multiplayer session with that device. In FIG. 6C, devices 500a and 500b are each displaying their respective game user interfaces and have respective input devices attached. For example, device 500a is attached to input devices 602a-1 and 602a-2 and displaying game user interface 606a, and device 500b is attached to input devices 602b-1 and 602b-2 and displaying game user interface 606b. As described above, input devices 602a-1 and 602a-2 are optionally two parts of the same input device (referred, in combination, as input device 602a) and input devices 602b-1 and 602b-2 are optionally two parts of the same input device (referred, in combination, as input device 602b). In some embodiments, input device 602a is paired with device 500a and provides user inputs to device 500a and input device 602b is paired with device 500b and provides user inputs to device 500b.

In FIG. 6D, device 500a and device 500b detect that at least one portion of their attached input devices has been replaced with a corresponding portion of another input device. For example, input device 602a-2 has been swapped with input device 602b-2 such that input device 602a-2 is now attached to device 500b and input device 602b-2 is now attached to device 500a. In some embodiments, a device is able to determine that an input device is associated with another device by determining that the unique ID (e.g., serial number, etc.) of the input device is associated with another electronic device, or determining that the input device is currently or has already been paired with another device.

In some embodiments, in response to detecting that at least one portion of their paired input devices has been swapped with another electronic device, both device 500a and device 500b initiate a multiplayer gaming session with each other, and display multiplayer game user interface 606a and multiplayer game user interface 606b, respectively. In some embodiments, devices 500a and 500b initiate a multiplayer gaming session for the game application that was displayed on either device 500a or device 500b before the input devices were swapped. In some embodiments, devices 500a and 500b initiate a multiplayer gaming session and display a user interface of the application for managing a plurality of game applications, for example, for the users to select a game to play together. It is understood that devices 500a and device 500b can be displaying any user interface (e.g., not necessarily a user interface of a game application) to initiate a multiplayer game session and/or displaying a multiplayer game user interface in response to detecting that the input devices have been swapped.

In some embodiments, a device is able to initiate a multiplayer game session and/or display a multiplayer game user interface in response to detecting that an input device that is associated with another device has been attached to the device, without requiring a determination that an input device associated with the device has been attached to the other device. For example, attaching input device 602a-2 to device 500b causes device 500b to initiate a multiplayer game session and/or display a multiplayer game user interface, without requiring device 500b to determine that input device 602b-2 has been attached to device 500a.

Figure 6F:
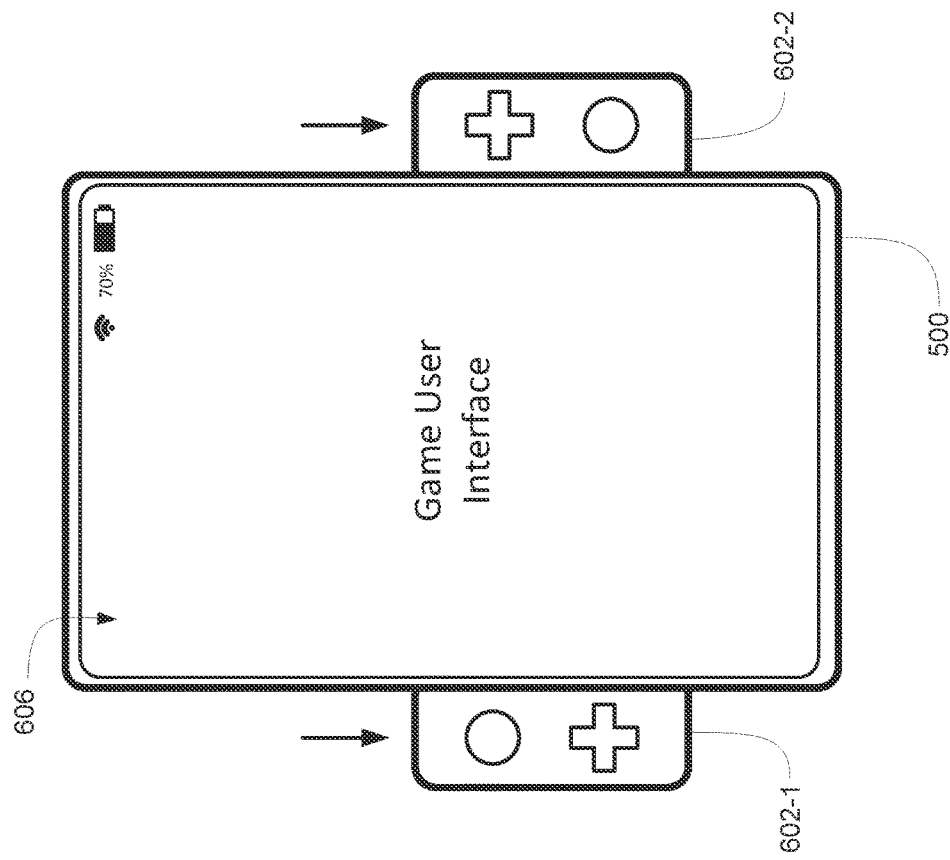
Figure 6E:
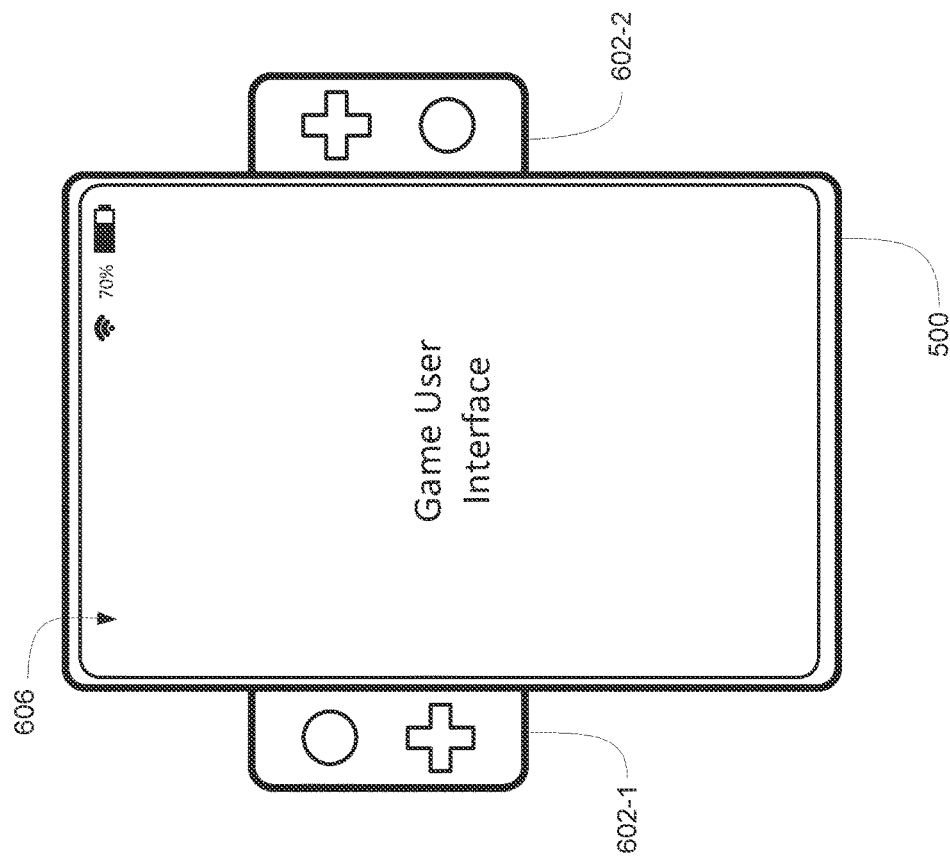

FIGS. 6E-6F illustrate an electronic device (e.g., device 500) on which an input device is able to be moved from one location to another location without interrupting display of the user interface that is displayed by the display generation component of the electronic device, even when the input device is moved. FIG. 6E illustrates input devices 602-1 and 602-2 at locations on device 500 when device 500 is in a portrait orientation, for example, at the top half of device 500. In some embodiments, input device 602 provides user inputs to device 500 while device 500 is displaying game user interface 606 and playing a game.

In FIG. 6F, device 500 detects that input devices 602-1 and 602-2 have slid downwards to become attached to device 500 at the bottom half of device 500. In some embodiments, in response to detecting that input devices 602-1 and 602-2 have changed locations, but have remained attached to device 500, device 500 maintains display of game user interface 606 and optionally continues the gaming session (e.g., device 500 does not interrupt the application being displayed). In some embodiments, device 500 maintains display of game user interface 606 if input devices 602-1 and 602-2 are detached and re-attached within a threshold amount of time (e.g., within 3 seconds, 5 seconds, 10 seconds, 30 seconds, etc.). In some embodiments, in response to detecting that input devices 602-1 and/or 602-2 have been detached, device 500 temporarily pauses the game session (or whatever application is running on device 500) until input devices 602-1 and/or 602-2 have been reattached. In some embodiments, input devices 602-1 and 602-2 need not be attached opposite of each other to provide user inputs to device 500. For example, input device 602-1 can be attached at the top half of device 500 while input device 602-2 is attached at the bottom half of device 500, and both are able to continue providing user inputs to device 500.

Figure 6H:
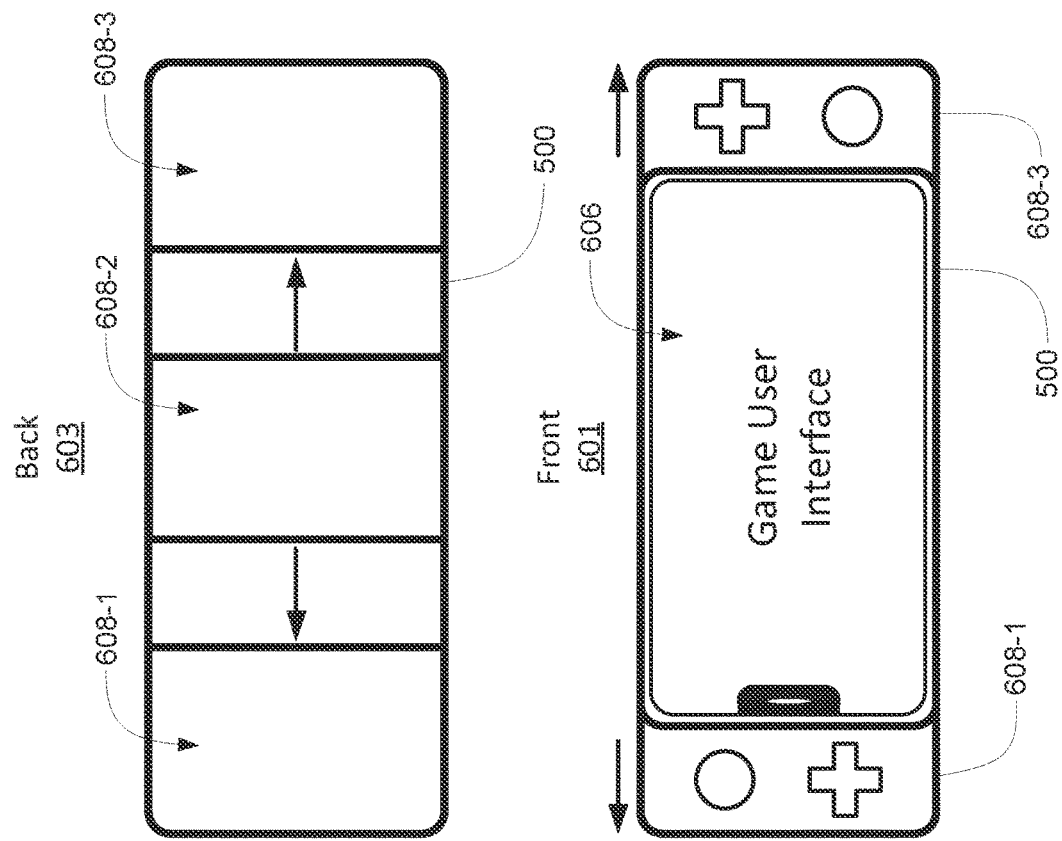
Figure 6G:
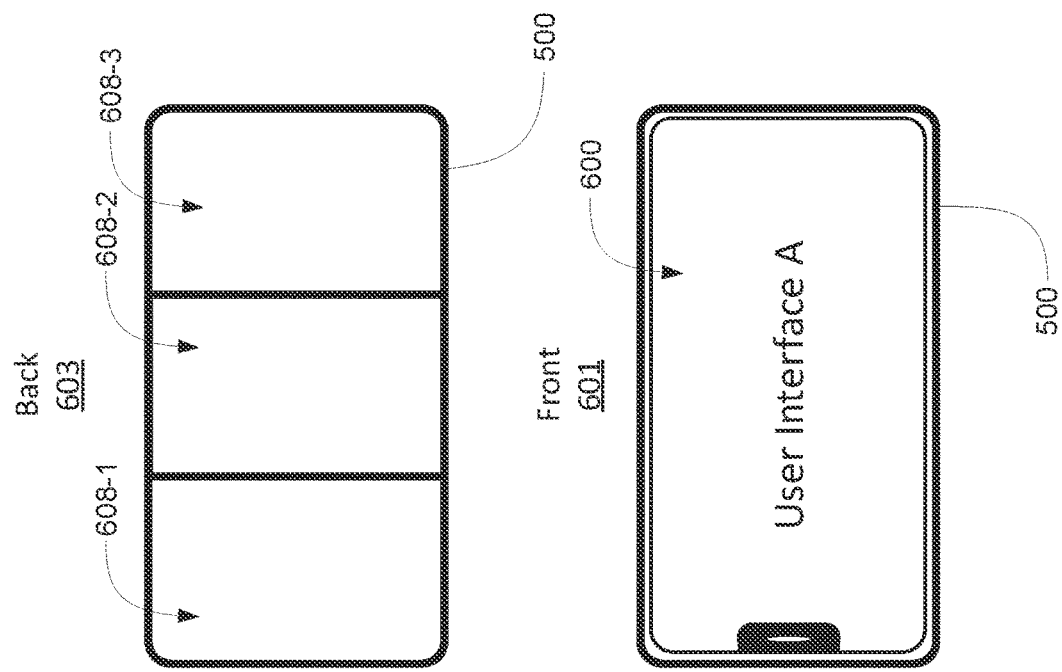

FIGS. 6G-6H illustrate an embodiment in which an input device that is attached to the back of an electronic device can be opened to reveal one or more input mechanisms. FIG. 6G illustrates front view 601 and back view 603 of device 500. Back view 603 illustrates input device 608 attached to the back of device 500. In some embodiments, input device 608 includes three portions, first input portion 608-1, center portion 608-2, and second input portion 608-3 (e.g., collectively referred to as input device 608). In some embodiments, input device 608 is a device that is physically separate from device 500 and is able to be physically attached and detached from device 500. In some embodiments, input device 608 includes one or more input mechanisms and is able to provide user inputs to device 500, for example, when input device 608 is attached to device (e.g., in a manner similar to described with respect to input device 602). As will be described in further detail below, first input portion 608-1 includes one or more input mechanisms and second input portion 608-3 includes one or more input mechanisms that are accessible when input device 608 is opened. As shown in FIG. 6G, input device 608 is in its closed position such that the input mechanisms of first input portion 608-1 and second input portion 608-3 are not accessible.

Front view 601 illustrates device 500 displaying user interface A 600 when input device 608 is in its closed position. In some embodiments, user interface A 600 is any type of user interface (e.g., a game user interface, a system user interface, a user interface of a non-game application, etc.).

In FIG. 6H, device 500 detects that input device 608 has been slid open into its open position such that first input portion 608-1 and second input portion 608-3 are expanded to the left and right of device 500, as shown in front view 601. As shown in back view 603, first input portion 608-1 slid leftwards and second input portion 608-3 slid rightwards while center portion 608-2 remained attached to the center of device 500. Front view 601 illustrates that first input portion 608-1 has slid leftwards, thus revealing the input mechanisms on the inner face of first input portion 608-1 that were previously inaccessible, and second input portion 608-3 has slid rightwards, thus revealing the input mechanism on the inner face of second input portion 608-3 that were previously inaccessible. In some embodiments, in response to detecting that input device 608 has slid open into its open position to reveal the input mechanisms of input device 608, device 500 displays game user interface 606 (e.g., replacing display of user interface A 600), as shown in FIG. 6H. As described above, game user interface 606 is optionally a user interface of a game application, a user interface of an application for managing a plurality of game applications, etc.

FIGS. 6I-6J illustrate an embodiment in which an input device that is attached to the back of an electronic device can be rotated to reveal one or more input mechanisms. Back view 603 illustrates input device 608 attached to the back of device 500. In some embodiments, input device 608 includes three portions, first input portion 608-1, center portion 608-2, and second input portion 608-3 (e.g., collectively referred to as input device 608). In some embodiments, input device 608 is a device that is physically separate from device 500 and is able to be physically attached and detached from device 500. In some embodiments, input device 608 includes one or more input mechanisms and is able to provide user inputs to device 500, for example, when input device 608 is attached to device (e.g., in a manner similar to described with respect to input device 602). As will be described in further detail below, first input portion 608-1 includes one or more input mechanisms and second input portion 608-3 includes one or more input mechanisms that are accessible when input device 608 is opened. As shown in FIG. 6G, input device 608 is in its closed position such that the input mechanisms of first input portion 608-1 and second input portion 608-3 are not accessible.

Front view 601 illustrates device 500 displaying user interface A 600 when input device 608 is in its closed position. In some embodiments, user interface A 600 is any type of user interface (e.g., a game user interface, a system user interface, a user interface of a non-game application, etc.).

In FIG. 6J, device 500 detects that input device 608 has rotated open into its open position such that first input portion 608-1 and second input portion 608-3 are accessible on the left and right sides of device 500, as shown in front view 601. As shown in back view 603, first input portion 608-1 and second input portion 608-3 rotated clockwise (from the perspective of the front of the device), thus causing the first input portion 608-1 and second input portion 608-3 to extend outwards from the boundaries of device 500, while center portion 608-2 remained attached to the center of device 500 and rotated in-place (e.g., first input portion 608-1 and second input portion 608-2 rotated around center portion 608-2). Front view 601 illustrates that first input portion 608-1 has rotated clockwise to the right side of device 500, thus revealing the input mechanisms on the inner face of first input portion 608-1 that were previously inaccessible, and second input portion 608-3 has rotated clockwise to the left side of device 500, thus revealing the input mechanisms on the inner face of second input portion 608-3 that were previously inaccessible. In some embodiments, in response to detecting that input device 608 has rotated into its open position to reveal the input mechanisms of input device 608, device 500 displays game user interface 606 (e.g., replacing display of user interface A 600), as shown in FIG. 6J. As described above, game user interface 606 is optionally a user interface of a game application, a user interface of an application for managing a plurality of game applications, etc.

FIGS. 6K-6L illustrate an embodiment in which an input device that is attached to the back of an electronic device can be flipped open to reveal one or more input mechanisms. Side view 605 illustrates input device 610 attached to the back of device 500 while in a closed position. In some embodiments, input device 610 is a foldable cover that is able to be attached to the back of device 500 and folded open to cover the front side of device 500 (e.g., to cover the display of device 500). As will be described in further detail below, input device 610 is able to be folded open to reveal one or more input mechanisms while supporting device 500 at a respective viewing position.

Front view 601 illustrates device 500 displaying user interface A 600 when input device 610 is in its closed position. In some embodiments, user interface A 600 is any type of user interface (e.g., a game user interface, a system user interface, a user interface of a non-game application, etc.).

In FIG. 6L, device 500 detects that input device 610 has been unfolded into its mounted position such that the input mechanisms of input device 610 are accessible (e.g., as shown in front view 601) and device 500 is supported at a respective angle (e.g., as shown in side view 605). In some embodiments, input device 610 includes a directional pad 614a and a plurality of action buttons 614b. In some embodiments, the input mechanisms are located on the "inside" surface of input device 610 that touches the display of device 500 when input device 610 is covering the display of device 500 (e.g., and that is facing outwards when input device 600 is in its closed position and attached to the back of device 500 such as in FIG. 6K). In some embodiments, input device 610 includes a display generation component (e.g., a display screen, a touch screen, a projector, etc.), which is capable of receiving display information from device 500 and displaying a user interface (optionally on the same surface as the input mechanisms). In some embodiments, while input device 610 is opened revealing the input mechanism of input device 610 (e.g., as opposed to when input device 610 is in a closed position as in FIG. 6K), input device 610 is able to receive user inputs and provide the user inputs to device 500.

In some embodiments, in response to detecting that input device 610 has opened to reveal the input mechanisms of input device 610, device 500 displays game user interface 1 606 (e.g., replacing display of user interface A 600), as shown in FIG. 6L. In some embodiments, in response to detecting that input device 610 has opened to reveal the input mechanisms of input device 610, the display generation component included in input device 608 receives display information from device 500 and displays game user interface 2 612. In some embodiments, game user interface 2 612 is a user interface of an instance of the same application that is displaying game user interface 1 606. In some embodiments, game user interface 2 612 is a user interface of an instance of a different game application. In some embodiments, game user interface 2 612 is a user interface of an instance of an application for managing a plurality of game applications (e.g., a user interface of the operating system of device 500, a user interface of a game-management application on device 500, etc.). In some embodiments, game user interface 2 612 displays one or more options for initiating a social interaction with another user, as described below with respect to method 900.

Figure 6M:
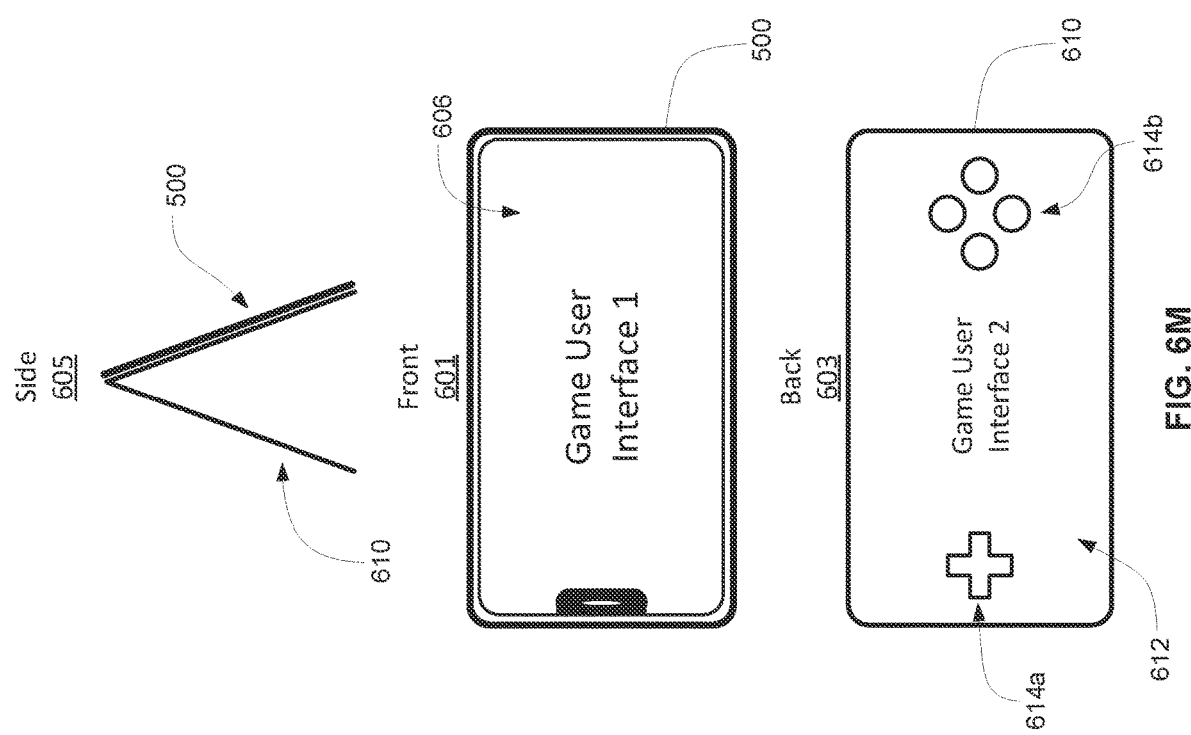

FIG. 6M input device 610 unfolded to a position in which the display generation component (and optionally the input mechanisms of input device 610) are facing away from the direction that the display generation component of device 500 is facing. For example, side view 605 illustrates input device 610 unfolded in a manner similar to a bipod, such that device 500 is supported at an angle facing towards the user while the display generation component of input device 610 is facing at an angle away from the user (e.g., away from the display side of device 500). In some embodiments, while device 500 is displaying game user interface 1 606 (as shown in front view 601), the display generation component of input device 610 is displaying game user interface 2 612 (as shown in back view 603). In some embodiments, game user interface 2 612 is a user interface of the application that is displaying game user interface 1 606. In some embodiments, game user interface 2 612 is the same user interface as game user interface 1 606 such that other viewers are able to watch the user's interaction with game user interface 1 606 (e.g., without requiring that the other viewers be positioned next to the user). In some embodiments, game user interface 2 612 provides information associated with the game application (e.g., status information, a map, inventory, character health, etc.). It is understood that game user interface 1 606 and game user interface 2 612 need not be game user interfaces and can be a user interface of any application. For example, game user interface 1 606 can be a user interface of a media application such that game user interface 1 606 and/or game user interface 2 612 are displaying media content.

Figure 7A:
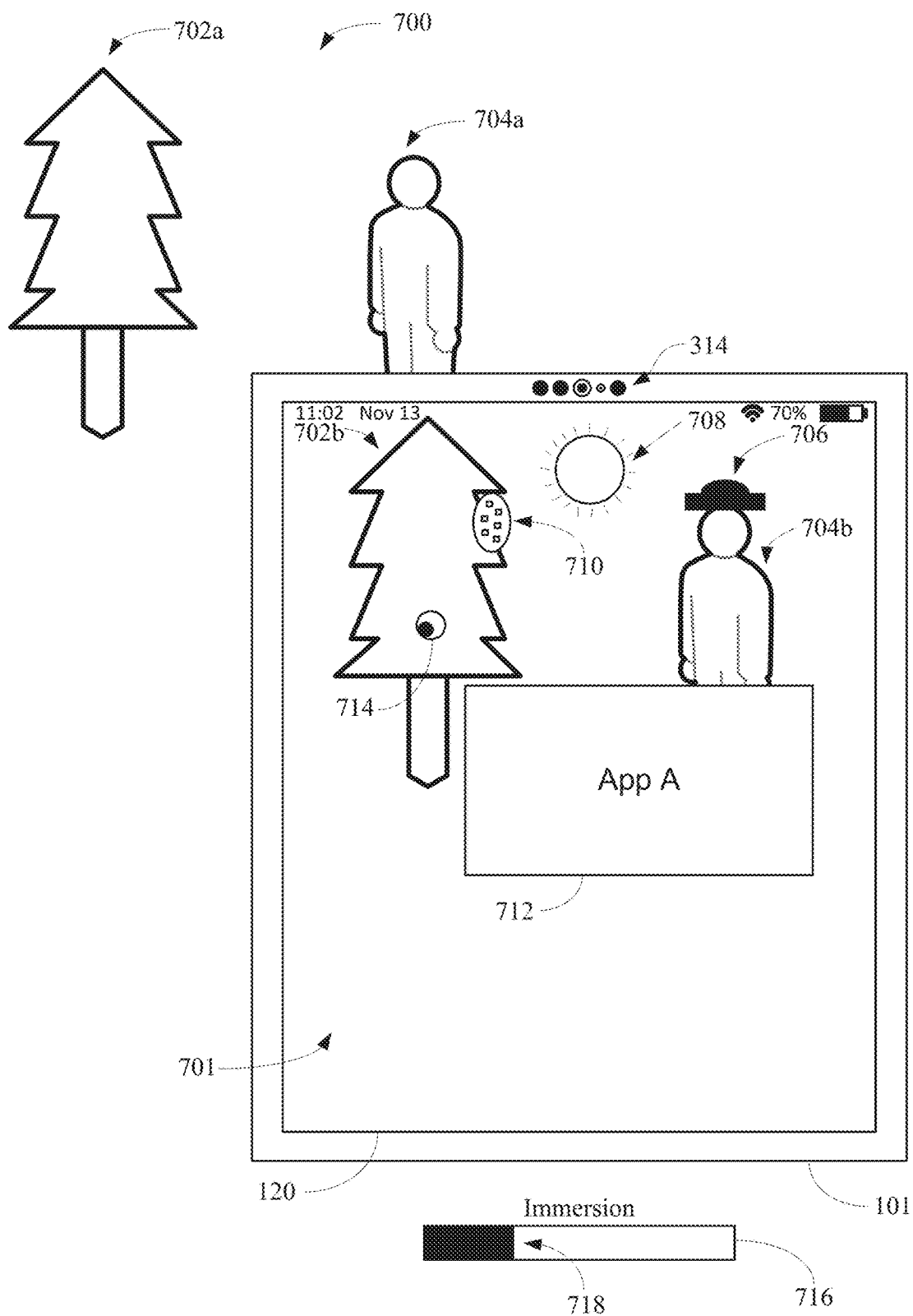
FIG. 7 is a flow diagram illustrating a method of displaying a game user interface in response to detecting that an input device has been connected to the electronic device in accordance with some embodiments of the disclosure.
Figure 7B:
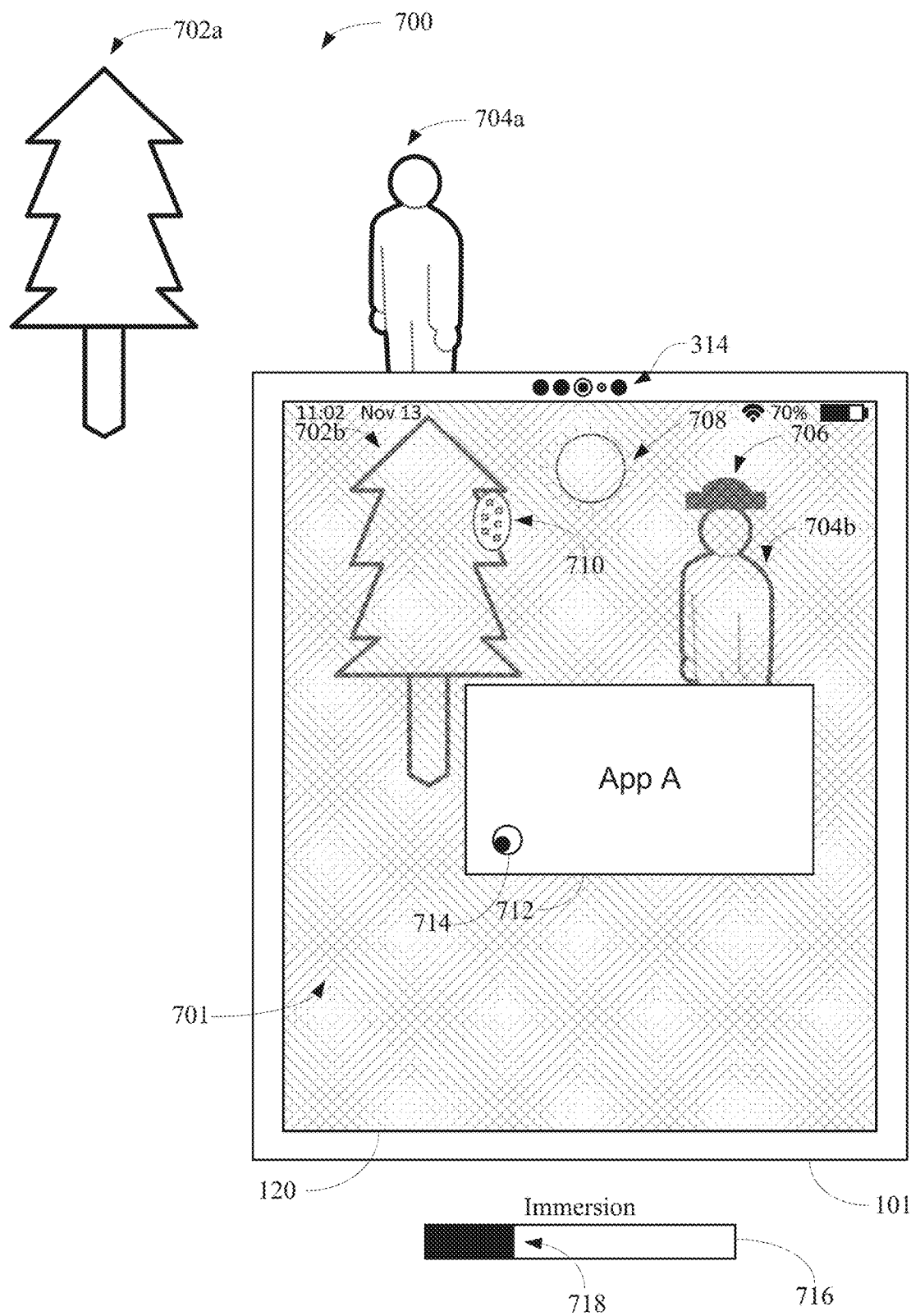

FIG. 7 is a flow diagram illustrating a method 700 of displaying a game user interface in response to detecting that an input device has been connected to the electronic device in accordance with some embodiments of the disclosure. The method 700 is optionally performed at an electronic device such as device 100, device 300, device 500, and device 580 as described above with reference to FIGS. 1A-1B, 2-3, 4A-4B and 5A-5I. Some operations in method 700 are, optionally combined and/or the order of some operations is, optionally, changed.

As described below, the method 700 is directed to displaying a game user interface in response to detecting that an input device has been connected to the electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500, device 580, device 580, a mobile device (e.g., a tablet, a smartphone, a media player, or a wearable device), a set-top box or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.), while displaying, via the display generation component, a first user interface associated with a first mode of the electronic device, detects (702)

that a respective input device (e.g., of the one or more input devices), separate from the electronic device, is in a first configuration relative to the electronic device, wherein the first configuration is a configuration in which the respective input device can provide input to a user interface of the electronic device when the electronic device is in a second mode, different from the first mode, such as detecting that input devices 602-1 and 602-2 have been attached to device 500 as shown in FIG. 6B (e.g., and not configured to provide input to user interfaces associated with the first mode of the electronic device, including the first user interface).

In some embodiments, a display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the respective input device is optionally a game controller peripheral (e.g., accessory) for the electronic device that is configured to provide input (e.g., directional button inputs, functional button inputs) to user interfaces of games displayed by the electronic device.

In some embodiments, the second mode of the electronic device is a game mode of the electronic device (e.g., a mode during which input to the electronic device is provided via the external game controller peripheral, in some embodiments, additionally or alternatively to input provided via the input devices incorporated into the electronic device itself). In some embodiments, the respective input device is attachable to one or more parts of the electronic device (e.g., attachable to opposite sides of the electronic device, attachable to the back side of the electronic device (e.g., the side opposite the display generation component, etc.)). In some embodiments, detecting that the respective input device is in the first configuration relative to the electronic device includes detecting that a first part of the respective input device is attached to the left side of the electronic device, and a second part of the respective input device is attached to the right side of the electronic device (e.g., defined based on the current orientation of the electronic device relative to gravity). In some embodiments, the first part of the respective input device includes a first set of controls (e.g., directional controls, a directional pad ("d-pad"), etc.) for providing input to the electronic device while the respective input device is in the first configuration relative to the electronic device, and the second part of the respective input device includes a second set of controls (e.g., functional button controls) for providing input to the electronic device while the respective input device is in the second configuration relative to the electronic device. In some embodiments, the respective input device is active and/or able to provide user inputs (e.g., transmit) to the electronic device when the respective input device is attached to the electronic device (e.g., when the respective input device is in the first configuration). In some embodiments, if the respective input device is not attached to the electronic device (e.g., when the respective input device is not in the first configuration), the respective input device is optionally inactive (e.g., turned off, in a low power state, etc.) such that inputs received at the respective input device are not transmitted to the electronic device. In some embodiments, the respective input device includes a display generation component that is capable of displaying a user interface, similar to described below with respect to method 900. In some embodiments, the respective input device includes a display generation component that is capable of projecting a user interface onto a surface, similar to described below with respect to method 1300.

In some embodiments, in response to detecting that the respective input device is in the first configuration relative to the electronic device, the electronic device displays (704) (e.g., automatically displaying, without (e.g., user) input other than detection of the respective input device in the first configuration), via the display generation component, the user interface of the electronic device when the electronic device is in the second mode, such as game user interface 606 in FIG. 6B (e.g., that is able to receive input from the respective input device in the first configuration relative to the electronic device).

For example, displaying a game-mode related user interface, such as displaying a user interface of a game, displaying a central user interface of a game center application from which a plurality of different game applications can be launched/displayed, etc. In some embodiments, the user interface was not displayed prior to detecting that the respective input device was in the first configuration relative to the electronic device.

The above-described manner of displaying a different user interface associated with a different mode of the electronic device based on the configuration of the respective input device provides a quick and efficient manner of displaying that user interface associated with the different mode, which simplifies the interaction between the user and the electronic device and enhances the operability of the electronic device and makes the user-device interface more efficient (e.g., without requiring the need for additional user input), which additionally reduces power usage and improves battery life of the electronic device by enabling the user to use the electronic device more quickly and efficiency, while reducing errors in usage.

In some embodiments, detecting that the respective input device is in the first configuration relative to the electronic device includes detecting that the respective input device has been attached to the electronic device, such as attaching input devices 602-1 and 602-2 to device 500 in FIG. 6B (e.g., where the respective input device was not attached to the electronic device while the electronic device was displaying the first user interface associated with a first mode of the electronic device).

In some embodiments, detecting that the respective input device has been attached to the electronic device includes detecting that the respective input device has been physically attached to the electronic device (e.g., magnetically attached, attached via a physical latching, binding, and/or attachment mechanism, etc.). In some embodiments, one or more sensors in the electronic device are able to detect that the respective input device has become attached to the electronic device. In some embodiments, one or more sensors in the respective input device is able to detect that the respective input device has become attached to the electronic device and communicate to the electronic device that the respective input device has become attached. In some embodiments, detecting that the respective input device has become attached to the electronic device includes determining that the respective input device has become connected to the electronic device (e.g., electrically connected, wirelessly connected, or otherwise having established a communication channel).

The above-described manner of displaying a different user interface associated with a different mode of the electronic device in response to detecting that the respective input device has become attached to the electronic device provides a quick and efficient manner of displaying that user interface associated with the different mode (e.g., by determining that the respective input device is associated with the different mode and automatically displaying the user interface associated with that different mode), which simplifies the interaction between the user and the electronic device and enhances the operability of the electronic device and makes the user-device interface more efficient (e.g., without requiring the need for additional user input), which additionally reduces power usage and improves battery life of the electronic device by enabling the user to use the electronic device more quickly and efficiency, while reducing errors in usage.

In some embodiments, detecting that the respective input device is in the first configuration relative to the electronic device includes detecting that (e.g., at least) a portion of the respective input device has been rotated to a respective orientation relative to the electronic device, such as in FIG. 6J (e.g., and/or relative to another portion of the respective input device).

In some embodiments, the portion of the respective input device was not at the respective orientation relative to the electronic device while the electronic device was displaying the first user interface associated with a first mode of the electronic device. In some embodiments, the respective input device is attached to the electronic device (e.g., the back of the electronic device) and rotating a portion of the respective input device causes a portion of the respective input device to be accessible on one or more sides of the electronic device. For example, the respective input device has a rectangular shape similar to the shape of the electronic device and is attached to the back of the electronic device such that, when viewing the electronic device from the front, the respective input device is hidden. In some embodiments, rotating a portion of the respective input device causes a portion of the respective input device to extend outwards from the left and right sides of the electronic device such that, when viewing the electronic device from the front, a portion of the respective input device extends to the left of the electronic device and another portion extends to the right of the electronic device. In some embodiments, when the respective input device is rotated such that a portion of the respective input device is accessible, the respective input device becomes active (e.g., capable of receiving input and communicate the inputs to the electronic device), whereas when the respective input device is in an orientation such that the respective input device is not accessible, the respective input device is inactive (e.g., in a low power mode, turned off, etc. such that inputs received on the respective input device are optionally not communicated to the electronic device). In some embodiments, the portion of the respective input device that extends outwards from the left and right sides of the electronic device include one or more buttons and/or input mechanisms that are capable of receiving user inputs and communicate the user inputs to the electronic device.

The above-described manner of displaying a different user interface associated with a different mode of the electronic device in response to detecting that the respective input device has rotated to a respective orientation provides a quick and efficient manner of displaying that user interface associated with the different mode (e.g., by determining that the respective input device has been rotated such that it is ready to accept inputs and automatically displaying the user interface associated with the respective input device), which simplifies the interaction between the user and the electronic device and enhances the operability of the electronic device and makes the user-device interface more efficient (e.g., without requiring the need for additional user input), which additionally reduces power usage and improves battery life of the electronic device by enabling the user to use the electronic device more quickly and efficiency, while reducing errors in usage.

In some embodiments, detecting that the respective input device is in the first configuration relative to the electronic device includes detecting that (e.g., at least) a portion of the respective input device has been translated to a respective position relative to the electronic device, such as in FIG. 6H and FIG. 6L (e.g., and/or relative to another portion of the respective input device).

In some embodiments, the portion of the respective input device was not at the respective position relative to the electronic device while the electronic device was displaying the first user interface associated with a first mode of the electronic device. In some embodiments, the respective input device includes two layers (e.g., two surfaces) that are able to be opened. For example, the respective input device is folded and is able to be unfolded to reveal surfaces that were previously hidden (e.g., facing each other when folded). In some embodiments, the respective input device includes two layers and is able to be slid open, revealing a portion that was previously hidden. In some embodiments, the portion of the respective input device that is revealed when unfolded and/or slid open includes one or more buttons and/or input mechanisms that are capable of receiving user inputs and communicate the user inputs to the electronic device.

The above-described manner of displaying a different user interface associated with a different mode of the electronic device in response to detecting that the respective input device has been slid open or unfolded to reveal one or more input mechanisms provides a quick and efficient manner of displaying that user interface associated with the different mode (e.g., by determining that the respective input device is ready to accept inputs and automatically displaying the user interface associated with the respective input device), which simplifies the interaction between the user and the electronic device and enhances the operability of the electronic device and makes the user-device interface more efficient (e.g., without requiring the need for additional user input), which additionally reduces power usage and improves battery life of the electronic device by enabling the user to use the electronic device more quickly and efficiency, while reducing errors in usage.

In some embodiments, detecting that the respective input device is in the first configuration relative to the electronic device includes detecting that (e.g., at least) a portion of the respective input device has been unfolded to make accessible, on the portion, one or more input elements to provide input to the user interface of the electronic device when the electronic device is in the second mode of the electronic device, such as in FIG. 6L.

In some embodiments, the portion of the respective input device was folded (e.g., closed) while the electronic device was displaying the first user interface associated with a first mode of the electronic device. In some embodiments, the respective input device includes two layers (e.g., two surfaces) that are able to be opened. For example, the respective input device is folded and is able to be unfolded to reveal surfaces that were previously hidden (e.g., facing each other when folded). In some embodiments, the portion of the respective input device that is revealed when unfolded includes one or more buttons and/or input mechanisms that are capable of receiving user inputs and communicate the user inputs to the electronic device. In some embodiments, the respective input device is integrated into a case for the electronic device. In some embodiments, the case for the electronic device can be folded open or slid open such that the portion of the case that is revealed includes the one or more input elements.

The above-described manner of displaying a different user interface associated with a different mode of the electronic device in response to detecting that the respective input device has been unfolded to reveal one or more input mechanisms provides a quick and efficient manner of displaying that user interface associated with the different mode (e.g., by determining that the respective input device is ready to accept inputs and automatically displaying the user interface associated with the respective input device), which simplifies the interaction between the user and the electronic device and enhances the operability of the electronic device and makes the user-device interface more efficient (e.g., without requiring the need for additional user input), which additionally reduces power usage and improves battery life of the electronic device by enabling the user to use the electronic device more quickly and efficiency, while reducing errors in usage.

In some embodiments, the portion of the respective input device includes a second display generation component configured to display information (e.g., information relevant to the one or more other users) to one or more other users in a physical environment of the electronic device, such as in FIG. 6M (e.g., the portion of the respective input device that is revealed when the respective input device is unfolded includes a display generation component capable of displaying a user interface).

In some embodiments, the respective input device receives display information from the electronic device and is able to display a user interface via the display generation component. In some embodiments, the user interface displayed via the display generation component of the respective input device is associated with the user interface that is displayed via the display generation component of the electronic device. For example, the user interface displayed via the display generation component of the respective input device is an extension of the user interface displayed via the display generation component of the electronic device, displays information associated with the application that is running on the electronic device, or otherwise displays additional information to the user. In some embodiments, because the respective input device is a foldable device and is capable of changing orientation, the display generation component is able to be oriented towards other people (e.g., away from the user, or otherwise having an orientation different from the orientation of the display generation component of the electronic device) and display information to other people. For example, user interface displayed via the display generation component of the respective input device provides information about a game that the user is playing on the electronic device to other viewers. In some embodiments, the user interface displayed via the display generation component of the respective input device is a duplicate of the user interface displayed via the display generation component of the electronic device, thus allowing other users that are not directly next to the user to also view what the user is viewing.

The above-described manner of displaying information via a display generation component of the respective input device provides a quick and efficient manner of displaying additional information to the user on the same device that receives the user input (e.g., by integrating display capabilities into the input device, without requiring a separate component to expand the display capabilities of the electronic device), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the display generation component associated with the electronic device is configured to display a first portion of the user interface of the electronic device when the electronic device is in the second mode, and the portion of the respective input device includes a second display generation component configured to display a second portion, different from the first portion, of the user interface of the electronic device when the electronic device is in the second mode, such as in FIG. 6L and FIG. 6M (e.g., the display generation component of the respective input device displays an extension of the user interface displayed by the display generation component of the electronic device).

For example, if the electronic device is displaying a game user interface, a first portion of the game user interface is displayed on the electronic device and a second portion of the game user interface is displayed on the respective input device. In some embodiments, the user interface displayed on the respective input device is additional information associated with the game. In some embodiments, the user interface displayed on the respective input device is an extension of the user interface displayed by the display generation component of the electronic device. For example, the game user interface can extend across both display generation components, thus increasing the available display area for the electronic device. In some embodiments, when the respective input device becomes active, the user interface displayed on the electronic device is updated to span both the display generation component of the electronic device and the respective input device (e.g., increasing the available display area for displaying the user interface).

The above-described manner of displaying information via a display generation component of the respective input device provides a quick and efficient manner of displaying additional information to the user on the same device that receives the user input (e.g., by integrating display capabilities into the input device, without requiring a separate component to expand the display capabilities of the electronic device), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the second mode of the electronic device is a game mode, and the user interface of the electronic device when the electronic device is in the second mode is a user interface that includes information about one or more games accessible via the electronic device, and one or more selectable options to display the one or more games via the display generation component, such as in FIG. 6B (e.g., in response to detecting a change in the configuration of the respective input device, the device displays a user interface associated with one or more games).

In some embodiments, the user interface is a user interface of an application and/or service that is associated with games. In some embodiments, the application includes information about the status of games played by the user (e.g., or the current active user profile of the electronic device), the status of games played by friends of the user, achievements, high scores, etc. In some embodiments, the application includes an interface in which one or more games may be launched. In some embodiments, the application allows a user to view the online status of other users (e.g., friends of the user), create a multiplayer session with another user, join a multiplayer session with another user, resume a multiplayer session with another user, etc. In some embodiments, the application is not a user interface of a game application, but rather, receives information from one or more game applications and aggregates the information into the application.

The above-described manner of displaying a user interface of an application associated with one or more games provides a quick and efficient manner of displaying the application when the respective input device associated with gaming becomes active (e.g., without requiring additional user inputs to launch the application), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, while the respective input device is in the first configuration relative to the electronic device and while displaying the user interface of the electronic device when the electronic device is in the second mode via the display generation component, the electronic device detects that the respective input device has changed from being in the first configuration relative to the electronic device to being in a second configuration, different from the first configuration, relative to the electronic device while remaining attached to the electronic device, such as in FIG. 6F (e.g., detecting that the respective input device has moved from being attached to the electronic device in a first manner (e.g., in the first configuration) to being attached to the electronic device in a second manner (e.g., in the second configuration)).

In some embodiments, the respective input device is capable of being attached to the electronic device in a plurality of locations, positions, and/or orientations. In some embodiments, the respective input device is capable of sliding from being attached to a portion of the electronic device to a second portion of the electronic device, optionally without affecting the functionality of the respective input device (e.g., the respective input device remains functional throughout the transition). In some embodiments, detecting that the respective input device has changed to the second configuration includes detecting that the respective input device has become detached from the electronic device and re-attached at the same or different location of the electronic device within a threshold amount of time (e.g., within 0.5 seconds, 1 second, 3 seconds, 10 seconds, 30 seconds, etc.), before the respective input device has become inactive and/or terminated communication with the electronic device.

In some embodiments, in response to detecting that the respective input device has changed from being in the first configuration relative to the electronic device to being in the second configuration relative to the electronic device while remaining attached to the electronic device, the electronic device maintains display of the user interface of the electronic device when the electronic device is in the second mode via the display generation component, such as in FIG. 6F (e.g., continue to display the user interface, without interruption).

For example, the electronic device does not revert to displaying the first user interface, another user interface, or otherwise interrupt the user's session with the electronic device. Thus, in some embodiments, the first configuration and the second configuration are both associated with a game session and thus changing from the first configuration to the second configuration or from the second configuration to the first configuration does not cause the device to switch away from the second mode.

The above-described manner of maintaining display of the user interface (e.g., in response to the respective input device changing from the first configuration to the second configuration) provides a quick and efficient manner of preserving the continuity of user's interaction with the electronic device (e.g., without interrupting the user's interaction with the electronic device by switching to displaying a different user interface when the respective input device switches to a configuration in which the respective input device is still active), which simplifies the interaction between the user and the electronic device and enhances the operability of the electronic device and makes the user-device interface more efficient (e.g., without displaying a different user interface and requiring the user to perform additional inputs to switch back to the user interface), which additionally reduces power usage and improves battery life of the electronic device by enabling the user to use the electronic device more quickly and efficiency, while reducing errors in usage.

In some embodiments, while the respective input device is attached to the electronic device, the electronic device detects a respective event including detecting that at least a portion of the respective input device has been detached from the electronic device and attached to a second electronic device, and that at least a portion of a second respective input device associated with a second electronic device has been (e.g., detached from the second electronic device and) attached to the electronic device, such as in FIG. 6D.

In some embodiments, the respective user input includes a first component and a second component, each of which including one or more input mechanisms for receiving user input. In some embodiments, the first component and second component are uniquely paired with each other such that the combination of the two components form the respective input device. In some embodiments, each of the first component and second component is able to be attached to an electronic device and provide user inputs to the electronic device without the other component being attached to the electronic device. In some embodiments, the first and second components are able to be attached to different electronic devices and provide user inputs to their respective electronic devices. In some embodiments, because the first and second components are uniquely paired with each other, attaching the two components to different electronic devices optionally causes the two electronic devices to be paired with each other or otherwise form a relationship. In some embodiments, the electronic device is able to detect that the first component of a first respective input device has been attached to the electronic device while a second component of a second respective input device has been attached to the electronic device. For example, the electronic device determines that the unique IDs of the two attached components do not match and thus are not components of the same respective input device. In some embodiments, the respective user input includes a single component (e.g., instead of two components, as described above) and is paired with the electronic device such that if the single component is attached to another electronic device, a multiplayer game session can be established between the electronic device and the other electronic device.

In some embodiments, in response to detecting the respective event, initiating a process to create a gaming session in which the electronic device and the second electronic device participate, such as in FIG. 6D (e.g., automatically create a gaming session between the first electronic device and the second electronic device which have swapped components of two respective input devices).

In some embodiments, creating a gaming session includes displaying a user interface of a game application and automatically configuring the game application in a multiplayer mode in which the users of the two electronic devices are players in the multiplayer session. In some embodiments, creating a gaming session includes establishing a relationship between the two electronic devices using a multiplayer gaming service and optionally providing the user with one or more options of games with which to play a multiplayer session.

The above-described manner of establishing a multiplayer session with two electronic devices (e.g., in response to detecting that the two electronic devices have swapped a component of their respective input devices) provides a quick and efficient manner of creating a gaming session between the two electronic devices (e.g., without requiring the users of the two electronic devices to perform additional inputs to identify each other and create a gaming session), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300 and 1500) are also applicable in an analogous manner to method 700 described above with respect to FIG. 7. For example, the operation of the electronic device of displaying user interfaces associated with games in response to detecting input devices having been connected to an electronic device described above with reference to method 700 optionally has one or more of the characteristics of displaying a reduced user interface in response to detecting that a cover has covered a portion of the display, displaying a user interface via a display generation component of an input device, and/or projecting a user interface via a projection device of an input device, etc., described herein with reference to other methods described herein (e.g., methods 900, 1100, 1300 and 1500). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIG. 7 are, optionally, implemented by components depicted in FIGS. 1A-1B. For example, detecting operation 702 and displaying operation 704 are, optionally, implemented by event sorter 170, event recognizer 180, and event handler 190. Event monitor 171 in event sorter 170 detects a contact on a touch-sensitive surface, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Displaying a Reduced User Interface

Users interact with electronic devices in many different manners, including using a cover or a case to protect the display of an electronic device. In some embodiments, a cover or case can include one or more cut-outs or areas through which a user is able to see unobstructed portions of the display of the device. The embodiments described below provide ways in which an electronic device displays a reduced user interface through the one or more cut-outs or areas through which the user is able to see portions of the display of the device in response to detecting that the cover or case has covered portions of the display. Displaying reduced user interfaces in response to detecting that a cover has covered portions of the display enhances the user's interactions with the electronic device and reduces the amount of time the user needs to perform operations. Reducing operational time decreases the power usage of the device and increases battery life for battery-powered devices.

FIGS. 8A-8F illustrate exemplary ways in which an electronic device displays a reduced user interface in response to detecting that a cover has covered a portion of the display of the electronic device in accordance with some embodiments of the disclosure. The embodiments in these figures are used to illustrate the processes described below, including the processes described with reference to FIG. 9. Although FIGS. 8A-8F illustrate various examples of ways an electronic device is able to perform the processes described below with respect to FIG. 9, it should be understood that these examples are not meant to be limiting, and the electronic device is able to perform one or more processes described below with reference to FIG. 9 in ways not expressly described with reference to FIGS. 8A-8F.

FIG. 8A illustrates electronic device 500 displaying user interface 800 (e.g., via a display device, via a display generation component, etc.) and input device 804 attached to the back of device 500. In some embodiments, user interface 800 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, input device 804 is a foldable cover that is able to be attached to the back of device 500 and folded open to cover the front side of device 500 (e.g., to cover the display of device 500), similar to input device 610 described above with respect to FIGS. 6K-6M. In some embodiments, details of input device 610 apply analogously to input device 804 described herein.

Front view 801 illustrates device 500 displaying game user interface 1 800 when input device 804 is in its closed position. In some embodiments, game user interface 1 800 is a user interface of a game application.

Figure 8B:
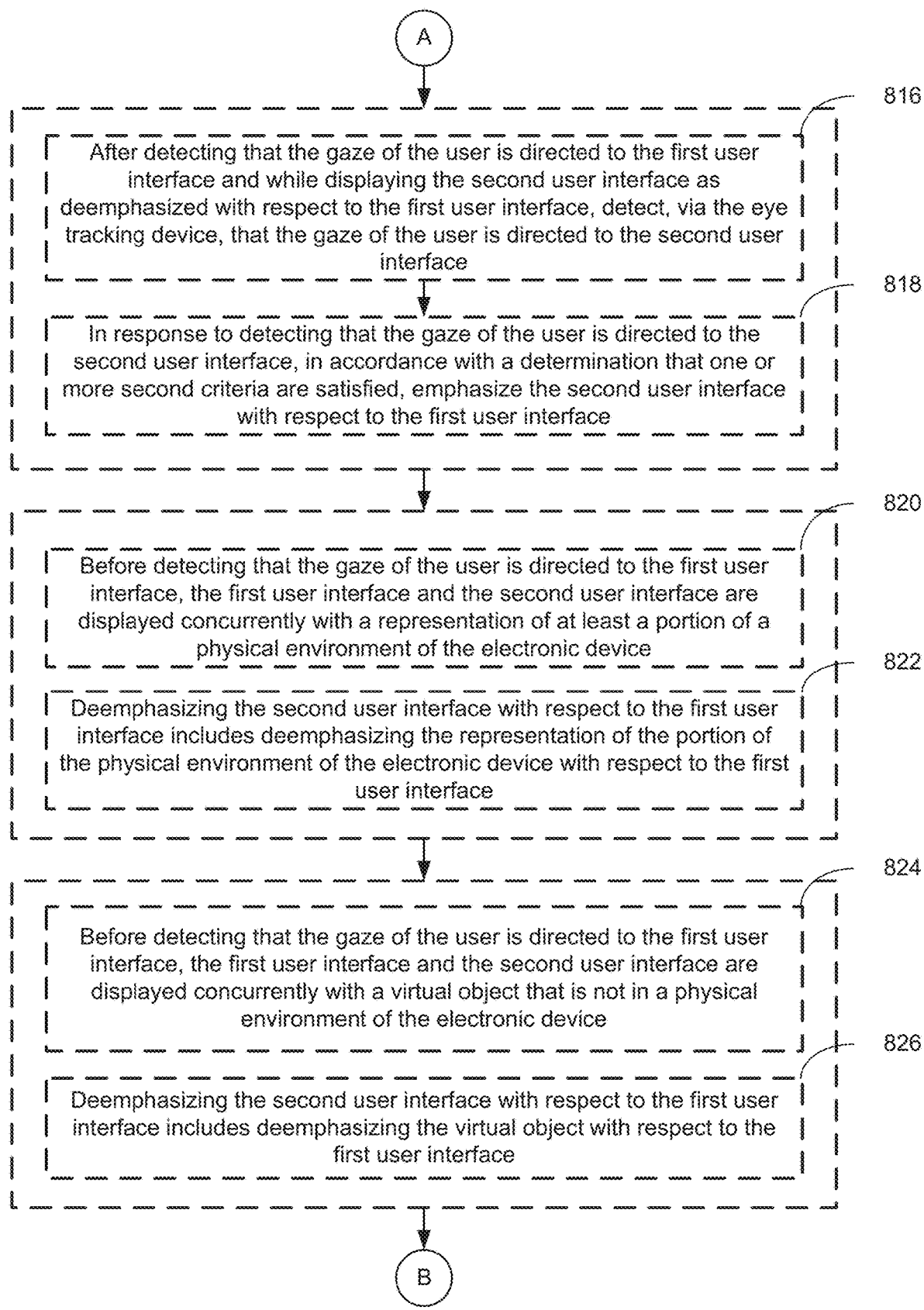

In FIG. 8B, input device 804 has been folded around device 500 such that the display of device 500 is at least partially covered by input device 804. As shown, in some embodiments, the portion of input device 804 that covers the display of device 500 includes one or more areas that do not obstruct the view of portions of the display of device 500. For example, input device 804 optionally includes one or more holes, one or more cut-outs, and/or one or more portions with translucent or transparent material (e.g., plastic, glass, etc.), through which a user is able to see portions of the display of device 500. For example, in FIG. 8B, input device 804 includes a rectangular cut-out at the center through which device 500 is able to display game user interface 2 806, while the other portions of the display generation component of device 500 is obscured by input device 806 (e.g., as illustrated in FIG. 8B by the hatched pattern).

In some embodiments, in response to detecting that input device 804 has covered the display of device 500 (and optionally in accordance with a determination that one or more portions of the display of device 500 remain visible), device 500 displays game user interface 2 806 (e.g., replaces display of game user interface 1 800 with game user interface 2 806), as shown in FIG. 8B. In some embodiments, game user interface 2 806 is displayed only at the areas that are not obscured by input device 804. In some embodiments, the device enters into a reduced display mode to accommodate the reduced available display area. For example, game user interface 2 806 is a reduced content version of game user interface 1 800, in which a limited amount of content is displayed. In some embodiments, the game application associated with game user interface 1 800 enters into a different game mode. For example, game user interface 2 806 optionally is a minigame or a side quest of the main game application. In some embodiment, game user interface 2 806 displays status information associated with the game, such as a character's health, inventory, map, etc. at the time input device 804 was folded around device 500. In some embodiments, the game application pauses when input device 804 covers at least a portion of the display of device 500. In some embodiments, the game application does not pause and the user is able to continue interaction with the game application (optionally in a different game mode, in a reduced game mode, etc.). In some embodiments, a user is able to interact with game user interface 2 806 (e.g., to select, touch, etc.) to provide input to the main game application and/or the reduced functionality game. Thus, as described above, in some embodiments, in response to detecting that the display of device 500 has been covered by input device 804, device 500 does not disable or otherwise turn off the display of device 500 or lock device 500.

In some embodiments, a game application is designed to supports a reduced game mode associated with when the display of the device is partially covered by input device 804. In some embodiments, a game designer can design the game such that to progress in the gameplay, the user is required to play in a reduced game mode with the display being partially covered by input device 804. For example, a game can integrate the reduced game mode into the story of the game (e.g., instead of as a side quest or minigame that is auxiliary to the primary gameplay). In such an embodiment, the game application can request that the user cover the display using input device 804 to continue the gameplay progression. Similarly, a game application may be designed such that the progress of the game along a storyline requires the game to be in full functionality mode. In such embodiments, the game application can request the user uncover the display of the device and return the game to full functionality mode in order to continue the gameplay progression.

Figure 8C:
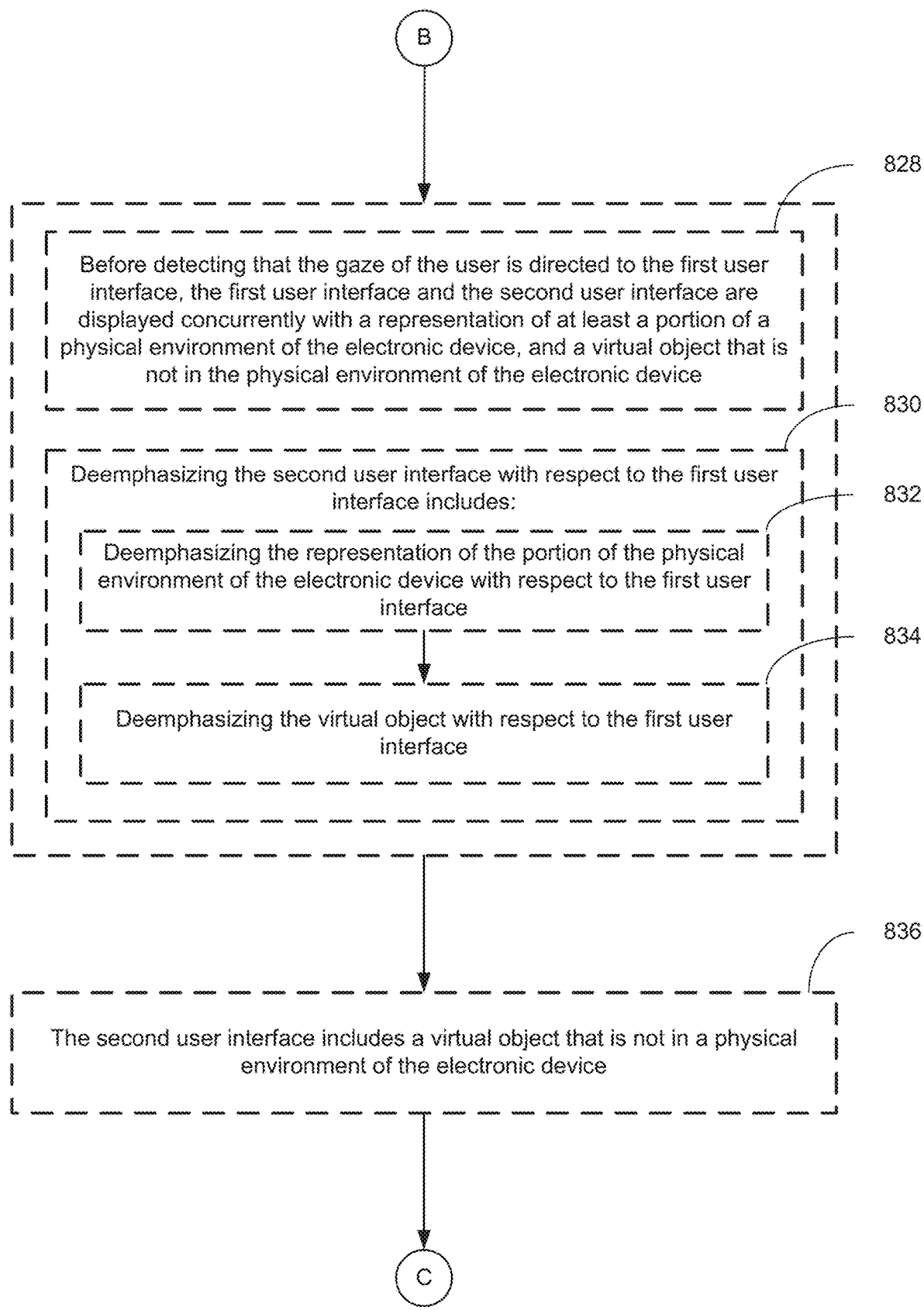

In FIG. 8C, device 500 detects that input device 804 has been folded to no longer be covering the display of device 500. In some embodiments, in response to detecting that the display of device 500 is no longer partially obscured, device 500 redisplays game user interface 1 800 (e.g., replaces display of game user interface 2 806 with display of game user interface 1 800), as shown in FIG. 8C. In some embodiments, device 500 resumes the full functionality mode and/or the game application returns to a full functionality game mode. In some embodiments, if the game application paused when input device 804 was obscuring the display of device 500, then the game application resumes when input device 804 is no longer obscuring the display of device 500.

Figure 8D:
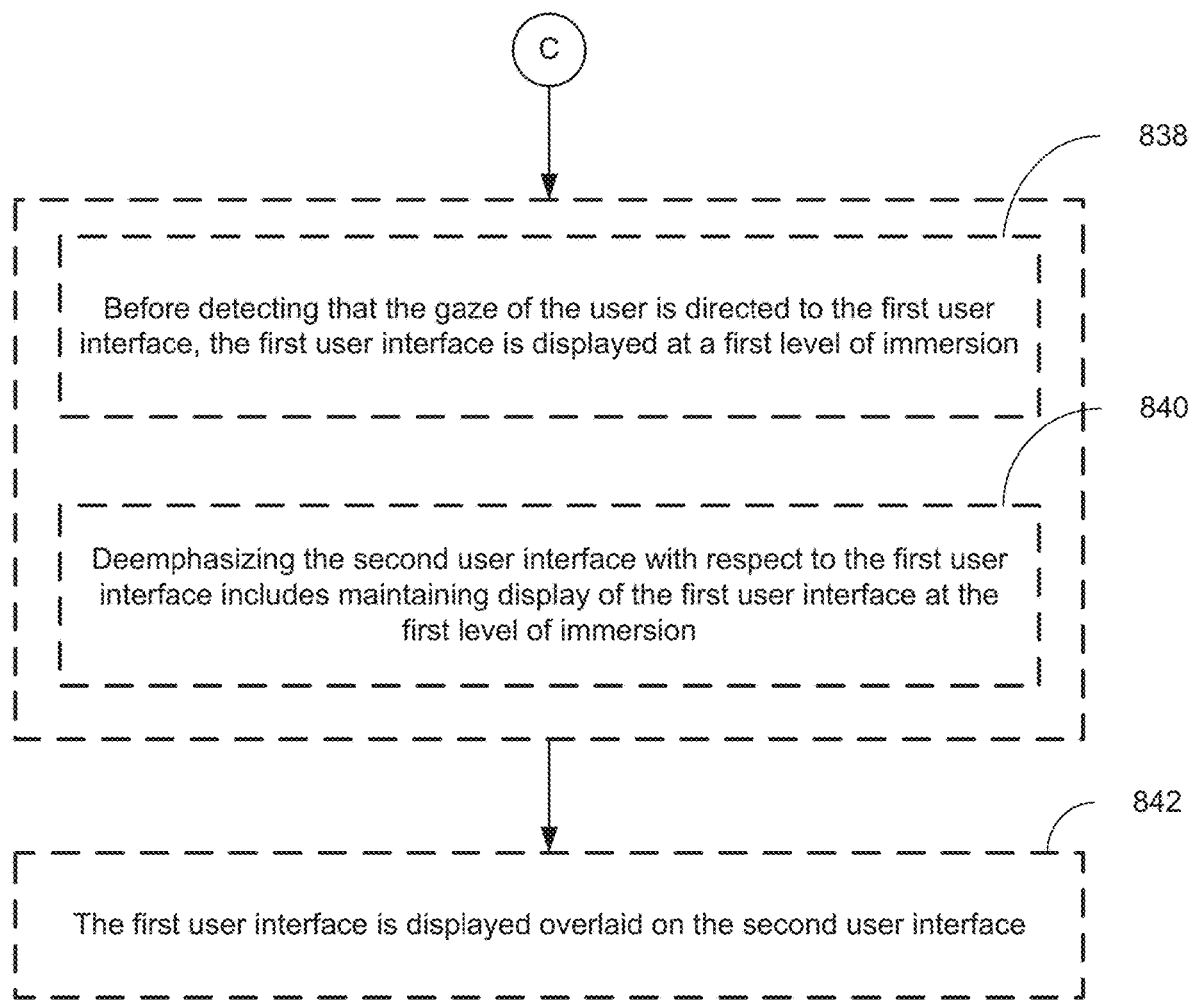

As described above, the device and/or the active application can enter into a different mode (e.g., reduced mode) in response to detecting that the display has been covered by a device that only partially obscures the display of device 500. It is understood that the active application need not be a game application as described above. For example, in FIG. 8D, device 500 is displaying lock screen 808 when input device 804 is not covering the display of device 500. In some embodiments, lock screen 808 is a wake screen user interface that is displayed when device 500 exits low-power mode and/or in response to a request to wake up the device. In some embodiments, lock screen 808 includes an indication of the current date and/or time, an indication of whether the device is locked or unlocked (e.g., whether the user is authenticated or not), and/or one or more representations of notifications (e.g., received messages, received phone calls, news alerts, the occurrence of events of interest associated with an application on device 500, etc.). In FIG. 8D, lock screen 808 includes a notification (e.g., notification 1), which optionally includes a textual description and/or graphical content of the event associated with the notification (e.g., a description of the event that triggered display of the notification).

In FIG. 8E, input device 804 has been folded around device 500 such that the display of device 500 is at least partially covered by input device 804. In some embodiments, in response to detecting that the display is partially covered by input device 804, device 500 displays reduced lock screen 810 (e.g., replaces display of lock screen 808 with reduced lock screen 810), as shown in FIG. 8E. In some embodiments, reduced lock screen 810 is a minimized and/or reduced version of lock screen 808 and optionally includes less content than lock screen 808. For example, in FIG. 8E, reduced lock screen 810 includes an indication of the time and date and an indication that one notification exists, without including the content associated with the notification (e.g., without including a textual description and/or graphical content of the event associated with the notification). In FIG. 8E, reduced lock screen 810 does not include an indication of whether the device is locked or unlocked. In some embodiments, a user is able to interact with lock screen 810, for example, to select the indication that one notification exists to cause display of the content associated with the one notification through the portion of input device 804 that allows part of the display of device 500 to be visible.

Thus, as described above, when device 500 detects that a cover has covered the display of device 500, but that one or more portions of the display are not obscured, device 500 optionally does not disable or turn off the display and optionally does not lock the device and device 500 optionally switches to a reduced display mode in which the display displays a reduced version of the user interface that was displayed before the display was covered, or the device displays a different user interface as a result of the active application switching to a different mode, such as a reduced display mode, a minigame mode, a miniature mode, etc. For example, a map application optionally switches from a map user interface to a compass user interface in response to detecting that the display is partially covered, a music application switches from a music playback user interface to displaying only the album art of the currently playing song, etc.

FIG. 8F illustrates an alternative embodiment in which input device 804 includes a plurality of cut-outs or regions through which a user is able to see portions of the display of device 500 (e.g., as opposed to one cut-out or region as described above with respect to FIGS. 8B-8E). In some embodiments, in response to detecting that input device 804 is covering the display of device 500 and includes a plurality of areas for viewing the display, device 500 optionally displays a plurality of selectable options at locations associated with the plurality of cut-outs, as shown in FIG. 8F. In some embodiments, the plurality of selectable options are associated with applications on device 500 (e.g., optionally to launch and/or cause display of the respective application). For example, selectable option 812*a* is associated with a messenger application and is optionally selectable to launch the messenger application, display a user interface of the messenger application (e.g., in a reduced display mode) and/or perform an operation associated with the messenger application, such as to display the user's favorite contacts and/or send a text message to one or more contacts. In some embodiments, selectable option 812*b* is associated with a music application and is selectable to perform an operation associated with the music application, such as to begin playback of a song, pause playback of a song, etc. In some embodiments, the plurality of selectable options are associated with a game application (e.g., the game application that was active when input device 804 covered the display of device 500). For example, selectable options 812*c*-812*e* are associated with different game applications and are selectable to launch a respective game application. In some embodiments, selectable options 812*c*-812*e* are associated with the game application that was active when input device 804 covered the display of device 500 and are selectable to perform an operation associated with the game (e.g., the options are selectable to send inputs to the game application). In some embodiments, the plurality of selectable options are associated with one or more social operations. For example, selectable option 812*f* is associated with a first friend of the user of device 500 and is optionally selectable to initiate a communication session with the first friend of the user (e.g., send a text message, initiate a phone call, etc.), and selectable option 812*g* is associated with a second friend of the user of device 500 and is optionally selectable to initiate a communication session with the second friend of the user.

It is understood that although input device 804 described above with respect to FIGS. 8A-8F is described as an element that is foldable and attachable to device 500 and that includes one or more input mechanisms, the disclosure herein is applicable to devices that do not include input mechanisms. For example, the process described herein of displaying a user interface and/or user interface elements through one or more areas in the input device that do not obstruct the view of respective portions of the display of device 500 can also be performed with a passive device case or protective cover that do not include any input mechanisms and do not provide inputs to device 500, but are capable of covering at least a portion of the display of device 500 while leaving other portions of the display of device 500 unobscured and/or viewable.

Figure 9A:
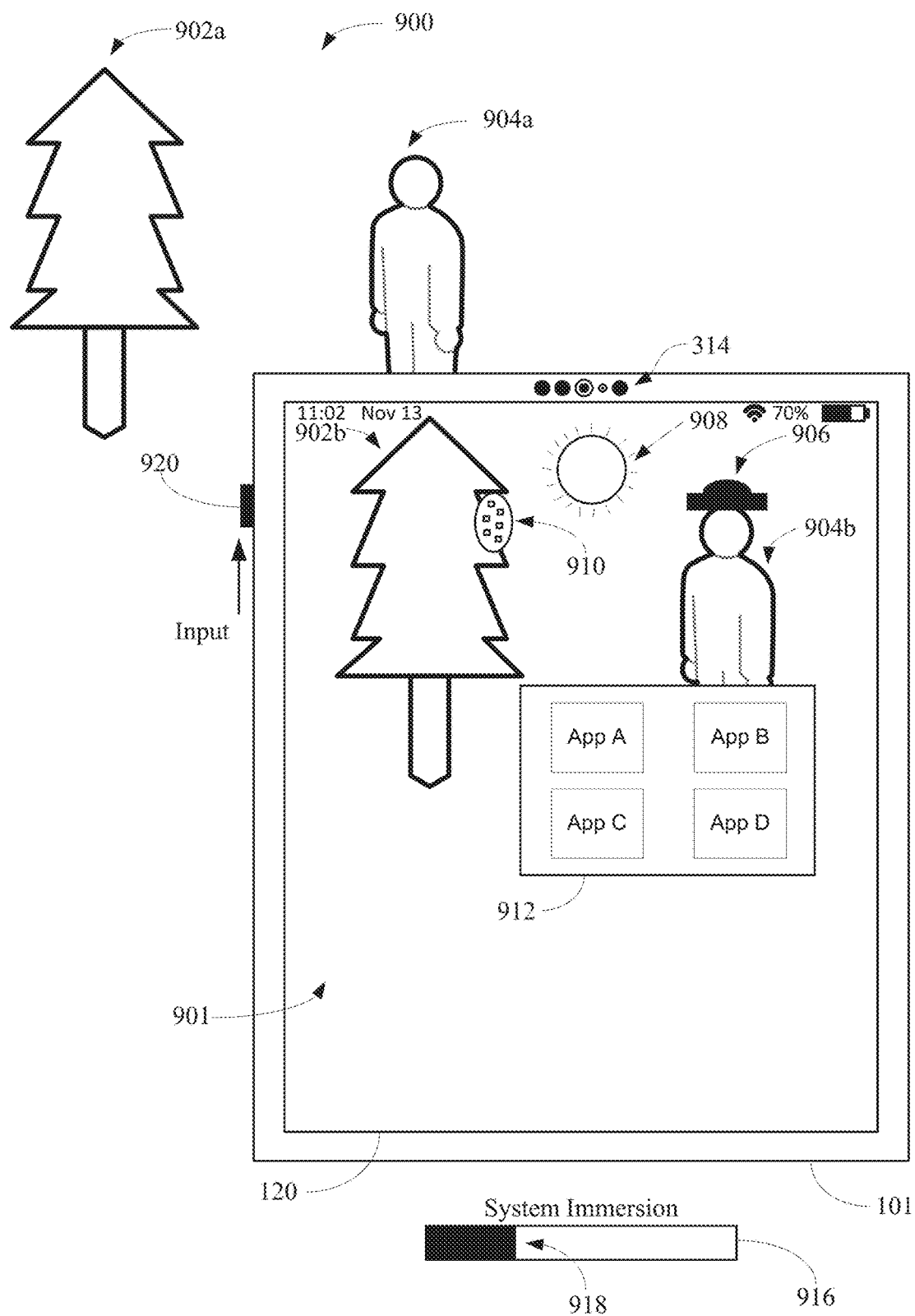
FIG. 9 is a flow diagram illustrating a method of displaying a reduced user interface in response to detecting that a cover has covered a portion of the display of an electronic device in accordance with some embodiments of the disclosure.
Figure 9B:
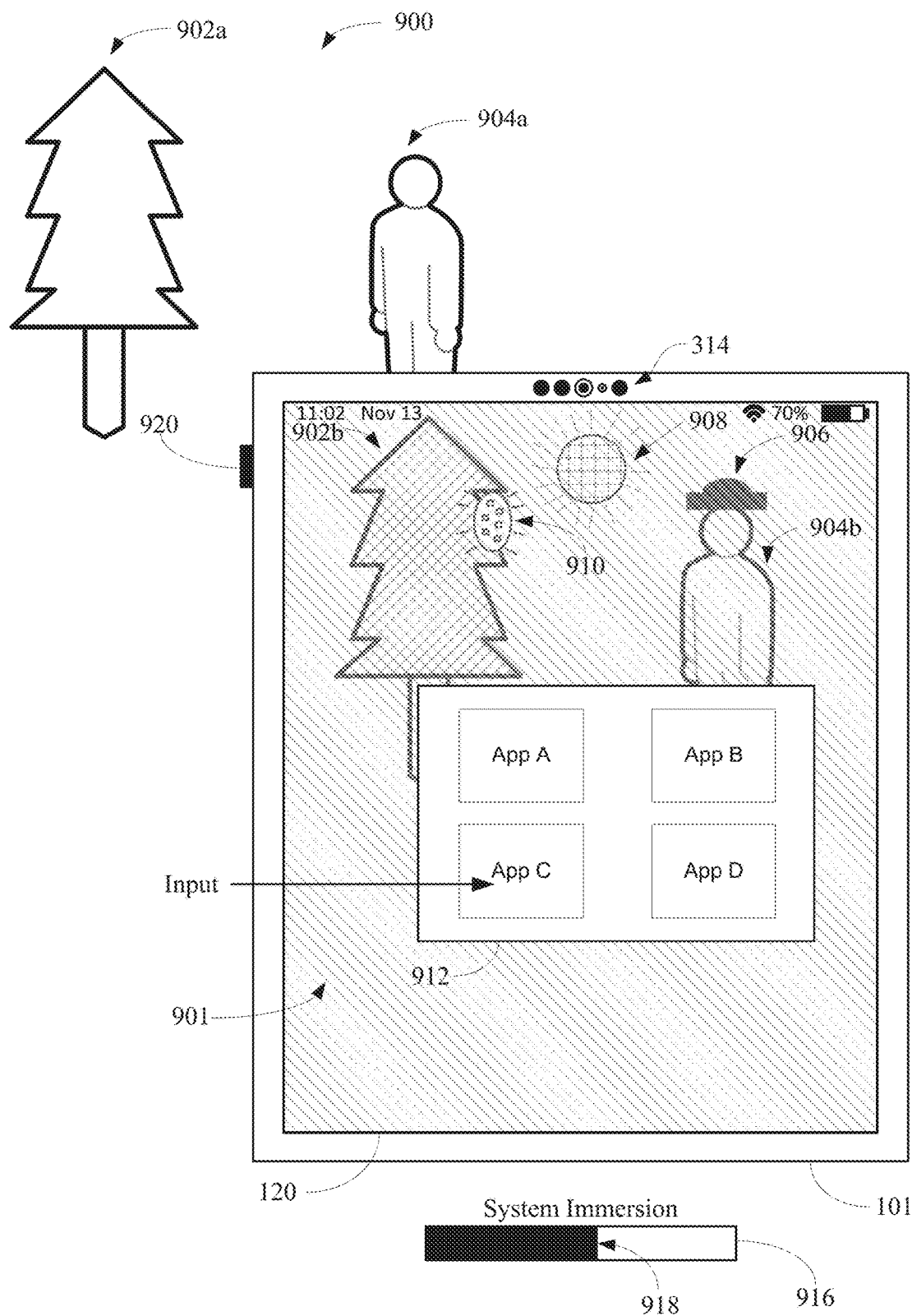
Figure 9C:
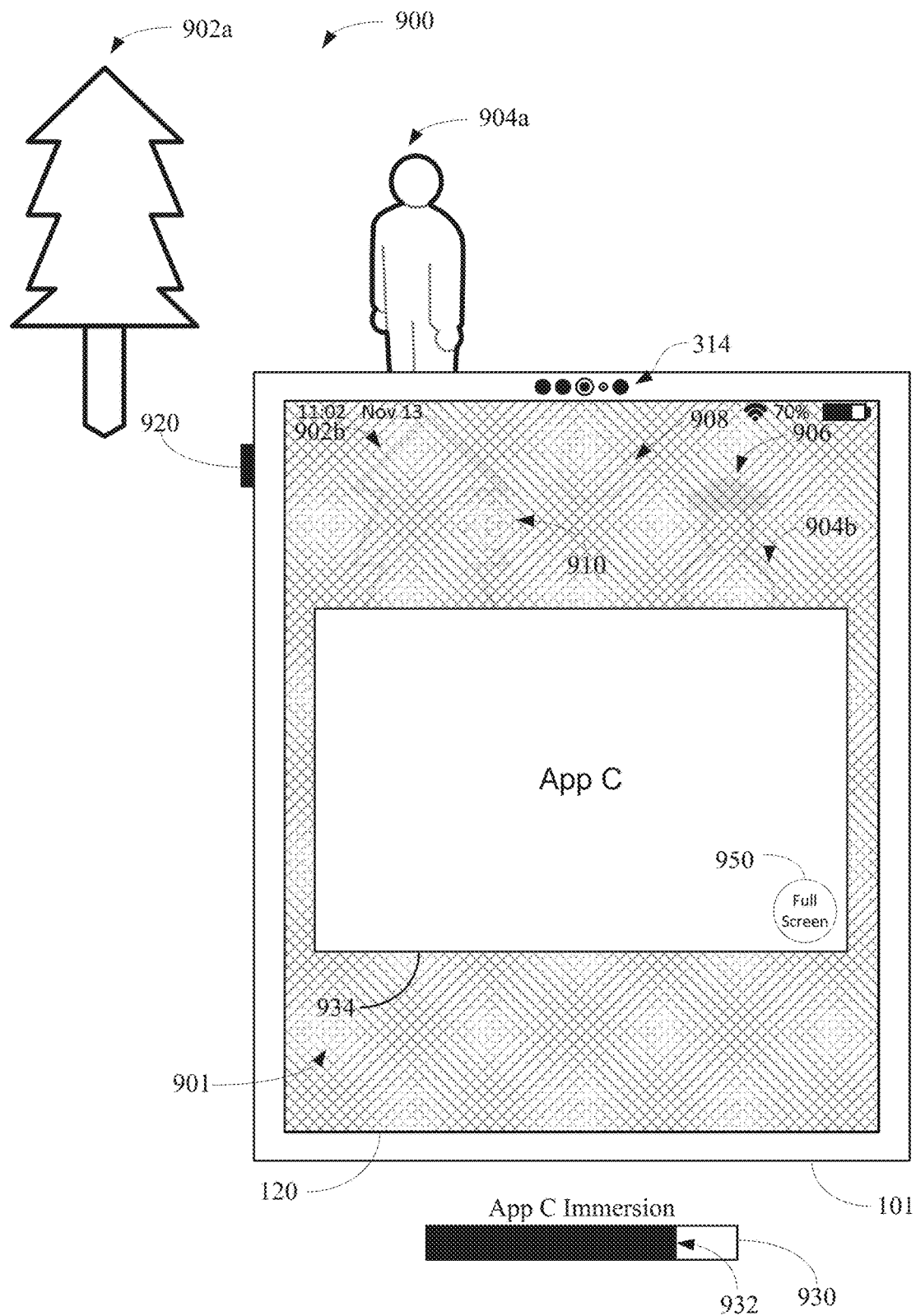

FIG. 9 is a flow diagram illustrating a method 900 of displaying a reduced user interface in response to detecting that a cover has covered a portion of the display of an electronic device in accordance with some embodiments of the disclosure. The method 900 is optionally performed at an electronic device such as device 100, device 300, device 500, and device 580 as described above with reference to FIGS. 1A-1B, 2-3, 4A-4B and 5A-5I. Some operations in method 900 are, optionally combined and/or the order of some operations is, optionally, changed.

As described below, the method 900 is directed to displaying a reduced user interface in response to detecting that a cover has covered a portion of the display of the electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., electronic device 500, device 580, a mobile device (e.g., a tablet, a smartphone, a media player, or a wearable device), a set-top box or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.), while displaying, via the display generation component, a first user interface associated with a first application (e.g., a user interface of a game application on the electronic device), detects (902) that a respective peripheral for the electronic device is in a first configuration relative to the electronic device, such as device 500 detecting that input device 804 has covered a portion of the display of device 500 in FIG. 8B (e.g., the respective peripheral is optionally a case or other peripheral that attaches to the electronic device, and is able to be manipulated by a user to be in various configurations/positions relative to the electronic device).

In some embodiments, a display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the first user interface is a gameplay user interface that is displayed while gameplay of the game is occurring (e.g., via controls provided via one or more input devices that are integrated with the electronic device and/or controls provided via one or more external controller input devices, such as described with reference to method 700). In some embodiments, the first user interface is not a user interface of a game application on the electronic device (e.g., is a user interface of a non-game application and/or operating system of the electronic device).

For example, the respective peripheral optionally includes a flap or other foldable or movable part that can be positioned to as to cover at least a portion of the display generation component (e.g., a touch screen) of the electronic device. In some embodiments, the electronic device detects that the respective peripheral is in the first configuration relative to the electronic device using one or more sensors on the electronic device and/or one or more sensors on the respective input device. In some embodiments, before detecting that the respective peripheral for the electronic device is in the first configuration relative to the electronic device, the respective peripheral was in a second configuration relative to the electronic device (e.g., such that the respective peripheral is not covering at least a portion of the display generation component) or the respective peripheral was not connected/attached to the electronic device. In some embodiments, the respective peripheral includes one or more input mechanisms (e.g., such as described with reference to methods 700, 1100 and 1300) and is configured to provide input to the electronic device. For example, the respective peripheral optionally includes a set of controls (e.g., directional controls, a directional pad ("d-pad"), buttons, etc.) and optionally transmits user inputs interacting with the set of controls to the electronic device. In some embodiments, the respective peripheral does not include one or more input mechanisms.

In some embodiments, the first configuration is a configuration in which a first portion of the respective peripheral covers at least a first portion of the display generation component of the electronic device (904), such as input device 804 covering a portion of device 500 in FIG. 8B (e.g., the first portion of the peripheral hinders visibility of at least a portion of the user interfaces displayed by the display generation component when the respective peripheral is in the first configuration, and optionally allows other portions of the user interfaces displayed by the display generation component to continue to be visible (e.g., the portions that are not covered by the respective peripheral)). In some embodiments, the display generation component optionally continues displaying user interfaces, despite detecting that the respective peripheral covers at least a portion of the display generation component.

In some embodiments, the first portion of the respective peripheral includes one or more areas for displaying information from the electronic device (906), such as the center area of input device 804 including a cut-out and providing an unobscured view of the display of device 500 in FIG. 8B (e.g., the first portion of the respective peripheral includes one or more portions that do not include material that would hinder the visibility of a corresponding portion of the display generation component when the respective peripheral is in the first configuration). For example, the respective peripheral includes holes (e.g., circular or square holes), cut-outs, etc. in the first portion of the respective peripheral, such that at least a portion of the display generation component is viewable through the one or more holes or cut-outs. In some embodiments, the portions of the user interface(s) displayed via the display generation component that are coincident with the areas in the first portion for displaying information while the respective peripheral is in the first configuration are visible through the holes.

In some embodiments, in response to detecting that the respective peripheral is in the first configuration relative to the electronic device, the electronic device displays (908) (e.g., automatically displaying, without (e.g., user) input other than detection of the respective peripheral in the first configuration), via the display generation component, a second user interface associated with the first application (e.g., the second user interface is a different user interface of the game for which the first user interface is a user interface), wherein the second user interface includes information about a status of the first application that is displayed at one or more locations corresponding to the one or more areas in the first portion of the respective peripheral, such as game user interface 2 806 in FIG. 8B.

In some embodiments, the second user interface is a user interface of an application other than the game for which the first user interface is a user interface (e.g., the second user interface is a user interface of a game center application, such as described with reference to method 700, the second user interface is a user interface of the operating system of the electronic device), but displays information related to the game.

For example, the second user interface optionally includes, at the one or more locations on the display generation component that correspond to the one or more hole in the respective peripheral (e.g., so the displayed information is visible through those holes), information about game status for the game that was being played when the electronic device detected the respective peripheral in the first configuration. In some embodiments, game status is information such as a current progression through the game (e.g., what level the user of the electronic device was playing when the electronic device detected the respective peripheral in the first configuration), the latest activity of the game (e.g., the latest event that occurred in the game, whether before or after the electronic device detected the respective peripheral in the first configuration), a total amount of time the user has played the game, etc. In some embodiments (e.g., in embodiments in which the first user interface was not a user interface of a game), the second user interface optionally displays status information for a game that was most recently played/displayed by the electronic device (e.g., even though it was not being displayed when the electronic device detected the respective peripheral in the first configuration). In some embodiments, the first user interface is a gameplay user interface of the game via which the game is able to be controlled via controls included in the respective peripheral; in some embodiments, the second user interface is not a gameplay user interface of the game such that the game cannot be controlled via controls included in the respective peripheral. Thus, in some embodiments, in response to detecting that the respective peripheral is in the first configuration, the game application switches from a first game mode (e.g., which provides active gameplay) to a second game mode (e.g., in which status information is displayed).

The above-described manner of displaying application status information based on the configuration of the respective peripheral and through one or more holes in the respective peripheral provides a quick and efficient manner of accessing application status information, which simplifies the interaction between the user and the electronic device and enhances the operability of the electronic device and makes the user-device interface more efficient (e.g., without requiring the need for additional user input), which additionally reduces power usage and improves battery life of the electronic device by enabling the user to use the electronic device more quickly and efficiency, while reducing errors in usage.

In some embodiments, the second user interface includes a respective selectable option that is displayed at a respective location corresponding to a respective area of the one or more areas in the first portion of the respective peripheral for displaying information from the electronic device while the respective peripheral is in the first configuration relative to the electronic device, wherein the respective selectable option is selectable to interact with a reduced functionality version of the first application while the respective peripheral is in the first configuration relative to the electronic device, such as selectable options 812c-812e in FIG. 8F.

In some embodiments, the second user interface is a different mode (e.g., a reduced functionality mode) of the first application that was displaying when the respective peripheral was detected to be in the first configuration relative to the electronic device. For example, while the electronic device is displaying content in a full screen mode, the electronic device detects that the respective peripheral has been unfolded to cover a portion of the display generation component, while a second portion of the display generation component remains visible (e.g., via the areas in the respective peripheral for displaying information from the electronic device). In some embodiments, in response to detecting that the respective peripheral has been unfolded, the electronic device automatically switches to a non-full-screen mode of viewing content. For example, the electronic device displays the content in a reduced viewing mode in which the second user interface displays reduced content that is viewable via the holes in the respective peripheral. In some embodiments, the first application is a game application and the electronic device switches from a full gameplay mode to a reduced gameplay mode in response to detecting that the respective peripheral has been unfolded. In some embodiments, the reduced functionality mode includes displaying less content than the non-reduced functionality mode. In some embodiments, the reduced functionality mode includes displaying only notifications, only status information, only alerts, etc.

The above-described manner of displaying a reduced functionality user interface (e.g., in response to detecting that the respective peripheral is covering the display generation component such that portions of the display generation component are viewable via one or more holes in the respective peripheral) provides a quick and efficient manner continuing to display information to the user (e.g., via the second user interface that is viewable via the one or more holes in the respective peripheral), which simplifies the interaction between the user and the electronic device and enhances the operability of the electronic device and makes the user-device interface more efficient (e.g., without requiring the user to uncover the display generation component to view information), which additionally reduces power usage and improves battery life of the electronic device by enabling the user to use the electronic device more quickly and efficiency, while reducing errors in usage.

In some embodiments, the second user interface includes a respective selectable option that is displayed at a respective location corresponding to a respective area of the one or more areas in the first portion of the respective peripheral for displaying information from the electronic device while the respective peripheral is in the first configuration relative to the electronic device, wherein the respective selectable option is selectable to interact with a second application, different from the first application, while the respective peripheral is in the first configuration relative to the electronic device, such as in FIG. 8B (e.g., a simplified application that is associated or not associated with the first application).

In some embodiments, the second application is a reduced functionality version of the first application (e.g., a simplified version of the first application). In some embodiments, the second application is a sub-application of the first application (e.g., a simplified mode provided by the first application). In some embodiments, respective selectable option is associated with the reduced functionality version of the first application such that selecting the respective selectable option causes the execution of an operation, which optionally changes one or more elements displayed on the second user interface.

The above-described manner of displaying a reduced functionality application (e.g., in response to detecting that the respective peripheral is covering the display generation component such that portions of the display generation component are viewable via one or more holes in the respective peripheral) provides a quick and efficient manner of providing continued interaction with the user (e.g., via a reduced functionality application), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the second user interface includes a respective representation of another user that is currently available, and the respective representation of the other user is displayed at a respective location corresponding to a respective area of the one or more areas in the first portion of the respective peripheral for displaying information from the electronic device while the respective peripheral is in the first configuration relative to the electronic device, such as selectable options 812f and 812g in FIG. 8F.

In some embodiments, the other users are users that have a pre-existing relationship with the user of the electronic device. For example, the displayed users are friends with the user of the electronic device or have previously played a multiplayer session with the user of the electronic device. In some embodiments, the representation of the other user includes an indication of the online status of the other user. For example, the representation includes a green dot indicating that the user is currently online, a yellow dot indicating the user is currently idle, a red dot indicating the user is currently busy, or a grey or hollow dot indicating that the user is currently offline, etc. In some embodiments, the representation of the other user is selectable to establish a communication session with the other user. In some embodiments, the representation of the user is selectable to create a gaming session (e.g., multiplayer session) with the other user. In some embodiments, the representation of the other user is selectable to display information about the other user (e.g., display the other user's user profile, display information about the current status of the other user, etc.).

The above-described manner of displaying representations of other users (e.g., in response to detecting that the respective peripheral is covering the display generation component such that portions of the display generation component are viewable via one or more holes in the respective peripheral) provides a quick and efficient manner of providing information about the user's friends or contacts (e.g., even when the display generation component is partially covered), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the second user interface includes a respective selectable option that is displayed at a respective location corresponding to a respective area of the one or more areas in the first portion of the respective peripheral for displaying information from the electronic device while the respective peripheral is in the first configuration relative to the electronic device, wherein the respective selectable option is selectable to display, via the display generation component, a user interface of a respective application, such as selectable options 812a-812b in FIG. 8F (e.g., the second user interface includes one or more selectable options associated with one or more applications that are selectable to launch or otherwise display a user interface of the respective application).

In some embodiments, the one or more selectable options are viewable via the one or more holes of the respective peripheral. In some embodiments, the respective application is launched in a reduced mode in which the user interface of the respective application is viewable via the one or more holes of the respective peripheral. In some embodiments, the respective application is pre-loaded and becomes active (e.g., option with full functionality) in response to detecting that the respective peripheral is no longer covering the display generation component (e.g., the application is launched but remains idle or inactive until the respective peripheral is no longer covering the display generation component).

The above-described manner of displaying representations of applications (e.g., in response to detecting that the respective peripheral is covering the display generation component such that portions of the display generation component are viewable via one or more holes in the respective peripheral) provides a quick and efficient manner of display a respective application (e.g., in response to selection of a respective selectable option, even when the display generation component is partially covered), which simplifies the interaction between the user and the electronic device and enhances the operability of the electronic device and makes the user-device interface more efficient (e.g., without requiring the user to uncover the display generation component to launch an application), which additionally reduces power usage and improves battery life of the electronic device by enabling the user to use the electronic device more quickly and efficiency, while reducing errors in usage.

In some embodiments, in accordance with a determination that one or more first criteria are satisfied, the respective application is a first respective application, such as the messaging application associated with selectable option 812a in FIG. 8F (e.g., the second user interface includes a representation of an application that was the most recently used application or a representation of the user's favorite application). Thus, the one or more first criteria include a criterion that is satisfied when the first respective application is the most recently used application. In some embodiments, the one or more first criteria includes a criterion that is satisfied if the respective application has been marked as a favorite application and/or if the respective application is a top used application (e.g., one of the top 5 used application, one of the top 10 used application, etc.).

In some embodiments, in accordance with a determination that one or more second criteria are satisfied, the respective application is a second respective application, such as music application associated with selectable option 812b in FIG. 8F (e.g., if the second respective application was the most recently used application or the user's favorite application, then the second user interface includes a representation of the second respective application).

Thus, in some embodiments, the second user interface includes one or more representations of one or more recently used, commonly used, and/or favorite applications. In some embodiments, the second user interface includes a plurality of representations. In some embodiments, the second user interface includes representations of applications selected from different criteria. For example, the second user interface optionally includes representations of recently used applications, representations of recommended applications, representations of applications commonly used by contacts of the user, and/or representations of the most popular applications, etc.

The above-described manner of displaying representations of applications (e.g., in response to detecting that the respective peripheral is covering the display generation component such that portions of the display generation component are viewable via one or more holes in the respective peripheral) provides a quick and efficient manner of launching applications that the user has previously indicated an interest in (e.g., applications that the user most recently used or has favorited), which simplifies the interaction between the user and the electronic device and enhances the operability of the electronic device and makes the user-device interface more efficient (e.g., by automatically presenting the user with applications that is likely to be selected, without requiring the user to perform additional inputs to browse through multiple applications), which additionally reduces power usage and improves battery life of the electronic device by enabling the user to use the electronic device more quickly and efficiency, while reducing errors in usage.

In some embodiments, the respective application is an application from which a plurality of applications can be accessed, such as if one of selectable options 812a-812g in FIG. 8F is selectable to launch an application associated with managing and/or launching a plurality of applications (e.g., the second user interface includes a representation of an application or service that is associated with managing one or more social and/or multiplayer interactions of a plurality of applications, such as game applications, and that is capable of accessing multiple game applications). In some embodiments, the representation is selectable to display a user interface of the respective application.

The above-described manner of displaying a representation of a game associated with social and/or multiplayer aspects of one or more other applications (e.g., in response to detecting that the respective peripheral is covering the display generation component such that portions of the display generation component are viewable via one or more holes in the respective peripheral) provides a quick and efficient manner of initiating a multiplayer gaming session with other users, which simplifies the interaction between the user and the electronic device and enhances the operability of the electronic device and makes the user-device interface more efficient (e.g., without requiring the user to uncover the display generation component and select the application from a list of applications), which additionally reduces power usage and improves battery life of the electronic device by enabling the user to use the electronic device more quickly and efficiency, while reducing errors in usage.

In some embodiments, the electronic device displays the second user interface in accordance with a determination that the electronic device is not in a locked state, such as in FIG. 8B (e.g., the electronic device is in an unlocked state when the electronic device detects that the respective peripheral is in the first configuration).

In some embodiments, when the respective peripheral is moved to being in the first configuration (e.g., by a user), the electronic device remains in the unlocked state such that the user continues to be able to interact with the device. In some embodiments, if the electronic device is in a locked state when the respective peripheral is in the first configuration and receives a user input to unlock the electronic device, then the electronic device is updated to be in an unlocked state and optionally displays the second user interface.

In some embodiments, in response to detecting that the respective peripheral is in the first configuration relative to the electronic device, and in accordance with a determination that the electronic device is in the locked state, the electronic device displays, via the display generation component, a third user interface, wherein the third user interface includes respective information, different from the information about the status of the first application, that is displayed at the one or more locations corresponding to the one or more areas in the first portion of the respective peripheral for displaying information from the electronic device while the respective peripheral is in the first configuration relative to the electronic device, such as in FIG. 8E (e.g., if the electronic device is in a locked state in which the user is unable to access one or more applications, files, documents, etc. of the electronic device without first unlocking the device).

In some embodiments, unlocking the device includes authenticating that the user is an authorized user of the electronic device. In some embodiments, when the electronic device is in a locked state when the respective peripheral is moved to being in the first configuration, the electronic device remains in the locked state. In some embodiments, the user interface that is displayed via the one or more holes of the respective peripheral when the device is in the locked state are different than the user interface that is displayed via the one or more holes of the respective peripheral when the device is in the unlocked state. For example, while in the locked state, the device displays one or more of the time, the date, the device status, one or more indications of notifications, etc. In some embodiments, while in the locked state, the device does not display a user interface of an application.

The above-described manner of displaying different user interfaces based on whether the device is locked or unlocked provides a quick and efficient manner of displaying limited information if the device is unlocked and displaying more information if the device is unlocked, which simplifies the interaction between the user and the electronic device and enhances the operability of the electronic device and makes the user-device interface more efficient (e.g., without requiring the user to uncover the display generation component and unlock the device to access more information), which additionally reduces power usage and improves battery life of the electronic device by enabling the user to use the electronic device more quickly and efficiency, while reducing errors in usage.

In some embodiments, the first application remains active on the electronic device while the electronic device is displaying the second user interface while the respective peripheral is in the first configuration relative to the electronic device, such as in FIG. 8B (e.g., in response to detecting that the respective peripheral is in the first configuration, the electronic device continues in an active mode and/or continues displaying a user interface of the application that was running before the respective peripheral was detected in the first configuration).

In some embodiments, the second user interface includes one or more selectable options associated with the application that was running before the respective peripheral was detected in the first configuration (e.g., which optionally were not displayed before the respective peripheral was detected in the first configuration) and/or are selectable to provide input to the application that was running before the respective peripheral was detected in the first configuration.

The above-described manner of maintain an application as active (e.g., in response to detecting that the respective peripheral is covering the display generation component such that portions of the display generation component are viewable via one or more holes in the respective peripheral) provides a quick and efficient manner of displaying limited information if the device is unlocked and displaying more information if the device is unlocked, which simplifies the interaction between the user and the electronic device and enhances the operability of the electronic device and makes the user-device interface more efficient (e.g., without requiring the user to uncover the display generation component and unlock the device to access more information), which additionally reduces power usage and improves battery life of the electronic device by enabling the user to use the electronic device more quickly and efficiency, while reducing errors in usage.

In some embodiments, first user interface and the second user interface are user interfaces of the first application, such as in FIGS. 8A-8B (e.g., different user interfaces of the same application, optionally associated with different modes of the first application. For example, the first user interface is associated with a full feature mode of the game while the second user interface is associated with a reduced feature mode of the game (e.g., a minigame, a side quest, etc.).

In some embodiments, while displaying, via the display generation component, the second user interface, the electronic device detects that the respective peripheral for the electronic device is in a second configuration relative to the electronic device, such as in FIG. 8C (e.g., detecting that the respective peripheral has changed configuration. For example, detecting that the respective peripheral is no longer covering the display generation component.

In some embodiments, in response to detecting that the respective peripheral for the electronic device is in the second configuration relative to the electronic device, the electronic device displays, via the display generation component, the first user interface, such as in FIG. 8C (e.g., revert to displaying the first user interface, which was displayed when the device detected that the respective peripheral had changed to the first configuration).

For example, the application returns to a full functionality mode in response to detecting that the display generation component is no longer partially covered. In some embodiments, the second user interface includes an indication that changing the configuration of the respective peripheral will cause the application to display the first user interface or otherwise switch to the full featured mode. In some embodiments, while interacting with the second user interface (e.g., a minigame or reduced functionality game), the gameplay progress reaches a point at which gameplay cannot progress except in a full functionality mode, and in such situations, the second user interface optionally displays an indication to change the configuration of the respective peripheral to the second configuration to continue progressing the game, in full functionality mode. In some embodiments, the second user interface does not display the indication to change the configuration to the second configuration if gameplay progress has not reached a point at which gameplay cannot progress without being in a full functionality mode.

The above-described manner of resuming display of the first user interface (e.g., in response to detecting that the respective peripheral is no longer covering the display generation component) provides a quick and efficient manner of resuming the full functionality mode of the active application, which simplifies the interaction between the user and the electronic device and enhances the operability of the electronic device and makes the user-device interface more efficient (e.g., without requiring the user to uncover the display generation component and perform additional inputs to switch the application to its full functionality mode), which additionally reduces power usage and improves battery life of the electronic device by enabling the user to use the electronic device more quickly and efficiency, while reducing errors in usage.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300 and 1500) are also applicable in an analogous manner to method 900 described above with respect to FIG. 9. For example, the operation of the electronic device of displaying a reduced user interface in response to detecting that a cover has covered a portion of the display described above with reference to method 900 optionally has one or more of the characteristics of displaying user interfaces associated with games in response to detecting input devices having been connected to an electronic device, displaying a user interface via a display generation component of an input device, and/or projecting a user interface via a projection device of an input device, etc., described herein with reference to other methods described herein (e.g., methods 700, 1100, 1300 and 1500). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIG. 9 are, optionally, implemented by components depicted in FIGS. 1A-1B. For example, detecting operation 902 and displaying operation 908 are, optionally, implemented by event sorter 170, event recognizer 180, and event handler 190. Event monitor 171 in event sorter 170 detects a contact on a touch-sensitive surface, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Displaying a User Interface Via an Input Device

Users interact with electronic devices in many different manners, including using remote input devices to provide inputs to such electronic devices. In some embodiments, an input device includes a display generation component, such as a touch screen display. The embodiments described below provide ways in which a user interface is displayed via a display generation component of the input device concurrently with the display of a user interface via a display generation component of the electronic device. Displaying a user interface via an input device enhances the user's interactions with the electronic device and reduces the amount of time the user needs to perform operations. Reducing operational time decreases the power usage of the device and increases battery life for battery-powered devices.

Figure 10A:
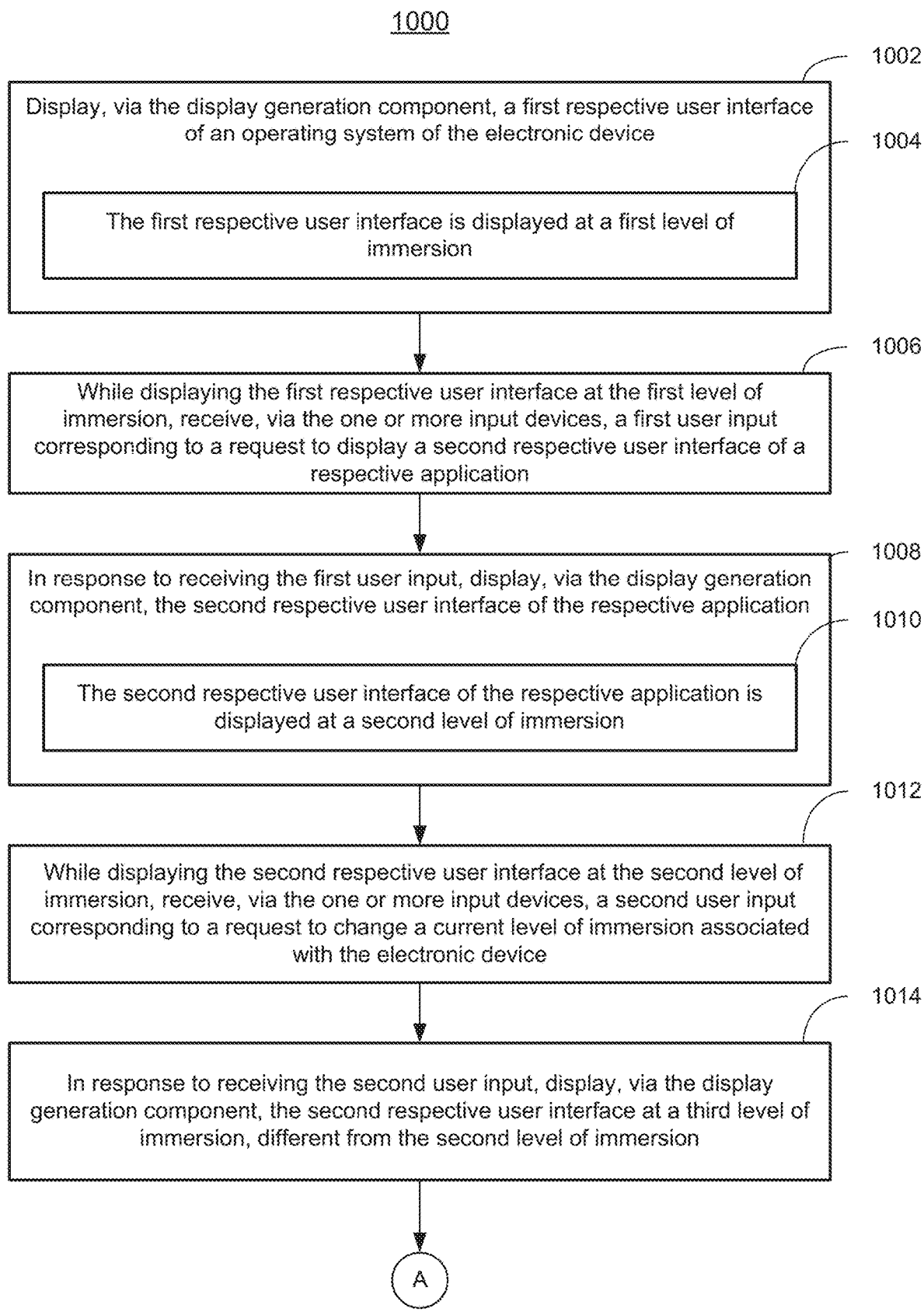
FIGS. 10A-10S illustrate exemplary ways in which an electronic device displays a user interface via a display generation component of an input device in accordance with some embodiments.

FIGS. 10A-10S illustrate exemplary ways in which an electronic device displays a user interface via a display generation component of an input device in accordance with some embodiments of the disclosure. The embodiments in these figures are used to illustrate the processes described below, including the processes described with reference to FIG. 11. Although FIGS. 10A-10S illustrate various examples of ways an electronic device is able to perform the processes described below with respect to FIG. 11, it should be understood that these examples are not meant to be limiting, and the electronic device is able to perform one or more processes described below with reference to FIG. 11 in ways not expressly described with reference to FIGS. 10A-10S.

FIG. 10A illustrates electronic device 500 displaying user interface 1004 (e.g., via a display device, via a display generation component, etc.). In some embodiments, user interface 1004 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In FIG. 10A, input device 1006 is attached to the back of device 500 and is unfolded into its mounted position such that the input mechanisms of input device 1006 (e.g., d-pad 1010*a* and function buttons 1010*b*) are accessible (e.g., as shown in front view 1001) and device 500 is supported at a respective angle (e.g., as shown in side view 1002), similar to input device 610 described above with respect to FIG. 6L. As described above with respect to FIGS. 6K-6L, when input device 1006 is unfolded such that input mechanisms of input device 1006 are accessible, input device 1006 is able to receive user inputs and provide the user inputs to device 500.

Figure 10B:
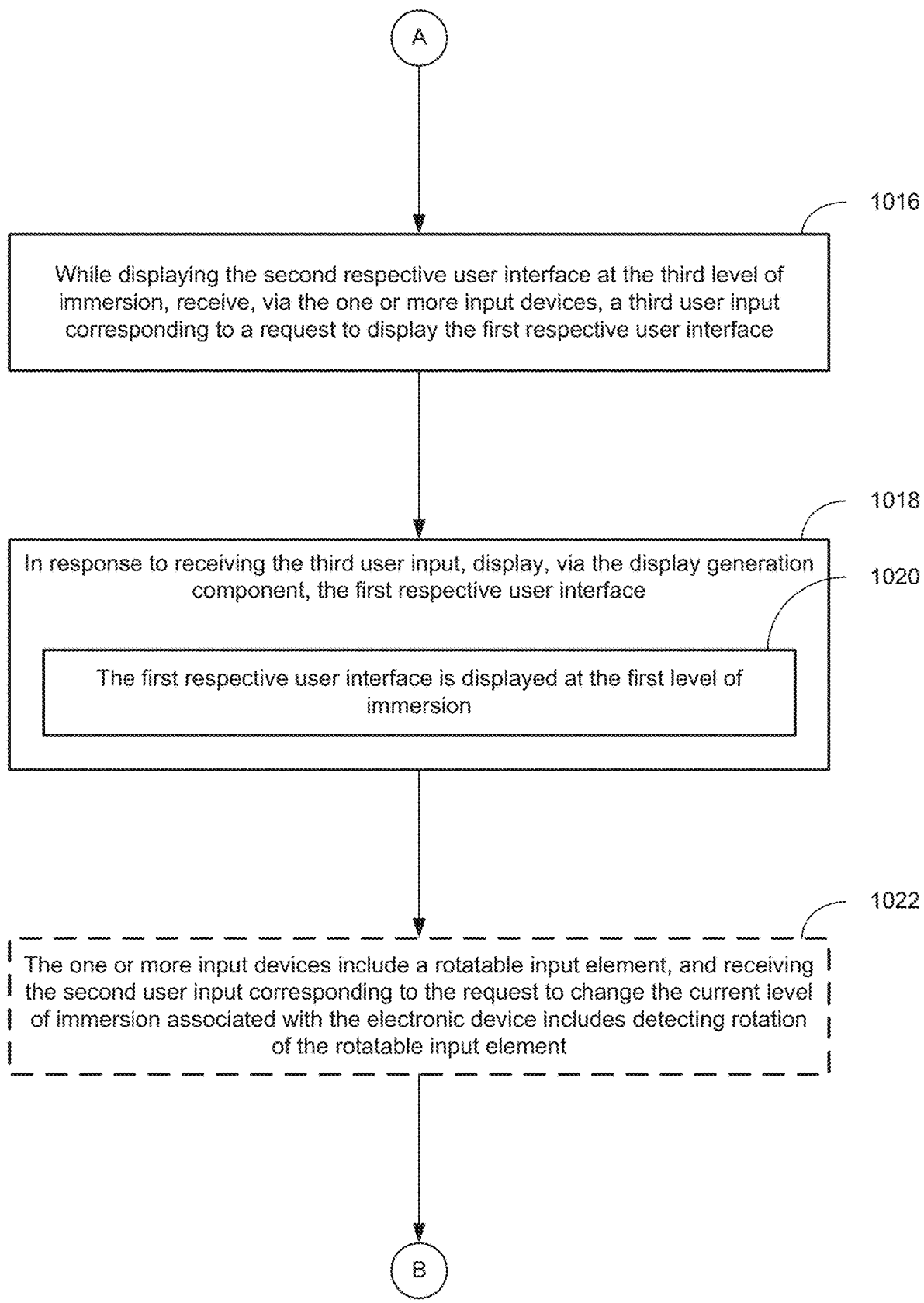

In some embodiments, input device 1006 includes a display generation component, such as a display or a touch screen device, on the same surface of input device 1006 as the input mechanisms, as shown in FIG. 10A. In FIG. 10A, input device 1006 displays user interface 2 1008 via the display generation components of input device 1006. In some embodiments, user interface 2 1008 is associated with game user interface 1 1004 (e.g., is a user interface of the game application that is displaying user interface 1 1004). In some embodiments, user interface 2 1008 is not associated with game user interface 1 1004. For example, user interface 2 1008 is a system user interface or is a user interface of another application. FIGS. 10B-10S illustrate different embodiments of the content that can be displayed by the display generation component of input device 1006 and optionally how the display generation component of input device 1006 interacts with the display generation component of device 500.

In FIG. 10B, function buttons 1010*b* are configured to provide user inputs to device 500 while device 500 is displaying game user interface 1 1004. Thus, the input mechanisms of input device 1006 control one or more functions associated with the active game being played on device 500. In FIG. 10B, input device 1006 displays button function indicator 1012-1 and button function indicator 1012-2. In some embodiments, button function indicators 1012-1 and 1012-2 are graphical and/or textual indications that indicate the operation and/or function that is performed when the respective button of function buttons 1010*b* are selected. For example, in FIG. 10B, button function indicator 1012-1 indicates that selecting the bottom button of function buttons 1010*b* causes the user's character to run in game user interface 1 1004, and button function indicator 1012-2 indicates that selecting the top button of function buttons 1010*b* causes the user's character to jump in game user interface 1 1004. Thus, in some embodiments, the display generation component of input device 1006 is able to display one or more tutorial information associated with the application that is displayed on device 500.

Additionally or alternatively, input device 1006 displays one or more status information associated with the active application that is displayed on device 500. For example, in FIG. 10C, while device 500 is running a respective game and displaying game user interface 1 1004, input device 1006 optionally displays health warning 1016 indicating that the user's character's health is low. For example, game user interface 1004 (e.g., the primary gameplay user interface) includes health and mana bars 1013 and indicates that the game character's health in the game was low and in response to the game character's health being low, input device 1006 optionally displays health warning 1016. Thus, in some embodiments, the display generation component of input device 1006 is able to display status information associated with the user interface displayed by device 500. In some embodiments, input device 1006 displays a combination of tutorial information described above and status information described herein.

Figure 10C:
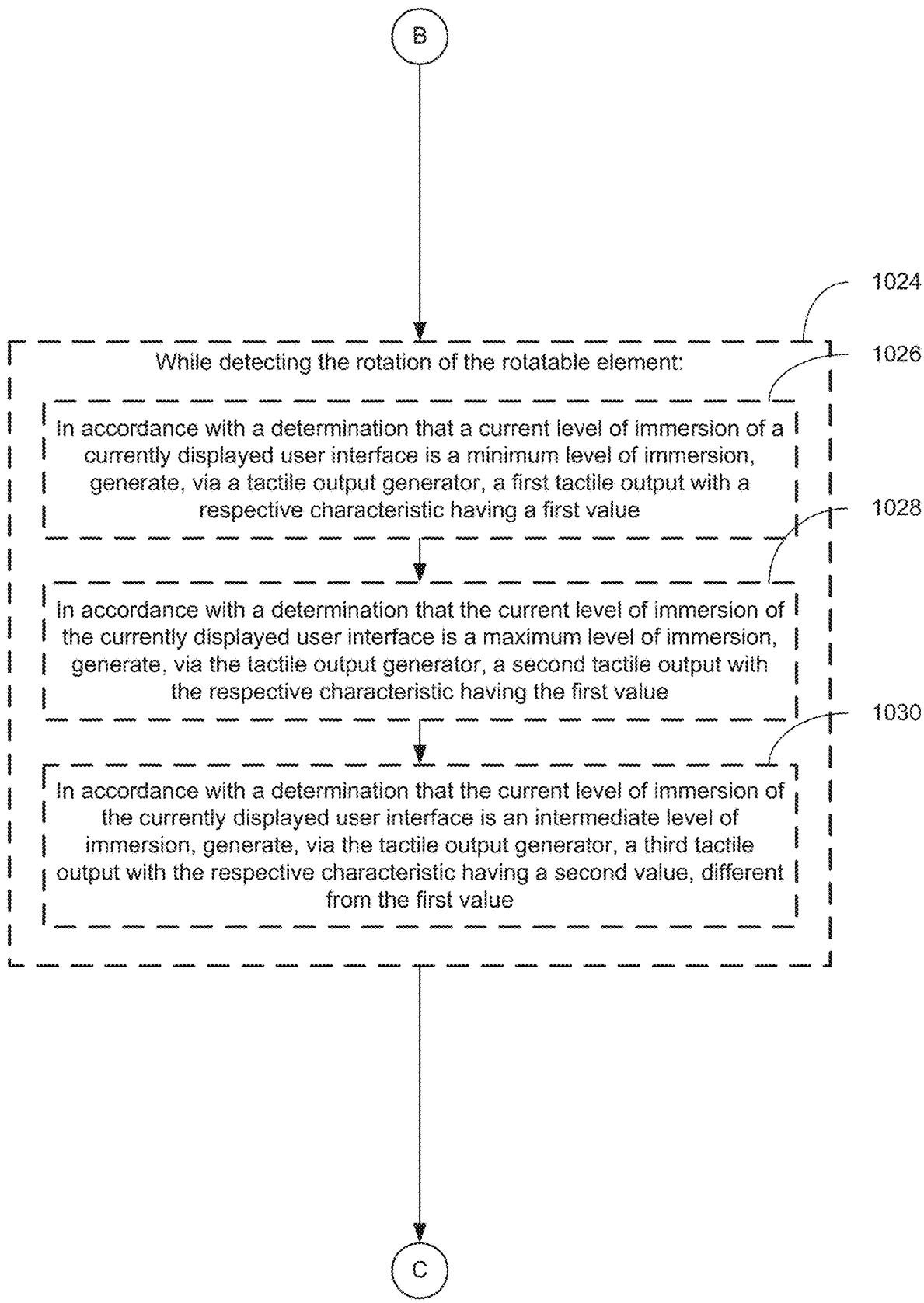
Figure 10D:
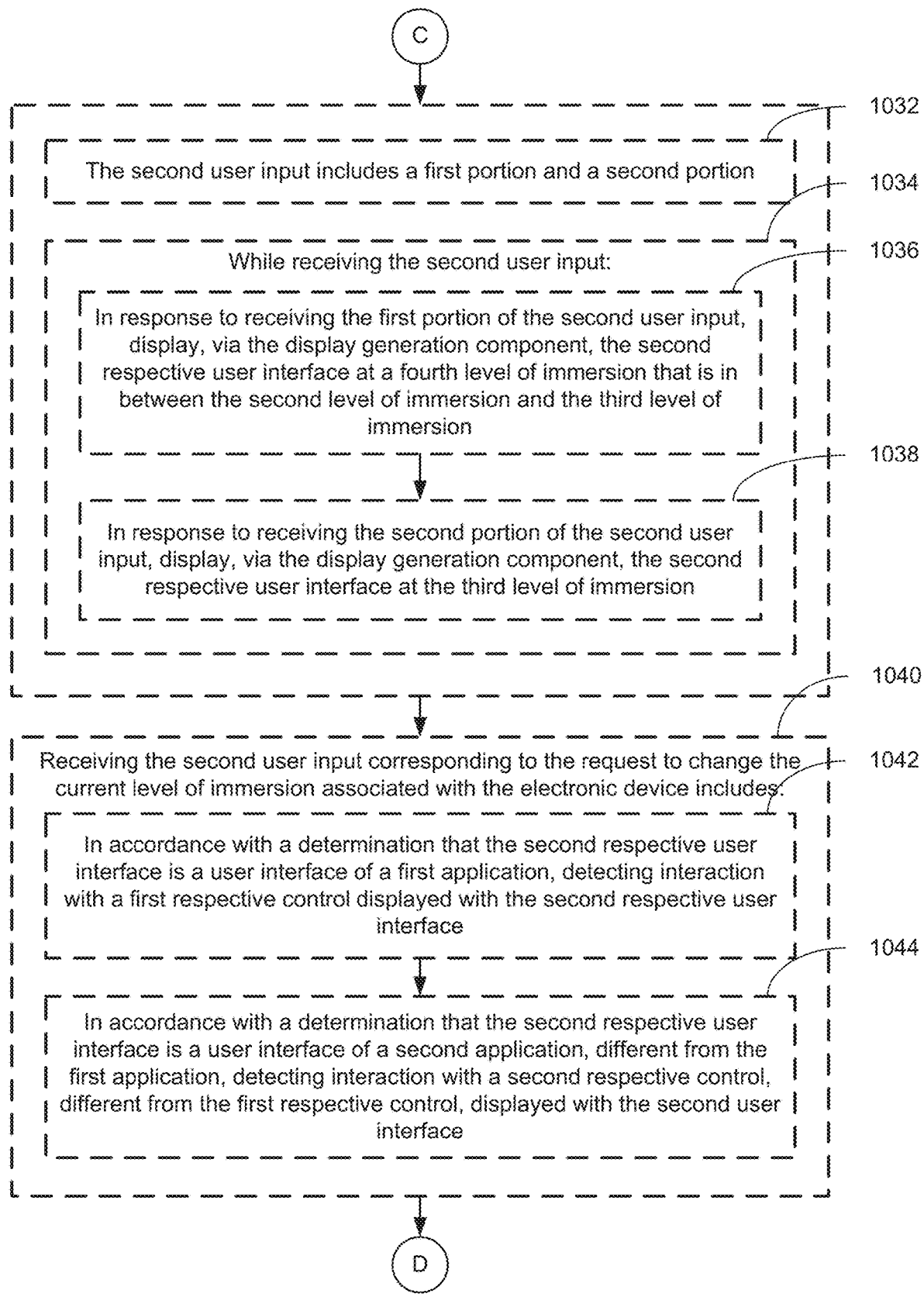

FIG. 10D illustrates an embodiment in which input device 1006 displays one or more representations of friends of the user of device 500. In FIG. 10D, input device 1006 displays (e.g., while device 500 is displaying game user interface 1 1004) social element 1014 that includes representation 1016-1 of a first user, representation 1016-2 of a second user, and representation 1016-3 of a third user. In some embodiments, representation 1016-1 includes online indicator 1018-1 that indicates the online status of the first user. For example, online indicator 1018-1 optionally indicates that the first user is online and available, online indicator 1018-2 indicates that the second user is online and available, and online indicator 1018-3 indicates that the third user is online but unavailable. In some embodiments, the online indicators are able to indicate that a user is online and available, online and unavailable, online and playing a game, idle, not online, etc. In some embodiments, the representations are selectable to perform a social operation associated with the user, such as to initiate a social interaction with the user, as will be described in more detail below.

Figure 10E:
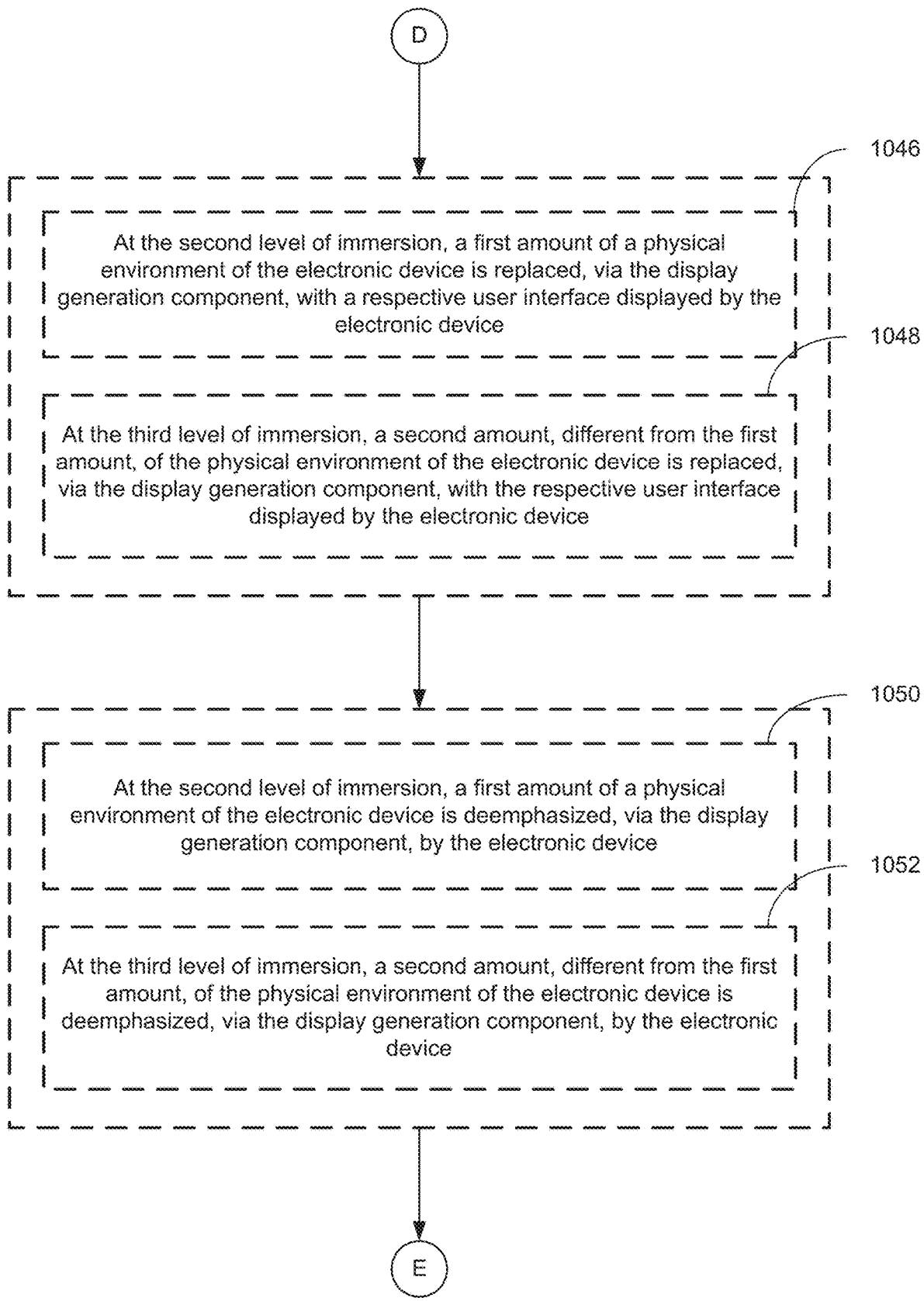
Figure 10F:
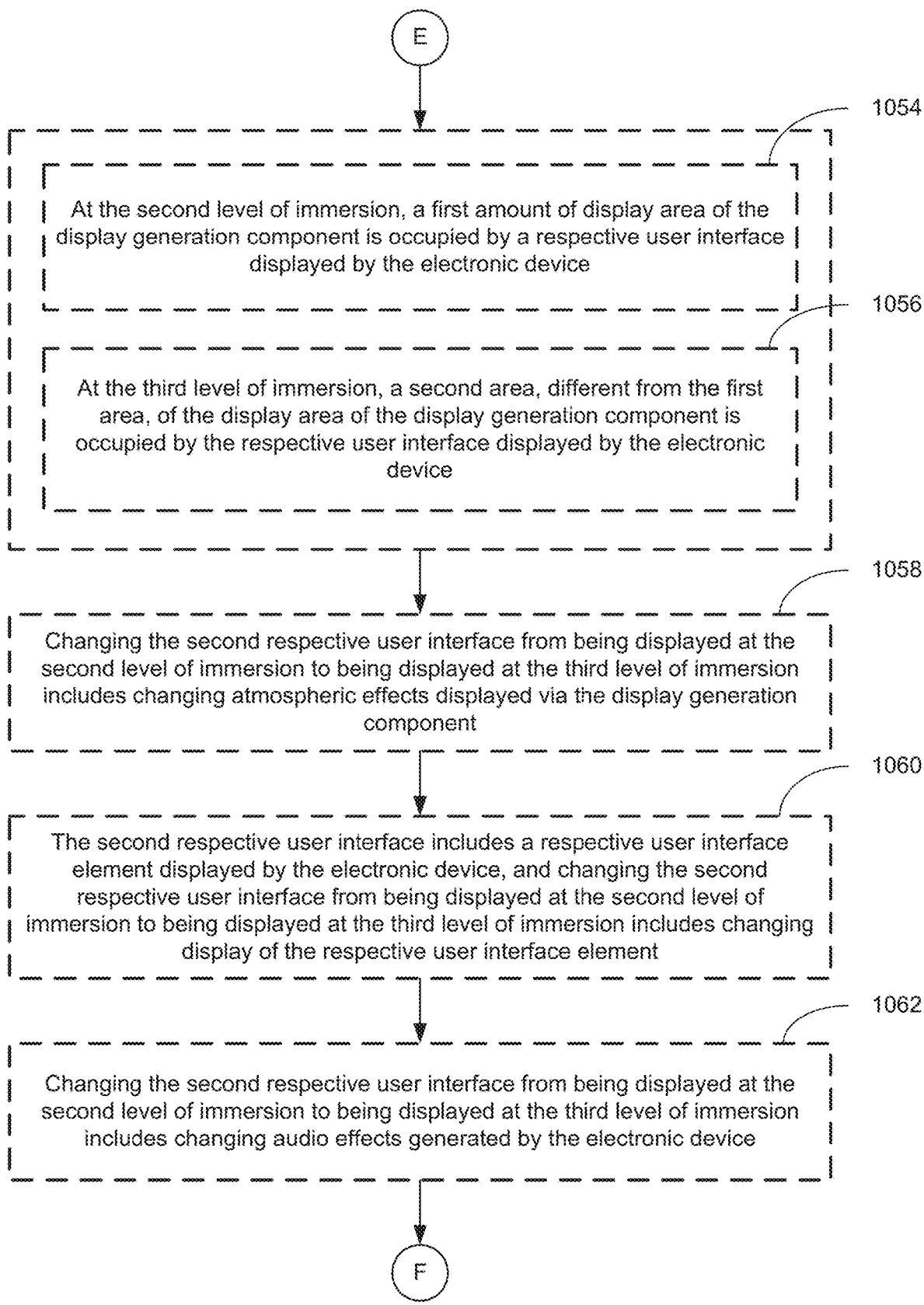

In FIG. 10E, a user input is received from a hand of the user selecting representation 1016-2 of the second user (e.g., a tap input on a location associated with representation 1016-2). In some embodiments, the user input is received via the touch screen device of input device 1006. In some embodiments, the user input is received via the input mechanisms, for example, moving a focus indicator to representation 1016-2 (e.g., via the d-pad) and receiving a button press input on a function button associated with a selection operation. In some embodiments, in response to receiving the user input, input device 1006 transmits the user input to device 500. In some embodiments, in response to receiving the user input, device 500 causes input device 1006 to display messaging user interface 1020, as shown in FIG. 10F (e.g., while device 500 continues to display game user interface 1 1004). In some embodiments, messaging user interface 1020 includes one or more messages sent to and received from user 2, such as message 1022-1 sent to user 2 and message 1022-2 received from user 2. In some embodiments, messaging user interface 1020 includes text entry field 1024 for sending a message to user 2. In some embodiments, messaging user interface 1020 is a user interface of a messaging application that is not associated with the game application that is displayed on device 500 (e.g., a text messaging application, an online messaging application, etc.). In some embodiments, messaging user interface 1020 is a messaging user interface of the game application that is displayed on device 500 (e.g., an integrated chat service or feature provided by the game application for chatting with other players that are playing the game).

Figure 10G:
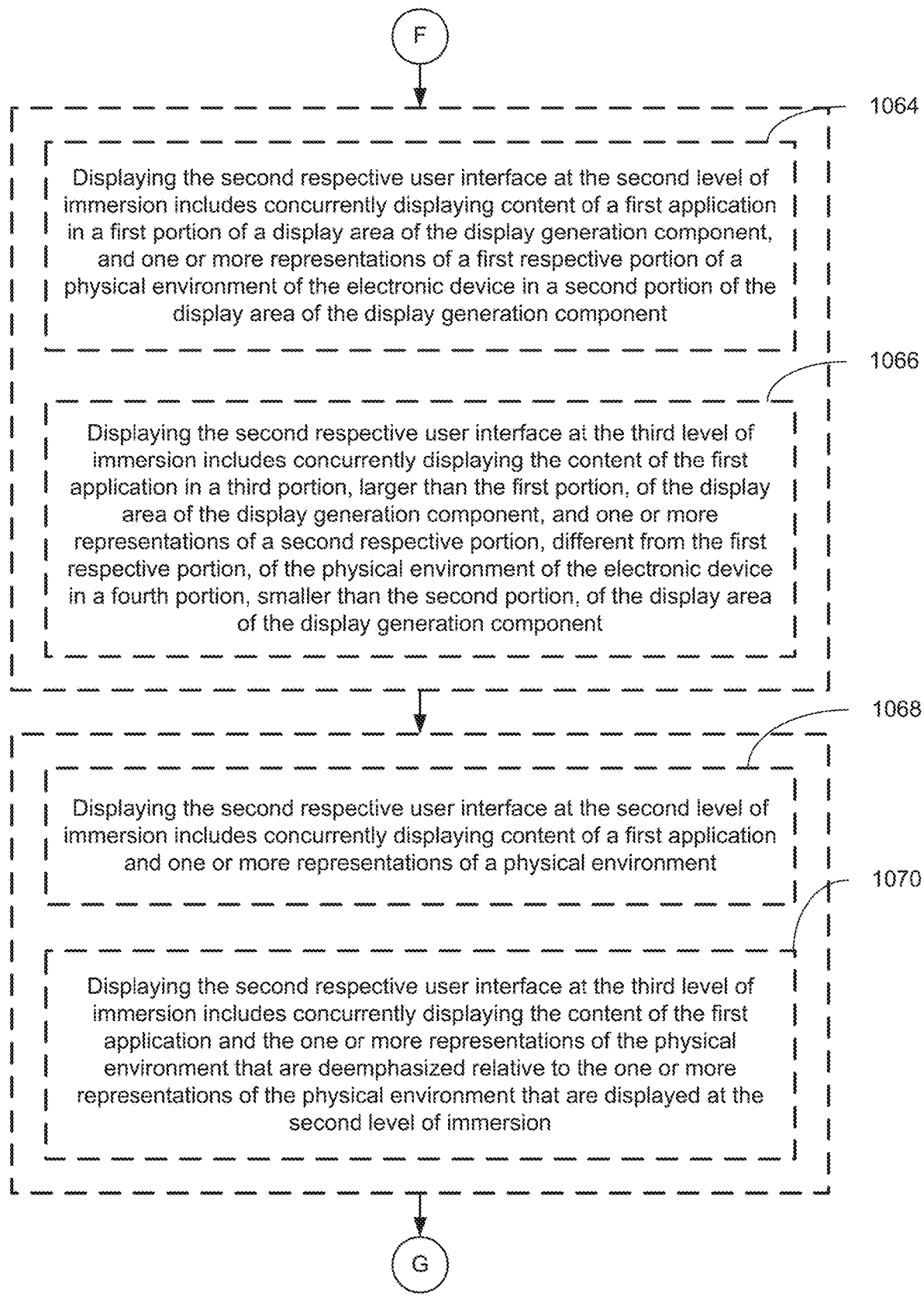

In FIG. 10F, a user input is received selecting text entry field 1024. In some embodiments, in response to receiving the user input selecting text entry field 1024, input device 1006 updates (e.g., device 500 causes input device 1006 to update) user interface 1020 to include soft keyboard 1026, as shown in FIG. 10G (e.g., while device 500 continues to display game user interface 1 1004). In FIG. 10G, the one or more messages cease to be displayed and soft keyboard 1026 is displayed below text entry field 1024. In some embodiments, soft keyboard 1026 is a representation of a keyboard that includes representations of keys that are selectable to insert characters into text entry field 1024. In some embodiments, after entering characters into text entry field 1024, the message can be sent to the recipient in response to input received at input device 1006 (e.g., the touch screen of input device 006) and soft keyboard 1026 ceases to be displayed and user interface 1020 displays the messages of the conversation, similar to shown in FIG. 10F.

Figure 10H:
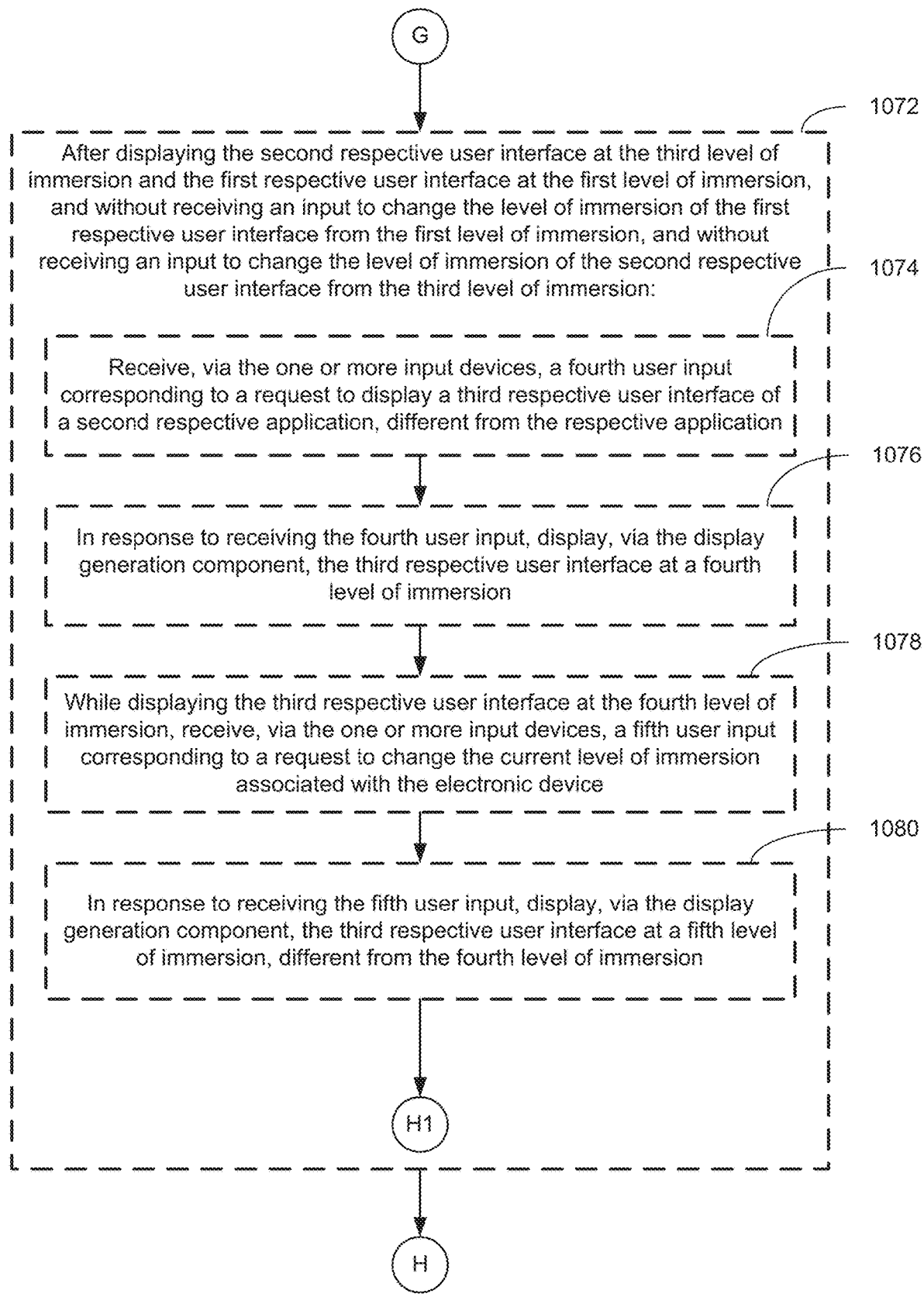

FIG. 10H illustrates an alternative embodiment in which the messaging user interface is displayed (e.g., in response to receiving a user input selecting a representation 1016-2 of the second user such as in FIG. 10E) on both the display generation component of device 500 and the display generation component of input device 1006. For example, in response to receiving the user input in FIG. 10E selecting representation 1016-2 of the second user, device 500 displays first messaging user interface 1028 and input device 1006 displays second messaging user interface 1030, as shown in FIG. 10H. In some embodiments, the active application that was displayed on device 500 before receiving the user input is paused and no longer displayed (e.g., the game session is paused).

As shown in FIG. 10H, first messaging user interface 1028 includes one or more messages sent to and received from user 2, such as message 1022-1 and message 1022-3 sent to user 2 and message 1022-2 received from user 2. In some embodiments, second messaging user interface 1030 includes message 1022-4 received from user 2 and text entry field 1024. Thus, in some embodiments, the user interface elements of the messaging application spans across the display generation components of device 500 and input device 1006 (e.g., representations of some of the messages of the conversation with user 2 are displayed in user interface 1028, and representations of others of the messages of the conversation with user 2 are displayed in user interface 1020). In some embodiments, text entry region 1024 is selectable to display a soft keyboard, optionally via the display generation component of input device 1006, similar to FIG. 10G.

In some embodiments, a user is able to dismiss the messaging application, such as via the selection of an exit affordance displayed in user interface 1028. In some embodiments, in response to dismissing user interface 1028 and/or user interface 1030 of the messaging application, device 500 resumes display of game user interface 1004 via its display generation component, and optionally resumes the game session that was previously in session.

Figure 10I:
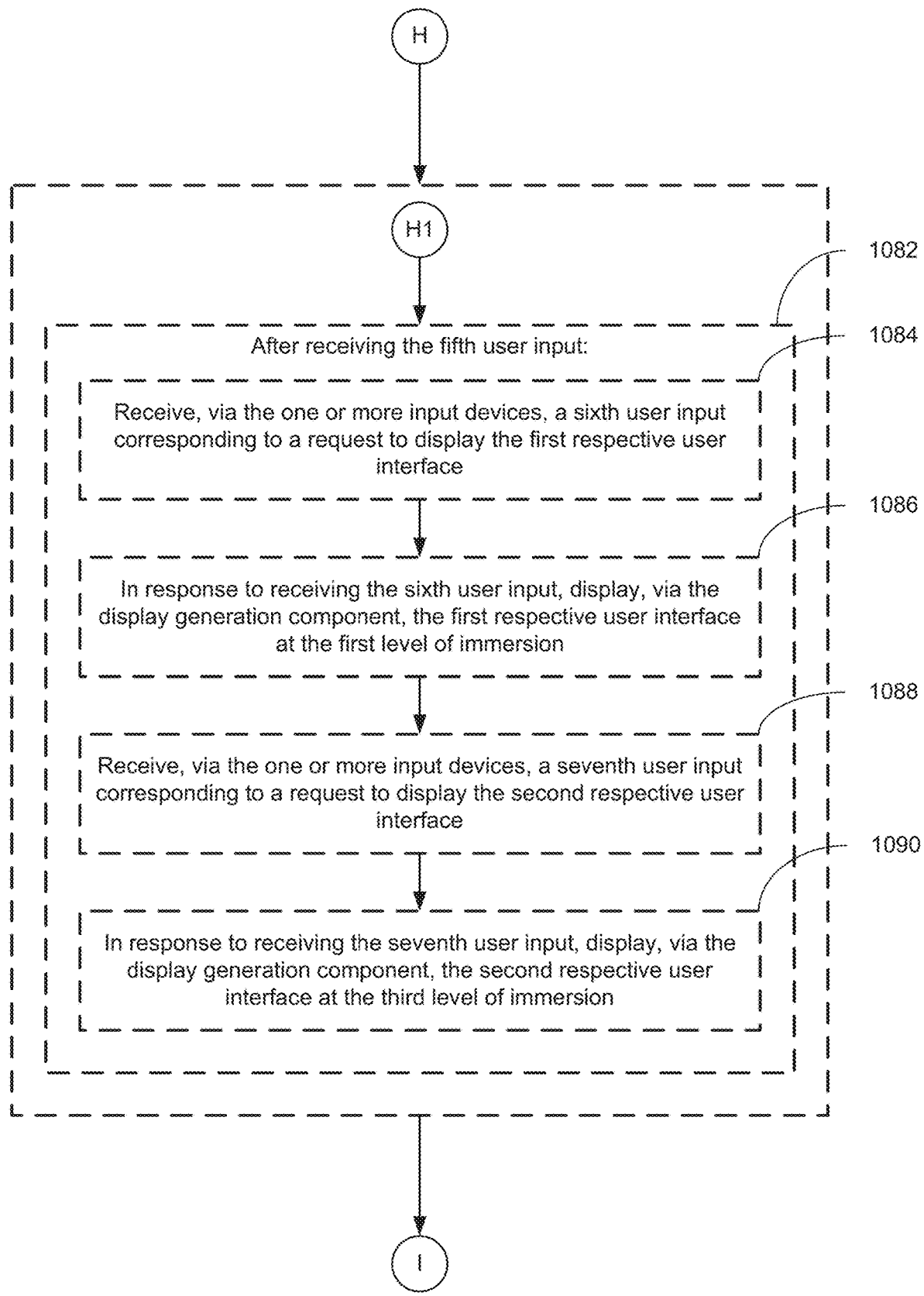

FIG. 10I illustrates an alternative embodiment in which the messaging user interface is displayed (e.g., in response to receiving a user input selecting a representation 1016-2 of the second user such as in FIG. 10E) across the display generation component of device 500 and the display generation component of input device 1006 such that the one or more messages are displayed in user interface 1028 and the text entry region 1024 and soft keyboard 1026 are displayed in user interface 1030 (e.g., messages are not displayed in user interface 1030). Thus, the interactive elements of the messaging application are displayed by the display generation component of input device 1006, while the messages content is displayed by the display generation component of device 500.

Figure 10J:
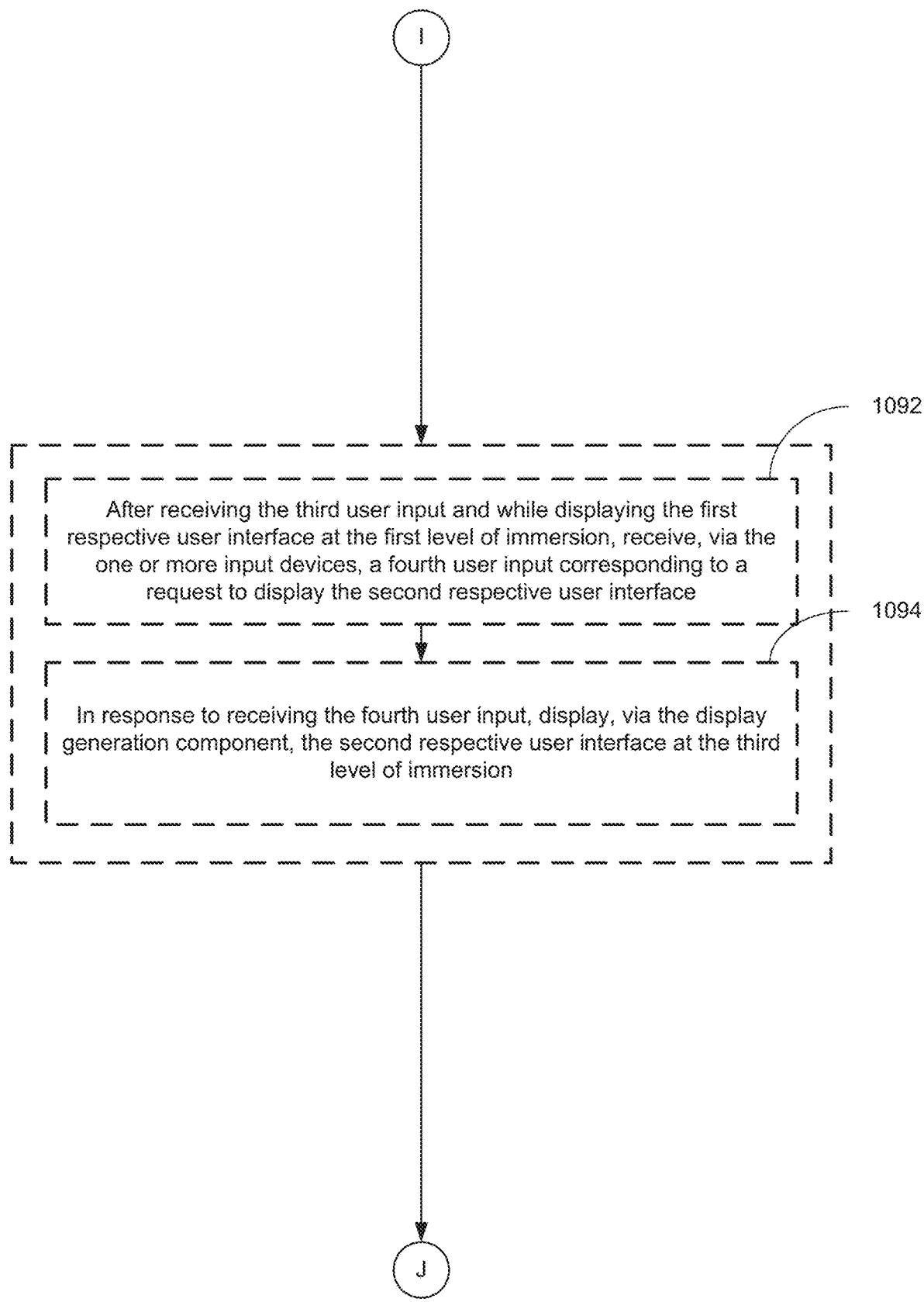
Figure 10K:
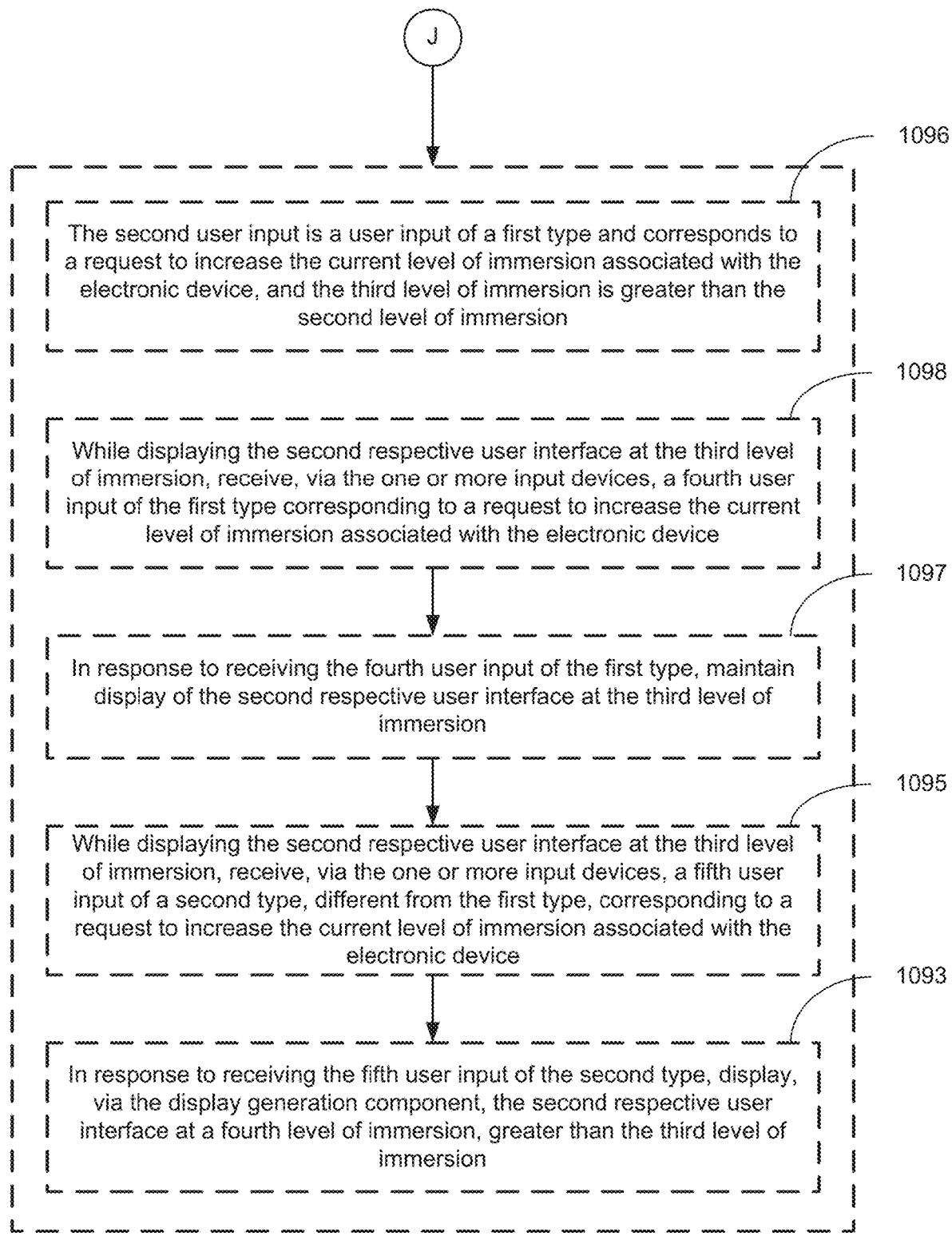

FIGS. 10J-10K illustrate an embodiment in which input device 1006 displays a video chat user interface. In FIG. 10J, while device 500 is displaying game user interface 1 1004 (or any other user interface), input device 1006 displays video chat user interface 1006. In some embodiments, video chat user interface 1006 is displayed in response to a user input selecting are presentation of a user, such as in FIG. 10E. In some embodiments, video chat user interface 1006 is a user interface of the game application that is running on device 500 for chatting with other players that are playing the respective game. In some embodiments, video chat user interface 1006 is a user interface of a video chat application (e.g., a videotelephony application). In some embodiments, video chat user interface 1006 displays a representation 1034 of the person with which the user is video-chatting (e.g., a player with which the user is playing with or against in user interface 1 1004, a friend of the user, etc.). In some embodiments, video chat user includes a representation of the user of device 500. In some embodiments, representation 1034 is a live video feed of the person with which the user is video-chatting and is captured via one or more cameras of the device of the person with which the user is video-chatting. In some embodiments, representation 1034 is an animated avatar that moves and has facial expressions based on the movements and facial expressions of the person with which the user is video-chatting. For example, in FIG. 10K, the facial expression of representation 1034 has changed (e.g., from a smile face to a frown face) based on a determination that the person with which the user is video-chatting has changed facial expressions from a smile to a frown.

FIG. 10L illustrates an embodiment in which input device 1006 displays notifications. In FIG. 10L, in response to detecting a notification event, device 500 causes input device 1006 to display notification 1038 (e.g., while device 500 is displaying game user interface 1 1004). In some embodiments, notification 1038 indicates that a friend of the user (e.g., user 2) has begun playing a game (e.g., Game 1). In some embodiments, notification 1038 includes a representation 1040 of user 2 (e.g., the icon or profile picture of the user) including an indication of the online status of user 2. In some embodiments, if notification 1038 is associated with a friend playing a game such that the friend is available for a multiplayer gaming session, then notification 1038 includes a selectable option 1042 that is selectable to initiate a multiplayer gaming session with User 2.

For example, in FIG. 10L, a user input is received by a hand of the user selecting selectable option 1042. In some embodiments, in response to receiving the user input, device 500 initiates a multiplayer game session with user 2 and optionally launches and displays a user interface 1044 of Game 1 (e.g., the game to be played in the multiplayer session), as shown in FIG. 10M. In some embodiments, user interface 1044 is a user interface of Game 1 and includes a representation 1046 of user 2 and a representation 1048 of the user of the device 500 within the game. In some embodiments, representation 1048 of the user of the device 500 is the user's avatar and/or the character in the game that is being controlled by the user, and representation 1046 of user 2 is the avatar of user 2 and/or the character in the game that is being controlled by user 2. In some embodiments, because the user is playing a multiplayer game (e.g., because device 500 is running a social process), input device 1006 includes one or more selectable options for sending one or more reactions and/or graphical messages to user 2. For example, input device 1006 includes menu 1050. In some embodiments, menu 1050 includes selectable option 1052-1 associated with a first reaction and/or graphical message, selectable option 1052-2 associated with a second reaction and/or graphical message, and selectable option 1052-3 associated with a third reaction and/or graphical message. In some embodiments, more or fewer selectable options are possible. In some embodiments, the selectable options are selectable to transmit the graphical message to the other players in the multiplayer game session.

For example, in FIG. 10N, a user input is received by hand 1054 selecting selectable option 1052-2 associated with a second graphical message (e.g., exclamation mark graphics). In some embodiments, in response to receiving the user input, device 500 transmits the second graphical message to user 2, and displays the second graphical message 1056 at a location in user interface 1044 associated with representation 1048 (e.g., the representation/character controlled by the user of device 500), as shown in FIG. 10O. For example, in FIG. 10O, second graphical message 1056 is displayed at or near the head of representation 1048, indicating that the user of the device has sent second graphical message 1056.

In some embodiments, if user 2 transmitted a graphical message, user interface 1044 includes a graphical message at or near representation 1046 of user 2.

FIGS. 10P-10S illustrate an embodiment in which the screen of the device is recorded and shared. In FIG. 10P, input device 1006 includes social element 1014 (e.g., as was discussed above with respect to FIG. 10D) and record button 1058. In FIG. 10P, a user input 1060p (e.g., a tap input) is received selecting record button 1058. In some embodiments, in response to receiving user input 1060p, device 500 begins recording user interface 1004, as shown in FIG. 10Q. In some embodiments, input device 1006 displays a recording timer 1062 indicating the amount of video that has been recorded. In some embodiments, device 500 records a video of the content that is displayed on the display generation component of device 500, including, for example, the gameplay of game user interface 1 1004.

In FIG. 10Q, a user input 1060q (e.g., a tap input) is received selecting record button 1058. In some embodiments, in response to receiving user input 1060q, device 500 ends the recording and saves the recording to device 500, as shown in FIG. 10R. In some embodiments, input device 1006 displays an indication 1064 that the recording has completed and has been saved. In some embodiments, indication 1064 is interactable, such as to move indication 1064 to a representation of a contact to share the recording with the respective contact. For example, in FIG. 10R, a user input is received by hand 1054 contacting indication 1064. In some embodiments, while maintaining contact with input device 1006 (e.g., the touch screen of input device 1006), input device 1006 detects that hand 1054 has moved and dragged indication 1064 to the location of representation 1016-1 associated with user 1, as shown in FIG. 10S. In some embodiments, in response to detecting that indication 1064 has been dragged to representation 1016-1 (e.g., optionally after detecting a termination of the contact by hand 1054 with the touch screen, such as a liftoff of the contact), device 500 shares the recording with user 1. In some embodiments, the recording is shared with user 1 via a messaging application.

Figure 11A:
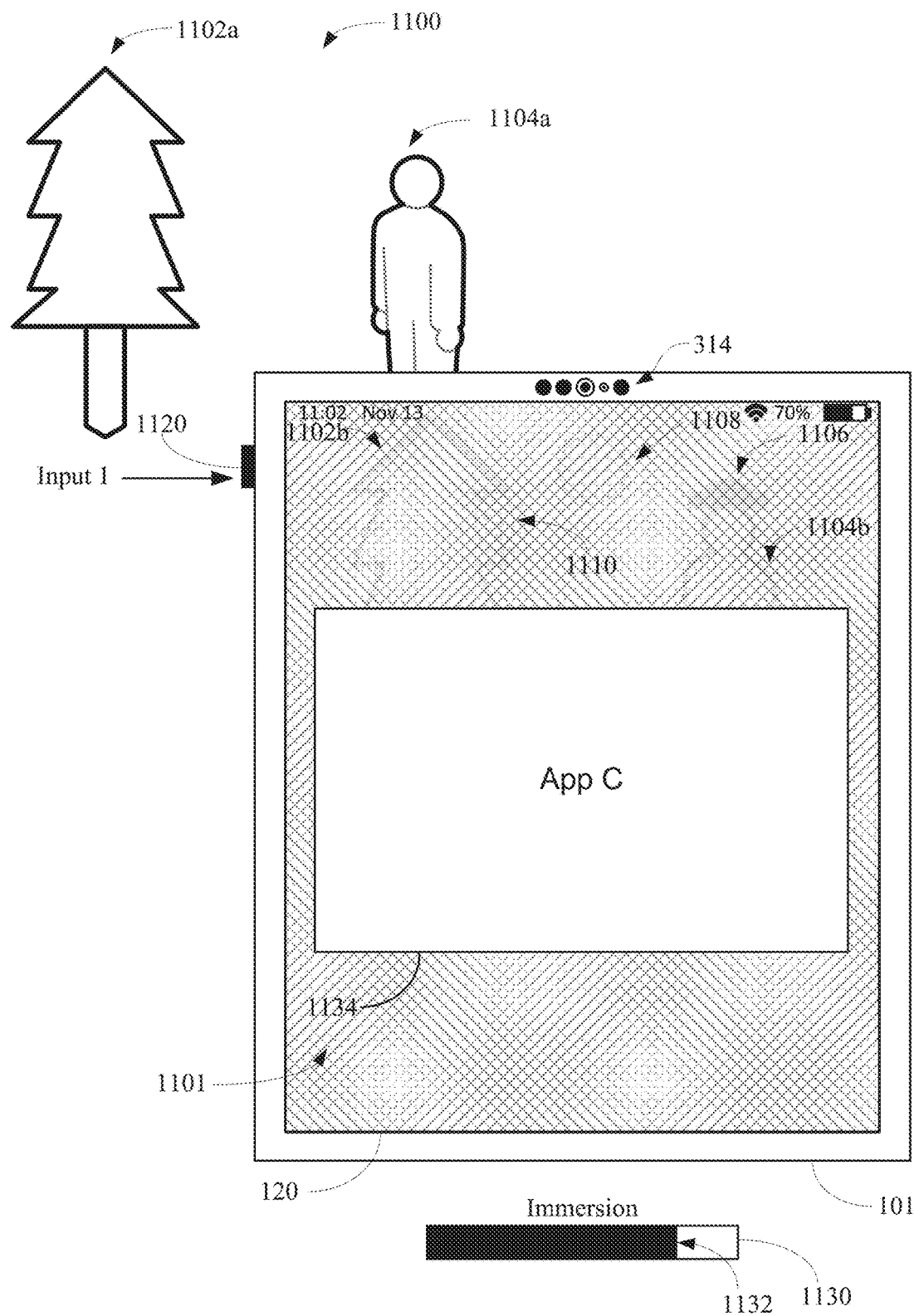
FIG. 11 is a flow diagram illustrating a method of displaying a user interface via a display generation component of an input device in accordance with some embodiments of the disclosure.
Figure 11B:
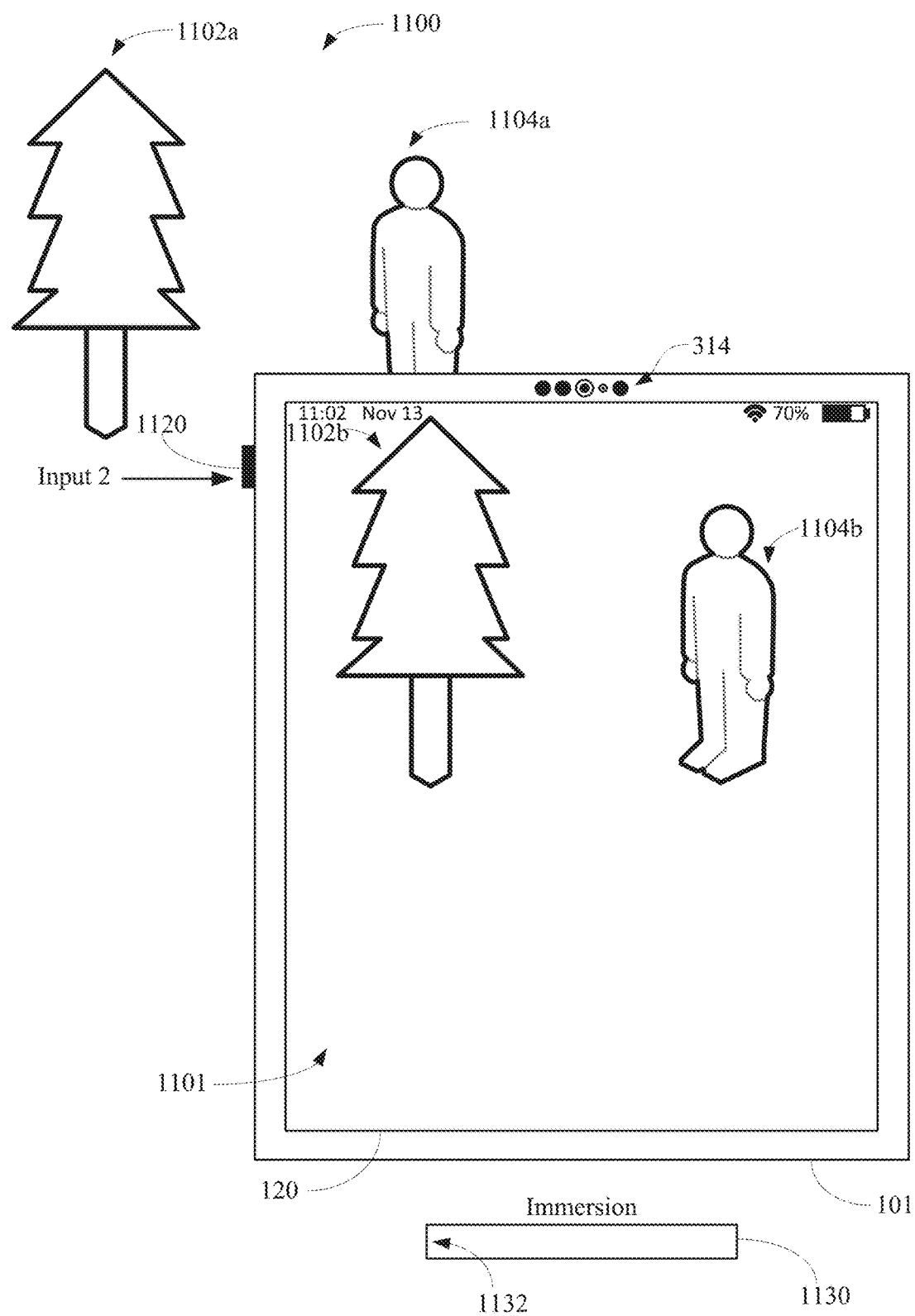

FIG. 11 is a flow diagram illustrating a method 1100 of displaying a user interface via a display generation component of an input device in accordance with some embodiments of the disclosure. The method 1100 is optionally performed at an electronic device such as device 100, device 300, device 500, and device 580 as described above with reference to FIGS. 1A-1B, 2-3, 4A-4B and 5A-5I. Some operations in method 1100 are, optionally combined and/or the order of some operations is, optionally, changed.

As described below, the method 1100 is directed to displaying a user interface via a display generation component of an input device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., an electronic device 500, device 580, a mobile device (e.g., a tablet, a smartphone, a media player, or a wearable device), a set-top box, or a computer) in communication with a first respective display generation component (e.g., a display integrated with the electronic device (optionally a touch screen display), external display such as a monitor, projector, television, or a hardware component (optionally integrated or external) for projecting a user interface or causing a user interface to be visible to one or more users, etc.) and a first input device, separate from the respective electronic device, wherein the first input device includes a second respective display generation component, separate from the first respective display generation component, while displaying, via the first respective display generation component, a first user interface associated with a first application (e.g., a main, gameplay user interface of a game application), wherein a first user (e.g., a user of the respective electronic device) is (e.g., currently) interacting with the first user interface via (e.g., the first application on) a first electronic device (e.g., the respective electronic device, or another electronic device) (e.g., and a second user is (e.g., currently) interacting with the first user interface via (e.g., the first application on) a second electronic device) (e.g., different from the first electronic device), displays (1102), via the second respective display generation component, a second user interface (e.g., different from the first user interface) associated with the first application, wherein the second user interface includes one or more selectable options that are selectable to initiate a process to interact with one or more users, such as input device 1006 displaying social element 1014 that includes representations of users that are selectable to initiate a social interaction with the respective user in FIG. 10D (e.g., that are interacting with the first user interface).

In some embodiments, the respective electronic device is a multifunction device that is able to run one or more applications and display user interfaces associated with those applications. In some embodiments, the respective electronic device is a controller device that provides inputs to a multifunction device that is able to run one or more applications and display user interfaces associated with those applications.

In some embodiments, the first input device is a device separate from the electronic device and is capable of receiving one or more user inputs via one or more input mechanisms and provide user inputs to the electronic device (e.g., via a wired or wireless communication channel). In some embodiments, the first input device includes a display generation component (e.g., a touch screen display, a projector, or any other hardware component capable of causing a user interface to be visible to one or more users, etc. In some embodiments, the first input device is a device that is capable of being attached to the respective electronic device (e.g., a case that includes a remote control for providing input to the respective electronic device), or is a dedicated remote control device (optionally with an integrated touch screen display) that provides input to the respective electronic device for interacting with the first user interface, such as described with reference to methods 700 and 900.

In some embodiments, the first and second users are optionally playing a multiplayer game from different devices, but both players have the same or corresponding applications installed on their respective devices to be able to play the multiplayer game with each other. In some embodiments, the first and second users are not playing the same game. In some embodiments, the first user is playing a game and the second user is not playing a game (e.g., the second user is interacting with a user interface other than the first user interface).

In some embodiments, the second user interface includes information and/or controls for the users that are currently playing the multiplayer game to interact with one another; for example, to send messages to each other or otherwise communicate with each other. In some embodiments, the second user interface is not necessarily a user interface associated with the first application, but optionally is a user interface associated with an application other than the first application, such as a messaging application or any other application for communicating with other people whether or not those people are playing the multiplayer game.

In some embodiments, while displaying the first user interface via the first respective display generation component and the second user interface via the second respective display generation component, the electronic device detects (1104), via the first input device, an input selecting a respective selectable option of the one or more selectable options that is selectable to initiate a process to interact with a second user, such as the selection of representation 1016-2 associated with the second user in FIG. 10E (e.g., detecting that the first user who is interacting with the first user interface via the first electronic device has selected an option displayed via the second respective display generation component to send a message to the second user (e.g., who is interacting with the first user interface via the second electronic device)).

In some embodiments, in response to detecting the input selecting the respective selectable option, the electronic device initiates (1106) the process to interact with the second user while maintaining display, via the first respective display generation component, of the first user interface associated with the first application, such as displaying messaging user interface 1020 on user interface 1006 while maintaining display of game user interface 1 1004 on device 500 in FIG. 10F (e.g., while gameplay continues via the first respective display generation component).

In some embodiments, in response to detecting selection of the respective selectable option, the respective electronic device optionally transmits a message corresponding to the selected option to the second electronic device associated with the second user (e.g., without the need for further user input other than the selection of the respective selectable option), for example in a situation in which the respective selectable option is pre-associated with a message (e.g., "Hello"). In some embodiments, in response to detecting selection of the respective selectable option, the respective electronic device displays, via the second respective display generation component, a user interface (e.g., a messaging user interface) from which the message to be sent to the second user is able to be composed and sent, for example in a situation in which the respective selectable option is no pre-associated with a message, but rather is a selectable option to display the messaging user interface. In some embodiments, interacting with the second user includes transmitting short reaction messages to the second user (e.g., a "like" indication, a "dislike" indication, etc.) which are optionally associated with or correspond to one or more actions of the second user in the multiplayer game.

The above-described manner of displaying an interaction user interface via a second display generation component provides a quick and efficient manner of interacting with users that are concurrently interacting with the first user interface (e.g., playing a multiplayer game together), which simplifies the interaction between the user and the electronic device and enhances the operability of the electronic device and makes the user-device interface more efficient (e.g., without requiring separate input to, or disrupting the display of, the first user interface), which additionally reduces power usage and improves battery life of the electronic device by enabling the user to use the electronic device more quickly and efficiency, while reducing errors in usage.

In some embodiments, the first input device is attached to a mobile device, such as in FIG. 10A (e.g., the first input device, which is a device separate from the electronic device and includes the display generation component, is capable of being physically attached to a mobile device).

In some embodiments, the mobile device is the respective electronic device. In some embodiments, the mobile device is a device other than the respective electronic device, which optionally is in communication with the respective electronic device. In some embodiments, when the first input device is attached to the mobile device, the first input device is configured to provide inputs to the mobile device. In some embodiments, if the first input device is attached to a different mobile device, the first input device is configured to provide inputs to the other mobile device. Thus, the device to which the first input device is attached receives the user inputs that are performed on the first input device. In some embodiments, the first input device communicates with the electronic device via a physical electrical connection or a wireless connection. In some embodiments, when the first input device is attached to the mobile device, the mobile device is capable of providing display information to the first input device for displaying the second user interface on the second display generation component. In some embodiments, in response to attaching the first input device to the mobile device, the mobile device optionally displays a user interface associated with a game mode, such as described above with respect to method 700.

The above-described manner of expanding the display capabilities of a mobile device (e.g., by attaching a second display generation component to the mobile device) provides a quick and efficient manner of concurrently displaying two user interfaces, which simplifies the interaction between the user and the electronic device and enhances the operability of the electronic device and makes the user-device interface more efficient (e.g., without requiring separate input to view the second user interface, or disrupting the display of, the first user interface), which additionally reduces power usage and improves battery life of the electronic device by enabling the user to use the electronic device more quickly and efficiency, while reducing errors in usage.

In some embodiments, the second user interface includes a selectable option that is selectable to initiate a process to share a representation of the first user interface with a third user, such as if input device 1006 displayed an option for sharing a screen in FIG. 10D with a user in social element 1014 (e.g., the second user interface includes a selectable option for sharing a user interface of the device with another device).

In some embodiments, in response to selecting the selectable option, a communication session with another user (e.g., on another device) is created. In some embodiments, in response to selecting the selectable option, the first user interface, the second user interface, or both the first and second user interfaces are shared with the other user (e.g., the screen of the electronic device is shared). In some embodiments, sharing a respective user interface provides the other user the ability to see what the user of the device is seeing, including receiving a live view of the interactions on the respective user interface. In some embodiments, instead of sharing the entirety of a user interface, the user is able to select a portion of the user interface to share, such as a portion associated with a respective application, a respective window, a respective UI element, etc., without sharing other portions of the user interface. In some embodiments, the user interface sharing process is associated with a videotelephony application, a messaging application, or any other communication application).

The above-described manner of sharing a currently displayed user interface with another user and/or device (e.g., by providing a selectable option on the second user interface to initiate a screen sharing process) provides a quick and efficient manner of sharing the user interface (e.g., by providing the user with the ability to initiate screen sharing via the second user interface, without requiring the user to interrupt the display of the first user interface to initiate the screen sharing), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the second user interface includes a selectable option that is selectable to initiate a process to send a message to a third user, such as in FIGS. 10D-10F (e.g., an option that is selectable to initiate a communication session with another user).

In some embodiments, the communication session is a text-based communication process (e.g., SMS, MMS, etc.). In some embodiments, initiating the communication session includes displaying a messaging user interface (e.g., of a messaging application) on the first generation component and/or the second generation component. In some embodiments, the selectable option is selectable to send a graphical message to the other user. In some embodiments, the graphical message is displayed in the first user interface or second user interface, optionally at a location associated with the user. For example, if the first user interface is a multiplayer session which includes a representation of the user, the graphical message can be displayed at or near the representation of the user, indicating that the user is transmitting the graphical message. In some embodiments, if another user transmits a graphical message, the graphical message can be displayed at or near the representation of the other user).

The above-described manner of initiating a process to send a message to another user (e.g., by providing a selectable option on the second user interface) provides a quick and efficient manner of communicating with another user (e.g., by providing the user with the ability to initiate messaging capabilities via the second user interface, without requiring the user to interrupt the display of the first user interface to initiate the screen sharing), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the second user interface includes an avatar of a third user that is animated based on facial expressions of the third user, such as in FIGS. 10J-10K (e.g., while in a communication session with another user, in some embodiments, the other user is represented by an avatar associated with the other user).

In some embodiments, the avatar is a live representation of the other such that the orientation, pose, and/or facial expressions, etc. of the avatar are based on the orientation, pose, and/or facial expressions of the other user. In some embodiments, the communication session is associated with a videotelephony application, a messaging application, etc. In some embodiments, the videotelephony application provides the ability to display and/or view a live video of the third user (e.g., the person with which the user is communicating), the ability to share screens (e.g., share user interfaces), the ability to substitute a live video with an avatar representation of the user, etc.

The above-described manner of communicating with another user (e.g., by displaying an avatar of the other user that is animated based on the expressions of the other user) provides a quick and efficient manner of communicating with another user (e.g., by displaying a graphical representation of the other user on the user interface), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the second user interface includes tutorial information for interacting with the (e.g., first user interface of the) first application, such as in FIG. 10B (e.g., how to use the device that includes the second respective display generation component to provide desired inputs to the first user interface of the first application, how to use the device attached to the device that includes the second respective display generation component to provide desired inputs to the first user interface of the first application).

For example, the second user interface includes a textual description of the different operations that can be performed via the one or more input mechanisms on the first input device. In some embodiments, the second user interface includes one or more graphics that indicates the different operations that can be performed via the one or more input mechanisms of the first input device. In some embodiments, the tutorial information is associated with the first user interface. For example, the second user interface includes information for how to interact with the first user interface. In some embodiments, as the first user interface changes (e.g., as the game progresses), the tutorial information displayed on the second user interface adapts according to the changes in the first user interface.

The above-described manner of displaying tutorial information (e.g., on the second user interface displayed on the second display generation component) provides a quick and efficient manner of displaying such information (e.g., by displaying tutorial information on the second user interface, without requiring additional inputs to interrupt display of the first user interface to cause display of tutorial information), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the second user interface includes status information associated with the first user with respect to the first application, such as in FIG. 10C (e.g., the second user interface includes one or more textual or graphical indications of status information associated with the first user interface).

For example, if the first user interface is a user interface of a game application, the second user interface optionally includes one or more textual or graphical indicators of one or more status information associated with the game application. In some embodiments, the status information is associated with the health of the character in the game application, the inventory of the character in the game application, or any other suitable status indicator. For example, if the game application is a sports game, the second user interface optionally includes a fire graphical animation indicating that the user is currently "on fire".

The above-described manner of displaying status information (e.g., on the second user interface displayed on the second display generation component) provides a quick and efficient manner of displaying such information (e.g., by displaying status information on the second user interface, without requiring additional inputs to interrupt display of the first user interface to cause display of status information), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the second user interface includes one or more representations of other users that are currently available for interaction, such as in FIG. 10D (e.g., the second user interface includes one or more representations of one or more users and indicates the availability status of the one or more users).

For example, the one or more representations include a color coded indicator that indicates whether the respective user is online and available, online and busy, idle, offline, etc. In some embodiments, the one or more representations are not selectable elements. In some embodiments, the one or more representations are selectable to initiate a communication session with the respective user, initiate a multiplayer session with the respective user, or perform any other operation associated with the respective user.

The above-described manner of displaying status information of other users (e.g., on the second user interface displayed on the second display generation component) provides a quick and efficient manner of displaying such information (e.g., by displaying online status information of other users on the second user interface, without requiring additional inputs to interrupt display of the first user interface to cause display of online status information of other users), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, while a respective user is interacting with a respective user interface of a respective application at a second electronic device, different from the respective electronic device, the second user interface includes a selectable option that is selectable to initiate a process for the first user to join the respective user in interacting with the respective user interface, such as in FIG. 10L (e.g., display an indication on the second user interface that includes a selectable option to join another user in a multiplayer gaming session).

In some embodiments, the indication indicates that a contact of the user is playing a game and/or is available for a multiplayer gaming session (e.g., the same game the first user is playing, or a different game than the first user is playing, or even when the first user is not playing any game at the moment). In some embodiments, the indication is displayed on the second user interface while the user is playing the same game as the contact of the user. In some embodiments, the indication is displayed on the second user interface while a user interface of a different game is displayed on the first user interface. In some embodiments, the indication is displayed while the first user interface is displaying a non-game user interface. In some embodiments, selecting the selectable option initiates a multiplayer gaming session with the respective user, including displaying a user interface associated with the respective game application on the first and/or second display generation component.

The above-described manner of initiating a multiplayer gaming session with another player (e.g., by displaying a selectable option on the second user interface to join the other player) provides a quick and efficient manner of joining another player (e.g., by displaying a notification on the second user interface that a contact of the user is available for multiplayer, without requiring additional inputs to interrupt display of the first user interface to cause display of such notification), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the second user interface includes a selectable option that is selectable to initiate a process to record the first user interface over time, and share the recording of the first user interface with a third user, such as in FIG. 10P (e.g., a selectable option that is selectable to record the first user interface and/or the second user interface).

In some embodiments, in response to initiating the recording, the selectable option is optionally selectable to end the recording. In some embodiments, while recording is in session, the second user interface displays a time indication that indicates the duration of the recording. In some embodiments, after terminating the recording, the second user interface displays a representation of the recording (e.g., an icon indicating that the recording has been successfully saved, or an icon representative of the recording) that is selectable to drag the representation to a representation of another user to initiate a process to share the recording (e.g., the video) with the other user. In some embodiments, the representation of one or more users is displayed in the second user interface.

The above-described manner of recording the screen and sharing the record with another user (e.g., by displaying a selectable option to record a user interface and an option to share the recording with another user) provides a quick and efficient manner of sharing a recording (e.g., by displaying selectable options on the second user interface, without requiring additional inputs to interrupt display of the first user interface to access such options), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the process to interact with the second user is a process to communicate with the second user in a messaging conversation, such as in FIG. 10F. In some embodiments, in response to detecting the input selecting the respective selectable option, the electronic device pauses the first user interface, such as described in FIG. 10F and FIG. 10H (e.g., automatically, without additional user input, pausing the session with the first user interface in response to initiating the communication session with the second user).

For example, if the first user interface is user interface of a game application, in response to the user selecting a representation of a user on the second user interface and initiating a conversation with the second user, the game session displayed in the first user interface is automatically paused. In some embodiments, when the communication session in the second user interface is terminated (e.g., closed), the game session in the first user interface is resumed. In some embodiments, the game session in the first user interface is resumed in response to receiving a user input selecting the first user interface, or otherwise moving a focus back to the first user interface.

The above-described manner of initiating a process to communicate with another user (e.g., by automatically pausing the user's session with the first user interface) provides a quick and efficient manner of communicating with another user (e.g., without requiring the user to perform additional inputs to pause the user's interaction with the first user interface), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, in response to detecting the input selecting the respective selectable option, the electronic device displays, via the second respective display generation component, at least a portion of the messaging conversation without displaying the messaging conversation via the first respective display generation component, such as in FIGS. 10F-10G (e.g., displaying user interface elements associated with the messaging conversation via the second respective display generation components, without displaying any elements associated with the messaging conversation via the first respective display generation component). For example, the messaging user interface is only displayed on one of the display generation components, while the other display generation component optionally is not affected and continues displaying the user interface that it was displaying before the messaging user interface was displayed.

The above-described manner of displaying a messaging user interface (e.g., via the second display generation component, but not the first display generation component) provides a quick and efficient manner of displaying multiple user interfaces (e.g., by maintaining display of the first user interface on the first display generation component while simultaneously displaying the messaging user interface on the second display generation component, without requiring the user to interrupt the user's interaction with the first user interface), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, in response to detecting the input selecting the respective selectable option, the electronic device displays, via the first respective display generation component, at least a portion of the messaging conversation, such as in FIG. 10H and FIG. 10I (e.g., displaying a part of the messaging user interface via the first display generation component).

In some embodiments, the part of the messaging user interface that is displayed is based on the orientation between the first display generation component and the second display generation component. For example, if the first display generation component is above the second display generation component, the part of the messaging user interface that is displayed via the first display generation component is the top part of the messaging user interface. In some embodiments, if the first display generation component is to the left of the second display generation component, the part of the messaging user interface that is displayed via the first display generation component is the left part of the messaging user interface (e.g., the messages sent by the other user).

In some embodiments, the electronic device displays, via the second respective display generation component, at least a portion of the messaging conversation, such as in FIG. 10H and FIG. 10I (e.g., displaying a part of the messaging user interface via the second display generation component). In some embodiments, the part of the messaging user interface that is displayed is based on the orientation between the first display generation component and the second display generation component. For example, if the first display generation component is above the second display generation component, the part of the messaging user interface that is displayed via the second display generation component is the bottom part of the messaging user interface. In some embodiments, if the first display generation component is to the left of the second display generation component, the part of the messaging user interface that is displayed via the first display generation component is the right part of the messaging user interface (e.g., the messages sent by the user). In some embodiments, the part of the messaging user interface that is displayed via the second display generation component includes the text entry field, the soft keyboard, and/or one or more of the most recently messages.

The above-described manner of displaying a messaging user interface (e.g., via both the first and second display generation component) provides a quick and efficient manner of displaying the messaging user interface (e.g., by expanding the messaging user interface across the available display area), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, in response to detecting the input selecting the respective selectable option, the electronic device displays, via the first respective display generation component, at least a portion of the messaging conversation, such as in FIG. 10H and FIG. 10I (e.g., displaying the messages portion of the messaging user interface via the first display generation component). In some embodiments, the messages portion of the messaging user interface includes the messages sent to and received from the other user.

In some embodiments, the electronic device displays, via the second respective display generation component, a user interface for providing input to messaging conversation, such as in FIG. 10I (e.g., displaying a text entry field and/or a soft keyboard via the second display generation component). In some embodiments, the keys on the soft keyboard are selected via touch (e.g., if the second display generation component is a touch screen device) or via the input mechanisms of the first input device (e.g., moving a focus indicator to the desired keys and selecting a selection button).

The above-described manner of displaying a messaging user interface (e.g., by displaying the messages on one display generation component and the key entry elements on another display generation component) provides a quick and efficient manner of displaying the messaging user interface (e.g., by separating the two functional portions of the messaging user interface onto different display generation components), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

It should be understood that the particular order in which the operations in FIG. 11 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300 and 1500) are also applicable in an analogous manner to method 1100 described above with respect to FIG. 11. For example, the operation of the electronic device of displaying a user interface via a display generation component of an input device described above with reference to method 1100 optionally has one or more of the characteristics of displaying user interfaces associated with games in response to detecting input devices having been connected to an electronic device, displaying a reduced user interface in response to detecting that a cover has covered a portion of the display, and/or projecting a user interface via a projection device of an input device, etc., described herein with reference to other methods described herein (e.g., methods 700, 900, 1300 and 1500). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIG. 11 are, optionally, implemented by components depicted in FIGS. 1A-1B. For example, displaying operation 1102 and detecting operation 1104 are, optionally, implemented by event sorter 170, event recognizer 180, and event handler 190. Event monitor 171 in event sorter 170 detects a contact on a touch-sensitive surface, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Projecting a User Interface Via an Input Device

Users interact with electronic devices in many different manners, including using remote input devices to provide inputs to electronic devices. In some embodiments, an input device includes a display generation component for projecting content onto a physical surface in the environment (e.g., physical environment) of the input device. The embodiments described below provide ways in which a user interface is projected by the input device concurrently with the display of a user interface via a display generation component of the electronic device. Projecting a user interface via an input device enhances the user's interactions with the electronic device and reduces the amount of time the user needs to perform operations. Reducing operational time decreases the power usage of the device and increases battery life for battery-powered devices.

FIGS. 12A-12K illustrate exemplary ways in which an electronic device projects a user interface in accordance with some embodiments of the disclosure. The embodiments in these figures are used to illustrate the processes described below, including the processes described with reference to FIG. 13. Although FIGS. 12A-12K illustrate various examples of ways an electronic device is able to perform the processes described below with respect to FIG. 13, it should be understood that these examples are not meant to be limiting, and the electronic device is able to perform one or more processes described below with reference to FIG. 13 in ways not expressly described with reference to FIGS. 12A-12K.

Figure 12A:
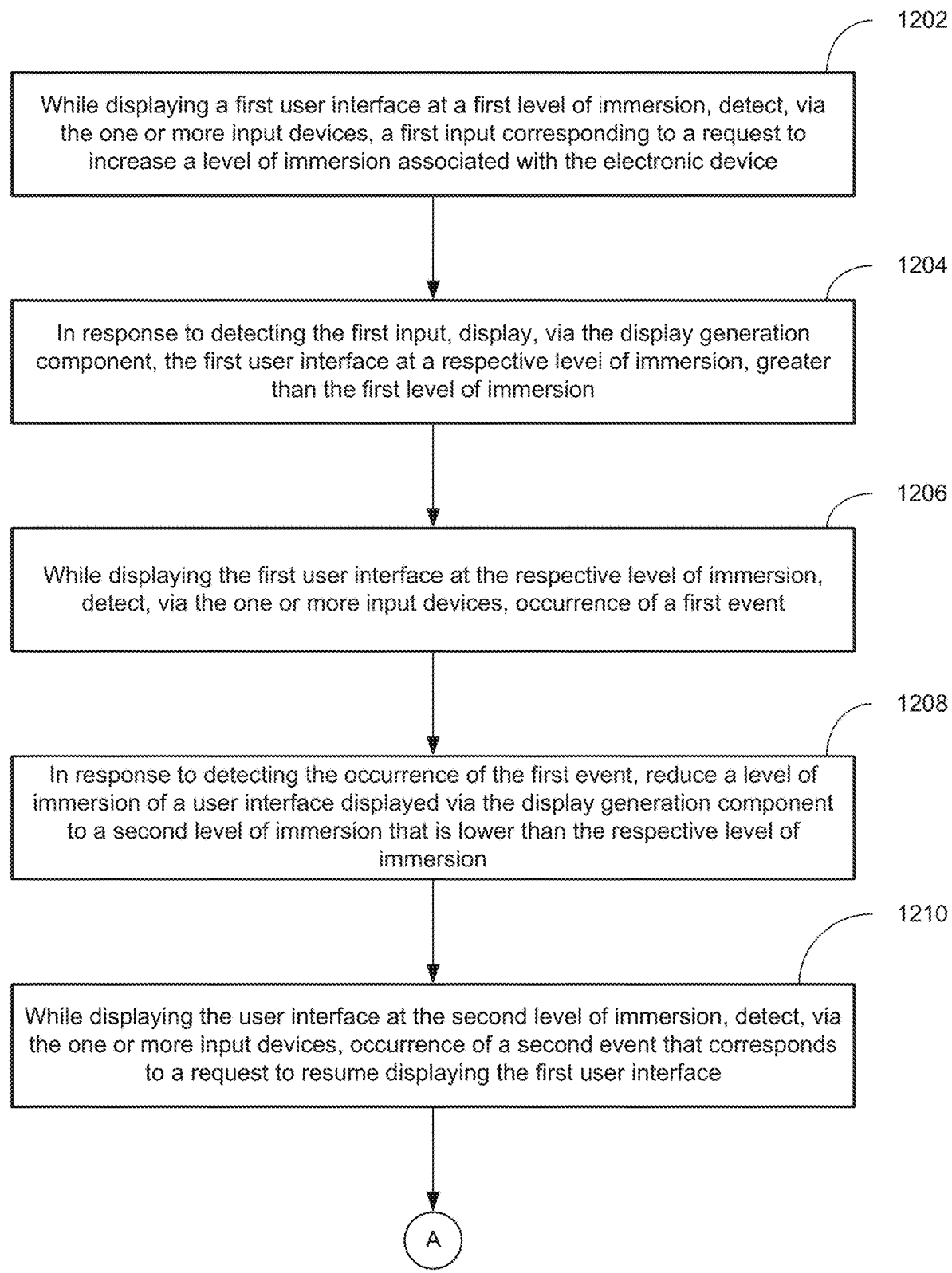

FIG. 12A illustrates electronic device 500 displaying user interface 1200 (e.g., via a display device, via a display generation component, etc.) and input devices 1202-1 and 1202-2 (collectively referred to as input device 1202, similar to game controller 490 described above with respect to FIG. 5L) attached to the sides of device 500 (e.g., in a manner similar to described above with respect to FIG. 6B). In some embodiments, user interface 1200 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

The embodiments illustrated below describe an input device displaying content and/or a user interface. For example, input device 1202 (e.g., an attachable game controller similar to game controller 490) and input device 1214 (e.g., a standalone game controller similar to game controller 480) are described below as being capable of displaying content and/or a user interface. It is understood that the figures illustrate content and/or user interfaces being displayed by a particular input device, but this is merely exemplary and any of the features described below with respect to input device 1202 can be performed with input device 1214 and any feature described below with respect to input device 1214 can be performed with input device 1202.

In FIG. 12A, user interface 1200 is a user interface of a non-game application. For example, user interface 1200 is a home screen user interface (e.g., user interface 400 described above with respect to FIG. 4A), a settings user interface, a user interface of a notes application, a user interface of a calculator application, etc. In some embodiments, while device 500 is displaying a user interface of a non-game application, input device 1202 does not project a user interface via a projection device. In some embodiments, input device 1202 includes a projection device (e.g., either or both of input devices 1202-1 and 1202-2) that is capable of projecting an image, content, a user interface, onto a physical surface in the environment of input device 1202. In some embodiments, the projection device of input device 1202 is automatically enabled (e.g., turned on) in response to device 500 launching a game application (optionally a game application that supports projecting a user interface).

Figure 12B:
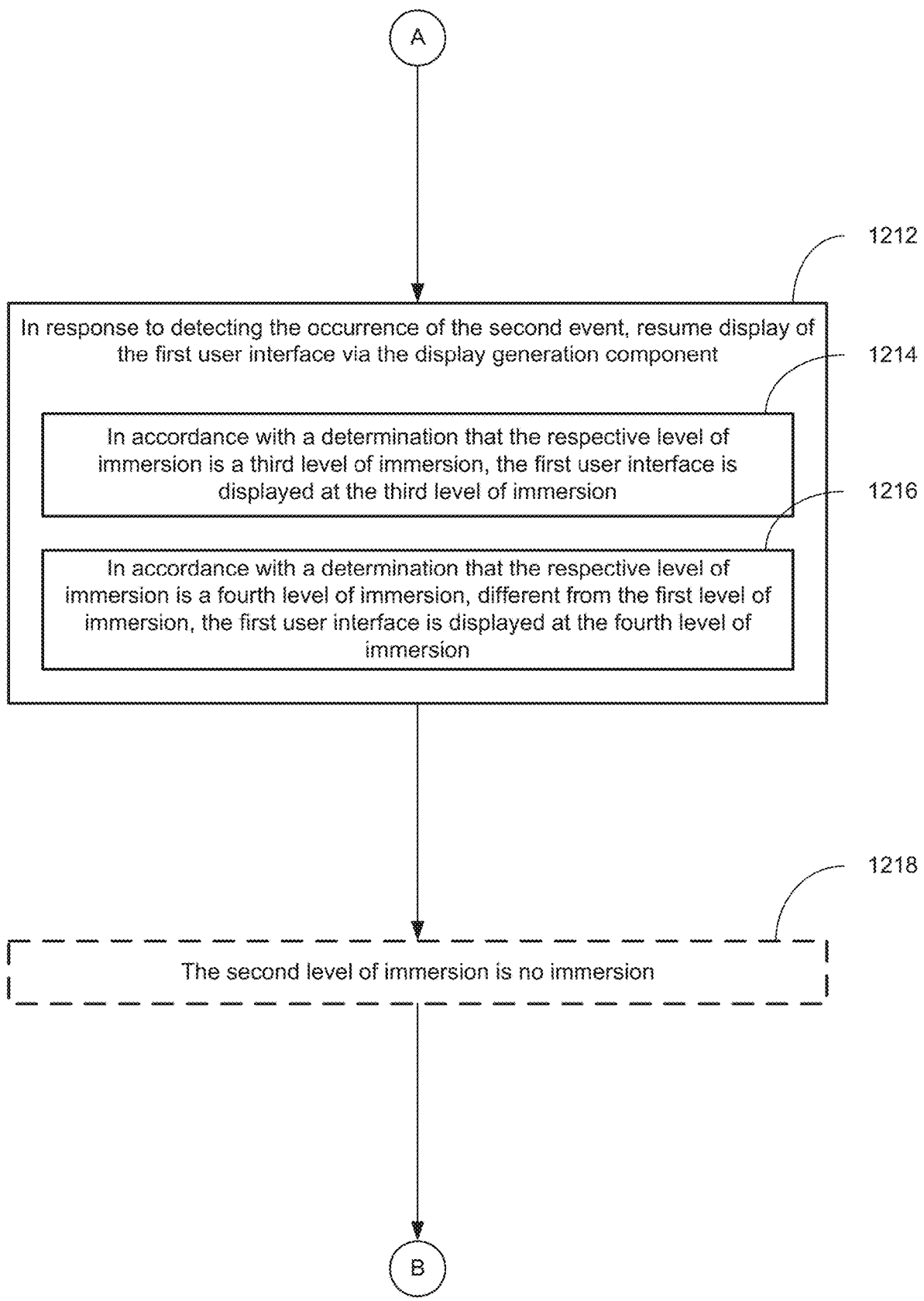

For example, in FIG. 12B, device 500 begins displaying game user interface 1 1201. In some embodiments, game user interface 1201 is a user interface of a game application that supports displaying an auxiliary user interface. In some embodiments, in response to device 500 displaying game user interface 1 1201 (and optionally in accordance with a determination that the game application supports displaying an auxiliary user interface), input device 1202 projects game user interface 2 1204 onto a surface (e.g., a table, a wall, etc.). In some embodiments, game user interface 2 1204 is a user interface of the same game application as game user interface 1 1201. In some embodiments, game user interface 2 1204 includes additional auxiliary information associated with game user interface 1 1201. For example, game user interface 2 1204 optionally includes status information, character inventory information, and/or a map of the game level, etc. In some embodiments, game user interface 2 1204 displays content intended to be viewed publicly (e.g., by people other than the user of device 500). For example, game user interface 2 1204 is optionally a duplicate of game user interface 1 1200 such that another person is able to see what is being displayed by device 500. In some embodiments, game user interface 2 1204 is a reduced version of game user interface 1 1204 (e.g., similar to game user interface 1 1204, optionally without including content that is specific to the user playing the game). In some embodiments, game user interface 2 1204 includes content that is not displayed in game user interface 1 1201 (e.g., extra and/or additional content). In some embodiments, game user interface 1 1201 includes content that is not displayed in game user interface 2 1204. For example, game user interface 2 1201 includes a top-down view of a map of the game level, but game user interface 1 1201 does not include such a map.

Figure 12C:
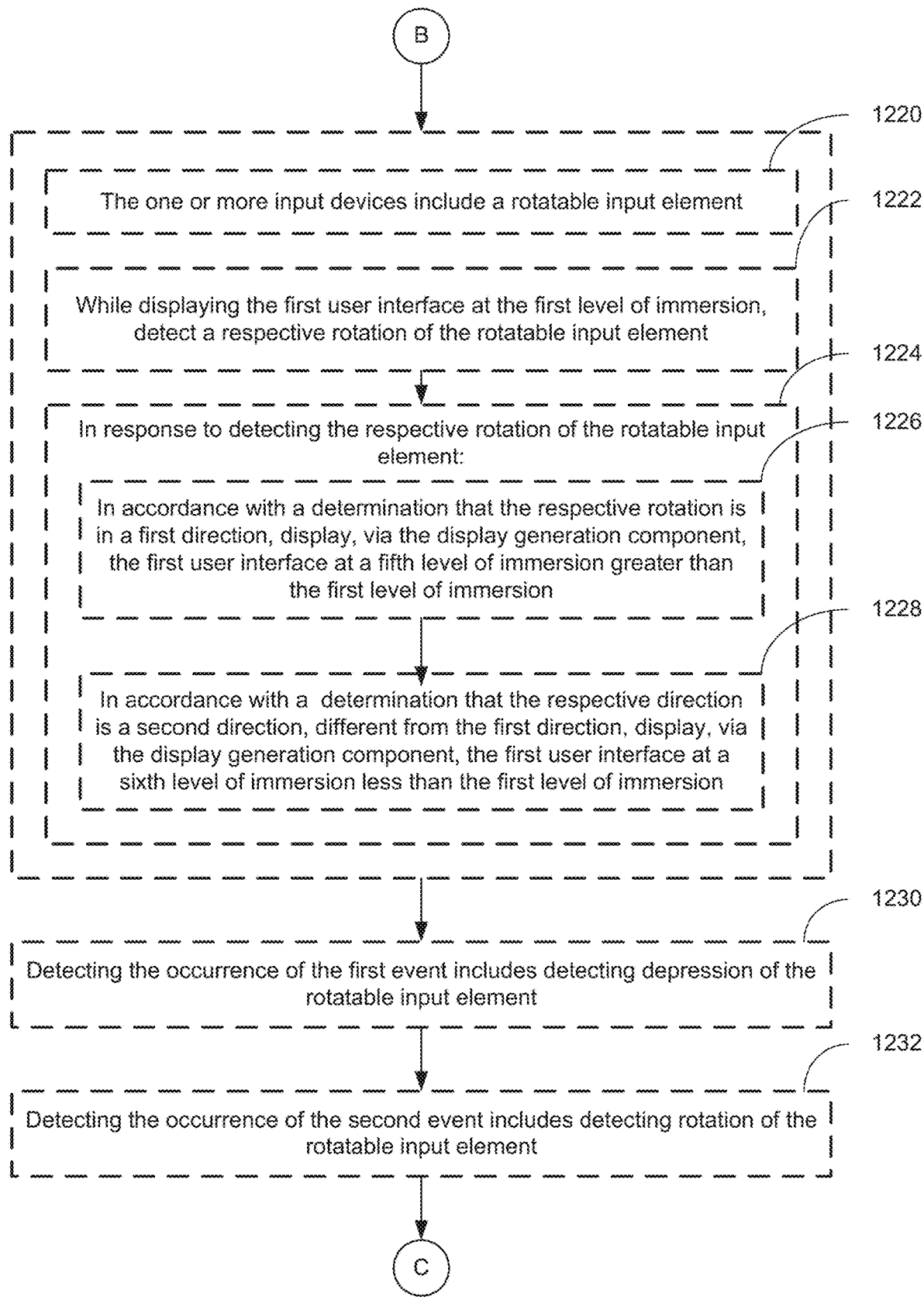

FIG. 12C illustrates an embodiment in which two devices (e.g., device 500a and device 500b) are playing a multi-player game with each other (e.g., such as in response to detecting that at least one portion of their attached input devices has been replaced with a corresponding portion of another input device described above with respect to FIG. 6D). In such an embodiment, device 500a and device 500b are both displaying game user interfaces (e.g., game user interface 1200a and game user interface 1200b, respectively), while input device 1202a projects multiplayer shared user interface 1206. In some embodiments, the input device of one device projects multiplayer shared user interface (e.g., only one, of the two input devices), and device 500a and device 500b optionally coordinate which input device projects multiplayer shared user interface 1206. In some embodiments, multiplayer shared user interface 1206 includes content that is relevant to both players, such as a representation of a map of the game level being played on by device 500a and device 500b.

Figure 12D:
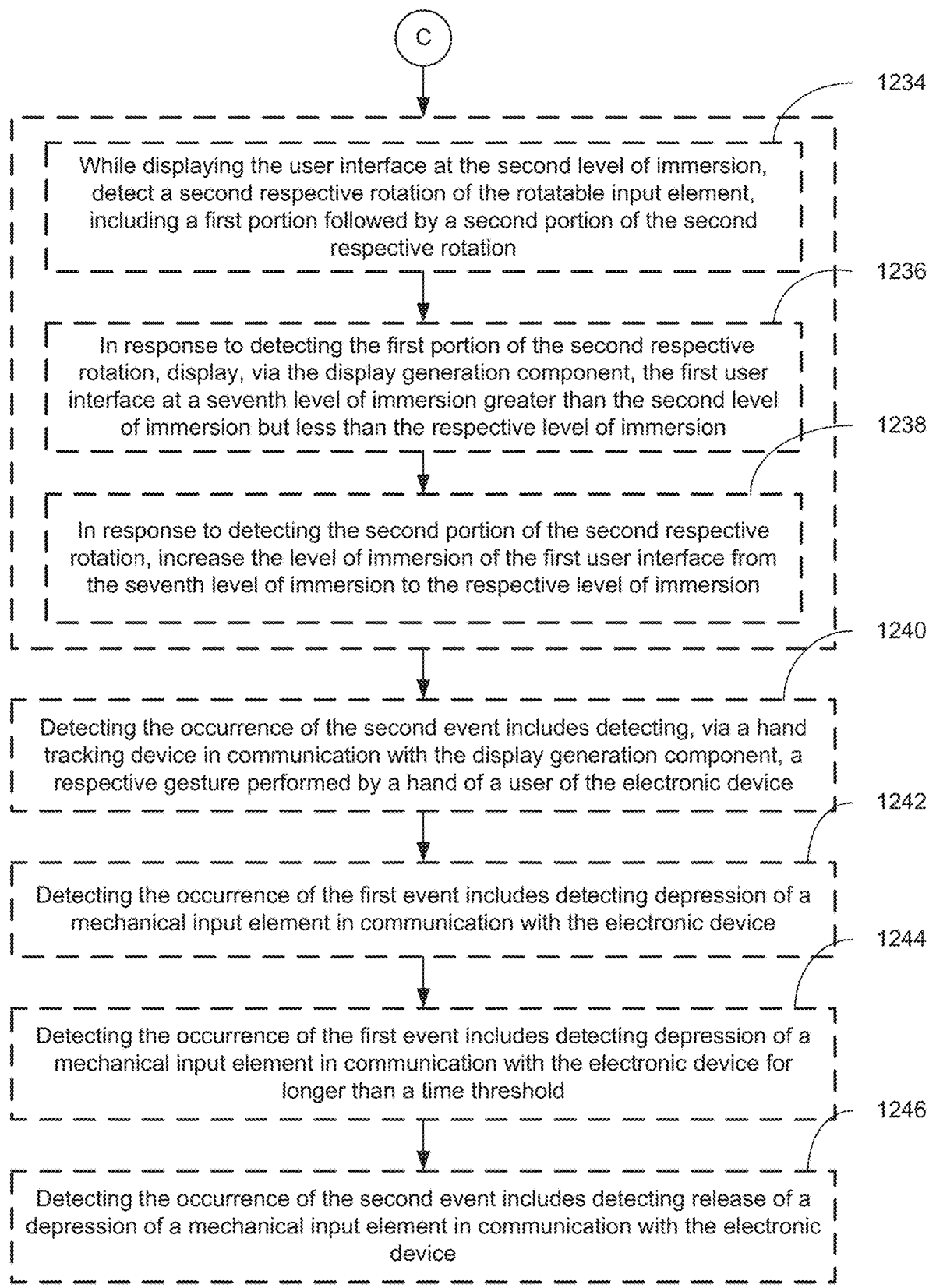

FIG. 12D illustrates an embodiment in which the projection device of input device 1202 projects an image of a keyboard 1210. In FIG. 12D, device 500 is displaying a text input field 1208. In some embodiments, in response to detecting that text entry is required at the device to which input device 1202 is providing input, input device 1202 optionally projects an image of a keyboard 1210 for use in entering text into text input field 1208. In some embodiments, a user is able to select keys on keyboard 1210 using hand 1212 directly selecting the image of the respective keys. In some embodiments, a camera of device 500 and/or input device 1202 captures an image of keyboard 1210 and is able to detect that hand 1212 is selecting keys on keyboard 1210 and in response, enter the selected keys into text input field 1208. In some embodiments, a user is able to select keys on keyboard 1210 by using the input mechanisms of input device 1202 and moving a focus indicator around keyboard 1210 and actuating a function key on input device 1202 associated with the selection option.

In some embodiments, the above-described method of projecting an image of a keyboard 1210 can be performed by a standalone game controller (e.g., such as game controller 480 described above with respect to FIG. 5K and input device 1214 described below). For example, a standalone game controller can configured to provide user inputs to a set-top box (e.g., device 580) and in response to determining that the set-top box is displaying a text input field (e.g., on a display device), the standalone game controller can project an image of a keyboard 1210, in a manner similar to described above.

FIG. 12E illustrates input device 1214 (e.g., similar to game controller 480 described above with respect to FIG. 5K) that is configured to project a user interface and to communicate with set-top box 1216 (e.g., such as device 580 described above with respect to FIG. 5I) that is displaying a user interface. In FIG. 12E, set-top box 1216 is coupled to display 1218 (e.g., a television, a monitor, etc.) and is configured to display game user interface 1201 on display 1218. In some embodiments, set-top box 1216 receives user inputs from a remote control device or a game controller, such as input device 1214. In some embodiments, input device 1214 communicates with set-top box 1216 and provides user inputs to set-top box 1216 wirelessly or via a wired connection.

In some embodiments, input device 1214 is a game controller device that optionally includes one or more analog input mechanisms (e.g., analog sticks), one or more directional pad input mechanisms (e.g., "d-pad"), one or more function buttons, one or more trigger buttons, and/or one or more menu buttons, etc. In some embodiments, input device 1214 includes a projection device that is capable of projecting an image, content, a user interface, onto a physical surface (e.g., a table, the floor, the wall, etc.).

In some embodiments, while set-top box 1216 is displaying game user interface 1201 such that a user is playing a game using input device 1214, input device 1214 projects one or more auxiliary user interfaces (optionally in accordance with a determination that the game supports display of auxiliary user interfaces). In FIG. 12E, input device 1214 projects user interface 1220 and user interface 1222 to the right and left of display 1218, respectively (e.g., onto the wall behind display 1218, although it is understood that user interfaces 1220 and 1222 can be projected anywhere). In some embodiments, user interfaces 1220 and 1222 are displayed in response to detecting a display trigger, such as the launching of a game application by set-top box 1216 (e.g., in a manner similar to described in FIG. 12B), a user input requesting the display of auxiliary user interfaces, etc. In some embodiments, user interface 1220 is a map user interface that includes a representation of the map of the game level, and user interface 1222 includes information about the user's inventory in the game. For example, user interface 1222 includes one or more representations of items in the user's inventory and optionally indicates how many inventory slots are available, how many inventory slots are used, etc. Thus, input device 1214 is able to display one or more user interfaces that include auxiliary information associated with the user interface displayed on display 1218. In some embodiments, the auxiliary information displayed in the one or more user interfaces are not otherwise displayed on game user interface 1201 (e.g., optionally without otherwise receiving a user input requesting display of the respective information).

FIG. 12F illustrates an embodiment in which input device 1214 displays a menu 1224 that includes one or more selectable options (e.g., selectable options 1226-1 to 1226-4). In some embodiments, set-top box 1216 is displaying user interface 1228 and while displaying user interface 1228, input device 1214 displays menu 1224. In some embodiments, menu 1224 is displayed in response to detecting a display trigger, such as a user input requesting the display of menu 1224. In some embodiments, menu 1224 is associated with user interface 1228 and includes selectable options that are selectable to perform operations associated with user interface 1228. For example, if user interface 1228 is a media player user interface, menu 1224 includes options to play, pause, rewind, fast forward, and/or change the subtitle settings, etc. (e.g., which optionally are not displayed in user interface 1228). In some embodiments, menu 1224 is not associated with user interface 1228 and includes selectable options that are selectable to perform operations unrelated to user interface 1228. For example, menu 1224 optionally includes options to cause set-top box 1216 to display a home screen user interface on display 1228, an option to turn off set-top box 1216, an option to increase or decrease the volume of set-top box 1216 (or the volume of the display that is displaying content from set-top box 1216), an option to launch an application and display a user interface of the launched application via set-top box 1216 (e.g., on the display that is receiving display information from set-top box 1216), an option to initiate a social interaction with another user, etc.

In FIG. 12G, input device 1214 projects friends list 1230 that includes one or more representations of friends and an indication of their corresponding online statuses. For example, representation 1232-1 corresponding to the first user includes an indication that the first user is online, representation 1232-2 corresponding to the second user includes an indication that the second user is online, and representation 1232-2 corresponding to the third user includes an indication that the third user not online. In some embodiments, the representations are selectable to perform an operation associated with the respective user, such as to initiate a communication session with the respective user or initiate a multiplayer game session with the respective user (e.g., in a manner similarly to described above with respect to method 1100). For example, a user is able to use input device 1214 to move a focus indicator to the desired representation and actuate a function button associated with the selection operation.

FIG. 12H illustrates an embodiment in which input device 1214 is projecting a video call user interface 1232 alongside display 1218, for example, in response to a user input selecting a representation of a user in FIG. 12G. In some embodiments, video call user interface 1232 includes a live view of the person with which the user is video-chatting with and optionally a live view of the user set-top box 1216 (which is optionally captured by a camera of set-top box 1216 or a camera in input device 1214). In some embodiments, video call user interface 1232 is a user interface associated with a game application that is displayed on display 1218 (e.g., a video call feature that is integrated with the game application). In some embodiments, video call user interface 1232 is associated with a video calling application (e.g., a videotelephony application) separate from the game application, similar to that described above in FIGS. 10J-10K.

FIG. 12I illustrates an embodiment in which input device 1214 displays a user interface 1234 around display 1218. In some embodiments, input device 1214 determines the size and position of display 1218 and is able to project content around display 1218. In some embodiments, user interface 1234 optionally includes one or more status indicators, one or more notifications, etc. For example, in FIG. 12I, set-top box 1216 detects the occurrence of a notification event for which a notification should be generated and in response to detecting the notification event, set-top box 1216 provides display information to input device 1214 and user interface 1234 is updated to include notification 1236 that indicates that the user has received three messages via a messenger application. In some embodiments, user interface 1234 is able to display any number of notifications or status indicators, such as a battery level indicator, a wifi strength indicator, a date and/or time indicator, etc. Thus, user interface 1234 can act as a frame around display 1218 and display additional information and/or content to the user without sacrificing the display area of display 1218. For example, if set-top box 1216 is not connected with a input device that includes a projection device, then in some embodiments, content that is displayed in user interface 1234 would otherwise be displayed in user interface 1218.

FIG. 12J illustrates an embodiment in which user interface 1234 projected around display 1218 is an extended user interface to user interface 1228. For example, the content displayed in user interface 1228 is optionally expanded into user interface 1234 such as if the available display area includes the display area of user interface 1234. In some embodiments, user interface 1234 includes ambient and/or environmental content to enhance user interface 1228. For example, user interface 1234 optionally includes artwork that optionally increases the immersive effect of user interface 1228. For example, if user interface 1228 is a media playback user interface or a game user interface that includes a desert scene, user interface 1234 optionally includes a desert landscape, if user interface 1228 includes a forest scene, user interface 1234 optionally includes a forest landscape, etc.

In FIG. 12K, input device 1214 has rotated such that input device 1214 is not facing directly towards display 1218. In some embodiments, input device 1214 is able to determine that display 1218 has changed locations relative to the orientation of input device 1214. In some embodiments, input device 1214 updates the projection such that user interface 1234 is maintained around device 1218. Thus, in some embodiments, input device 1214 is able to snap user interfaces (e.g., any of the user interfaces that are displayed by input devices described above) to one or more physical objects (e.g., a television, a display, a table, the wall, etc.) and maintain the projected user interfaces at the snapped locations relative to the physical objects with which the user interfaces are snapped. For example, in FIG. 12K, user interface 1234 has snapped around display 1218 and in response to detecting a movement and/or rotation of input device 1214, input device 1214 continues to project user interface 1234 at the same location and orientation snapped around display 1218. In some embodiments, if input device 1214 is moved or rotated to a degree that projecting user interface 1234 at the snapped location is not physically possible, input device 1214 optionally snaps user interface 1234 to a new location and/or ceases displaying user interface 1234 (e.g., turns off the projection device).

It is understood that any of the user interfaces described herein with respect to FIGS. 12B-12K can include any of the content displayed by the input devices described above with respect to method 700 and 1100.

Figure 13A:
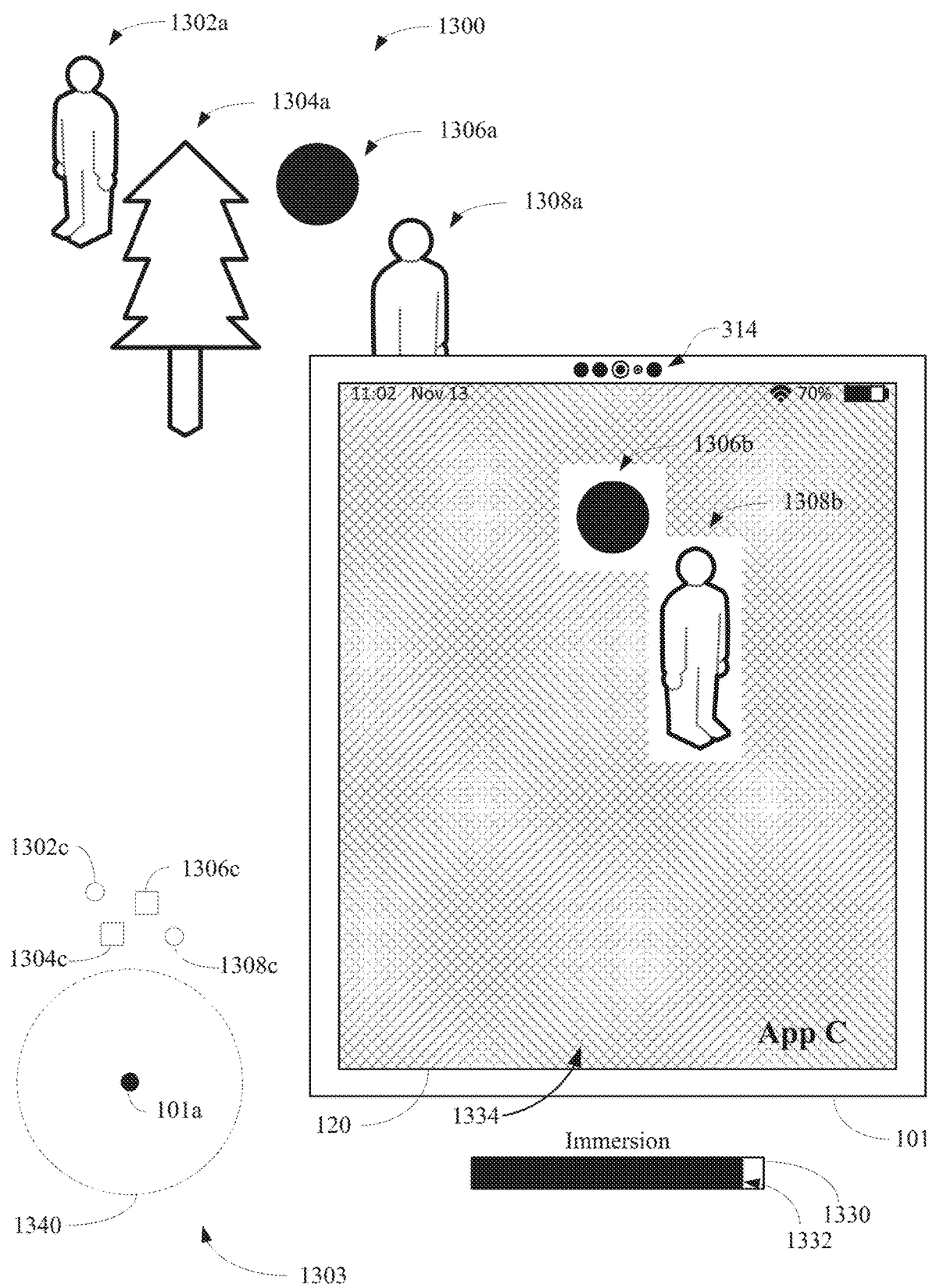
FIG. 13 is a flow diagram illustrating a method of projecting a user interface via a projection device of an input device in accordance with some embodiments of the disclosure.
Figure 13B:
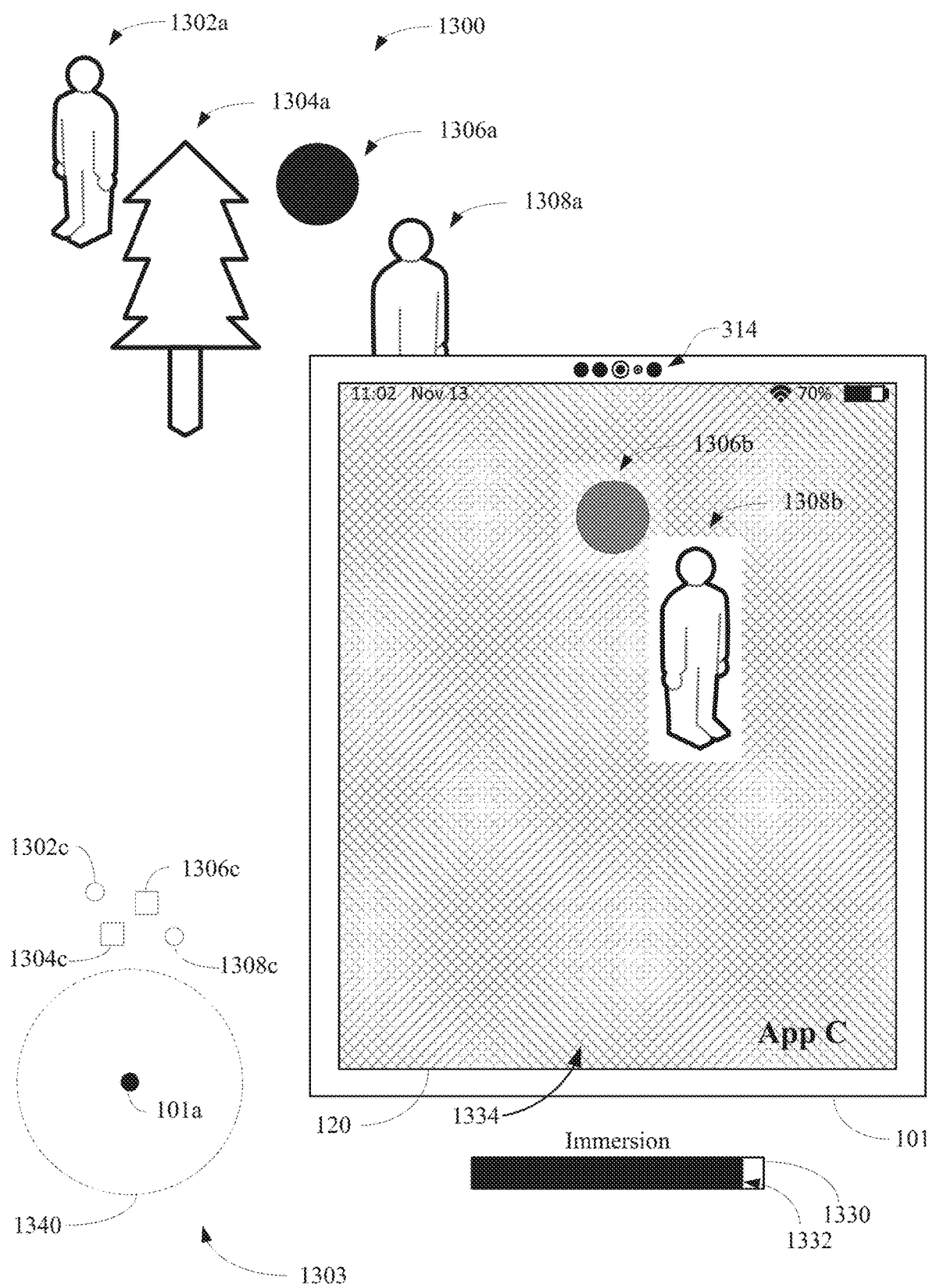
Figure 13C:
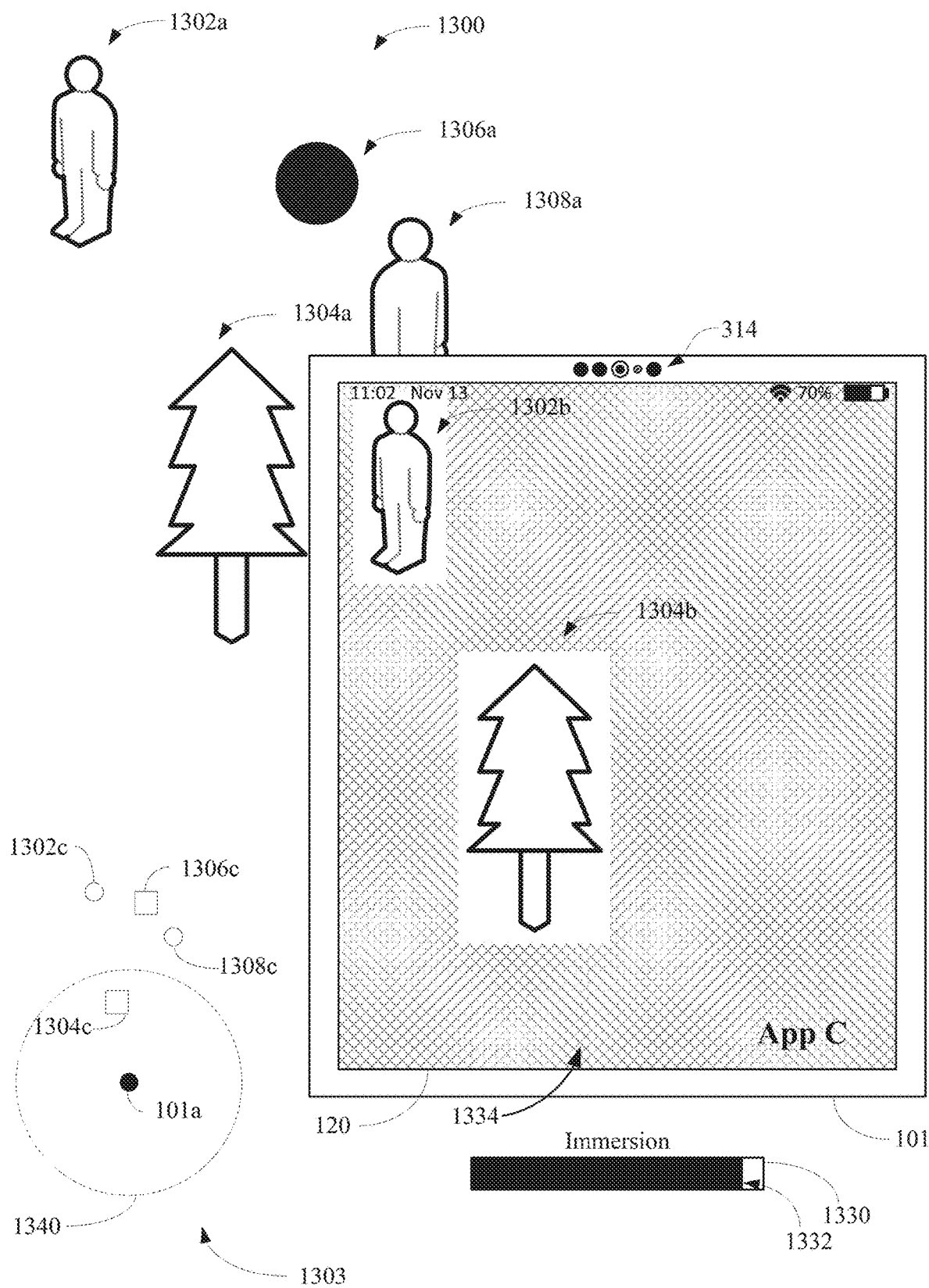

FIG. 13 is a flow diagram illustrating a method 1300 of projecting a user interface via a projection device of an input device in accordance with some embodiments of the disclosure. The method 1300 is optionally performed at an electronic device such as device 100, device 300, and device 500, and device 580 as described above with reference to FIGS. 1A-1B, 2-3, 4A-4B and 5A-5I. Some operations in method 1300 are, optionally combined and/or the order of some operations is, optionally, changed.

As described below, the method 1300 is directed to projecting a user interface. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, electronic device (e.g., an electronic device 500, device 580, a mobile device (e.g., a tablet, a smartphone, a media player, or a wearable device), a set-top box or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.) in communication with a first display generation component and a respective input device that includes a second display generation component for projecting a user interface onto a surface (e.g., a surface in a physical environment of the respective input device, such as a table, a floor, a wall, etc.) while displaying, via the first display generation component, a first user interface associated with a first application (e.g., a main, gameplay user interface of a game application currently being run on the electronic device via which gameplay in the game is controlled), displays (1302), via the second display generation component, a second user interface projected onto the surface, the second user interface associated with the first application, wherein the second user interface includes information associated with the first application, such as game user interface 2 1204 projected onto a table or wall in FIG. 12B (e.g., projecting, via the second display generation component, a second user interface, different from the first user interface, associated with the game application).

In some embodiments, the first display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the respective input device is a controller device, separate from the electronic device, that provides input to the electronic device, such as described with reference to methods 700, 900 and 1100. In some embodiments, the respective input device includes a second display generation component includes a projector or other suitable hardware component for projecting a user interface or causing a user interface to be visible to one or more users, etc.

In some embodiments, the second user interface is an auxiliary user interface of the game application, and gameplay in the game application is not controlled via the second user interface (e.g., input is not directed to the second user interface to direct gameplay, but rather the second user interface displays information about the gameplay). In some embodiments, the second user interface includes information about the game that is not displayed via the first user interface. For example, in some embodiments, the first user interface is a view of the environment of the game application seen from a viewpoint of a user playing the game application (e.g., an on-the-ground viewpoint), and the second user interface is a top-down view of the environment of the game application that is not seen from the viewpoint of a user playing the game application that, for example, indicates the locations of various users in the environment of the game (e.g., a bird's eye view of the environment, a "map" of the environment, etc.).

In some embodiments, while displaying the first user interface via the first display generation component and the second user interface via the second display generation component, the electronic device receives (1304), via the respective input device, a respective input associated with the first user interface, such as receiving a user input via input device 1214 in FIG. 12E (e.g., an input from the respective input device to control gameplay in some manner, such as an input to change the direction of movement of the user through the environment of the game).

In some embodiments, in response to receiving the respective input (1306), the electronic device updates (1308) the first user interface displayed via the first display generation component based on the respective input, such as updating game user interface 1200 in response to the user input received on input device 1214 in FIG. 12E (e.g., the game application responds to the input to change or control the gameplay received via the respective input device, and the main gameplay user interface of the game application is updated accordingly). For example, an input to turn the user around in the game environment optionally causes the first user interface to be updated to show a different viewpoint of the game environment (e.g., a viewpoint looking in the opposite direction from before).

In some embodiments, the electronic device updates (1310) the second user interface displayed via the second display generation component based on the respective input, such as updating user interface 1220 and/or user interface 1222 based on changes in the game, such as map and/or inventory changes, as a result of the user input received on input device 1214 in FIG. 12E (e.g., the auxiliary user interface of the game application is optionally also updated based on the change in gameplay in response to the input from the respective input device). For example, in some embodiments, the second user interface includes a top-down view of the environment of the game application in which the "up" direction (e.g., device north) is the aligned with the direction that the user's game character is facing, and an input to turn the user around in the game environment optionally causes the second user interface to be updated to reflect the change in the user's game character's orientation (e.g., the map changes orientation based on the change in orientation of the user's character). For example, if the input from the respective input device caused the user playing the game to progress from level 1 to level 2 in the game application, the auxiliary user interface optionally indicates that progression.

The above-described manner of displaying information associated with an application via a second display generation component of a respective input device (e.g., by projecting the user interface via the second display generation component onto a physical surface) provides a quick and efficient manner of displaying such information, which simplifies the interaction between the user and the electronic device and enhances the operability of the electronic device and makes the user-device interface more efficient (e.g., without requiring separate input to, or disrupting the display of, the first user interface), which additionally reduces power usage and improves battery life of the electronic device by enabling the user to use the electronic device more quickly and efficiency, while reducing errors in usage.

In some embodiments, the second user interface displayed via the second display generation component includes information about a status, in the first application, associated with a user associated with the respective input device, such as described in FIG. 12B (e.g., and does not include information associated with a second user in the first application).

In some embodiments, the first application is a game application and the status includes status information of the progress of the game. For example, the second user interface includes indicates the inventory of the user's character in the game application, a map of the world in the game application, and/or the health and/or energy of the user's character in the game application, etc. Thus, in some embodiments, the second user interface includes supplemental and/or auxiliary information about the application that is being displayed by the first display generation component. In some embodiments, the status information displayed via the second display generation component is not concurrently displayed by the first display generation component. In some embodiments, the status information displayed via the second display generation component would otherwise be displayed by the first display generation component if, for example, the second display generation component was not active or did not exist (e.g., in response to detecting that the second display generation component has connected to the electronic device, the user interface displayed by the first display generation component is updated to move one or more elements and/or information to the user interface of the second display generation component.

The above-described manner of displaying status information associated with an application via a second display generation component of a respective input device provides a quick and efficient manner of displaying such information, which simplifies the interaction between the user and the electronic device and enhances the operability of the electronic device and makes the user-device interface more efficient (e.g., without requiring separate input to, or disrupting the display of, the first user interface), which additionally reduces power usage and improves battery life of the electronic device by enabling the user to use the electronic device more quickly and efficiency, while reducing errors in usage.

In some embodiments, the second user interface displayed via the second display generation component includes information associated with a first user and a second user associated with the first application, wherein the first user is associated with the respective input device, such as in FIG. 12C (e.g., the second user interface is projected by the display generation component to a location such that the user of the electronic device and another person is able to see the second user interface).

In some embodiments, the first application is a game application that is configured in a multiplayer mode. In some embodiments, the second user interface displays information that is relevant to the user of the electronic device and another player in the multiplayer game session. For example, the second user interface displays a map of the level that is being played on by both the user of the electronic device and another player in the multiplayer game session such that both the user of the electronic device and the other player are able to see the map. Thus, in some embodiments, the second display generation component displays information that is common to and/or relevant to multiplayer users and/or players. In some embodiments, the second display generation component does not display common information if the electronic device determines that the user is not in a multiplayer gaming session with a local player (e.g., a player that is in the same physical environment of the user), for example, because the other player(s) are not present to see the common information.

The above-described manner of displaying common information associated with two users via a second display generation component of a respective input device provides a quick and efficient manner of displaying such information, which simplifies the interaction between the user and the electronic device and enhances the operability of the electronic device and makes the user-device interface more efficient (e.g., by providing information to multiple users, without requiring the user to interrupt the user's interaction with the device to switch to displaying common information), which additionally reduces power usage and improves battery life of the electronic device by enabling the user to use the electronic device more quickly and efficiency, while reducing errors in usage.

In some embodiments, the second user interface displayed via the second display generation component includes one or more ambient effects corresponding to the first application, such as in FIG. 12J (e.g., the second user interface is optionally an extension of the first user interface and includes one or more ambient elements associated with the content displayed on the first user interface). For example, the second user interface includes artwork associated with the first application or a border or frame that improves the contrast and/or immersive effect of the first user interface. For example, the artwork includes solid color blocks that are based on the colors of the content displayed on the first user interface, or includes landscape, trees, or other environmental effects that are based on the content displayed on the first user interface. In some embodiments, the second user interface is displayed at a location associated with the first display generation component. For example, the second user interface is displayed to the left, right, top, bottom, or around the first display generation component.

The above-described manner of displaying an ambient effect via a second display generation component of a respective input device provides a quick and efficient manner of enhancing the first user interface, which simplifies the interaction between the user and the electronic device and enhances the operability of the electronic device and makes the user-device interface more efficient (e.g., by displaying ambient elements corresponding to the first application, without reducing available display area of the first user interface to achieve the same display of ambient effects via the first display generation component), which additionally reduces power usage and improves battery life of the electronic device by enabling the user to use the electronic device more quickly and efficiency, while reducing errors in usage.

In some embodiments, the second user interface displayed via the second display generation component includes a communication user interface for communicating with a user associated with a second electronic device, different from the electronic device, such as in FIG. 12H (e.g., the second user interface includes one or more social elements, including a communication user interface).

For example, the second user interface includes a chat window that displays one or more messages exchanged with another person. In some embodiments, the second user interface includes a video chat window that displays a video call (e.g., a live video of another person). In some embodiments, the social elements are associated with the first application (e.g., a chat feature integrated into the first application). In some embodiments, the social elements are associated with a process other than the first application (e.g., a messaging service, a chat room, a video call that is separate from the first application (e.g., optionally associated with another application or with a system application).

The above-described manner of displaying a communication user interface via a second display generation component of a respective input device provides a quick and efficient manner of enhancing the first user interface (e.g., by providing an interface for communicating with another user), which simplifies the interaction between the user and the electronic device and enhances the operability of the electronic device and makes the user-device interface more efficient (e.g., without requiring the user to perform additional inputs and interrupt the user's interaction with the first user interface to display a communication user interface for communicating with another user), which additionally reduces power usage and improves battery life of the electronic device by enabling the user to use the electronic device more quickly and efficiency, while reducing errors in usage.

In some embodiments, the second user interface displayed via the second display generation component includes information about a status of a user associated with a second electronic device, different from the electronic device, such as in FIG. 12G (e.g., the second user interface includes one or more representations of one or more users that indicates the current status of the respective user). For example, the representation indicates that the user is currently online, is currently busy, is currently playing a game, and/or is currently offline, etc. In some embodiments, the representations are selectable to begin a communication session with the respective user.

The above-described manner of displaying status of other users via a second display generation component of a respective input device provides a quick and efficient manner of indicating the users that are available to interact with, which simplifies the interaction between the user and the electronic device and enhances the operability of the electronic device and makes the user-device interface more efficient (e.g., without requiring the user to perform additional inputs and interrupt the user's interaction with the first user interface to view the availability status of the user's contacts), which additionally reduces power usage and improves battery life of the electronic device by enabling the user to use the electronic device more quickly and efficiency, while reducing errors in usage.

In some embodiments, the electronic device detects a notification event at the electronic device, such as in FIG. 12I (e.g., an event associated with one or more applications or processes for which a notification is generated and provided to the user). In some embodiments, the notification event includes displaying a visual notification alerting the user of the notification event. In some embodiments, the notification event includes generating an audible notification. In some embodiments, the notification event includes generating a tactile output.

In some embodiments, in response to detecting the notification event at the electronic device, displaying, via second display generation component, a visual indication of the notification event, such as in FIG. 12I (e.g., without displaying a visual indication of the notification event via the first display generation component).

In some embodiments, the visual indication includes an indication of the application and/or process that generated the notification and/or the content associated with the notification event In some embodiments, the notification is selectable to display information associated with the notification event, optionally via the first display generation component and/or second display generation component. In some embodiments, the notification is selectable to display the user interface of the application associated with the notification event, optionally via the first display generation component and/or the second display generation component. In some embodiments, if the notification is not selected via an input mechanism of the respective input device (e.g., which includes the second display generation component), then the device displays content and/or a user interface associated with the notification via the first display generation component.

The above-described manner of displaying a notification (e.g., via a second display generation component of a respective input device) provides a quick and efficient manner of providing notification information, which simplifies the interaction between the user and the electronic device and enhances the operability of the electronic device and makes the user-device interface more efficient (e.g., without requiring the user to perform additional inputs and interrupt the user's interaction with the first user interface to view notifications), which additionally reduces power usage and improves battery life of the electronic device by enabling the user to use the electronic device more quickly and efficiency, while reducing errors in usage.

In some embodiments, the second user interface displayed via the second display generation component includes one or more selectable options for controlling the electronic device, such as in FIG. 12F (e.g., displaying one or more selectable options that are selectable to perform one or more operations on the electronic device).

In some embodiments, the selectable options are associated with the first application displayed via the first display generation component. For example, the selectable options include an option to perform an action in the first application, and/or an option to close the first application, etc. In some embodiments, the selectable options are associated with the system. For example, the selectable options include an option to launch a respective application, an option to display the home screen, and/or an option to turn off the device, etc. In some embodiments, the selectable options are selectable by moving a focus indicator to a respective selectable option via the respective input device. In some embodiments, one or more cameras of the electronic device and/or respective input device monitor the selectable options such that the selectable options are selectable by contacting the selectable option with a finger or other suitable implement.

The above-described manner of displaying a menu (e.g., via a second display generation component of a respective input device) provides a quick and efficient manner of providing selectable options, which simplifies the interaction between the user and the electronic device and enhances the operability of the electronic device and makes the user-device interface more efficient (e.g., without requiring the user to perform additional inputs and interrupt the user's interaction with the first user interface to view and select options), which additionally reduces power usage and improves battery life of the electronic device by enabling the user to use the electronic device more quickly and efficiency, while reducing errors in usage.

In some embodiments, the second user interface displayed via the second display generation component includes a soft keyboard for providing text input to the electronic device, such as in FIG. 12D (e.g., project a representation of a keyboard onto a surface).

In some embodiments, the keys on the keyboard are selectable by moving a focus indicator to a respective selectable option via the respective input device. In some embodiments, one or more cameras of the electronic device and/or respective input device monitor the selectable options such that the selectable options are selectable by contacting the selectable option with a finger or other suitable implement. In some embodiments, the second user interface includes a soft keyboard in response to determining that the first user interface includes a text field into which text can be input. In some embodiments, the second user interface includes a soft keyboard in response to determining that text input is requested on the electronic device.

The above-described manner of displaying a soft keyboard (e.g., via a second display generation component of a respective input device) provides a quick and efficient manner of entering text, which simplifies the interaction between the user and the electronic device and enhances the operability of the electronic device and makes the user-device interface more efficient (e.g., without reducing the visible area of the first display generation component to display a soft keyboard for inputting text into a text entry field), which additionally reduces power usage and improves battery life of the electronic device by enabling the user to use the electronic device more quickly and efficiency, while reducing errors in usage.

In some embodiments, the second display generation component displays the second user interface at a respective location based on a location of (e.g., at a predefined relative position with respect to) an object in a physical environment of the electronic device, such as in FIG. 12J (e.g., the second user interface is aligned with a physical object).

For example, the second user interface is projected onto the surface of a table and/or aligned with one or more edges of the table. In some embodiments, the second user interface is displayed next to the first display generation component and is aligned to the first display generation component. In some embodiments, the respective input device is able to determine the orientation and/or alignment of the physical object with which the second user interface is aligned such that if the respective input device changes orientation and/or the physical object changes orientation, the second user interface is updated to maintain its orientation, spacing, and/or size with respect to the physical object with which the second user interface is aligned.

The above-described manner of displaying the second user interface (e.g., at a location associated with an object in the physical environment) provides a quick and efficient manner of displaying the second user interface (e.g., aligned with the physical object), which simplifies the interaction between the user and the electronic device and enhances the operability of the electronic device and makes the user-device interface more efficient (e.g., by reducing the visual clutter, thus allowing a user to identify content in the second user interface more easily), which additionally reduces power usage and improves battery life of the electronic device by enabling the user to use the electronic device more quickly and efficiency, while reducing errors in usage.

In some embodiments, the object is the first display generation component, such as in FIG. 12J (e.g., the second user interface is displayed at a location associated with the first display generation component). For example, the second user interface is displayed to the left, right, above, below, or around the first user interface that is displayed via the first display generation component. In some embodiments, the second user interface is aligned with the first user interface such that the boundaries of the second user interface are aligned with the boundaries of the first user interface. In some embodiments, the second user interface is aligned with the first user interface such that the second user interface is flush with the first user interface (e.g., seamless) and/or the second user interface appears as an extension of the first user interface.

The above-described manner of displaying the second user interface (e.g., at a location associated with the first display generation component) provides a quick and efficient manner of displaying the second user interface (e.g., aligned with the first user interface displayed via the first generation component), which simplifies the interaction between the user and the electronic device and enhances the operability of the electronic device and makes the user-device interface more efficient (e.g., by extending the available display area, thus allowing a user to see more information without otherwise interrupting the user's interaction with the user interface of the first application), which additionally reduces power usage and improves battery life of the electronic device by enabling the user to use the electronic device more quickly and efficiency, while reducing errors in usage.

It should be understood that the particular order in which the operations in FIG. 13 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100 and 1500) are also applicable in an analogous manner to method 1300 described above with respect to FIG. 13. For example, the operation of the electronic device projecting a user interface via a projection device of an input device described above with reference to method 1300 optionally has one or more of the characteristics of displaying user interfaces associated with games in response to detecting input devices having been connected to an electronic device, displaying a reduced user interface in response to detecting that a cover has covered a portion of the display, and/or displaying a user interface via a display generation component of an input device, described herein with reference to other methods described herein (e.g., methods 700, 900, 1100 and 1500). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIG. 13 are, optionally, implemented by components depicted in FIGS. 1A-1B. For example, displaying operation 1302 and receiving operations 1304 are, optionally, implemented by event sorter 170, event recognizer 180, and event handler 190. Event monitor 171 in event sorter 170 detects a contact on a touch-sensitive surface, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Multiple Input Modes of a Remote Input Device

Users interact with electronic devices in many different manners, including using remote input devices to provide inputs to electronic devices. In some embodiments, an input device operates in different modes that correspond to providing inputs to different (e.g., types of) user interfaces displayed by an electronic device to which the input device is providing inputs (e.g., providing inputs to system user interfaces versus game or application user interfaces). The embodiments described below provide ways in which an electronic device directs inputs from an input device to different user interfaces depending on the mode in which the input device is operating. Appropriately directing such inputs enhances the user's interactions with the electronic device and reduces the amount of time the user needs to perform operations. Reducing operational time decreases the power usage of the device and increases battery life for battery-powered devices.

Figure 14A:
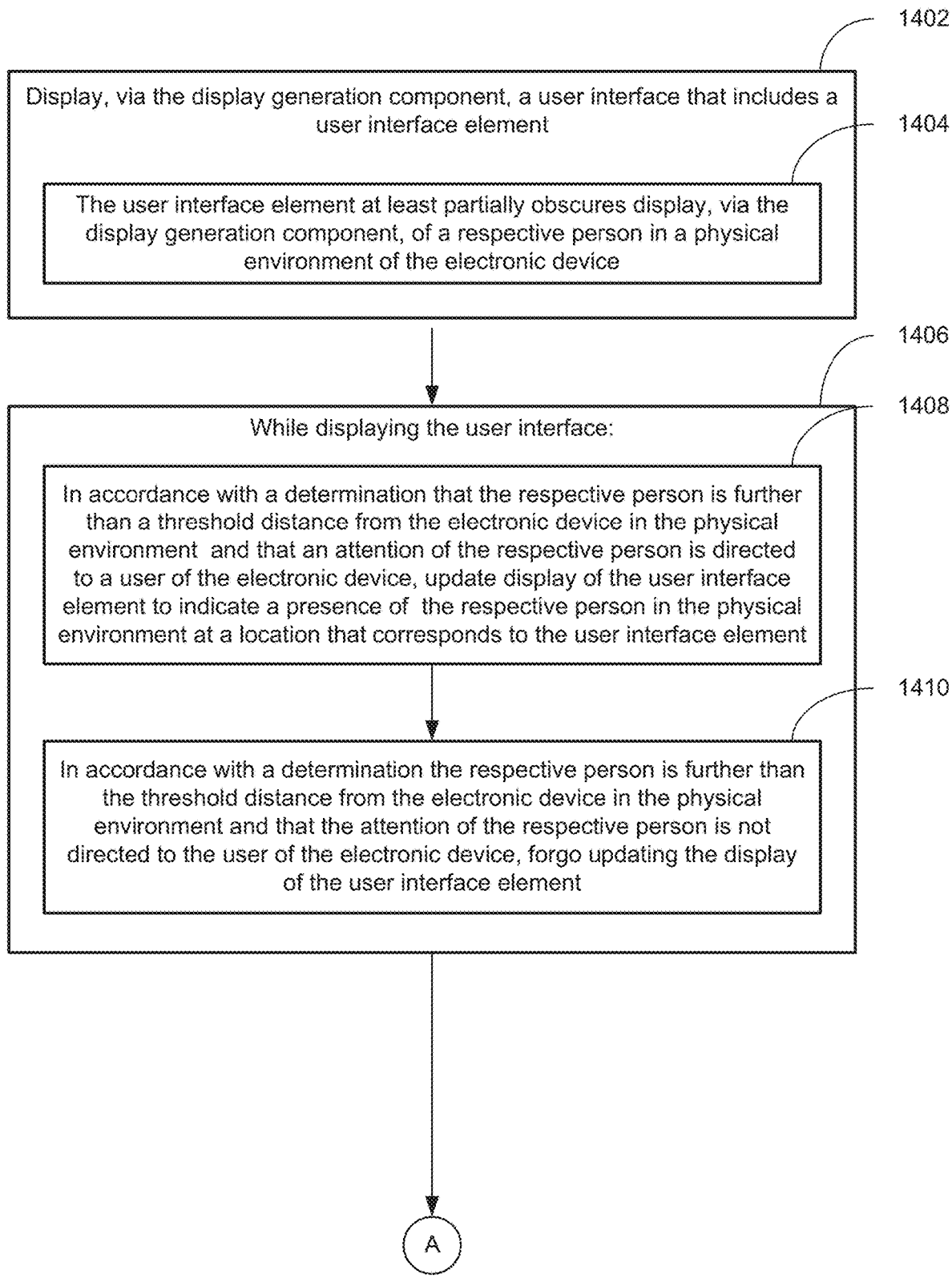
FIGS. 14A-14AH illustrate exemplary ways in which an electronic device directs inputs from an input device to different user interfaces depending on the mode in which the input device is operating in accordance with some embodiments of the disclosure.

FIGS. 14A-14AH illustrate exemplary ways in which an electronic device directs inputs from an input device to different user interfaces depending on the mode in which the input device is operating in accordance with some embodiments of the disclosure. The embodiments in these figures are used to illustrate the processes described below, including the processes described with reference to FIG. 15. Although FIGS. 14A-14AH illustrate various examples of ways an electronic device is able to perform the processes described below with reference to FIG. 15, it should be understood that these examples are not meant to be limiting, and the electronic device is able to perform one or more processes described below with reference to FIG. 15 in ways not expressly described with reference to FIGS. 14A-14AH.

Figure 5:
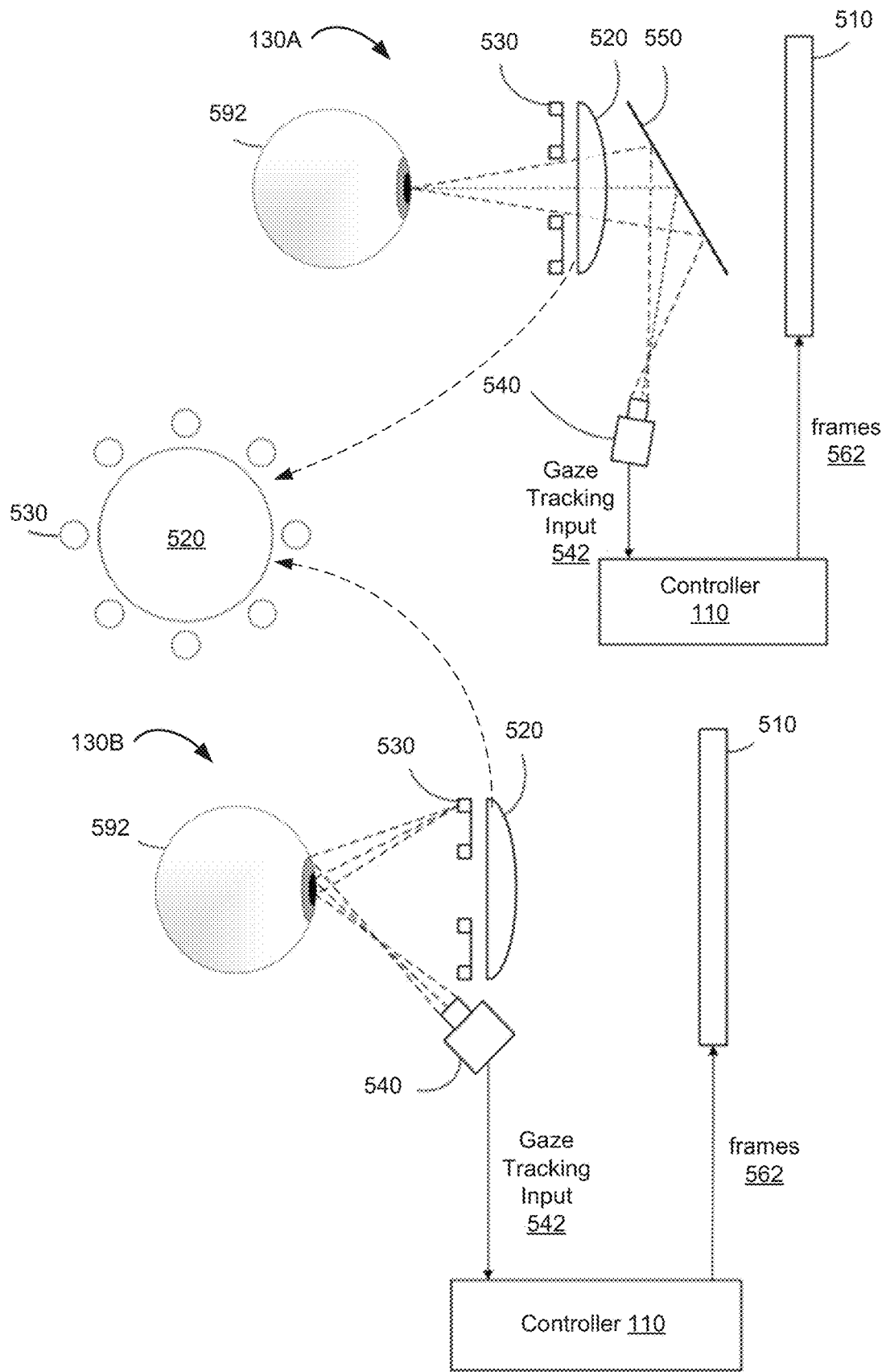
FIG. 5A illustrates a personal electronic device in accordance with some embodiments.
FIG. 5B is a block diagram illustrating a personal electronic device in accordance with some embodiments.
FIGS. 5C-5D illustrate exemplary components of a personal electronic device having a touch-sensitive display and intensity sensors in accordance with some embodiments.
FIGS. 5E-5H illustrate exemplary components and user interfaces of a personal electronic device in accordance with some embodiments.
FIGS. 5I-5L illustrate block diagrams of exemplary architectures for devices according to some embodiments of the disclosure.

FIG. 14A illustrates electronic device 1416 (e.g., corresponding to device 580 described with reference to FIG. 5I) displaying user interface 1401 (e.g., via a display device, via a display generation component, etc.). In some embodiments, user interface 1401 is displayed via a display generation component 1418. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 1416. For example, in FIG. 14A, device 1416 is coupled to display 1418 (e.g., a television, a monitor, etc.) and is configured to display user interface 1401 on display 1418. In some embodiments, device 1416 receives user inputs from a remote control device or a game controller, such as input device 1414 (e.g., corresponding to device 480 described with reference to FIG. 5K). In some embodiments, input device 1414 communicates with device 1416 and provides user inputs to device 1416 wirelessly or via a wired connection. In some embodiments, input device 1414 has one or more of the characteristics of any of the input devices described with reference to FIGS. 5-13.

In FIG. 14A, user interface 1401 (e.g., Application User Interface A) is a user interface of a game or application running on device 1416 (e.g., rather than a user interface of an operating system of device 1416, optionally referred to as a "system user interface"). Further, input device 1414 is in a first mode of operation in which inputs detected at input device 1414 (e.g., directional input detected at direction input element 1404, inputs selecting buttons X, Y, A, B, etc.) are directed to user interface 1401. Input device 1414 also includes indicator 1410 (e.g., an LED indicator) that indicates whether input device 1414 is in the first mode of operation (e.g., indicator 1410 is not emitting light) or is in a second mode of operation (e.g., indicator 1410 is emitting light). In the second mode of operation, inputs detected at input device 1414 are directed to a system user interface of device 1416 rather than a user interface of a game or application installed on device 1416 (e.g., user interface 1401), as will be described in more detail below.

Figure 14B:
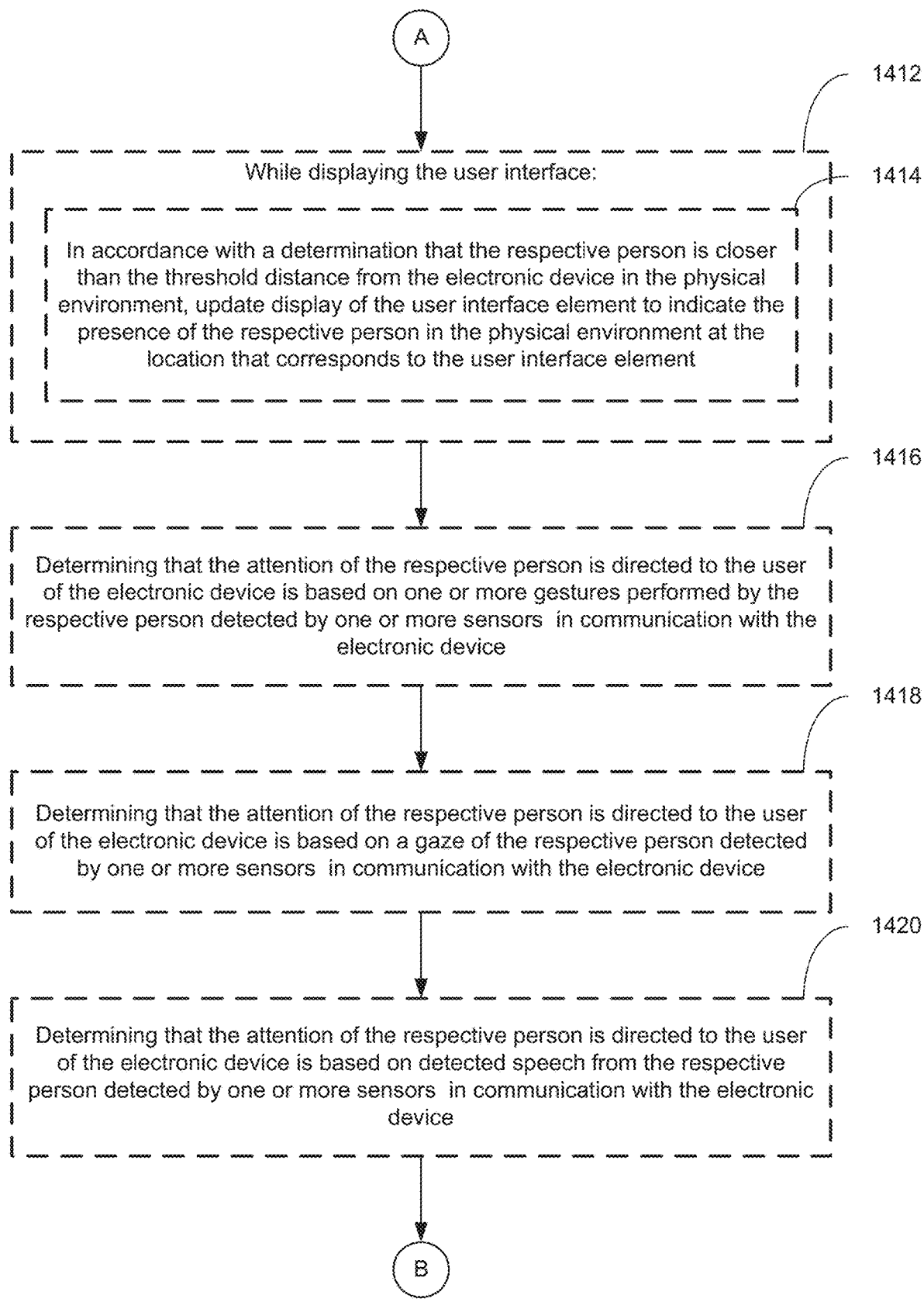

In some embodiments, input device 1414 includes button 1402. Button 1402 is optionally selectable to toggle input device 1414 between the first mode of operation and the second mode of operation. For example, in FIG. 14A, button 1402 is pressed and released (e.g., indicated by hand 1412). In response, input device 1414 optionally transitions to the second mode of operation, as indicated by indicator 1410 in FIG. 14B. Further, device 1416 optionally pauses progress in user interface 1401 (e.g., pauses a game that was being played in user interface 1401), and ceases display of user interface 1401 and instead displays user interface 1403, as shown in FIG. 14B. User interface 1403 is optionally a system user interface of device 1416, such as a notification user interface for viewing and/or interacting with notifications that have been received at device 1416, a control center user interface for controlling one or more functions of device 1416, a home user interface of device 1416 such as described with reference to FIG. 4A, etc. In the second mode of operation, inputs detected at input device 1414 are optionally directed to user interface 1403 (e.g., and not directed to user interface 1401).

In FIG. 14B, button 1402 is pressed and released again (e.g., indicated by hand 1412) while input device 1414 is in the second mode of operation. In response, input device 1414 optionally transitions back to the first mode of operation, as indicated by indicator 1410 in FIG. 14C. Further, device 1416 optionally ceases display of user interface 1403, redisplays user interface 1401 and resumes progress in user interface 1401 (e.g., resumes a game that was being played in user interface 1401), as shown in FIG. 14C.

Figure 14C:
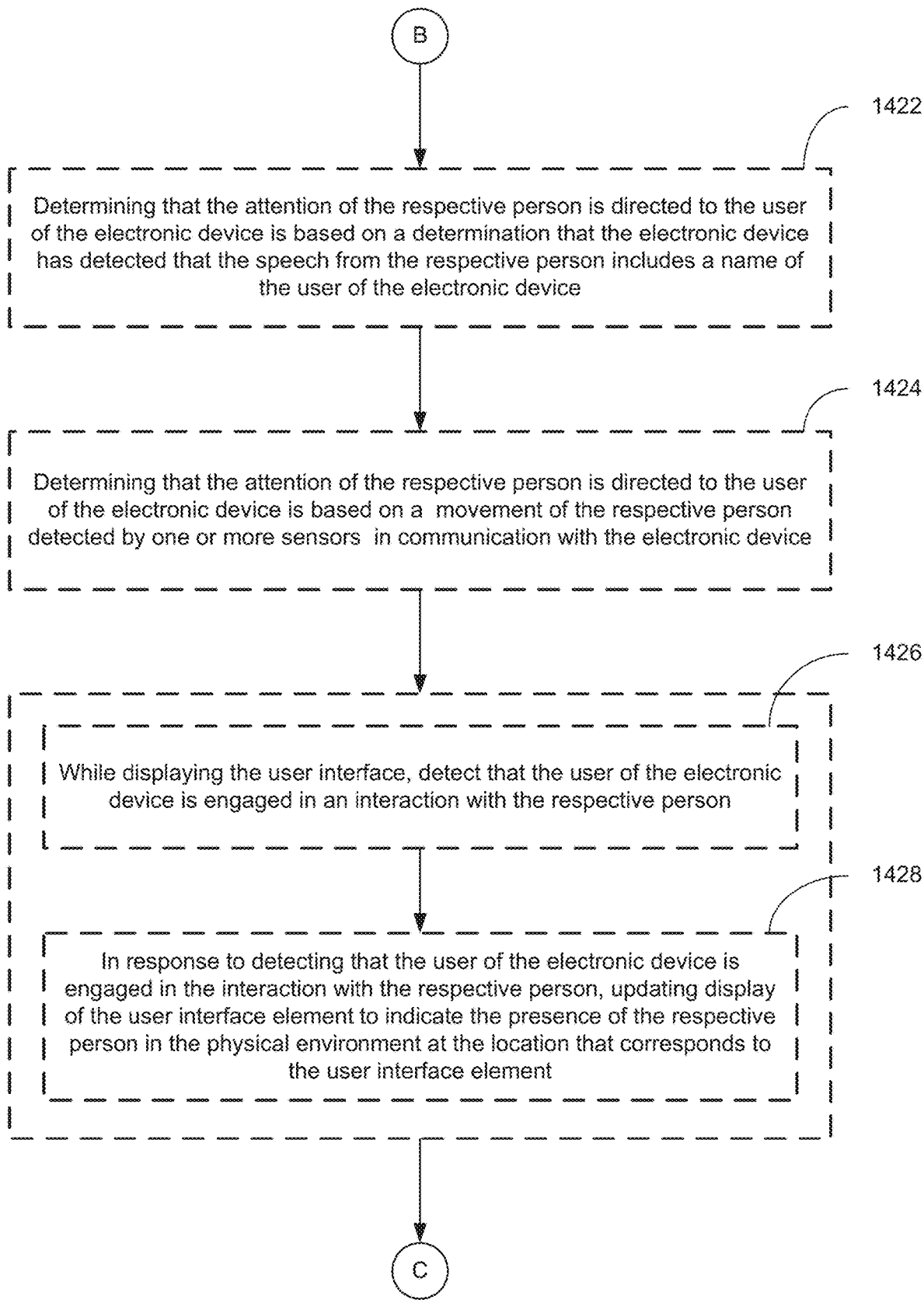

In FIG. 14C, input device 1414 also includes indicator 1406 (e.g., an LED indicator). Indicator 1406 optionally indicates whether an outstanding notification event (e.g., phone call, unread text message, unread email, etc.) is present at device 1416. Indicator 1406 optionally does not emit light when no outstanding notification event is present at device 1416, and does emit light when an outstanding notification event is present at device 1416. In FIG. 14C, indicator 1406 is not emitting light.

Figure 14D:
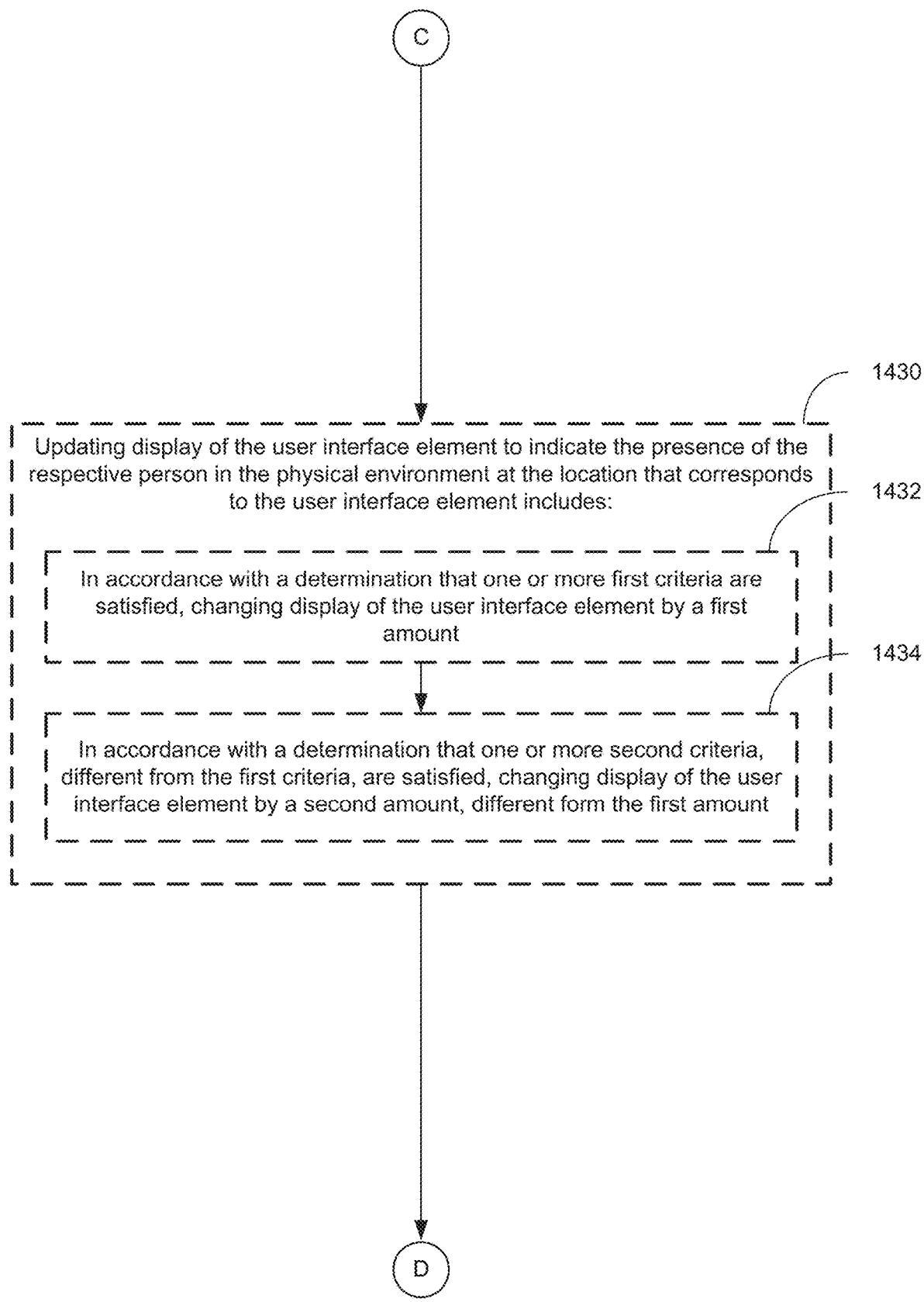
Figure 14E:
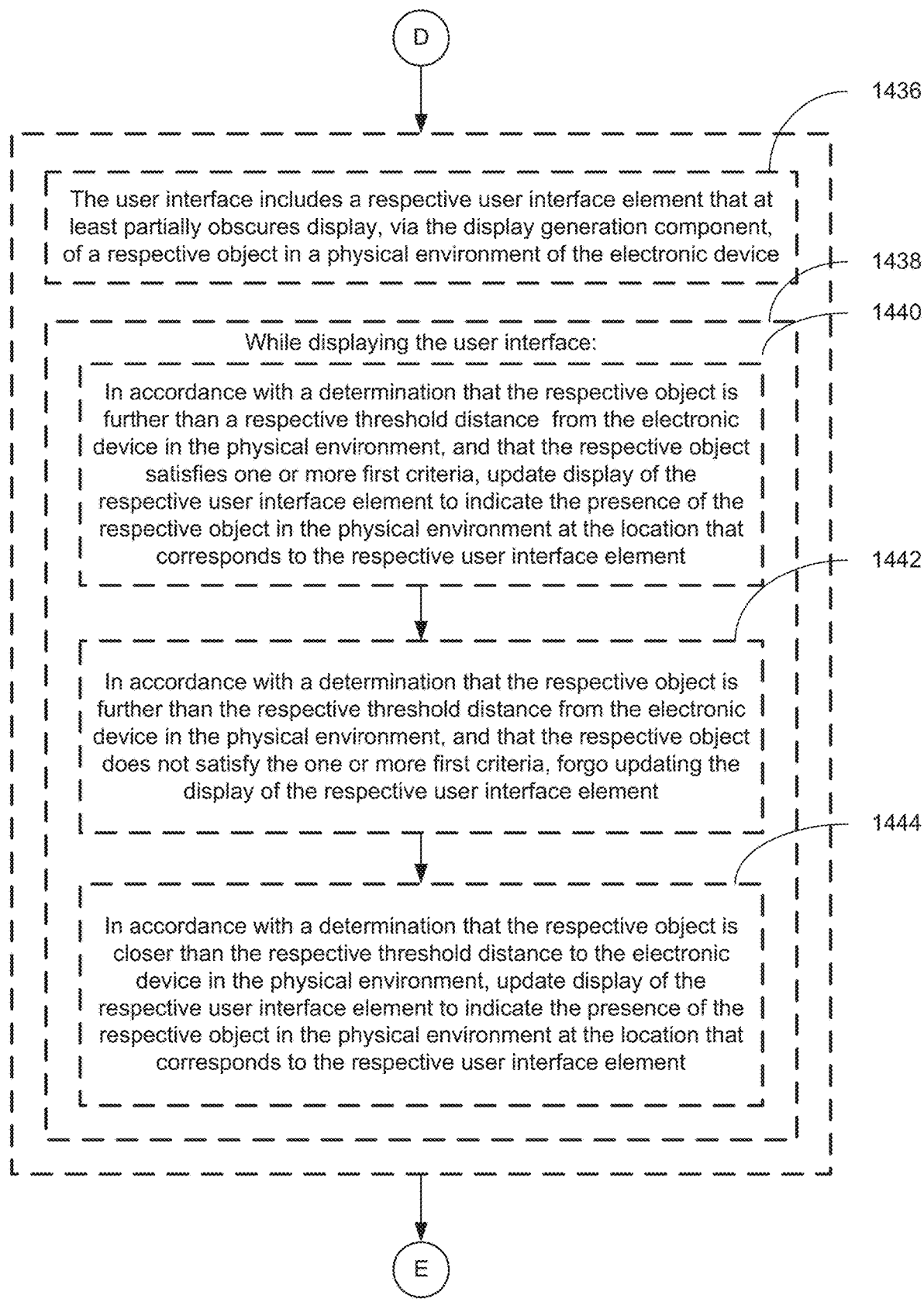

In FIG. 14C, device 1416 detects Incoming Event A (e.g., corresponding to an incoming phone call, an incoming text message, an incoming email, a notification generated by an application installed on device 1416, etc.). In response, as shown in FIG. 14D, input device 1414 activates indicator 1406 to indicate that an outstanding notification event is present at device 1416. Additionally or alternatively to indicator 1406, device 1416 optionally displays, via display 1418, an indication corresponding to Incoming Event A (e.g., indicating and/or including some information about an incoming phone call, an incoming text message, an incoming email, a notification generated by an application installed on device 1416, etc.). Selection of button 1402 while indicator 1406 is activated and/or while device 1416 is displaying an indication via display 1418 corresponding to Incoming Event A optionally causes input device 1414 to transition to the second mode of operation, and device 1416 to display a system user interface from which the notification corresponding to Incoming Event A can be interacted with. Input device 1414 also optionally deactivates indicator 1406 and activates indicator 1410. For example, in response to selection of button 1412 in FIG. 14D, device 1416 displays user interface 1405 (which is optionally a system user interface), as shown in FIG. 14E. User interface 1405 is optionally a notification user interface ("Notification User Interface C") that includes representations of one or more notification events at device 1416, including Incoming Event A. For example, user interface 1405 includes notification 1408a (e.g., corresponding to Incoming Event A), which optionally has the current focus in user interface 1405 as indicated by the dashed line indication, and notification 1408b (e.g., corresponding to a previous notification). In some embodiments, the notification corresponding to the latest notification event at device 1416 automatically has the current focus when user interface 1405 is first displayed. In FIG. 14D, inputs detected at input device 1414 (e.g., directional input detected at direction input element 1404, inputs selecting buttons X, Y, A, B, etc.) are optionally directed to user interface 1405. For example, directional inputs detected at input device 1414 optionally cause the current focus to move from notification 1408a to notification 1408b in accordance with the directional input. Selection of one or more of buttons X, Y, A, B optionally selects the notification that has the current focus (e.g., to display additional information about the notification, to dismiss the notification, to display a user interface and/or application associated with the notification, to take an action related to the notification, etc.).

Figure 14F:
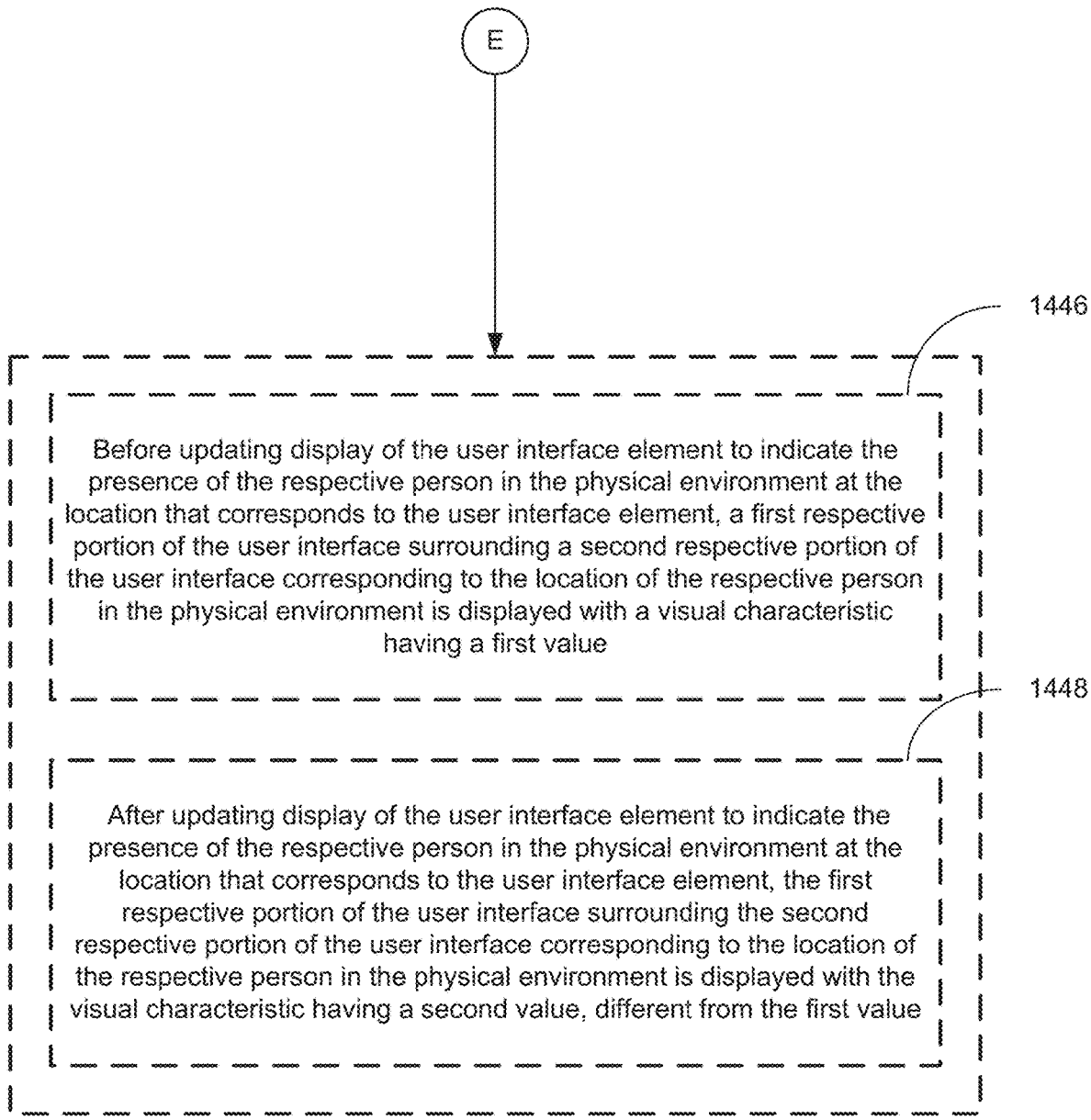

In some embodiments, input device 1414 includes a slider switch (e.g., rather than a toggle button) for transitioning between the first and second modes of operation. For example, in FIG. 14F, input device 1414 includes slider switch 1420 that includes element 1422 that can slide horizontally within slider switch 1420 to different positions that correspond to different modes of operation. In some embodiments, element 1422 is biased (e.g., with a spring) towards a first position in slider switch 1420 (e.g., the right-most position illustrated in FIG. 14F) such that if no input/force is being provided to element 1422, it automatically moves to the first position. The first position is optionally associated with the first mode of operation. Thus, as shown in FIG. 14F, input device 1414 is in the first mode of operation, and device 1416 is displaying user interface 1416. In FIG. 14F, device 1416 detects Incoming Event A (e.g., corresponding to an incoming phone call, an incoming text message, an incoming email, a notification generated by an application installed on device 1416, etc.). In response, as shown in FIG. 14G, input device 1414 activates indicator 1406 to indicate that an outstanding notification event is present at device 1416. Additionally or alternatively to indicator 1406, device 1416 optionally displays, via display 1418, an indication corresponding to Incoming Event A (e.g., indicating and/or including some information about an incoming phone call, an incoming text message, an incoming email, a notification generated by an application installed on device 1416, etc.).

In FIG. 14H, input device 1414 detects element 1422 being moved to a second, middle position in slider switch 1420 (e.g., via hand 1412). In response, input device 1414 transitions to the second mode of operation and deactivates indication 1406, device 1416 pauses progress in user interface 1401, and device 1416 concurrently displays (at least a portion of) user interface 1401 and user interface 1407 (e.g., a system user interface), which is overlaid on user interface 1401. User interface 1407 optionally slides into display 1418 in the same direction as and/or in accordance with the movement of element 1422 from right to left in slider switch 1420. As long as element 1422 remains at the second position in slider switch 1420, input device 1414 optionally remains in the second mode of operation, and device 1416 optionally displays user interface 1407 overlaid on user interface 1401. User interface 1407 is optionally a notification user interface ("Notification User Interface C") that includes representations of one or more notification events at device 1416, including Incoming Event A. For example, user interface 1407 includes notification 1424a (e.g., corresponding to Incoming Event A), which optionally has the current focus in user interface 1407 as indicated by the dashed line indication, and notification 1424b (e.g., corresponding to a previous notification). In some embodiments, the notification corresponding to the latest notification event at device 1416 automatically has the current focus when user interface 1407 is first displayed. In FIG. 14H, inputs detected at input device 1414 (e.g., directional input detected at direction input element 1404, inputs selecting buttons X, Y, A, B, etc.) are optionally directed to user interface 1407, and not to user interface 1401. For example, directional inputs detected at input device 1414 optionally cause the current focus to move from notification 1424a to notification 1424b in accordance with the directional input. Selection of one or more of buttons X, Y, A, B optionally selects the notification that has the current focus (e.g., to display additional information about the notification, to dismiss the notification, to display a user interface and/or application associated with the notification, to take an action related to the notification, etc.).

In FIG. 14I, input device 1414 detects element 1422 move back to the first position in slider switch 1420. In response, device 1414 transitions back to the first mode of operation, and device 1416 ceases display of user interface 1407. In some embodiments, user interface 1407 slides off display 1418 in the same direction of travel as the travel of element 1422 from the second position to the first position in slider switch 1420 (e.g., rightward). In FIG. 14I, device 1416 also fully redisplays user interface 1401 and resumes progress in user interface 1401 (e.g., resumes a game that was being played in user interface 1401).

In some embodiments, device 1416 displays different user interfaces associated with different types of communications. For example, in FIG. 14J, device 1416 detects an incoming call (e.g., phone call, video call, etc.) while displaying user interface 1401 and while input device 1414 is in the first mode of operation. In response, input device 1414 activates indicator 1406. In FIG. 14K, input device 1414 detects element 1422 being moved to the second position in slider switch 1420 (e.g., via hand 1412). In response, input device 1414 transitions to the second mode of operation and deactivates indication 1406, device 1416 pauses progress in user interface 1401, and device 1416 concurrently displays (at least a portion of) user interface 1401 and user interface 1409 (e.g., a system user interface), which is overlaid on user interface 1401. User interface 1409 optionally slides into display 1418 in the same direction as and/or in accordance with the movement of element 1422 from right to left in slider switch 1420. As long as element 1422 remains at the second position in slider switch 1420, input device 1414 optionally remains in the second mode of operation, and device 1416 optionally displays user interface 1409 overlaid on user interface 1401. User interface 1409 is optionally a phone or video call user interface. User interface 1409 includes information about the user initiating the call (e.g., name, phone number, email address, etc. for Megan), indication 1426a that indicates moving element 1422 leftward in slider switch 1420 (e.g., to a third position in slider switch) will cause device 1416 to answer the call, and indication 1426b that indicates moving element 1422 rightward in slider switch 1420 (e.g., to the first position in slider switch) will cause device 1416 to decline the call.

For example, in FIG. 14L, input device 1414 detects element 1422 move to the third position in slider switch 1420. In response, input device 1414 remains in the second mode of operation, and device 1416 ceases display of user interface 1401, answers the call, and displays user interface 1421. User interface 1421 is optionally an expanded call user interface that includes the information included in user interface 1409, but also includes additional information about the call and/or options for interacting with the call. For example, in FIG. 14L, user interface 1421 includes the name and phone number of Megan, an indication of the duration of the call (e.g., "01:45"), and selectable options 1428. Option 1428a is optionally selectable to mute the audio provided to the call by device 1416, option 1428b is optionally selectable to cause device 1416 to display a number pad on display 1418, option 1428c is optionally selectable to cause device 1416 to display audio options for the call, option 1428d is optionally selectable to add one or more additional users to the call, option 1428e is optionally selectable to convert the call into a video call, and option 1428f is optionally selectable to cause device 1416 to display a list of contacts of the user of device 1416 on display 1418. In FIG. 14L, option 1428a has the current focus as indicated by the dashed line indication. In FIG. 14L, inputs detected at input device 1414 (e.g., directional input detected at direction input element 1404, inputs selecting buttons X, Y, A, B, etc.) are optionally directed to user interface 1421. For example, directional inputs detected at input device 1414 optionally cause the current focus to move from option 1428a to option 1428e in accordance with the directional input. Selection of one or more of buttons X, Y, A, B optionally selects the option that has the current focus.

In FIG. 14L, if input device 1414 detects movement of element 1422 to the first position in slider switch 1420, input device 1414 optionally transitions back to the first mode of operation, and device 1416 optionally ceases display of user interface 1421, as shown in FIG. 14M. In some embodiments, user interface 1421 slides off display 1418 in the same direction of travel as the travel of element 1422 from the third position to the first position in slider switch 1420 (e.g., rightward). In FIG. 14M, device 1416 also fully redisplays user interface 1401 and resumes progress in user interface 1401 (e.g., resumes a game that was being played in user interface 1401). Device 1416 also optionally ends the call.

Similarly, in FIG. 14K, if input device 1414 detects movement of element 1422 to the first position in slider switch 1420, input device 1414 optionally transitions back to the first mode of operation, and device 1416 optionally ceases display of user interface 1409, as shown in FIG. 14M. In some embodiments, user interface 1409 slides off display 1418 in the same direction of travel as the travel of element 1422 from the second position to the first position in slider switch 1420 (e.g., rightward). In FIG. 14M, device 1416 also fully redisplays user interface 1401 and resumes progress in user interface 1401 (e.g., resumes a game that was being played in user interface 1401). Device 1416 also optionally declines the call without connecting to the call.

As another example of a different type of communication, in FIG. 14N, device 1416 detects an incoming message (e.g., text message, email, etc.) while displaying user interface 1401 and while input device 1414 is in the first mode of operation. In response, input device 1414 activates indicator 1406. In FIG. 14O, input device 1414 detects element 1422 being moved to the second position in slider switch 1420 (e.g., via hand 1412). In response, input device 1414 transitions to the second mode of operation and deactivates indication 1406, device 1416 pauses progress in user interface 1401, and device 1416 concurrently displays (at least a portion of) user interface 1401 and user interface 1411 (e.g., a system user interface), which is overlaid on user interface 1401. User interface 1411 optionally slides into display 1418 in the same direction as and/or in accordance with the movement of element 1422 from right to left in slider switch 1420. As long as element 1422 remains at the second position in slider switch 1420, input device 1414 optionally remains in the second mode of operation, and device 1416 optionally displays user interface 1411 overlaid on user interface 1401. User interface 1409 is optionally a messaging user interface. In FIG. 14O, inputs detected at input device 1414 (e.g., directional input detected at direction input element 1404, inputs selecting buttons X, Y, A, B, etc.) are optionally directed to user interface 1411, and not to user interface 1401. For example, directional inputs detected at input device 1414 optionally cause the current focus to move from option 1432a to option 1432b in accordance with the directional input. Selection of one or more of buttons X, Y, A, B optionally selects the option that has the current focus.

In FIG. 14O, user interface 1411 includes information about the user who sent the message (e.g., name, phone number, email address, etc. for Megan), indication 1430 that includes the content of the sent message (e.g., "Let's go to dinner!"), and selectable options 1432 that are selectable to respond to the message. User interface 1411 also includes option 1434 that is selectable to cease display of user interface 1411 without responding to the message. Option 1432a is optionally selectable to respond to the message with a first suggested response (e.g., "Sorry, can't."), option 1432b is optionally selectable to respond to the message with a second suggested response (e.g., "Yes please!"), and option 1432c is optionally selectable to provide input via input device 1414 to specify a different, custom response to the message. In FIG. 14O, option 1432a has the current focus as indicated by the dashed line indication. In FIG. 14O, moving element 1422 rightward in slider switch 1420 (e.g., to the first position in slider switch 1420) will optionally cause device 1416 to select the option that has the current focus (e.g., and perform the corresponding operation), and to cease display of user interface 1411.

In FIG. 14P, input device 1414 has detected a downward directional input (e.g., from input device 1414) that causes the current focus to move to option 1432b. In FIG. 14Q, input device 1414 detects element 1422 move back to the first position in slider switch 1420. In response, device 1414 transitions back to the first mode of operation, and device 1416 ceases display of user interface 1411. In some embodiments, user interface 1411 slides off display 1418 in the same direction of travel as the travel of element 1422 from the second position to the first position in slider switch 1420 (e.g., rightward). In FIG. 14Q, device 1416 also fully redisplays user interface 1401 and resumes progress in user interface 1401 (e.g., resumes a game that was being played in user interface 1401). Device 1416 also transmits a response to the sender of the incoming message in FIG. 14N, the response corresponding to the option that had focus in user interface 1411 when the input device 1414 detected element 1422 move back to the first position in slider switch 1420. In FIG. 14P, that option was option 1432b, which corresponds to the response "Yes please!"—therefore, in FIG. 14Q, device 1416 transmits the response "Yes please!" to the sender of the incoming message.

In some embodiments, one or more buttons on input device 1414 correspond to one or more selectable elements displayed by device 1416 such that a selection of a button on input device 1414 corresponds to selection of the corresponding selectable element displayed by device 1416. Therefore, in some embodiments it can be helpful for device 1416 and/or input device 1414 to indicate such correspondence. For example, in FIG. 14R, device 1416 is displaying two selectable elements 1436a and 1436b in user interface 1401. In some embodiments, user interface 1401 is a system user interface, though in FIG. 14R, user interface 1401 is an application user interface as previously described. In FIG. 14S, input device 1414 detects a press and hold of button 1402. In response, for the duration of the hold of button 1402, device 1416 optionally updates display of selectable elements 1436a and 1436b to indicate which buttons on input device 1414 correspond to elements 1436a and 1436b. For example, device 1416 displays element 1436a in association with indication 1438a that indicates that the "X" button on input device 1414 corresponds to element 1436a (e.g., selection of the "X" button on input device 1414 will result in selection of element 1436a), and device 1416 displays element 1436b in association with indication 1438b that indicates that the "A" button on input device 1414 corresponds to element 1436b (e.g., selection of the "A" button on input device 1414 will result in selection of element 1436b). In some embodiments, device 1416 displays indications 1438a, b for as long as button 1402 is held—in some embodiments, button 1402 need not be held, and device 1416 displays indications 1438a, b for a predetermined amount of time (e.g., 1, 2, 3, 5, 10, 15, 20, or 30 seconds) after button 1402 is selected.

In some embodiments, device 1416 alters the visual appearance of elements 1436a and/or 1436b to match the visual appearance of the "X" and "A" buttons on input device 1414 that correspond, respectively, to elements 1436a and 1436b. For example, in FIG. 14T, the "X" button has a first visual appearance (e.g., color, shape, and/or brightness, etc.), and the "A" button has a second visual appearance (e.g., color, shape, and/or brightness, etc.), optionally different from the first visual appearance. In FIG. 14T, elements 1436a and 1436b do not have the visual appearances of the "X" and "A" buttons, respectively. In FIG. 14U, input device 1414 detects a press and hold of button 1402 or a selection of button 1402. In response, device 1416 optionally updates display of selectable elements 1436a and 1436b to have the first and second visual appearances, respectively, as shown in FIG. 14U. For example, device 1416 displays element 1436a with the first visual appearance corresponding to the "X" button, and device 1416 displays element 1436b with the second visual appearance corresponding to the "A" button. In some embodiments, device 1416 maintains the first and second visual appearances for elements 1436a, b for as long as button 1402 is held—in some embodiments, button 1402 need not be held, and device 1416 displays elements 1436a, b with the first and second visual appearances for a predetermined amount of time (e.g., 1, 2, 3, 5, 10, 15, 20, or 30 seconds) after button 1402 is selected.

In some embodiments, input device 1414 alters the visual appearance of the "X" and "A" buttons to match the visual appearance of the elements 1436a and/or 1436b that correspond, respectively, to the "X" and "A" buttons. For example, in FIG. 14V, element 1436a has a first visual appearance (e.g., color, shape, and/or brightness, etc.), and element 1436b has a second visual appearance (e.g., color, shape, and/or brightness, etc.), optionally different from the first visual appearance. In FIG. 14V, the "X" and "A" buttons do not have the visual appearances of elements 1436a and 1436b, respectively. In FIG. 14W, input device 1414 detects a press and hold of button 1402 or a selection of button 1402. In response, input device 1414 optionally updates the "X" and "A" buttons to have the first and second visual appearances, respectively. For example, device 1414 updates the "X" button to have the first visual appearance corresponding to element 1436a, and device 1414 updates the "A" button to have the second visual appearance corresponding to element 1436b. In some embodiments, device 1414 maintains the first and second visual appearances for the "X" and "A" buttons for as long as button 1402 is held—in some embodiments, button 1402 need not be held, and device 1414 maintains the "X" and "A" buttons with the first and second visual appearances for a predetermined amount of time (e.g., 1, 2, 3, 5, 10, 15, 20, or 30 seconds) after button 1402 is selected.

In some embodiments, input device 1414 includes an integrated display or other mechanism for selectively displaying indications of functionalities associated with the buttons included in input device 1414. For example, in FIG. 14X, the "X" and "A" buttons on input device 1414 are not displayed in association with indications of elements 1436a or 1436b, respectively, or with functionality or operations associated with elements 1436a or 1436b, respectively. In FIG. 14Y, input device 1414 detects a press and hold of button 1402 or a selection of button 1402. In response, input device 1414 optionally displays indications 1440a and 1440b in association with the "X" and "A" buttons, respectively (e.g., proximate to their corresponding buttons, connected to their corresponding buttons with a line or other visual element, and/or surrounding their corresponding buttons, etc.). Indication 1440a optionally indicates an association with element 1436a (e.g., "M" for "Messaging"), and indication 1440b optionally indicates an association with element 1436b (e.g., "F" for "Friends"). Other indications of associations are also possible. In some embodiments, device 1414 maintains display of indications 1440*a* and 1440*b* for as long as button 1402 is held—in some embodiments, button 1402 need not be held, and device 1414 maintains display of indications 1440*a* and 1440*b* for a predetermined amount of time (e.g., 1, 2, 3, 5, 10, 15, 20, or 30 seconds) after button 1402 is selected.

In some embodiments, input device 1414 is configurable to control one or more of a plurality of target electronic devices (e.g., that are the same or similar to device 1416). Which target device input device 1414 is currently configured to control is optionally designated by the user as will be described below. In FIG. 14Z, device 1414 is projecting a device selection user interface 1417. User interface 1417 is optionally a user interface from which a user can select a target device to be controlled by device 1414. For example, user interface 1417 includes option 1442*a* that is selectable to cause device 1414 to control device 1416*a* ("Device A"), and option 1442*b* that is selectable to cause device 1414 to control device 1416*b* ("Device B"). While device 1414 is configured to control device 1416*a*, inputs detected at device 1414 are optionally transmitted to device 1416*a* and not to device 1416*b*. Similarly, while device 1414 is configured to control device 1416*b*, inputs detected at device 1414 are optionally transmitted to device 1416*b* and not to device 1416*a*. In FIG. 14Z, option 1442*a* has the current focus (e.g., as indicated by the dashed-line indicator). While displaying user interface 1417, directional inputs detected at device 1414 optionally move the current focus from one option to another in user interface 1417 (and are optionally not transmitted to devices 1416*a* and/or 1416*b*), and selection inputs detected at device 1414 (e.g., selection of the X, A, B and/or Y buttons) optionally cause selection of the option that has the current focus (e.g., without transmitting a corresponding command to devices 1416*a* and/or 1416*b*).

In some embodiments, device 1414 projects user interface 1417 on a surface such that user interface 1417 is aligned with a target electronic device and/or a display of a target electronic device. For example, in FIG. 14Z, device 1414 is oriented towards device 1416*a* and/or display 1418*a*—as such, device 1414 projects user interface 1417 on a surface and aligned with display 1418*a* (e.g., to the right of display 1418*a*, above display 1418*a*, etc.). In FIG. 14AA, device 1414 changes to be oriented towards device 1416*b* and/or display 1418*b*—as such, device 1414 projects user interface 1417 on a surface and aligned with display 1418*b* (e.g., to the left of display 1418*b*, above display 1418*b*, etc.).

As previously described, in some embodiments, device 1414 includes a display (e.g., a touch screen). In such embodiments, device 1414 optionally displays a map user interface 1444 on device 1414 for selecting a target device to be controlled by device 1414, as shown in FIG. 14AB. Map user interface 1444 optionally includes one or more of a representation 1446*a* of device 1416*a*, a representation 1446*b* of device 1416*b*, or a representation 1448 of device 1414. Representations 1446*a*, 1446*b* and/or 1448 are optionally arranged within user interface 1444 relative to one another in a manner that corresponds to the arrangements of device 1416*a*, 1416*b* and device 1414 in the physical environment of device 1414. For example, because device 1416*b* is in front of and to the right of device 1414 in the physical environment, representation 1446*b* is displayed as in front of and to the right of representation 1448 in user interface 1444. Representation 1446*a* is optionally selectable to cause device 1414 to control device 1416*a*, and representation 1446*b* is optionally selectable to cause device 1414 to control device 1416*b*.

For example, in FIG. 14AC, device 1414 detects selection of representation 1446*b*. In response, device 1414 optionally becomes configured to control device 1416*b*, as shown in FIG. 14AD. Further, in some embodiments, when device 1414 is configured to control a particular target device, device 1414 displays an image, content, background, etc. on device 1414 that corresponds to or is the same as the image, content, background, etc. being displayed by the target device. For example, in FIG. 14AD, device 1416*b* is displaying user interface 1415*b* with a background Background 2. Therefore, device 1414 is also displaying Background 2, as shown in FIG. 14AD. If device 1414 were instead configured to control device 1416*a*, as shown in FIG. 14AE, device 1414 would optionally display Background 1, which is optionally the background displayed in user interface 1415*a* being displayed by device 1416*a*.

In some embodiments, particular buttons in device 1414 are mapped to specific target devices for control such that selection of a particular button causes device 1414 to be configured to control the target device corresponding to that button. For example, in FIG. 14AF, the "X" button on device 1414 is selectable to cause device 1414 to be configured to control device 1416*a*, and the "A" button on device 1414 is selectable to cause device 1414 to be configured to control device 1416*b*. In some embodiments, device 1414 displays indications of devices 1416*a* and 1416*b* in association with the "X" and "A" buttons to indicate that selection of those buttons will cause device 1414 to be configured to control their corresponding target devices. For example, in FIG. 14AF, device 1414 is displaying an "A" indication in association with and/or connected to the "X" button (e.g., corresponding to device 1416*a*), and a "B" indication in association with and/or connected to the "A" button (e.g., corresponding to device 1416*b*).

In some embodiments, device 1414 selects a target device for control when it is oriented towards that target device. For example, in FIG. 14AG, device 1414 is oriented towards device 1416*a*—as such, device 1414 is configured to control device 1416*a* (e.g., indicated by Background 1 displayed on device 1414). In contrast, in FIG. 14AH, device 1414 is oriented towards device 1416*b*—as such, device 1414 is configured to control device 1416*b* (e.g., indicated by Background 2 displayed on device 1414). In some embodiments, device 1414 is required to be oriented towards a target device for at least a threshold time period (e.g., 0.1, 0.3, 0.5, 1, 2, 3, 5, 10, or 20 seconds) before becoming configured to control that target device; in some embodiments, device 1414 becomes configured to control that target device as soon as it is oriented towards the target device.

Figure 15A:
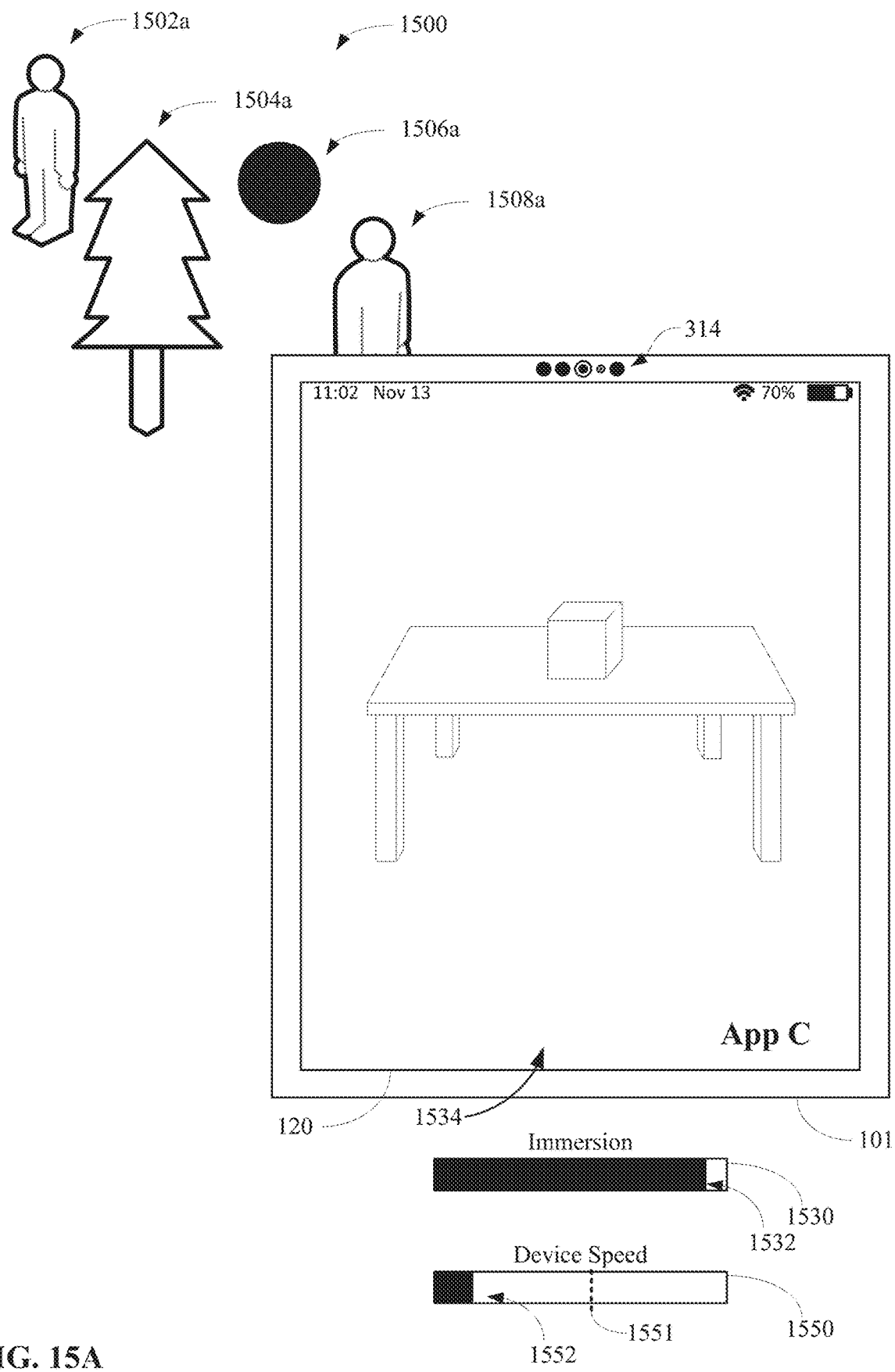
FIG. 15 is a flow diagram illustrating a method of directing inputs from an input device to different user interfaces depending on the mode in which the input device is operating in accordance with some embodiments.
Figure 15B:
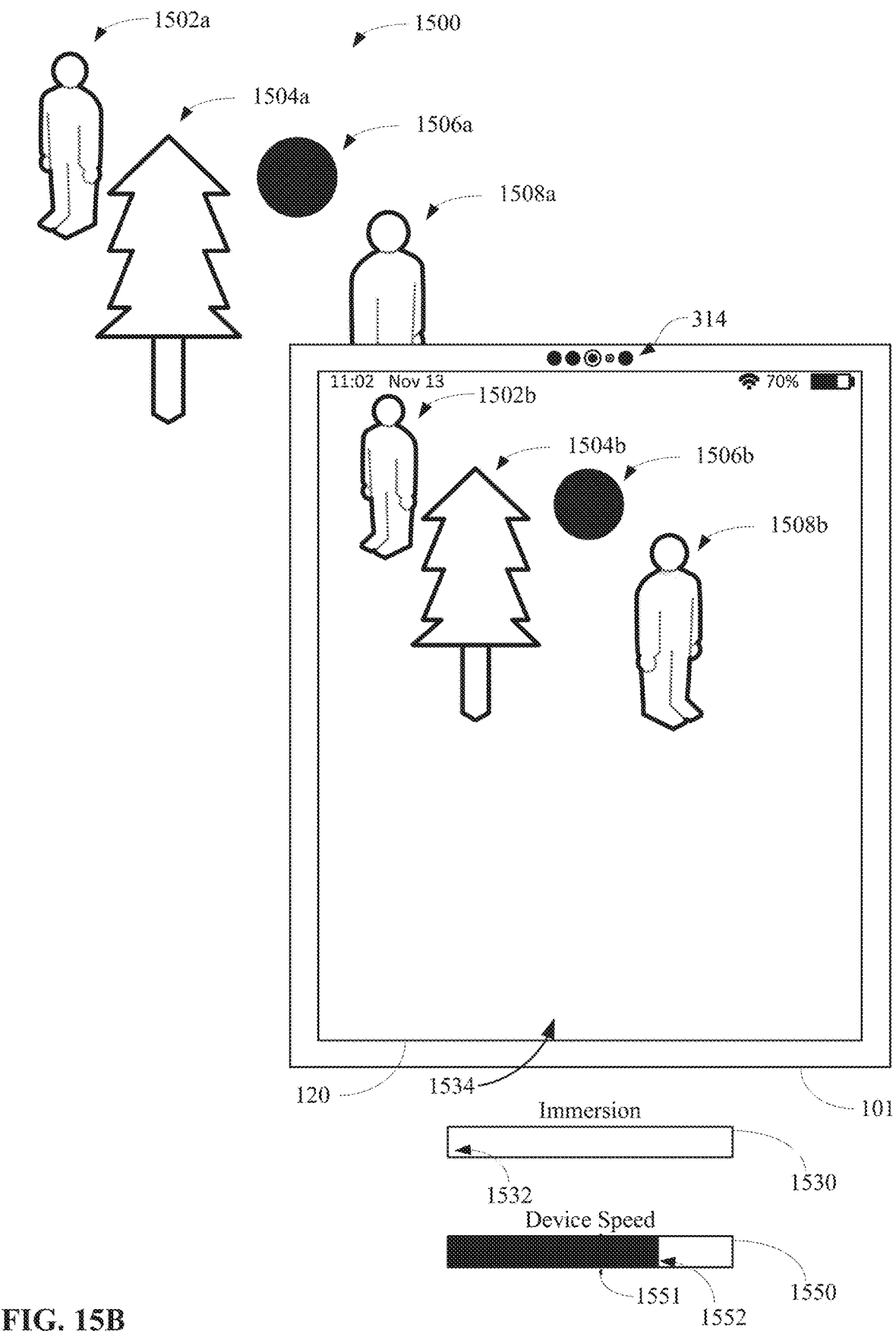
Figure 15C:
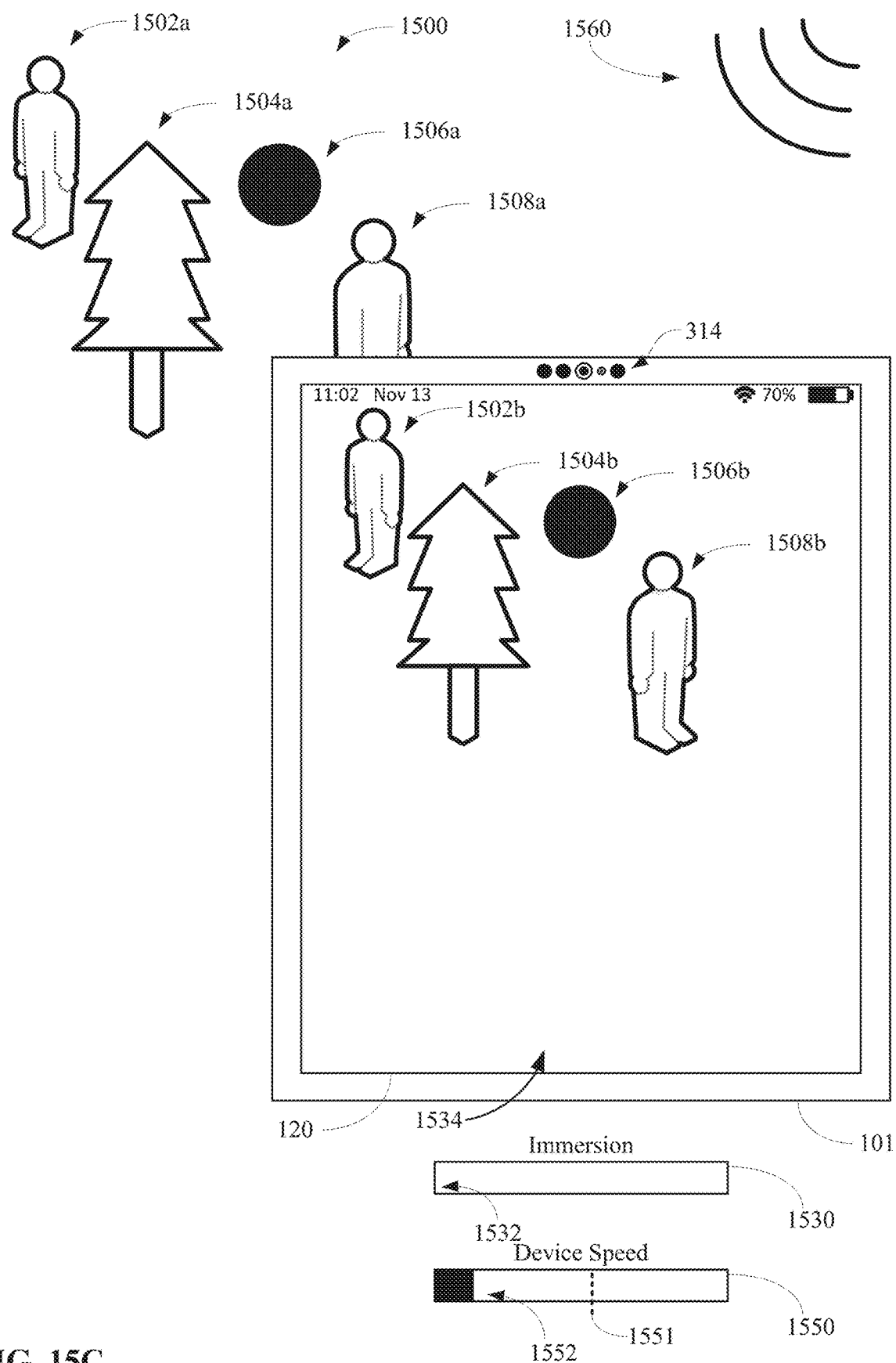
Figure 16A:
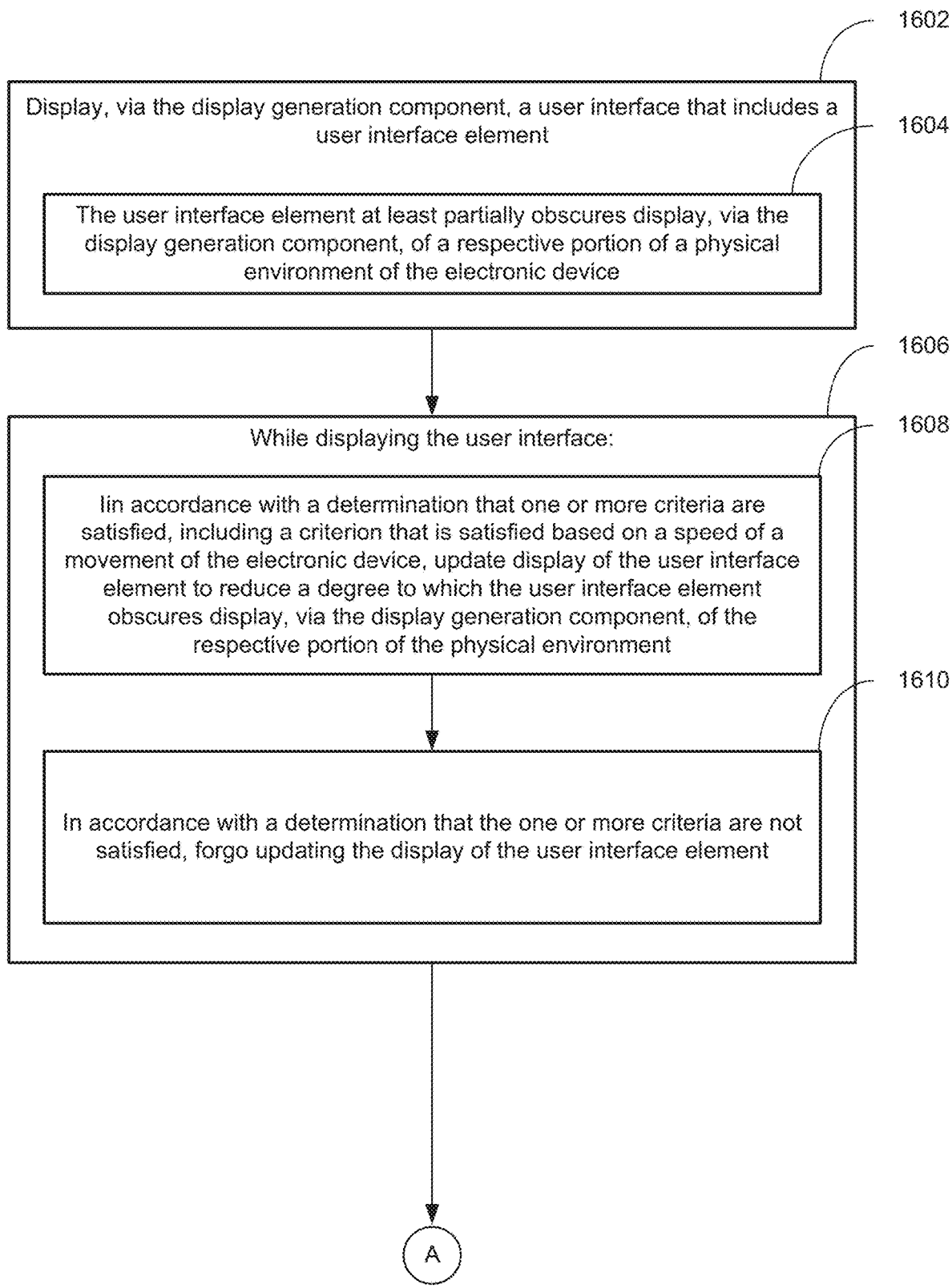
Figure 16B:
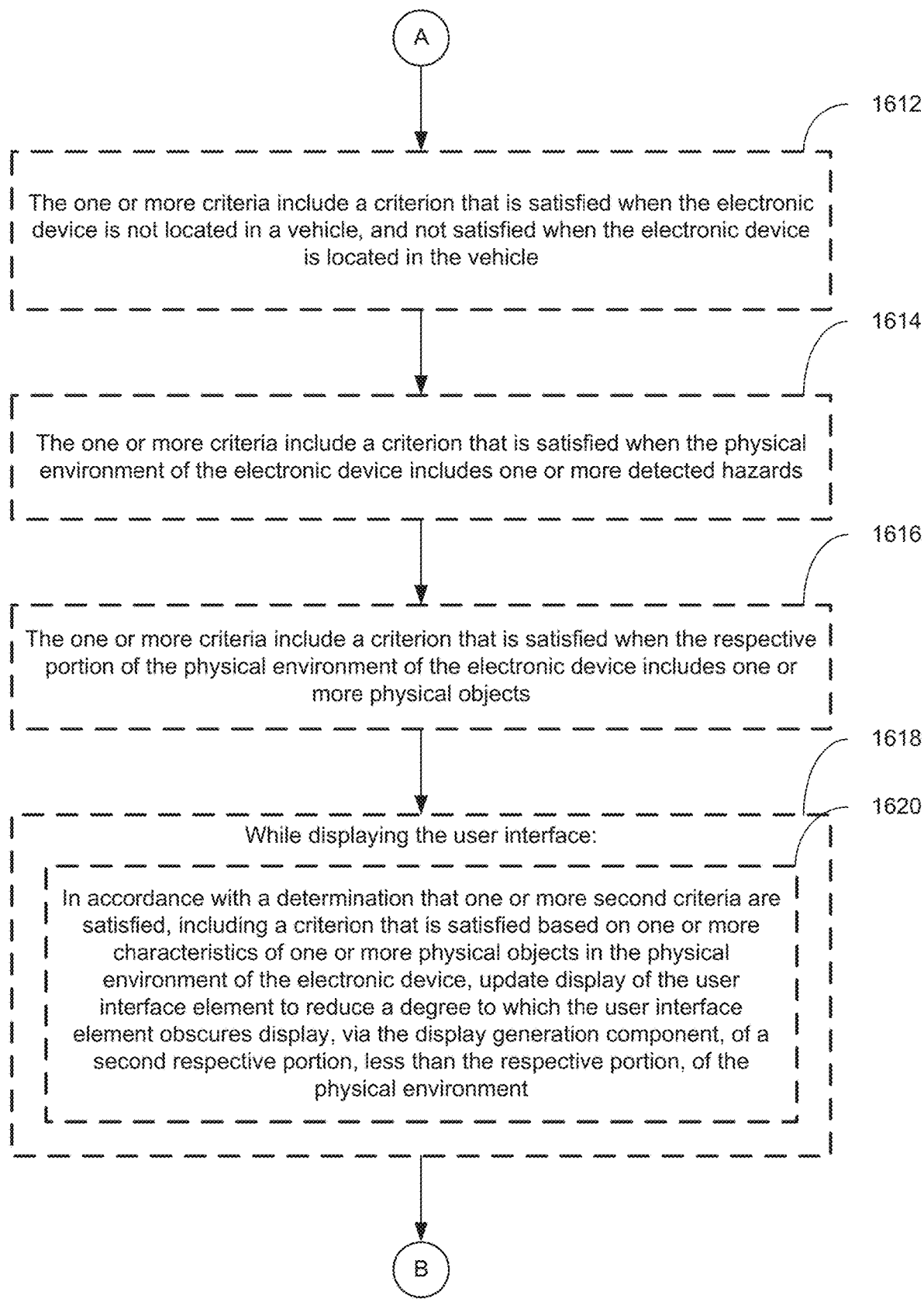
Figure 16C:
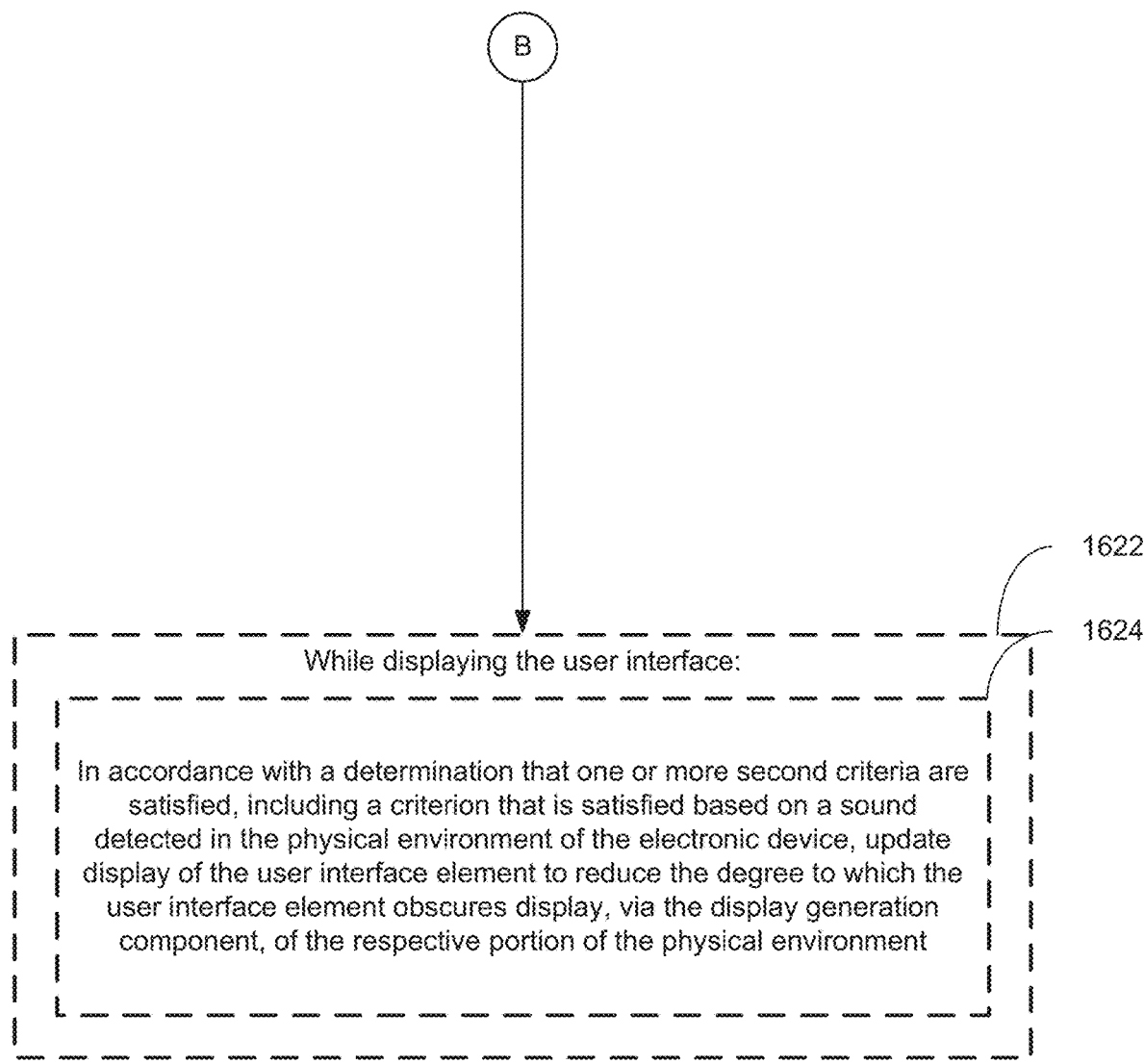

FIG. 15 is a flow diagram illustrating a method 1500 of directing inputs from an input device to different user interfaces depending on the mode in which the input device is operating in accordance with some embodiments of the disclosure. The method 1500 is optionally performed at an electronic device such as device 100, device 300, and device 500, and device 580 as described above with reference to FIGS. 1A-1B, 2-3, 4A-4B and 5A-5I. Some operations in method 1500 are, optionally combined and/or the order of some operations is, optionally, changed.

As described below, the method 1500 is directed to directing inputs from an input device to different user interfaces depending on the mode in which the input device is operating. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 1500 is performed at an electronic device (e.g., device 1416) in communication with a display generation component and one or more input devices, including a respective input device. For example, the electronic device is a mobile device (e.g., a tablet, a smartphone, a media player, or a wearable device), a set-top box, or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the respective input device is a multifunction device that is able to run one or more applications and display user interfaces associated with those applications. In some embodiments, the respective input device is a controller device that provides inputs to a multifunction device, such as the electronic device, that is able to run one or more applications and display user interfaces associated with those applications. In some embodiments, the respective input device is a device separate from the electronic device and is capable of receiving one or more user inputs via one or more input mechanisms and provide user inputs to the electronic device (e.g., via a wired or wireless communication channel). In some embodiments, the respective input device includes a display generation component (e.g., a touch screen display, a projector, or any other hardware component capable of causing a user interface to be visible to one or more users, etc.). In some embodiments, the respective input device is a device that is capable of being attached to the electronic device (e.g., a case that includes a remote control for providing input to the electronic device), or is a dedicated remote control device (optionally with an integrated touch screen display) that provides input to the electronic device for interacting with the electronic device, such as described with reference to methods 700, 900, 1100 and/or 1300.

In some embodiments, the electronic device displays (1502a), via the display generation component, a first user interface of an application on the electronic device, wherein the first user interface is not a system user interface of the electronic device, such as user interface 1401 in the FIG. 14 series. For example, displaying a user interface of a game or other application installed on the electronic device, such as a sports game or a content (e.g., movie, music, television show, video, etc.) browsing and/or playback application. In some embodiments, the first user interface is a user interface generated and/or displayed by the application installed (e.g., by the user) on the electronic device, and is not a user interface generated and/or displayed by the operating system of the electronic device, such as a notification user interface that is displayed by the electronic device in response to or after a notification event at the electronic device (e.g., displaying a notification, overlaid on the first user interface, including the content of a text message when the electronic device receives a text message, displaying a notification, overlaid on the first user interface, indicating the publication of a news story when the electronic device receives an indication of the publication of the news story, etc.

In some embodiments, while displaying the first user interface, the electronic device receives (1502b), via the respective input device, a first input (e.g., for example a directional input detected at the respective input device, such as an up/down/left/right input detected at a d-pad or touch-sensitive surface at the respective input device). In some embodiments, the first input does not define or indicate whether it is directed to a particular user interface displayed by the electronic device, or whether it is directed to a particular region of the user interface(s) displayed by the electronic device. Thus, in some embodiments, the first input is not an input that controls an input element such as a cursor. In some embodiments, the first input is merely a selection input (e.g., for causing selection of an element in the user interface that has a current focus) or a directional input (e.g., for moving a current focus in the user interface from its current position to another position in the user interface).

In some embodiments, in response to receiving the first input (1502c), in accordance with a determination that the respective input device is in a first mode of operation (e.g., a mechanical switch on the respective input device or a user-controllable setting associated with the respective input is set such that inputs from the respective input device will be directed to the first user interface and not directed to a system user interface displayed by the electronic device), the electronic device provides (1502d) the first input to the first user interface of the application, such as described with reference to FIG. 14A (e.g., the input detected at the respective input device causes a corresponding action to be performed in the first user interface, and no action to be performed in a system user interface displayed by the electronic device). In some embodiments, in accordance with a determination that the respective input device is in a second mode of operation, different from the first mode of operation (e.g., a mechanical switch on the respective input device or a user-controllable setting associated with the respective input is set such that inputs from the respective input device will be directed to a system user interface displayed by the electronic device and not directed to the first user interface), the electronic device provides (1502e) the first input to a second user interface without providing the first input to the first user interface, wherein the second user interface is a system user interface of the electronic device, such as in FIGS. 14B, 14E, etc. (e.g., the input detected at the respective input device causes a corresponding action to be performed in the second user interface, and no action to be performed in the first user interface). For example, in some embodiments, if the respective input device is in the first mode of operation, a particular directional input detected at the respective input device causes a corresponding directional action to occur in a first region of the display area displayed by the display generation component (e.g., moving a character in a game in that direction, moving a game piece in that direction, etc., where the character or game piece are in a first region of the display area displayed by the display generation component, such as the lower-middle section of the display area). Similarly, in some embodiments, if the respective input device is in the first mode of operation, a particular selection input detected at the respective input device causes a corresponding selection action to occur in the first region of the display area displayed by the display generation component (e.g., causing a character to perform an action such as open a door, dropping a game piece in its current location, etc., where the character or game piece are in a first region of the display area displayed by the display generation component, such as the lower-middle section of the display area). In contrast, in some embodiments, if the respective input device is in the second mode of operation, the same particular directional input detected at the respective input device causes a corresponding directional action to occur in a second region, different from the first region, of the display area displayed by the display generation component (e.g., moving a current focus from a first notification to a second notification in a system notification user interface that includes notifications from a plurality of applications installed on the electronic device, where the notifications are displayed in the second region, different from the first region, of the display area displayed by the display generation component, such as the upper-middle section of the display area in a notification user interface that is overlaid on the first user interface). Similarly, in some embodiments, if the respective input device is in the second mode of operation, the same particular selection input detected at the respective input device causes a corresponding selection action to occur in the second region of the display area displayed by the display generation component (e.g., causing selection of a notification that has the current focus in the notification user interface, where the notification is in the second region of the display area displayed by the display generation component, such as the upper-middle section of the display area in the notification user interface that is overlaid on the first user interface). Controlling system or application user interfaces based on the mode of operation of the respective input device allows for full control of both types of user interfaces without a particular input detected at the respective input device being required to indicate or navigate to the system or application user interface, thereby enhancing user-device interactions and reducing the need for input to navigate to the system or application user interface.

In some embodiments, the respective input device is in the first mode or the second mode of operation based on a state of a mechanical input element included in the respective input device, such as button 1402 or switch 1420. For example, the respective input device includes a physical button, dial, toggle, slider, etc. with a spring and/or travel that controls whether the respective input device is in the first mode or the second mode of operation. In some embodiments, the respective input device includes a physical button that toggles between the first and second modes of operation in response to discrete presses of the physical button. In some embodiments, depression of the physical button puts the respective input device in the second mode of operation for as long as the button is depressed, and upon release of the button, the respective input device returns to the first mode of operation. Utilizing a physical input element on the respective input device to control the mode of operation provides an easily interactable and convenient manner of switching modes of operation, thereby enhancing user-device interactions.

In some embodiments, the mechanical input element is configured to while in a position corresponding to the second mode of operation, automatically transition to a position corresponding to the first mode of operation when force from an input directed to the mechanical input element ceases to be applied to the mechanical input element, such as element 1422 being biased towards the first position in slider switch 1420. For example, the mechanical input element includes a spring or similar apparatus that biases the element towards a position corresponding to the first mode of operation. When a finger provides enough force to move the input element to the position corresponding to the second mode of operation, the respective input device transitions to the second mode of operation, and when the finger no longer provides enough force to maintain the input element at the position corresponding to the second mode of operation, the input element moves to the position corresponding to the first mode of operation and the respective input device transitions to the first mode of operation. Biasing the input element towards the position corresponding to the first mode of operation avoids erroneous operation in the second mode of operation, thereby enhancing user-device interactions.

In some embodiments, the respective input device is in the first mode or the second mode of operation based on a state of a slider switch included in the respective input device, such as switch 1420 (e.g., a slider switch that moves horizontally on the respective input device, where a first horizontal position of the slider switch corresponds to the first mode of operation, and a second, different, horizontal position of the slider switch corresponds to the second mode of operation), and the slider switch is configured to move horizontally in a first direction from a first position corresponding to the first mode of operation to a second position corresponding to the second mode of operation, such as from FIG. 14G to 14H (e.g., the right-most position of the slider switch corresponds to the first mode of operation, and the slider switch is able to move to the left to a different position that corresponds to the second mode of operation). In some embodiments, in response to detecting the slider switch moving horizontally in the first direction from the first position corresponding to the first mode of operation to the second position corresponding to the second mode of operation, the electronic device displays, via the display generation component, an animation of the second user interface moving in the first direction to reveal display of the second user interface, such as in FIG. 14H. In some embodiments, the system user interface that is displayed in the second mode of operation is displayed as animating into the display in the same direction of the movement of the slider switch to the second mode of operation. In some embodiments, the progress of the movement of the system user interface is based on the movement of the slider switch such that if the slider switch stops moving, the system user interface stops sliding into the display, if the slider switch moves more quickly, the system user interface slides more quickly into the display, etc. In some embodiments, the first user interface correspondingly animates in the first direction, or remains static as the second user interface animates in the first direction to overlay at least a portion of the first user interface. Animating movement of the second user interface in a manner that corresponds to the movement of the slider switch clearly conveys the connection between the slider switch input and the displayed user interface, thereby enhancing user-device interactions.

In some embodiments, the second user interface includes respective information corresponding to a respective system operation, such as in user interface 1409 in FIG. 14K (e.g., information about an incoming call, information about an incoming message, etc., such as functions or operations other than those occurring in the first user interface and/or by the application associated with the first user interface). In some embodiments, while displaying the second user interface after the slider switch has moved horizontally in the first direction to the second position, detecting further horizontal movement of the slider switch (e.g., while the respective input device is in the second mode of operation, detecting further leftward or rightward movement of the slider switch), in response to detecting the further horizontal movement of the slider switch, in accordance with a determination that the further horizontal movement of the slider switch is in a first respective direction (e.g., the first direction, such as further leftward movement of the slider switch), the electronic device performs the respective system operation, such as in FIG. 14L (e.g., answering the incoming call, displaying the full content of the incoming message, etc.). In some embodiments, in accordance with a determination that the further horizontal movement of the slider switch is in a second respective direction (e.g., opposite the first direction, such as rightward movement of the slider switch), different from the first respective direction, the electronic device forgoes performing the respective system operation, such as described with reference to FIG. 14M (e.g., declining the incoming call, not displaying the full content of the incoming message, etc.). Performing or not performing system operations in response to slider switch directions that correspond to or don't correspond to, respective, operating in the second mode of operation maintains consistency of input paradigms at the respective input device, thereby enhancing user-device interactions.

In some embodiments, the respective input device is in the first mode or the second mode of operation based on a state of a virtual input element displayed by the respective input device. For example, the respective input device includes a display, a touch screen, a projector, etc. that displays a virtual switch, such as a virtual button, a virtual slider switch, a virtual dial. The virtual input element optionally responds to inputs in the same manners as described above with reference to physical or mechanical input elements. Utilizing a virtual input element on the respective input device to control the mode of operation provides for flexibility of layout of input element at the respective input device, thereby enhancing user-device interactions.

In some embodiments, the respective input device or the electronic is configured to indicate a correspondence between a respective input element (e.g., a particular button, virtual or mechanical) at the respective input device and a corresponding respective operation at the electronic device (e.g., corresponding to a button displayed by the electronic device via the display generation component). For example, if selection of a first button at the respective input device will perform a first (e.g., system) operation at the electronic device, the respective input device and/or the electronic device display an indication that indicates that selection of the first button at the respective input device will perform the first (e.g., system) operation at the electronic device, as will be described in more detail below. In some embodiments, the correspondence of buttons at the respective input device and operations at the electronic device is dynamic; therefore, the respective input device and/or the electronic device optionally dynamically update the indications provided by them (e.g., any of the indications described below) that indicate such correspondence. Thus, if the correspondence of an operation to a button on the respective input device changes, the respective input device and/or the electronic device optionally changes or updates the indication (e.g., any of the indications described below) appropriately. Indicating correspondence between operations at the electronic device and input elements at the respective input device avoids erroneous inputs to the electronic device, thereby enhancing user-device interactions and reducing errors in usage.

In some embodiments, the corresponding respective operation is accessible via selection of a second respective input element displayed via the display generation component (e.g., the electronic device displays a button in the first and/or second user interface that causes the operation to occur), the respective input element has a first appearance (e.g., a particular value of any visual characteristic, such as color, pattern, shading, size, shape, brightness, translucency, etc.), and the second respective input element has the first appearance, such as in FIG. 14U (e.g., the particular value of the same visual characteristic, such as color, pattern, shading, size, shape, brightness, translucency, etc.). Thus, for example, the button displayed by the electronic device has a red color, and the button on the respective input device for selecting the button displayed by the electronic device has the red color (or a similar red color). Indicating correspondence between input elements at the electronic device and input elements at the respective input device utilizing a shared appearance clearly conveys the correspondence without the need to introduce other indications that consume space in the user interface(s), thereby enhancing user-device interactions.

In some embodiments, before the second respective input element is displayed by the display generation component, the respective input element does not have the first appearance, and while the second respective input element is displayed by the display generation component (e.g., in response to the second respective input element being displayed by the display generation component), the respective input element has the first appearance, such as described with reference to FIG. 14W. For example, in some embodiments, the respective input device has capabilities (e.g., light/color emitting structures such as light-emitting diodes or displays) for changing the visual appearance (e.g., colors, etc.) of the input elements (e.g., buttons) on the respective input device. In some embodiments, the respective input device updates the visual appearance of those input elements based on (e.g., to correspond to or match) the visual appearance of the input elements displayed by the electronic device that correspond to those input elements on the respective input device. Updating the visual appearance of an input element on the respective input device to correspond to the visual appearance of the input element displayed by the electronic device that will be activated upon selection of the input element on the respective input device efficiently conveys the correspondence without the need to introduce other indications that consume space in the user interface(s), thereby enhancing user-device interactions.

In some embodiments, before the second respective input element is displayed by the display generation component, the respective input element has the first appearance (e.g., the button on the respective input device has the first appearance before the electronic device displays the second respective input element), and while the second respective input element is displayed by the display generation component (e.g., in response to the second respective input element being displayed by the display generation component), in accordance with a determination that the second respective input element corresponds to the respective input element (e.g., the second respective input element would be selected in response to the respective input element on the respective input device being selected), the second respective input element has the first appearance (e.g., the electronic device displays the second respective input element to have an appearance that matches or corresponds to the appearance of the respective input element on the respective input device), and in accordance with a determination that the second respective input element corresponds to a third respective input element, different from the respective input element (e.g., the second respective input element would be selected in response to the third respective input element— not the respect input element-on the respective input device being selected), on the respective input device, the second respective input element has a second appearance, different from the first appearance, such as described with reference to FIG. 14U (e.g., the electronic device displays the second respective input element to have an appearance that matches or corresponds to the appearance of the third respective input element—not the respective input element-on the respective input device). Thus, in some embodiments, the electronic device updates and/or controls the visual appearance of input elements it displays based on (e.g., to correspond to or match) the visual appearance of the input elements on the respective input device that correspond to those input elements displayed by the electronic device. Controlling the visual appearance of an input element displayed by the electronic device to correspond to the visual appearance of the input element on the respective input device that will activate the displayed input element upon selection efficiently conveys the correspondence without the need to introduce other indications that consume space in the user interface(s), thereby enhancing user-device interactions.

In some embodiments, the corresponding respective operation is accessible via selection of a second respective input element displayed via the display generation component, and the second respective input element is displayed with an identifier corresponding to the respective input element at the respective input device, such as in FIG. 14S. For example, the electronic device displays the second respective input element with information that indicates which button on the respective input device, the selection of which causes the second respective input element to be selected. For example, if buttons on the respective input device as labeled with letters such as "A", "B", "C", etc., the electronic device optionally displays buttons that will be selected in response to selection of those "A", "B", "C" buttons on the respective input device with corresponding indications of "A", "B", "C", respectively. Displaying an input element with an identifier that corresponds to a button on the respective input device efficiently conveys the correspondence, thereby enhancing user-device interactions.

In some embodiments, the respective input device displays a visual indication of the respective operation associated with the respective input element, such as in FIG. 14Y. For example, the respective input device optionally includes an integrated display, and displays, on the display in correspondence with the respective input element, an indication of the operation that will be performed at the electronic device in response to selection of the respective input element. For example, if selection of the respective input element will cause selection of an "A" button displayed by the electronic device, the respective input device optionally displays an "A" near or proximate to or connected to the respective input element. As another example, if selection of the respective input element will cause the electronic device to display a messaging user interface, the respective input device optionally displays an "M" or "Messaging" near or proximate to or connected to the respective input element. Displaying a button with an indication of the operation that corresponds to the button efficiently conveys the correspondence, thereby enhancing user-device interactions.

In some embodiments, while the respective input device is in the first mode of operation, the respective input device indicates that the respective input device is in the first mode of operation, such as via indicator 1410. For example, the respective input device includes an integrated display, a status LED, etc. that dynamically changes and indicates that the respective input device is in the first mode of operation when that is the case. In some embodiments, while the respective input device is in the second mode of operation, the respective input device indicates that the respective input device is in the second mode of operation, such as via indicator 1410. For example, the respective input device includes an integrated display, a status LED, etc. that dynamically changes and indicates that the respective input device is in the second mode of operation when that is the case. Displaying an indication of the mode of operation of the respective input device at the respective input device efficiently conveys status of operation of the respective input device, thereby enhancing user-device interactions and reducing errors in usage.

In some embodiments, while displaying the first user interface while the respective input device is in the first mode of operation, the electronic device detects that the respective input device has transitioned to the second mode of operation (e.g., detecting selection of, toggling of, sliding of, etc. any of the previously described input elements at the respective input device for controlling the mode of operation of the respective input device). In some embodiments, in response to detecting that the respective input device has transitioned to the second mode of operation, the electronic device pauses progress in the first user interface, such as shown in FIG. 14H. For example, if the first user interface is a user interface of a game (or other application) that is running on the electronic device, the electronic device optionally automatically pauses the game (or other application) when the respective input device is switched to the second mode of operation (e.g., for controlling system operations). In this way, the user is able to provide system operation inputs to the electronic device without (e.g., adversely) affecting their progress in the game (or other application). Automatically pausing progress in the first user interface avoids accidental progression through the first user interface without requiring separate input to pause the progress in the first user interface, thereby enhancing user-device interactions and reducing errors in usage.

In some embodiments, while displaying the first user interface while the respective input device is in the first mode of operation, the electronic device detects a notification event, such as in FIG. 14F (e.g., detecting that the electronic device has received an incoming message, that the electronic device has received an incoming phone call, that an application (e.g., other than the application displaying the first user interface) on the electronic device has generated a notification associated with content from that application, etc.). In some embodiments, the electronic device receives, via the respective input device, input associated with the notification event. For example, the electronic device displays an indication of the notification (e.g., including some information about the notification), and receives selection of the indication of the notification (e.g., via input from the respective input device. In some embodiments, the respective input device displays an indication of the notification (e.g., a status LED on the respective input device becomes illuminated), and the respective input device detects an input for displaying, via the display generation component, additional information about the notification, such as toggling of a system button or slider on the respective input device.

In some embodiments, in response to receiving the input associated with the notification event, the electronic device pauses progress in the first user interface, such as in FIG. 14H. For example, if the first user interface is a user interface of a game (or other application) that is running on the electronic device, the electronic device optionally automatically pauses the game (or other application) when the input associated with the notification even is received. In this way, the user is able to provide system operation inputs to the electronic device associated with the notification without (e.g., adversely) affecting their progress in the game (or other application). In some embodiments, the electronic device transitions the respective input device to the second mode of operation. Thus, the respective input device automatically transitions to the mode of operation for providing inputs directed to the notification (e.g., system operation inputs) rather than for providing inputs directed to the first user interface. Subsequently, inputs detected at the respective input device can be for responding to the notification event (e.g., responding to a message), answering or declining an incoming call, viewing (or not viewing) additional information about a notification generated by an application, etc. Automatically pausing progress in the first user interface and transitioning the respective input device to the second mode of operation avoids accidental progression through the first user interface and allows for immediate interaction with the notification event without requiring separate inputs to do so, thereby enhancing user-device interactions and reducing errors in usage.

In some embodiments, while displaying the first user interface while the respective input device is in the first mode of operation, the electronic device detects that the respective input device has transitioned to the second mode of operation (e.g., in response to input directed to a toggle, switch, button, slider, etc., as previously described). In some embodiments, in response to detecting that the respective input device has transitioned to the second mode of operation, in accordance with a determination that a notification corresponding to a communication event was displayed when the respective input device transitioned to the second mode of operation (e.g., if the electronic device was displaying, via the display generation component, a visual indication of the communication event, such as an indication of an incoming text message that includes a portion of preview of the content of the text message; or if the respective input device was indicating the existence of a current communication event via illumination of an LED and/or via display, via a display of the respective input device, a visual indication of the communication event, such as an indication of an incoming text message that includes a portion of preview of the content of the text message), the electronic device displays, via the display generation component, a communication user interface associated with the communication event, such as in FIG. 14K or FIG. 14O. For example, if a communication is outstanding (e.g., not viewed, not dismissed, not replied-to, etc.) when the input for transitioning from the first mode to the second mode is received, the electronic device optionally displays a communication user interface for viewing more information about the communication event. In some embodiments, inputs from the respective input device at this point are directed to the communication user interface for dismissing, responding to, viewing more information about, etc., the communication event. In some embodiments, in conjunction with displaying the communication user interface, the electronic device pauses progress in the first user interface. In some embodiments, the communication user interface includes information for and/or is for providing input directed to the latest communication event at the electronic device, and not prior communication events at the electronic device. Automatically displaying a communication user interface associated with the incoming communication event provides an efficient way of providing input associated with the communication event, thereby enhancing user-device interactions and reducing errors in usage.

In some embodiments, displaying the communication user interface includes displaying the communication user interface overlaid on the first user interface, such as in FIG. 14K or 14O (e.g., the communication user interface is overlaid on a right-side portion of the first user interface while the left-side portion of the first user interface remains displayed), and the respective input device transitioned from the first mode of operation to the second mode of operation in response to detecting a first movement of a respective input element at the respective input device, such as the movement of element 1422 in slider 1420 (e.g., in response to detecting a slider switch on the respective input device moving leftward a first distance to a first position). In some embodiments, while displaying the communication user interface overlaid on the first user interface, the electronic device detects, via the respective input device, a further movement of the respective input element at the respective input device (e.g., leftward or rightward movement of the slider switch from the first position). In some embodiments, in response to detecting the further movement of the respective input element at the respective input device (e.g., in response to detecting further leftward movement of the slider switch, and not further rightward movement of the slider switch), the electronic device ceases display of the first user interface, such as in FIG. 14L (e.g., while continuing to pause progress in the first user interface). In some embodiments, the electronic device displays, via the display generation component, a second communication user interface associated with the communication event, such as in FIG. 14L. For example, a communication user interface that includes further information and/or input elements for interacting with the communication event, information and/or input elements that were not included in the communication user interface. In some embodiments, if the electronic device detects rightward movement of the slider switch from the first position, the electronic device optionally fully redisplays the first user interface and ceases display of the communication user interface (e.g., without displaying the second communication user interface). Displaying an additional communication user interface in response to further movement of the respective input element provides an efficient way of providing additional information and/or input options related to the communication event, thereby enhancing user-device interactions and reducing errors in usage.

In some embodiments, in accordance with a determination that the communication event corresponds to a first type of communication (e.g., a phone call or video call, or more generally communications that are synchronous), the communication user interface is a first communication user interface, and in accordance with a determination that the communication event corresponds to a second type, different from the first type, of communication (e.g., a text message or email, or more generally communications that are asynchronous), the communication user interface is a second communication user interface, different from the first communication user interface, such as shown in FIGS. 14K and 14O. Different types of communications optionally correspond to different communication user interfaces being displayed. For example, a phone call user interface optionally includes one or more selectable options for muting the call, displaying a number pad for inputting number selections, adding participants to the call, ending the call, etc. A text messaging user interface, on the other hand, optionally includes one or more selectable options for typing a text response to a message, sending a typed response to the message, sending a predefined or suggestion response to the message, etc. Displaying different user interfaces for different types of communications provides access to relevant information or input elements for those communications, thereby enhancing user-device interactions and reducing errors in usage.

In some embodiments, the first movement and the further movement of the respective input element are in a first direction (e.g., sequential leftward movement of a slider switch on the respective input device). In some embodiments, while displaying the communication user interface (or the second communication user interface) with a respective user interface element having a current focus (e.g., directional movement detected at the respective input device (e.g., at a d-pad or other directional input element of the respective input device, other than the slider switch) optionally causes the current focus to move accordingly in the communication user interface or the second communication user interface while the slider switch is maintained in its current position), the electronic device detects a second movement of the respective input element at the respective input device in a second direction, different from the first direction, such as from FIG. 14P to 14Q. For example, rightward movement of the slider switch. In some embodiments, the rightward movement of the slider switch is to the first/intermediate position in the slider switch. In some embodiments, the rightward movement of the slider switch is to the right-mode position in the slider switch. In some embodiments, in response to detecting the second movement of the respective input element, the electronic device performs an operation corresponding to the respective user interface element, such as in FIG. 14Q. For example, the respective user interface element (e.g., whether it corresponds to sending a response to a message, ending a phone call, etc.) is selected in response to the rightward movement of the slider switch. Therefore, the electronic device optionally performs the operation corresponding to the respective user interface element in response to the rightward movement of the slider switch. Selecting a user interface element with current focus in response to movement of the respective input element provides an efficient manner to select the user interface element (e.g., without requiring other input to do so), thereby enhancing user-device interactions.

In some embodiments, the operation corresponding to the respective user interface element includes transmitting a response to the communication event, such as in FIG. 14Q. For example, the respective user interface element is an element for sending a typed (or suggested) message in response to a message sender and/or phone call originator, and selection of the respective user interface element causes the electronic device to send the typed message. In some embodiments, the movement of the respective input element at the respective input device in the second direction additionally or alternatively causes the electronic device to cease display of the communication user interface (or the second communication user interface) and redisplay the first user interface. In some embodiments, redisplaying the first user interface includes resuming progress in the first user interface from the progress position that was current when the respective input device transitioning to the second mode of operation after the communication event was detected. Transmitting a response to a communication event in response to movement of the respective input element provides an efficient manner for doing so (e.g., without requiring other input to do so), thereby enhancing user-device interactions.

In some embodiments, the respective input device displays a respective user interface for selecting a target electronic device to be controlled by the respective input device, such as in FIG. 14Z. For example, the respective input device has a display (e.g., a touch screen display, a projector, etc.) and is able to control a plurality of target devices (e.g., one at a given moment in time), including the electronic device. In response to detecting an input to switch target devices for control, the respective input device optionally displays a user interface from which a target device for control can be selected (e.g., displays a list of potential target devices that are in communication range of the respective input device from which a target device for control can be selected). In some embodiments, in response to detecting an input to switch the target device for control to the selected target device, the respective input device is configured to control the selected target device (e.g., rather than the previously controlled target device). Displaying a user interface from which to select a target device for control provides an efficient manner for doing so, thereby enhancing user-device interactions and reducing errors in usage.

In some embodiments, the respective user interface is displayed on a display (e.g., touch screen) integrated into the respective input device. In some embodiments, the respective user interface is a projected user interface, such as in FIG. 14Z. For example, the respective input device optionally includes a projector that is able to project one or more user interfaces on one or more surfaces external to the respective input devices, such as in the physical environment of the respective input device (e.g., on a table, on a wall, etc.). In some embodiments, the respective user interface for selecting a target device for control is projected on such a surface. Displaying the respective user interface as a projected user interface avoids consuming portions of the respective input device and/or portions of the user interface displayed by the electronic device with the respective user interface, thereby enhancing user-device interactions and reducing errors in usage.

In some embodiments, the respective user interface is projected onto a surface in an environment of the respective input device, such as in FIG. 14Z. For example, the respective input device projects the respective user interface onto a top surface of a table (e.g., coffee table) between the respective input device and the potential target electronic devices. As another example, the respective input device projects the respective user interface onto a wall behind a television(s) (e.g., display generation component(s)) connected to the potential target electronic device(s). Displaying the respective user interface as a projected user interface on a nearby surface places the respective user interface at an accessible distance, thereby enhancing user-device interactions and reducing errors in usage.

In some embodiments, in accordance with a determination that the respective input device is oriented towards a first candidate target electronic device, the respective user interface is projected towards a first location based on a location of the first candidate target electronic device, and in accordance with a determination that the respective input device is oriented towards a second candidate target electronic device, the respective user interface is projected towards a second location, different from the first location, based on a location of the second candidate target electronic device, such as in FIGS. 14Z and 14AA. For example, the respective input device optionally projects the respective user interface to be aligned with and/or centered with the location of a target device toward which the respective input device is oriented. If the respective input device is oriented towards a display associated with (e.g., connected to) a target device, the respective input device optionally displays the respective user interface as aligned with the display. Aligning the respective user interface with potential target devices has one or more characteristics of projected content described with reference to method 1400. Displaying the respective user interface as a projected user interface aligned with a target device places the respective user interface at relevant location, thereby enhancing user-device interactions and reducing errors in usage.

In some embodiments, the respective input device includes an indication (e.g., a display, one or more lights (e.g., LEDs), etc.) that indicates which target device is currently being controlled by the respective input device. In some embodiments, the respective input device displays a list of potential target devices, and selection (e.g., via input from the respective input device) of a target device from the list causes the respective input device to control that selected target device.

In some embodiments, the respective user interface includes a representation of a map of a physical environment of the respective input device (e.g., an outline of a room in which the respective input device is located), including one or more representations of one or more candidate target electronic devices that are selectable to designate the selected candidate target electronic device as the target electronic device to be controlled by the respective input device, such as in FIG. 14AB. For example, if a first candidate target device is ahead of and to the right of the respective input device, the map includes a representation of the first candidate target device at a location on the map corresponding to the ahead-and-to-the-right location of the first candidate target device. In some embodiments, if a second candidate target device is ahead of and to the left of the respective input device, the map includes a representation of the second candidate target device at a different location on the map corresponding to the ahead-and-to-the-left location of the second candidate target device. Selection of the representation of the first target device optionally causes the respective input device to control the first target device, and selection of the representation of the second target device optionally causes the respective input device to control the second target device. Displaying target devices in a map interface for selection provides an efficient manner of identifying target devices for selection, thereby enhancing user-device interactions and reducing errors in usage.

In some embodiments, in accordance with a determination that the respective input device is oriented towards a first electronic device (e.g., for at least a threshold amount of time, such as 0.1, 0.3, 0.5, 1, 3, 5, 10, 20 seconds), the first electronic device is selected as a target electronic device to be controlled by the respective input device, and in accordance with a determination that the respective input device is oriented towards a second electronic device (e.g., for at least the threshold amount of time, such as 0.1, 0.3, 0.5, 1, 3, 5, 10, 20 seconds), different from the first electronic device, the second electronic device is selected as the target electronic device to be controlled by the respective input device, such as in FIGS. 14AG and 14AH. In some embodiments, the respective input device determines devices towards which it is oriented in ways similar to those described with reference to method 1400. In some embodiments, after selecting a target electronic device based on orientation, the respective input device need not continue to be oriented towards the target electronic device for the respective input device to continue to control that target electronic device. Selecting a target electronic device for control based on orientation provides an efficient manner of selecting target devices without the need for dedicated buttons or display area for doing so, thereby enhancing user-device interactions and reducing errors in usage.

In some embodiments, the respective input device includes a first button and a second button (e.g., physical buttons with spring/travel or virtual buttons displayed on an integrated touch screen), in response to selection of the first button, a first electronic device is selected as a target electronic device to be controlled by the respective input device, and in response to selection of the second button, a second electronic device is selected as the target electronic device to be controlled by the respective input device, such as in FIG. 14AF. In some embodiments, the first and second buttons are configured to provide inputs to the electronic device other than target device selection inputs when the respective input device is not in a target device selection mode (e.g., while the respective input device is controlling the first user interface or the second user interface). However, in response to the respective input device receiving a particular input to enter a target device selection mode, the first and second buttons optionally become associated with different target devices to be controlled by the respective input device. After the first or second button is selected, the respective input device optionally transitions out of the target device selection mode, and the first and second buttons are optionally again configured to provide inputs other than target device selection inputs. Associating different buttons with different target devices provides an efficient manner of selecting target devices, thereby enhancing user-device interactions and reducing errors in usage.

In some embodiments, in accordance with a determination that a first electronic device is selected as a target electronic device to be controlled by the respective input device, wherein the first electronic device is displaying first content, the respective input device displays (e.g., via an integrated display, touch screen and/or projector display) content corresponding to the first content, and in accordance with a determination that a second electronic device, different from the first electronic device, is selected as the target electronic device to be controlled by the respective input device, wherein the second electronic device is displaying second content, the respective input device displays content corresponding to the second content, such as in FIGS. 14AD and AE (e.g., which is optionally different from the content corresponding to the first content). For example, in some embodiments, the respective input device displays an image, content, color, or any other visual element that corresponds to what is currently being displayed by the target device that is selected for control by the respective input device, thereby providing an indication of which target device is currently being controlled by the respective input device. For example, if the currently selected target device is displaying a background image, the respective input device optionally displays the same background image, a portion of the background image, a modified version of the background image, a color corresponding to one or more colors of the background image, etc. If the content and/or background image displayed by the currently selected target device changes, the image, content, color, or any other visual element displayed by the respective input device optionally changes to match. Displaying content corresponding to the target device being controlled provides an efficient manner of indicating which target device is being controlled, thereby enhancing user-device interactions and reducing errors in usage.

It should be understood that the particular order in which the operations in FIG. 15 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100 and 1300) are also applicable in an analogous manner to method 1500 described above with respect to FIG. 15. For example, the operation of the electronic device responding to inputs from a remote input device and/or operations of the remote input device described above with reference to method 1500 optionally have one or more of the characteristics of displaying user interfaces associated with games in response to detecting input devices having been connected to an electronic device, displaying a reduced user interface in response to detecting that a cover has covered a portion of the display, displaying a user interface via a display generation component of an input device, electronic devices and/or remote input devices, described herein with reference to other methods described herein (e.g., methods 700, 900, 1100 and 1300). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIG. 15 are, optionally, implemented by components depicted in FIGS. 1A-1B. For example, displaying operation 1502*a* and receiving operation 1502*b* are, optionally, implemented by event sorter 170, event recognizer 180, and event handler 190. Event monitor 171 in event sorter 170 detects an input from the remote input device, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include friends and/or contacts, demographic data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver notifications and/or online information of friends of the user in accordance with their preferences. Accordingly, use of such personal information data enables users to receive more information. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of displaying the contacts and/or friends of the user and/or the online status of contacts and/or friends of the user and/or sharing the user's online status with other users, the present technology can be configured to allow users to select to "opt in" or "opt out" of participation in the collection of personal information data during registration for services or anytime thereafter. In another example, users can select not to provide online status data. In yet another example, users can select to limit the length of time online status data is maintained or entirely block the sharing of online status. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at population or group level rather than at an individual user level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display generation component and one or more input devices:
while displaying, via the display generation component, a first user interface associated with a first mode of the electronic device, detecting that a respective input device, separate from the electronic device, is in a first configuration relative to the electronic device, wherein the first configuration is a configuration in which the respective input device can provide input to a user interface of the electronic device when the electronic device is in a second mode, different from the first mode;
in response to detecting that the respective input device is in the first configuration relative to the electronic device, displaying, via the display generation component, the user interface of the electronic device when the electronic device is in the second mode;
while the respective input device is attached to the electronic device, detecting a respective event including detecting that at least a portion of the respective input device has been detached from the electronic device and attached to a second electronic device, and that at least a portion of a second respective input device associated with the second electronic device has been attached to the electronic device; and
in response to detecting the respective event, initiating a process to create a gaming session in which the electronic device and the second electronic device participate.

2. The method of claim 1, wherein detecting that the respective input device is in the first configuration relative to the electronic device includes detecting that the respective input device has been attached to the electronic device.

3. The method of claim 1, wherein detecting that the respective input device is in the first configuration relative to the electronic device includes detecting that a portion of the respective input device has been rotated to a respective orientation relative to the electronic device.

4. The method of claim 1, wherein detecting that the respective input device is in the first configuration relative to the electronic device includes detecting that a portion of the respective input device has been translated to a respective position relative to the electronic device.

5. The method of claim 1, wherein detecting that the respective input device is in the first configuration relative to the electronic device includes detecting that a portion of the respective input device has been unfolded to make accessible, on the portion, one or more input elements to provide input to the user interface of the electronic device when the electronic device is in the second mode of the electronic device.

6. The method of claim 5, wherein the portion of the respective input device includes a second display generation component configured to display information to one or more other users in a physical environment of the electronic device.

7. The method of claim 5, wherein the display generation component associated with the electronic device is configured to display a first portion of the user interface of the electronic device when the electronic device is in the second mode, and the portion of the respective input device includes a second display generation component configured to display a second portion, different from the first portion, of the user interface of the electronic device when the electronic device is in the second mode.

8. The method of claim 1, wherein the second mode of the electronic device is a game mode, and the user interface of the electronic device when the electronic device is in the second mode is a user interface that includes information about one or more games accessible via the electronic device, and one or more selectable options to display the one or more games via the display generation component.

9. The method of claim 1, further comprising:
while the respective input device is in the first configuration relative to the electronic device and while displaying the user interface of the electronic device when the electronic device is in the second mode via the display generation component, detecting that the respective input device has changed from being in the first configuration relative to the electronic device to being in a second configuration, different from the first configuration, relative to the electronic device while remaining attached to the electronic device; and
in response to detecting that the respective input device has changed from being in the first configuration relative to the electronic device to being in the second configuration relative to the electronic device while remaining attached to the electronic device, maintaining display of the user interface of the electronic device when the electronic device is in the second mode via the display generation component.

10. An electronic device, comprising:
one or more processors;
memory; and
one or more programs, wherein the one or more programs are stored in the memory and configured to be executed by the one or more processors, the one or more programs including instructions for:
while displaying, via a display generation component, a first user interface associated with a first mode of the electronic device, detecting that a respective input device, separate from the electronic device, is in a first configuration relative to the electronic device, wherein the first configuration is a configuration in which the respective input device can provide input to a user interface of the electronic device when the electronic device is in a second mode, different from the first mode;
in response to detecting that the respective input device is in the first configuration relative to the electronic device, displaying, via the display generation component, the user interface of the electronic device when the electronic device is in the second mode;
while the respective input device is attached to the electronic device, detecting a respective event including detecting that at least a portion of the respective input device has been detached from the electronic device and attached to a second electronic device, and that at least a portion of a second respective input device associated with the second electronic device has been attached to the electronic device; and
in response to detecting the respective event, initiating a process to create a gaming session in which the electronic device and the second electronic device participate.

11. The electronic device of claim 10, wherein detecting that the respective input device is in the first configuration relative to the electronic device includes detecting that the respective input device has been attached to the electronic device.

12. The electronic device of claim 10, wherein detecting that the respective input device is in the first configuration relative to the electronic device includes detecting that a portion of the respective input device has been rotated to a respective orientation relative to the electronic device.

13. The electronic device of claim 10, wherein detecting that the respective input device is in the first configuration relative to the electronic device includes detecting that a portion of the respective input device has been translated to a respective position relative to the electronic device.

14. The electronic device of claim 10, wherein detecting that the respective input device is in the first configuration relative to the electronic device includes detecting that a portion of the respective input device has been unfolded to make accessible, on the portion, one or more input elements to provide input to the user interface of the electronic device when the electronic device is in the second mode of the electronic device.

15. The electronic device of claim 14, wherein the portion of the respective input device includes a second display generation component configured to display information to one or more other users in a physical environment of the electronic device.

16. The electronic device of claim 14, wherein the display generation component associated with the electronic device is configured to display a first portion of the user interface of the electronic device when the electronic device is in the second mode, and the portion of the respective input device includes a second display generation component configured to display a second portion, different from the first portion, of the user interface of the electronic device when the electronic device is in the second mode.

17. The electronic device of claim 10, wherein the second mode of the electronic device is a game mode, and the user interface of the electronic device when the electronic device is in the second mode is a user interface that includes information about one or more games accessible via the electronic device, and one or more selectable options to display the one or more games via the display generation component.

18. The electronic device of claim 10, the one or more programs including further instructions for:
while the respective input device is in the first configuration relative to the electronic device and while displaying the user interface of the electronic device when the electronic device is in the second mode via the display generation component, detecting that the respective input device has changed from being in the first configuration relative to the electronic device to being in a second configuration, different from the first configuration, relative to the electronic device while remaining attached to the electronic device; and
in response to detecting that the respective input device has changed from being in the first configuration relative to the electronic device to being in the second configuration relative to the electronic device while remaining attached to the electronic device, maintaining display of the user interface of the electronic device when the electronic device is in the second mode via the display generation component.

19. A non-transitory computer readable storage medium storing one or more programs, the one or more programs comprising instructions, which when executed by one or more processors of an electronic device, cause the electronic device to perform a method comprising:
while displaying, via a display generation component, a first user interface associated with a first mode of the electronic device, detecting that a respective input device, separate from the electronic device, is in a first configuration relative to the electronic device, wherein the first configuration is a configuration in which the respective input device can provide input to a user interface of the electronic device when the electronic device is in a second mode, different from the first mode;
in response to detecting that the respective input device is in the first configuration relative to the electronic device, displaying, via the display generation component, the user interface of the electronic device when the electronic device is in the second mode;
while the respective input device is attached to the electronic device, detecting a respective event including detecting that at least a portion of the respective input device has been detached from the electronic device and attached to a second electronic device, and that at least a portion of a second respective input device associated with the second electronic device has been attached to the electronic device; and
in response to detecting the respective event, initiating a process to create a gaming session in which the electronic device and the second electronic device participate.

20. The non-transitory computer readable storage medium of claim 19, wherein detecting that the respective input device is in the first configuration relative to the electronic device includes detecting that the respective input device has been attached to the electronic device.

21. The non-transitory computer readable storage medium of claim 19, wherein detecting that the respective input device is in the first configuration relative to the electronic device includes detecting that a portion of the respective input device has been rotated to a respective orientation relative to the electronic device.

22. The non-transitory computer readable storage medium of claim 19, wherein detecting that the respective input device is in the first configuration relative to the electronic device includes detecting that a portion of the respective input device has been translated to a respective position relative to the electronic device.

23. The non-transitory computer readable storage medium of claim 19, wherein detecting that the respective input device is in the first configuration relative to the electronic device includes detecting that a portion of the respective input device has been unfolded to make accessible, on the portion, one or more input elements to provide input to the user interface of the electronic device when the electronic device is in the second mode of the electronic device.

24. The non-transitory computer readable storage medium of claim 23, wherein the portion of the respective input device includes a second display generation component configured to display information to one or more other users in a physical environment of the electronic device.

25. The non-transitory computer readable storage medium of claim 23, wherein the display generation component associated with the electronic device is configured to display a first portion of the user interface of the electronic device when the electronic device is in the second mode, and the portion of the respective input device includes a second display generation component configured to display a second portion, different from the first portion, of the user interface of the electronic device when the electronic device is in the second mode.

26. The non-transitory computer readable storage medium of claim 19, wherein the second mode of the electronic device is a game mode, and the user interface of the electronic device when the electronic device is in the second mode is a user interface that includes information about one or more games accessible via the electronic device, and one or more selectable options to display the one or more games via the display generation component.

27. The non-transitory computer readable storage medium of claim 19, the one or more programs comprising further instructions, which when executed by the one or more processors of the electronic device, cause the electronic device to perform the method, further comprising:
  while the respective input device is in the first configuration relative to the electronic device and while displaying the user interface of the electronic device when the electronic device is in the second mode via the display generation component, detecting that the respective input device has changed from being in the first configuration relative to the electronic device to being in a second configuration, different from the first configuration, relative to the electronic device while remaining attached to the electronic device; and
  in response to detecting that the respective input device has changed from being in the first configuration relative to the electronic device to being in the second configuration relative to the electronic device while remaining attached to the electronic device, maintaining display of the user interface of the electronic device when the electronic device is in the second mode via the display generation component.

* * * * *